United States Patent
Tsushima et al.

[11] Patent Number: 5,999,213
[45] Date of Patent: Dec. 7, 1999

[54] METHOD OF AND APPARATUS FOR SETTING UP ELECTRONIC DEVICE

[75] Inventors: Katsuhiko Tsushima; Kazuyoshi Miyamoto; Taku Kihara; Yoshio Chiba, all of Kanagawa, Japan

[73] Assignee: Sony Corporation, Tokyo, Japan

[21] Appl. No.: 08/659,686

[22] Filed: Jun. 6, 1996

[30] Foreign Application Priority Data

Jun. 8, 1995 [JP] Japan ................................. 7-142222

[51] Int. Cl.$^6$ ........................ H04N 17/00; H04N 17/02
[52] U.S. Cl. ........................ 348/180; 348/181; 348/211; 348/212
[58] Field of Search ........................ 348/180, 181, 348/187, 223, 254, 722, 723, 211, 212, 213, 214; H04N 17/00, 17/02

[56] References Cited

U.S. PATENT DOCUMENTS

| | | | |
|---|---|---|---|
| 4,949,286 | 8/1990 | Ohba | 348/580 |
| 5,036,251 | 7/1991 | Lee | 348/180 |
| 5,051,827 | 9/1991 | Fairhurst | 358/141 |
| 5,227,881 | 7/1993 | Wess et al. | 348/734 |
| 5,291,276 | 3/1994 | Matsumoto et al. | 348/180 |
| 5,298,993 | 3/1994 | Edgar et al. | 348/10 |
| 5,335,013 | 8/1994 | Faber | 348/254 |
| 5,384,768 | 1/1995 | Fujii | 370/14 |
| 5,483,259 | 1/1996 | Sachs | 348/189 |
| 5,647,019 | 7/1997 | Iino et al. | 348/442 |
| 5,675,358 | 10/1997 | Bullock et al. | 348/211 |
| 5,745,161 | 4/1998 | Ito | 346/211 |

FOREIGN PATENT DOCUMENTS 0 656 731  6/1995  European Pat. Off. .

OTHER PUBLICATIONS

Patent Abstracts of Japan vol. 017, No. 581 (P–1631), Oct. 21, 1993 of JP 05 165943 A (Fuji Xerox Co Ltd), Jul. 2, 1993.

Patent Abstracts of Japan vol. 018, No. 029 (E–1492), Jan. 17, 1994 of JP 05 260405 A (Sony Corp), Oct. 8, 1993.

Primary Examiner—Nathan Flynn
Assistant Examiner—Vivek Srivastava
Attorney, Agent, or Firm—Frommer Lawrence & Haug, LLP.; William S. Frommer

[57] ABSTRACT

An apparatus for setting up an electronic device has a memory for storing parameter setting image data for establishing one or more parameters with respect to a controlled device, the parameter setting image including parameter changing switch image data and setting state display image data, a display unit for displaying a parameter setting image based on the parameter setting image data read from the memory, an input unit for entering input information indicating changes in display states of a parameter changing switch image data and a setting state display image which are displayed by the display unit and a parameter to be established, and a controller for changing the display states of the parameter changing switch image data an the setting state display image which are displayed by the display unit and the parameter to be established, based on the input information entered by the input unit, and transmitting changed parameter data or a change in the parameter to the controlled device.

27 Claims, 84 Drawing Sheets

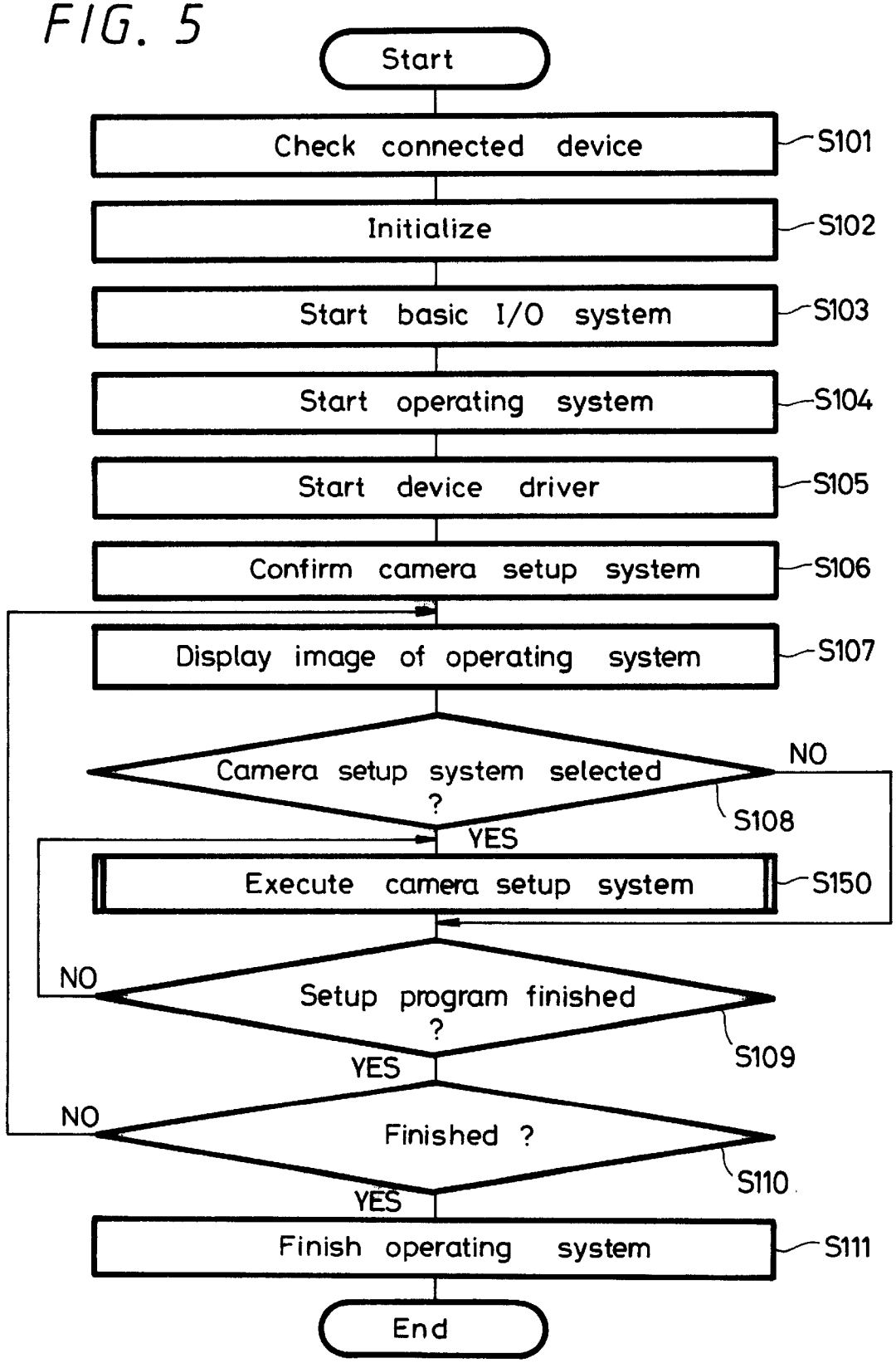

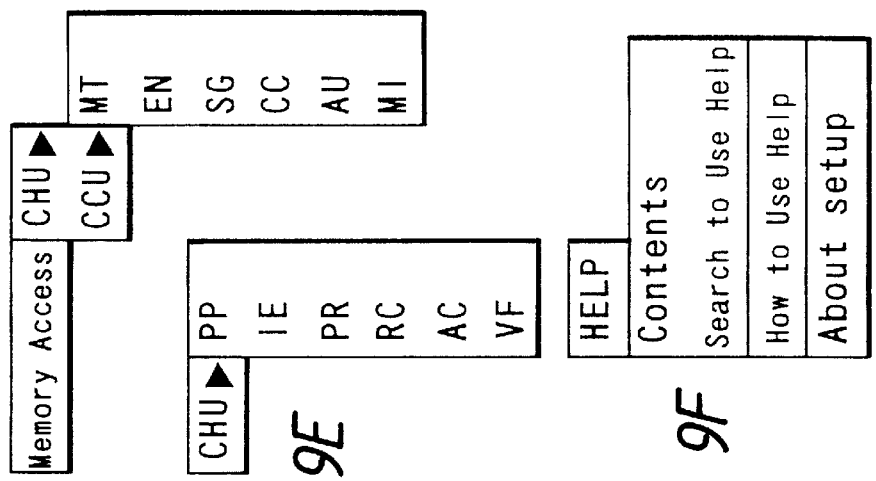
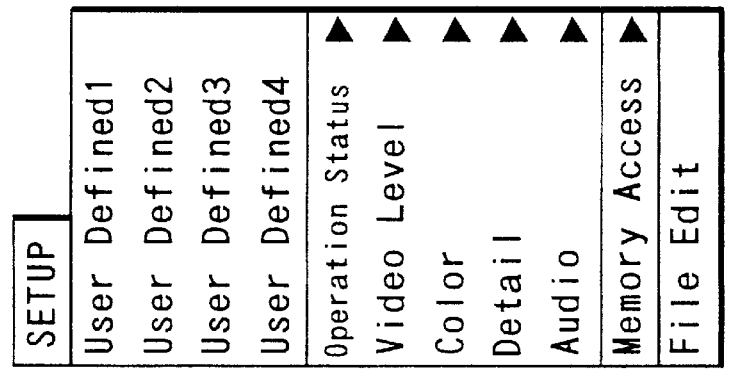
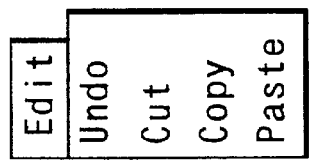
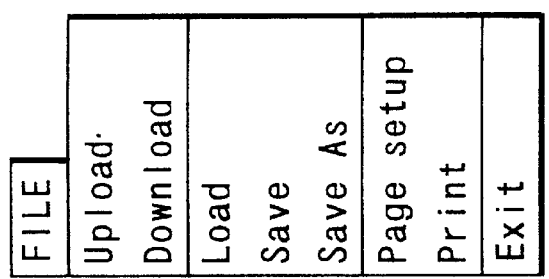
FIG. 9A  FIG. 9B  FIG. 9C  FIG. 9D  FIG. 9E  FIG. 9F

FIG. 10C

| Color | Black |
| --- | --- |
| | White |
| | Black set |
| | Flare |
| | Black Shading H |
| | Black Shading V |
| | White Shading H |
| | White Shading V |
| | V Modu Shading |
| | Matrix |
| | Gamma |
| | Black Gamma |

FIG. 10B

| Video Level | Iris |
| --- | --- |
| | Master Black |
| | Master Gain |
| | Knee Satulation |
| | Master V mod |
| | Knee |
| | White Clip |

FIG. 10A

| Operation Status | Shutter |
| --- | --- |
| | Filter |
| | Bars/Test |
| | Auto setup |

FIG. 11A

| Audio | Transmit |
| --- | --- |
| | Mic/Line |
| | Matrix Mix |
| | Matrix Output |
| | Incom |
| | Tracker |
| | Ext command |

FIG. 11B

| Detail | Detail Level |
| --- | --- |
| | H/V H/L Ratio |
| | Gamma Mix Ratio |
| | R/G/B Mix |
| | Slim Detail |
| | Slant Detail |
| | H limitter |
| | V limitter |
| | Knee Aperuter |
| | Level Depend |
| | Crispending |
| | Detail area |
| | Slin tone |

FIG. 12A

Operation Status | Cam Power
Bars
H/SC Phase
seqV Reset
Skin Gate
Prompt
Return
Pix Monitor
WF Monitor

FIG. 12B

Video Level | ENC out
Camera Out
Component Out
VBS Level
Y comb

FIG. 12C

Color | Color Switch
Contrast/Saturation
Notch
EDTV
Mono Color
Color Correct
Auto Color Matching

FIG. 12D

Audio Level | Transmit
Mic/Incom
Matrix
Ext command

FIG. 23A | Device Type ID | Command | Parameter ID | Parameter Data |

FIG. 23B | Device Type ID | Parameter ID | Parameter Data | ------ |

FIG. 23C | Device Type ID | LSI ID | Number of Used Bytes | Setting Data | ------ |

FIG. 23D | Device Type ID | Parameter ID | Parameter Display Data | ------ |

FIG. 23E | Device Type ID | Internal Device Data | ------ |

| | Gray | Yellow | Cyan | Green | Magenta | Red | Blue | Black |
|---|---|---|---|---|---|---|---|---|
| R | 1 | 1 | 0 | 0 | 1 | 1 | 0 | 0 |
| G | 1 | 1 | 1 | 1 | 0 | 0 | 0 | 0 |
| B | 1 | 0 | 1 | 0 | 1 | 0 | 1 | 0 |
| Y | 1.000 | 0.886 | 0.701 | 0.587 | 0.413 | 0.299 | 0.114 | 0 |
| R−Y | 0 | 0.114 | −0.701 | −0.587 | 0.587 | 0.701 | −0.114 | 0 |
| B−Y | 0 | −0.886 | 0.209 | −0.587 | 0.587 | −0.299 | 0.886 | 0 |

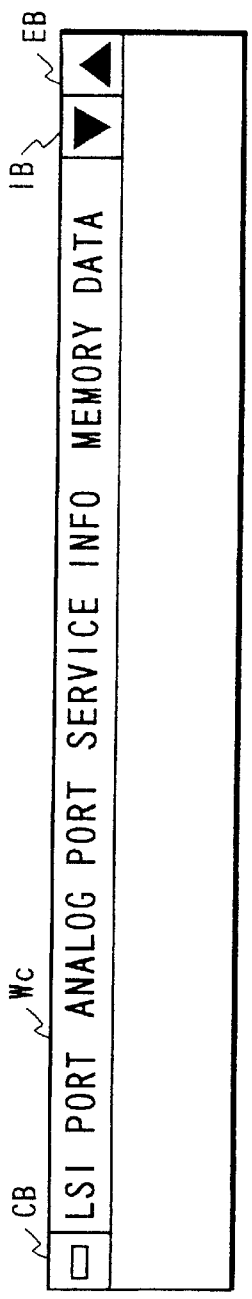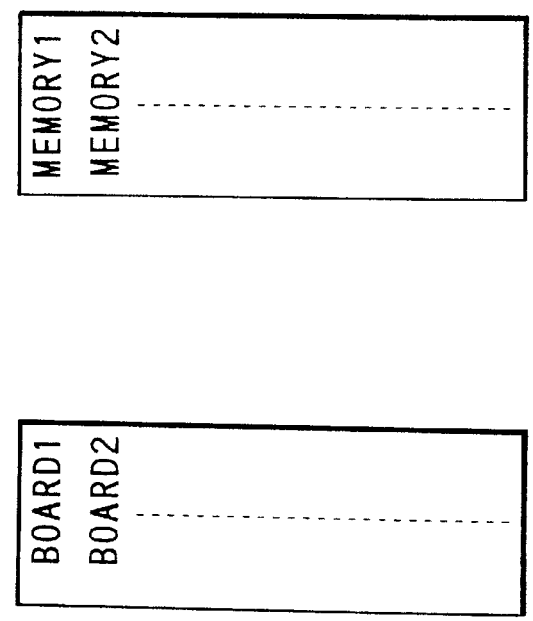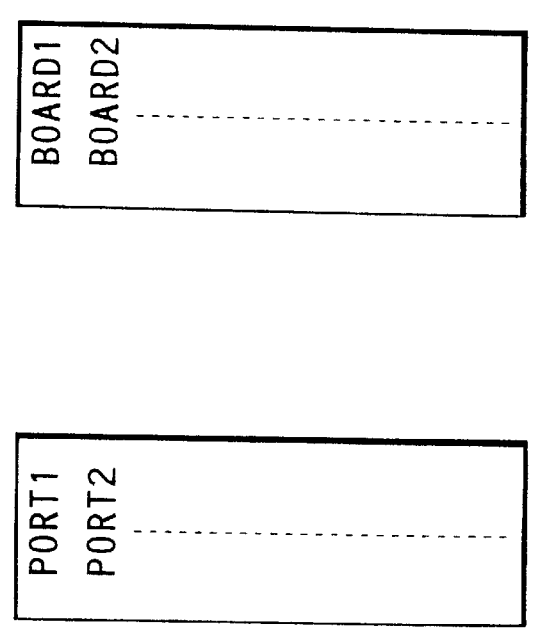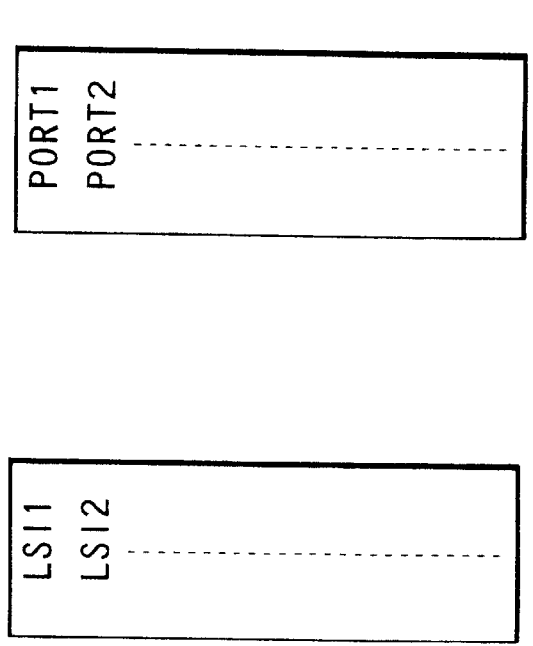

METHOD OF AND APPARATUS FOR SETTING UP ELECTRONIC DEVICE

BACKGROUND OF THE INVENTION

1. Field of the Invention

The present invention relates to a method of and an apparatus for setting up an electronic device such as a video camera (including a video tape recorder integrally combined with a video camera) for home use or a video camera for use in broadcasting stations.

2. Description of the Related Art

Video cameras have many parameters including white, black, gamma, knee, detail and other parameters to be established. It has been customary for the user of a video camera to establish those parameters by adjusting volumes or variable resistors in the video camera or pressing an incremental or decremental button on the video camera to increment or decrement parameter settings.

However, the conventional practice to establish many parameters of an electronic device such as a video camera is not an efficient process. Furthermore, when there are stringent standards imposed on video images outputted from video cameras for use in broadcasting stations, the user is required to actually shoot a reference image with the video camera and judge the reference image thus shot in order to confirm whether the parameters that have been established satisfy those standards which have been intended or imposed.

There has been a demand for a process of establishing parameters for an electronic device such as a video camera more efficiently, reliably, and accurately than before.

SUMMARY OF THE INVENTION

It is therefore an object of the present invention to provide a method of and an apparatus for setting up an electronic device such as a video camera by establishing parameters thereof more efficiently, reliably, and accurately than before.

According to the present invention, there is provided a method of setting up an electronic device by transmitting parameters indicated by a controller to a controlled device to set up the controlled device, comprising the steps of displaying a parameter setting image of a plurality of parameters that can be established with respect to the controlled device, deciding whether input information is entered or not while the parameter setting image is being displayed, changing a portion of the parameter setting image which corresponds to input information if such input information is entered, establishing parameter data according to the input information, and transmitting the established parameter data or a change in the parameter data to the controlled device to change a parameter in the controlled device.

According to the present invention, there is also provided an apparatus for setting up an electronic device, comprising storage means for storing parameter setting image data for establishing one or more parameters with respect to a controlled device, the parameter setting image including parameter changing switch image data and setting state display image data, display means for displaying a parameter setting image based on the parameter setting image data read from the storage means, input means for entering input information indicating changes in display states of a parameter changing switch image data and a setting state display image which are displayed by the display means and a parameter to be established, and control means for changing the display states of the parameter changing switch image data and the setting state display image which are displayed by the display means and the parameter to be established, based on the input information entered by the input means, and transmitting changed parameter data or a change in the parameter to the controlled device.

BRIEF DESCRIPTION OF THE DRAWINGS

FIG. 5 is a flowchart of a control sequence according to a main routine of the computer shown in FIG. 4;

FIGS. 9A through 9F are views of main pull-down menus which can be displayed from a menu bar in the connection configuration window shown in FIG. 7;

FIGS. 10A through 10C are views of pull-down menus for a CHU (camera head unit), which can also be displayed from one of the pull-down menus shown in FIGS. 9A through 9F;

FIGS. 11A and 11B are views of pull-down menus for the CHU, which can also be displayed from one of the pull-down menus shown in FIGS. 9A through 9F;

FIGS. 12A through 12D are views of pull-down menus for a CCU (camera control unit), which can also be displayed from one of the pull-down menus shown in FIGS. 9A through 9F;

FIGS. 23A through 23E are views of a transmission data format and file formats used in the computer shown in FIG. 4;

FIGS. 86A through 86E are views showing, by way of example, displayed images for processing memory accesses.

DETAILED DESCRIPTION OF THE PREFERRED EMBODIMENT

A method of and an apparatus for setting up an electronic device according to the present invention will be described below with respect to various items thereof which will be given under the headings below in the order named.

A. Arrangement and operation of an electronic device setup system (see FIG. 1);

B. Operation of the electronic device setup system (see FIG. 2);

C. Arrangement of a camera setup system (see FIG. 3);

D. Arrangement of a computer in the camera setup system shown in FIG. 3 (see FIG. 4);

E. Control operation according to a main routine of the computer shown in FIG. 4 (see FIG. 5);

F. Initial images produced by an operating system in the computer shown in FIG. 4 (see FIGS. 6A and 6B);

G. Connection configuration window which is displayed at first when the camera setup system shown in FIG. 3 starts to operate (see FIG. 7);

H. Parameter icon window of the camera setup system (see FIG. 8);

I. Main pull-down menus which can be displayed from a menu bar in the connection configuration window of the camera setup system (see FIGS. 9A through 9F);

J. Pull-down menus for a CHU (camera head unit) of the camera setup system (see FIGS. 10A through 10C and FIGS. 11A and 11B);

K. Pull-down menus for a CCU (camera control unit) or the camera setup system (see FIGS. 12A through 12D);

L. Basics of a parameter setting window of the camera setup system (see FIG. 13);

M. A main processing sequence of the camera setup system (see FIGS. 14 through 16);

N. A setup process of the camera setup system (see FIGS. 17 and 18);

O. A change process with a switch of the camera setup system (see FIG. 19);

P. A change process with a slide lever of the camera setup system (see FIG. 20);

Q. A change process with a numerical value of the camera setup system (see FIG. 21);

R. A change process with a waveform of the camera setup system (see FIG. 22);

S. A transmission data format and file formats used in the camera set up system (see FIGS. 23A through 23E);

T. A data converter in the camera setup system shown in FIG. 3 (see FIG. 24);

U. A control sequence of the data converter shown in FIG. 24 (see FIGS. 25 through 27);

V. A video system of a camera shown in FIG. 3 (see FIG. 28);

W. An audio system of a camera shown in FIG. 3 (see FIG. 29);

X. Displayed images for establishing parameters in the camera setup system (see FIGS. 30A and 30B through 87).

A. Arrangement and Operation of an Electronic Device Setup System (see FIG. 1)

Figure 1:
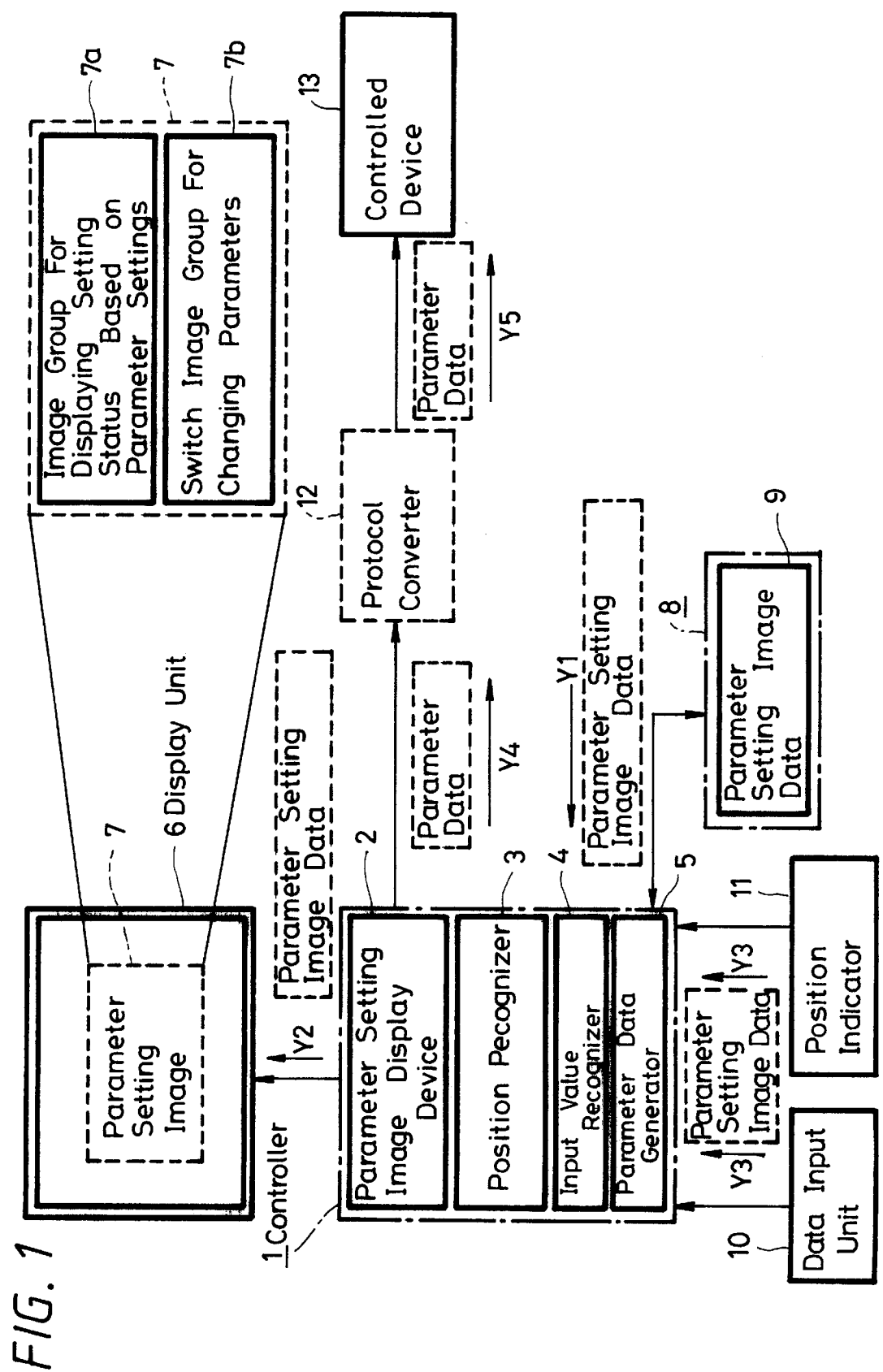
FIG. 1 is a block diagram of an electronic device setup system for setting up an electronic device, which embodies a method of and an apparatus for setting up an electronic device according to the present invention.

FIG. 1 shows in block form an electronic device setup system for setting up an electronic device, which embodies a method of and an apparatus for setting up an electronic device according to the present invention.

Connections and Structure

The electronic device setup system shown in FIG. 1 comprises a controller 1 for establishing parameters of a controlled device 13, a display unit 6 for displaying a parameter setting image 7 for use in establishing parameters of the controlled device 13, an external memory 8 for storing the data of the parameter setting image 7, a data input unit 10 for entering input data to establish parameters into the controller 1, a position indicator 11 for indicating the position of a pointer in the parameter setting image 7, a protocol converter 12 for converting a communication protocol for parameter data from the controller 1 into a communication protocol that can be received by the controlled device 13, and the controlled device 13 which automatically establishes parameters of its own according to parameter data transmitted prom the controller 1 through the protocol converter 12.

The controller 1 comprises a parameter setting image display device 2 for displaying the parameter setting image 7 on the display unit 6, an input value recognizer 4 for recognizing an input value represented by input data entered from the data input unit 10, a position recognizer 3 for recognizing the position of a pointer, indicated by positional data from the position indicator 11, in the parameter setting image 7 which is being displayed on the display unit 6, and a parameter data generator 5 for generating or modifying parameter data represented by the parameter setting image 7 displayed on the display unit 6, based on the input data entered from the data input unit 10 or the positional data entered from the position indicator 11.

The parameter setting image 7 comprises an image group 7a for displaying a setting status based on parameter settings, and a switch image group 7b for changing parameters. The image group 7a comprises graphic images such as tables, graphs, or the like which correspond to the parameters of the controlled device 13, and the switch image group 7b comprises visual switch images.

The electronic device setup system has two operation modes. In one of the operation modes, the displayed state of the image group 7a for parameter values and parameter settings is changed when the displayed state of the switch image group 7b is changed by the data input unit 10 or the position indicator 11.

Specifically, when input data are entered from the data input unit 10 or positional data are entered from the position indicator 11, the switch image group 7b displayed on the display unit 6 is changed depending on the entered input data or positional data as if a real switch or lever were moved by the operator, and the parameter data generator 5 generates or modifies the corresponding parameter data for changing the displayed state of the image group 7a.

In the other operation mode, the displayed state of the image group 7a is changed by the data input unit 10 or the position indicator 11, the parameter values and the displayed state of the switch image group 7b is changed.

Specifically, when input data are entered from the data input unit 10 or positional data are entered from the position indicator 11, the image group 7a displayed on the display unit 2 is changed depending on the entered input data or positional data, the corresponding parameter data are generated or modified by the parameter data generator 5, and the displayed state of the switch image group 7b is changed. Thus, the input data entered from the data input unit 10 or the positional data entered from the position indicator 11 are used as parameter setting information as shown in FIG. 1.

The protocol converter 12 is indicated by the broken line in FIG. 1 because the protocol converter 12 will not be required if a protocol converting process is carried out by the controlled device 13 rather than the protocol converter 12. Stated otherwise, the protocol converter 12 is required only if the controlled device 13 is incapable of carrying out a protocol converting process.

For the sake of brevity, image data for selecting parameters are omitted from illustration. A parameter selection image is an image for selecting the setting of a parameter among many parameters of the controlled device 13, and its data are held in the external memory 8.

Operation

When a parameter of the controlled device 13 is selected by the data input unit 10 or the position indicator 11, the controller 1 reads parameter setting image data 9 corresponding to the selected parameter from the external memory 8 as indicated by the solid-line arrow Y1, and supplies the read parameter setting image data 9 to the display unit 6 as indicated by the solid-line arrow Y2. The display unit 6 displays on its display panel a parameter setting image 7 represented by the parameter setting image data 9.

Then, when input data are entered from the data input unit 10 as indicated by the solid-line arrow Y3, the input value recognizer 4 recognizes the value of the entered input data. When positional data are entered from the position indicator 11, the position recognizer 3 recognizes the position of a pointer in the parameter setting image 7, which corresponds to the entered positional data.

Based on the pointer position recognized by the position recognizer 3 and the value of the entered input data recognized by the input value recognizer 4, the parameter setting image display device 2 changes corresponding data of the parameter setting image data 9 representing the parameter setting image 7 displayed on the display unit 2, i.e., data of the image group 7a and data of the switch image group 7b, and supplies the changed parameter setting image data 9 to the display unit 6 as indicated by the solid-line arrow Y2, thereby changing the displayed state of the image group 7a and the switch image group 7b on the display unit 2.

The parameter data generator 5 generates or modifies parameter data based on the pointer position recognized by the position recognizer 3 and the value of the entered input data recognized by the input value recognizer 4, and supplies the generated or modified parameter data to the protocol converter 12 as indicated by the solid-line arrow Y4.

The protocol converter 12 converts the communication protocol of the parameter data supplied from the controller 1 into a communication protocol which can be received by the controlled device 13. The parameter data converted by the protocol converter 12 are supplied therefrom to the controlled device 13 as indicated by the solid-line arrow Y5. The controlled device 13 changes the corresponding value of parameters of its own using the parameter data supplied from the protocol converter 12.

B. Operation of the Electronic Device Setup System (see FIG. 2)

Figure 2:
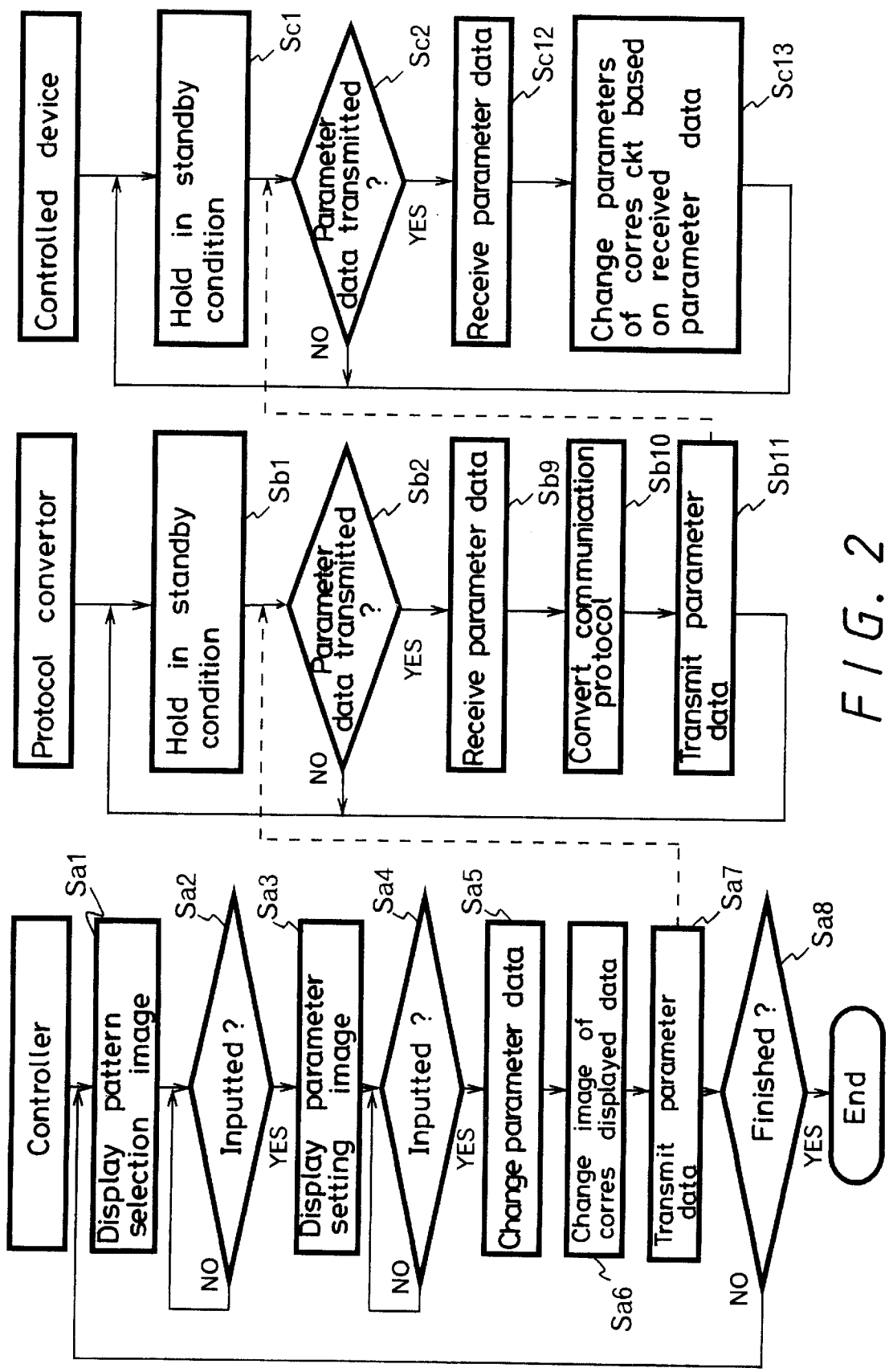
FIG. 2 is a flowchart of an operation sequence of the an electronic device setup system shown in FIG. 1.

FIG. 2 shows an operation sequence of the an electronic device setup system shown in FIG. 1. The operation sequence comprises steps Sa1~Sa8 which are executed by the controller 1, steps Sb1~Sb11 which are executed by the protocol converter 12, and steps Sc1~Sc13 which are executed by the controlled device 13. The greater the numerals contained in the reference characters which denote the above steps, the more subsequent the corresponding steps are in the entire operation sequence.

B1. Processing Operation of the Controller 1

In the step Sa1, the parameter setting image display device 2 reads parameter selecting image data from the external memory 8, and supplies the read parameter selecting image data to the display unit 6. The display unit 6 now displays on its display panel a parameter selection image for selecting one or more of many parameters of the controlled device 13. Thereafter, control proceeds to the step Sa2.

In the step Sa2, the position recognizer 3 and the input value recognizer 4 decide whether parameter setting information is entered from the data input unit 10 and the position indicator 11. If parameter setting information is entered (YES), then control proceeds to the step Sa3.

In the step Sa3, the parameter setting image display device 2 reads parameter setting image data 9 corresponding to the selected parameter or parameters from the external memory 8 based on the data recognized by the position recognizer 3 and the input value recognizer 4, and supplies the read parameter setting image data 9 to the display unit 6. The display unit 6 now displays on its display panel a parameter setting image represented by the supplied parameter setting image data 9. Thereafter, control proceeds to the step Sa4.

In the step Sa4, the position recognizer 3 and the input value recognize 4 decide whether parameter setting information is entered from the data input unit 10 and the position indicator 11. If parameter setting information is entered (YES), then control proceeds to the step Sa5.

In the step Sa5, the parameter data generator 5 generates or modifies parameter data based on the data recognized by the position recognizer 3 and the input value recognizer 4. Then, control proceeds to the step Sa6.

In the step Sa6, the parameter setting image display device 2 changes the image, displayed on the display unit 2, of the corresponding displayed data. Then, control proceeds to the step Sa7.

In the step Sa7, the parameter setting image display device 2 transmits the parameter data to the protocol converter 12. Then, control proceeds to the step Sa8.

In the step Sa8, the position recognizer 3 and the input value recognizer 4 decide whether the entering of parameter setting information is from the data input unit 10 and the position indicator 11 is finished or not. If the entering of parameter setting information is finished (YES), then the processing comes to an end.

B2. Processing Operation of the Protocol Converter 12

In the step Sb1, the protocol converter 12 is held in a standby condition. Then, control proceeds to the step Sb2.

In the step Sb2, the protocol converter 12 decides whether parameter data are transmitted from the controller 1 or not. If parameter data are transmitted (YES), then control proceeds to the step Sb9. If parameter data are not transmitted (NO), then control returns to the step Sb1.

In the step Sb9, the protocol converter 12 receives the parameter data transmitted from the controller 1. Then, control proceeds to the step Sb10. The step number jumps from "2" in the step Sb2 to "9" in the step Sb9 because the numerals contained in the steps represent the operating sequence and the step Sb9 is carried out after the step Sa7.

In the step Sb10, the protocol converter 12 converts the communication protocol of the parameter data received in the step Sb9 into a communication protocol which can be received by the controlled device 13. Then, control proceeds to the step Sb11.

In the step Sb11, the protocol converter 12 transmits the converted parameter data to the controlled device 13. Thereafter, control goes back to the step Sb1.

B3. Processing Operation of the Controlled Device 13

In the step Sc1, the controlled device 13 is held in a standby condition. Then, control proceeds to the step Sc2.

In the step Sc2, the controlled device 13 decides whether parameter data are transmitted from the protocol converter 12 or not. If parameter data are transmitted (YES), then control proceeds to the step Sc12. If parameter data are not transmitted (NO), then control returns to the step Sc1.

In the step Sc12, the controlled device 13 receives the parameter data transmitted from the protocol converter 12. Then, control proceeds to the step Sc13. The step number jumps from "2" in the step Sc2 to "12" in the step Sc12 because the numerals contained in the steps represent the operating sequence and the step Sc12 is carried out after the step Sb11.

In the step Sc13, the controlled device 13 changes the value of the parameter or parameters of a corresponding circuit or circuits based on the received parameter data. Then, control goes back to the step Sc1. Advantages offered by the electronic device setup system shown in FIGS. 1 and 2.

As described above, for establishing a parameter or parameters of the controlled device 13 with the controller 1, the electronic device setup system operates in either an operation mode in which the displayed state of the image group 7a is changed when the displayed state of the switch image group 7b is changed by the data input unit 10 or the position indicator 11, or an operation mode in which the displayed state of the switch image group 7b is changed when the displayed state of the image group 7a is changed by the data input unit 10 or the position indicator 11, for thereby changing the parameter or parameters in a graphical environment. Consequently, the environment for establishing parameters is improved, and the operator is prevented from changing parameters in error and allowed to confirm changed parameters.

Specific details of the method of and the apparatus for setting up an electronic device according to the present invention will be described below.

C. Arrangement and Operation of a Camera Setup System (see FIG. 3)

Figure 3:
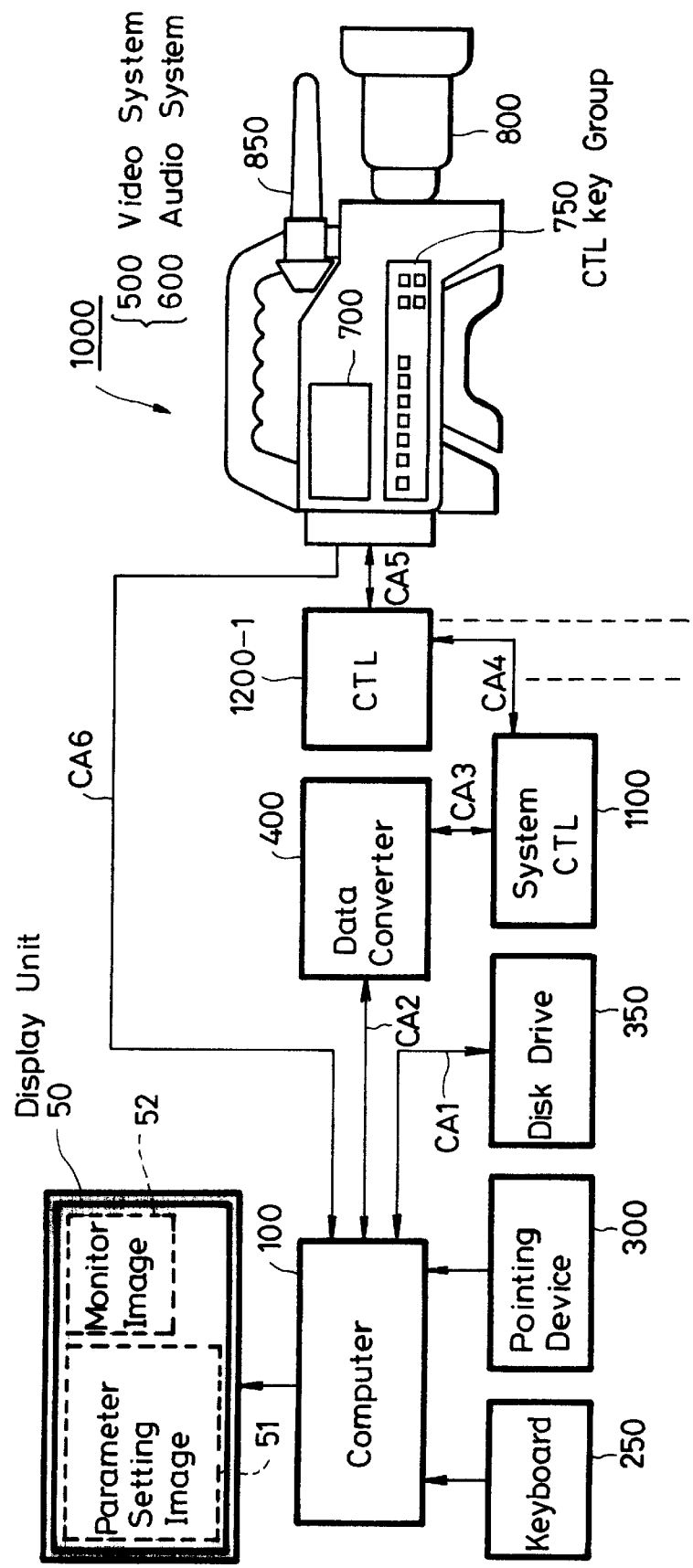
FIG. 3 is a block diagram of a camera setup system which incorporates the principles of the electronic device setup system shown in FIG. 1.

FIG. 3 shows in block form a camera setup system which incorporates the principles of the electronic device setup system shown in FIG. 1.

Connections and Structure

The camera setup system shown in FIG. 3 comprises a display unit 50 for displaying a parameter setting image 51 and a monitor image 52, a computer 100, a keyboard 250, a pointing device 300, a disk drive 350 for storing data of the parameter setting image 51 and program data, a data converter 400 for converting the protocol of data transmitted from the computer 100, a system controller 1100, a plurality of controllers 1200-1, . . . , 1200-n (one shown) connected to the system controller 1100, and a plurality of cameras 1000 (one shown) connected respectively to the controllers 1200-1, . . . , 1200-n. The system controller 1100 serves to supply data outputted from the data converter 400 selectively to the controllers 1200-1, . . . , 1200-n and the cameras 1000.

The computer 100 and the disk drive 350 are interconnected by a cable CA1. The computer 100 and the data converter 400 are interconnected by a cable CA2. The data converter 400 and the system controller 1100 are interconnected by a cable CA3. The system controller 1100 and the controllers 1200-1, . . . , 1200-n are interconnected by cables CA4. The controllers 1200-1, . . . , 1200-n and the cameras 1000 are interconnected by cables CA5. The computer 100 and the cameras 1000 are interconnected by cables CA6.

The parameter setting image 51 corresponds to the parameter setting image 7 shown in FIG. 1. The display unit 50 corresponds to the display unit 6 shown in FIG. 1. The computer 100 corresponds to the controller 1 shown in FIG. 1. The keyboard 250 corresponds to the data input unit 10 shown in FIG. 1. The pointing device 300 corresponds to the position indicator 11 shown in FIG. 1. The disk drive 350 corresponds to the external memory 8 shown in FIG. 1. The data converter 400 corresponds to the protocol converter 12 shown in FIG. 1. The controllers 1200-1, . . . , 1200-n and the cameras 1000 correspond to the controlled device 13 shown in FIG. 1.

As with the protocol converter 12 shown in FIG. 1, the data converter 40 may be dispensed with if the system controller 1100 has a protocol conversion capability.

Each of the controllers 1200-1, . . . , 1200-n is generally referred to as a CCU (Camera Control Unit). These controllers 1200-1, . . . , 1200-n serve to control the cameras 1000 and handle part of a signal processing operation for processing video and audio signals produced by the cameras 1000.

Camera systems which comprise the controllers 1200-1, . . . , 1200-n and the cameras 1000 are not used as single systems as is the case with VTRs integral with video cameras for home use. For this reason, each of the cameras 1000 is referred to as a CHU (Camera Head Unit) in broadcasting stations.

In FIG. 3, each of the camera systems in the camera setup system comprises a CCU and a CHU. However, the camera setup system may be used with respect to a video camera which is used as a single unit. In such a modification, the controllers 1200-1, . . . , 1200-n may be dispensed with.

The pointing device 300 may comprise a digitizer, a mouse, a track ball, a cursor key, a joy stick, or the like, for example.

Each of the cameras 1000 has a video system 500 and an audio system 600 disposed inside of its housing, and also has an LCD (Liquid Crystal Display) unit 700, a control key group 750, a lens assembly 800, and a microphone 850 mounted on its housing.

The disk drive 350 should preferably comprise a hard disk drive in view of its high access speed. Of course, the disk drive 350 may comprise an optical disk drive employing an recordable and reproducible optical disk which also has a relatively high access speed, or a magnetic disk drive.

The monitor image 52 is displayed on the display unit 50 based on a video signal captured by each of the cameras 1000.

Operation

When a parameter or parameters are selected, the computer 100 reads parameter setting image data stored in the disk drive 350. The parameter setting image data read from the disk drive 350 are supplied through the cable CA1 and the computer 100 to the display unit 50, which displays the parameter setting image 51 on its display panel based on the supplied parameter setting image data.

When a parameter change is indicated in the parameter setting image 51 by the keyboard 250 or the pointing device 300, the computer 100 changes parameter data and the displayed state of a corresponding portion of the parameter setting image 51 based on the controlling information from the keyboard 250 or the pointing device 300.

The computer 100 transmits the changed parameter data (absolute data) or data (relative data) indicative of the change through the cable CA2 to the data converter 400. The parameter data or the data indicative of the change which are supplied to the data converter 400 are converted in protocol, and then supplied to the system controller 1100, which supplies the data to one of the controllers 1200-1, . . . , 1200-n or more of the cameras 1000.

The manner in which the system controller 1100 recognizes one of the controllers 1200-1, . . . , 1200-n or one of the cameras 1000 to which it should transmit the data will be described later on with respect to a data transmission format with reference to FIGS. 23A through 23E.

While parameters are being established with respect to one of the controllers 1200-1, . . . , 1200-n or one of the cameras 1000 based on the parameter data, an output video signal from the camera 1000 is supplied to the computer 100. Alternatively, an output video signal from one of the controllers 1200-1, . . . , 1200-n may be supplied to the computer 100.

After the output video signal from the camera 1000 is supplied to the computer 100, it is supplied to the display unit 50, which then displays the monitor image 52 based on the supplied output video signal.

Internal arrangements and operations of the individual components of the camera setup system shown in FIG. 3 will be described below.

D. Arrangement of the Computer 100 in the Camera Setup System Shown in FIG. 3 (see FIG. 4)

Figure 4:
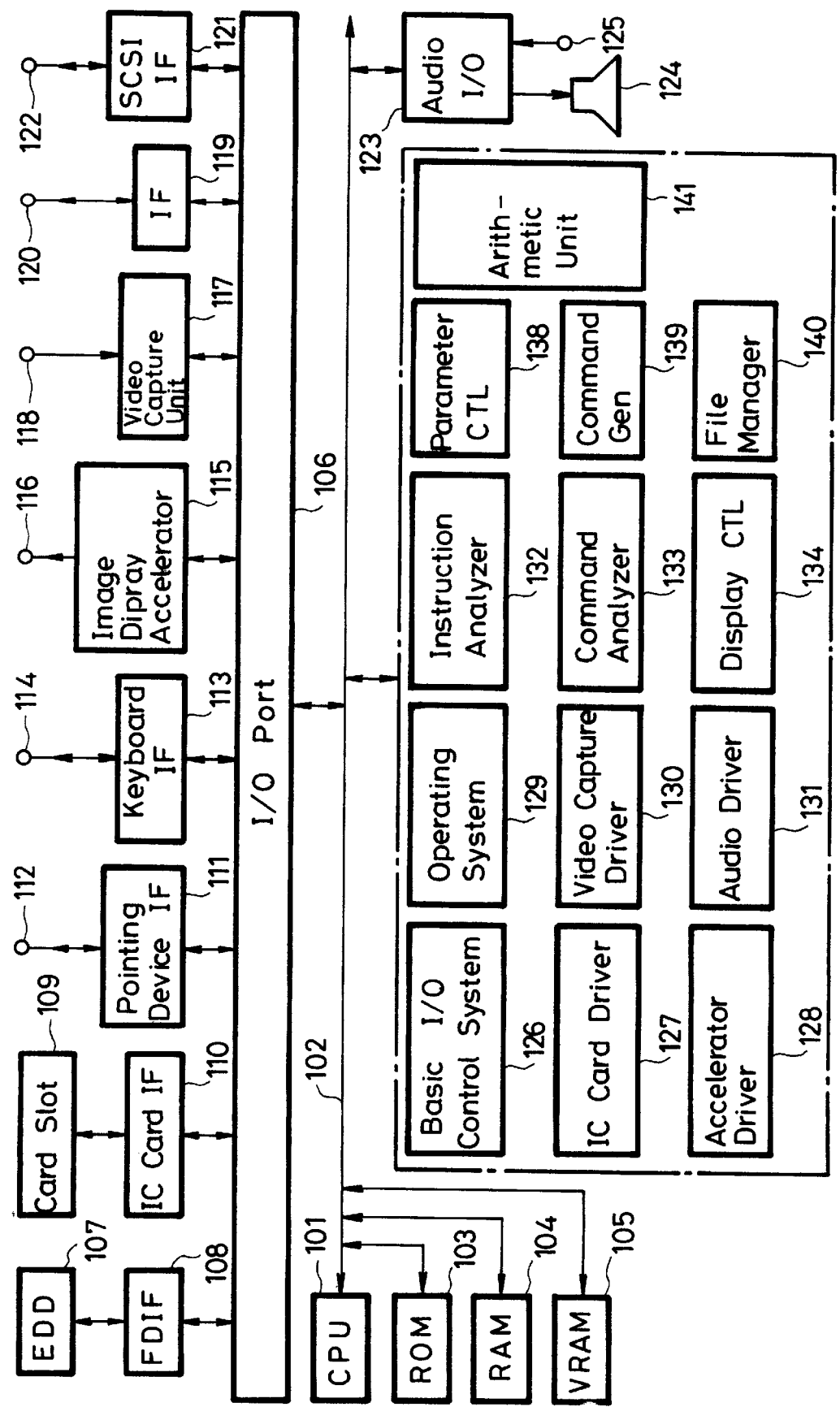
FIG. 4 is a block diagram of a computer in the camera setup system shown in FIG. 3.

FIG. 4 shows in block form the computer 100 in the camera setup system shown in FIG. 3.

Connections and Structure

The computer 100 comprises a CPU 101, a bus assembly 102 connected to the CPU 101 and comprising address, data, and control buses, a ROM (Read-Only Memory) 103 connected to the bus assembly 102 for storing a basic input/output control system, etc., a working RAM (Random-Access Memory) 104 connected to the bus assembly 102, a VRAM (Video Random-Access Memory) 105 connected to the bus assembly 102 for storing video images to be displayed, and an input/output port 106 connected to the bus assembly 102. To the input/output port 106, there are connected a floppy disk interface 108 connected to a floppy disk drive 107, an IC card interface 110 connected to a card slot 109, a pointing device interface 111 connected to an input/output terminal 112 which is coupled to the pointing device 300 shown in FIG. 3, a keyboard interface 113 connected to an input/output terminal 114 which is coupled to the keyboard 250 shown in FIG. 3, an image display accelerator 115 for controlling the display of images instead of the CPU 101, the image display accelerator 115 being connected to an output terminal 116 which is coupled to the display unit 50 shown in FIG. 3, a video capture unit 117 for capturing video images, the video capture unit 117 being connected to an input terminal 118 which is coupled to the cameras 1000 or the controllers 1200-1, . . . , 1200-n shown in FIG. 3, a communication interface 119 connected to an input/output terminal 120 which is coupled to the data converter 400 shown in FIG. 3, a SCSI (small Computer Systems Interface) 121 connected to an input/output terminal 122 which is coupled to the disk drive 350 shown in FIG. 3, and an audio input/output circuit 123 connected to an input terminal 125 which is coupled to the cameras 1000 or the controllers 1200-1, . . . , 1200-n shown in FIG. 3. A loudspeaker 124 is connected to the audio input/output circuit 123.

The communication interface 119 may comprise an RS-232C interface or an RS-422 interface, for example. The image display accelerator 115 is capable of displaying images with 1280×1024 dots in 16770 thousand colors on the display unit 50 shown in FIG. 3.

When the computer 100 is turned on, the CPU 101 reads a basic input/output control system 126 (BIOS) which is stored in the ROM 103, and then reads program data of an operating system from the disk drive 350 shown in FIG. 3, and further reads program data of drivers.

When a camera setup system (described later on) is selected on a displayed image of the operating system, the CPU 101 reads program data of the camera setup system from the disk drive 350. Blocks enclosed in a rectangular frame which is indicated by the dot-and-dash line represent functions of the CPU 101 which can be performed by the basic input/output control system, the operating system, the drivers, and the camera setup system which are resident in a main memory of the CPU 101.

The basic input/output control system 126 serves to control input and output data, e.g., to receive and recognize input data from the keyboard 250, to receive and recognize positional data from the pointing device 300, and to send display data to the display unit 50. The basic input/output control system 126 is normally stored as a conversion table in the ROM 103. In this embodiment, however, the basic input/output control system 126 is resident in the main memory of the CPU 101.

An IC card driver 127 allows the computer 100 to send data to and receive data from an IC card which is inserted in the card slot 109. An accelerator driver 128 permits data to be transmitted between the computer 100 and the image display accelerator 115. A video capture driver 130 permits data to be transmitted between the computer 100 and the video capture unit 117. An audio driver 131 permits data to be transmitted between the computer 100 and the audio input/output circuit 123.

An operating system 129 should preferably comprise an operating system capable of managing file data, controlling the disk drive 350, and otherwise providing a graphical user interface. For example, the operating system 129 may comprise an operation system such as MS-WINDOW provided by Microsoft, SYSTEM 7.5 provided by Apple Computer, or OS/2 provided by IBM. Alternatively, an operating system with no graphical user interface may be realized by the above camera setup systems.

The other functions include an instruction analyzer 132, a command analyzer 133, a display controller 134, a parameter controller 138, a command generator 139, a file manager 140, and an arithmetic unit 141 which are performed by the camera setup system.

The instruction analyzer 132 is capable of analyzing instructions based on input data from the pointing device interface 111 and the keyboard interface 113.

The command analyzer 132 is capable of analyzing commands in input data from the interface 119.

The display controller 134 is capable of changing data stored in the VRAM 105 according to instructions analyzed by the instruction analyzer 132.

The parameter controller 138 is capable of changing parameter data according to instructions analyzed by the instruction analyzer 132.

The command generator 139 is capable of transmitting parameter data or data indicative of changes through the interface 119 and the input/output terminal 120 to the controllers 1200-1, . . . , 1200-n or the cameras 1000, and also of issuing commands.

The file manager 140 is capable of holding and managing files of parameter data for the controllers 1200-1, . . . , 1200-n and the cameras 1000.

The arithmetic unit 141 is capable of carrying out arithmetic operations for changing parameter data and display data according to instructions analyzed by the instruction analyzer 132.

Operation of the computer 100 shown in FIG. 4 will be described in detail later on with reference to FIGS. 6A, 6B through 23A–23E.

E. Control Operation According to a Main Routine of the Computer 100 Shown in FIG. 4 (see FIG. 5)

FIG. 5 shows a control sequence according to a main routine of the computer 100 shown in FIG. 4. The control sequence is started when the computer 100 is turned on.

In a step S101, an initializing program stored in the ROM 103 is read, and causes the CPU 101 to check a connected device. Then, control proceeds to a step S102.

In the step S102, the CPU 101 initializes the RAM 104 and the VRAM 105. Thereafter, control proceeds to a step S103.

In the step S103, the basic input/output control system 126 starts to operate. Then, control proceeds to a step S104.

In the step S104, the basic input/output control system 126 reads the program data of the operating system 129 from the disk drive 350, thereby starting the operating system 129. Then, control proceeds to a step S105.

In the step S105, the operating system 129 reads the program data of the IC card driver 127, the accelerator driver 28, the video capture unit 130, and the audio driver 131 from the disk drive 350, and starts the IC card driver 127, the accelerator driver 128, the video capture unit 130, and the audio driver 131. Then, control proceeds to a step S106.

In the step S106, the operating system 129 confirms the camera setup system. Then, control proceeds to a step S107. Specifically, the operating system 129 confirms the camera setup system by reading information relative to the program data registered in the operating system 126 from files which are owned by the operating system 126. For example, such information includes information indicating that the camera setup system is registered as a starting program and information as to icons of the camera setup system.

In the step S107, the operating system 129 writes image data of the operation system 129 in the VRAM 105. The image data of the operating system 129 written in the VRAM 105 are supplied through the image display accelerator 115 and the output terminal 116 to the display unit 50. Thereafter, control proceeds to a step S108.

If the camera setup system is registered with respect to the operating system 129, an icon indicative of the camera setup system is also displayed.

In the step S108, the operating system 129 decides whether the camera setup system is selected or not. If the camera setup system is selected (YES), then control proceeds to a step S150. If the camera setup system is not selected (NOT), then control jumps to a step S109.

The camera setup system is selected when the pointer image of the pointing device 300 is superposed on the icon of the camera setup system in the image of the operating system 129 displayed on the display unit 50 and also when the pointing device 300 is double-clicked by the operator. The pointing device 300 is double-clicked when a button on the pointing device 300 is pressed successively twice by the operator.

In the step S150, the processing operation of the camera setup system is executed. Then, control goes to the step S109.

In the step S109, the operating system 129 decides whether a setup program of the camera setup system is finished or not. If the setup program is finished (YES), then control proceeds to a step S110. If the setup program is not finished (NO), then control returns to the step S150.

In the step S110, the operating system 129 decides whether its operation is finished or not. If the operation of the operating system 129 is finished (YES), then control proceeds to a step S111. If the operation of the operating system 129 is not finished (NOT), then control goes back to the step S107.

In the step S111, the operating system 129 is finished by making itself non-resident in the main memory of the CPU 101.

F. Initial Images Produces by the Operating System 129 in the Computer 100 Shown in FIG. 4 (see FIGS. 6A and 6B)

Figure 6A:
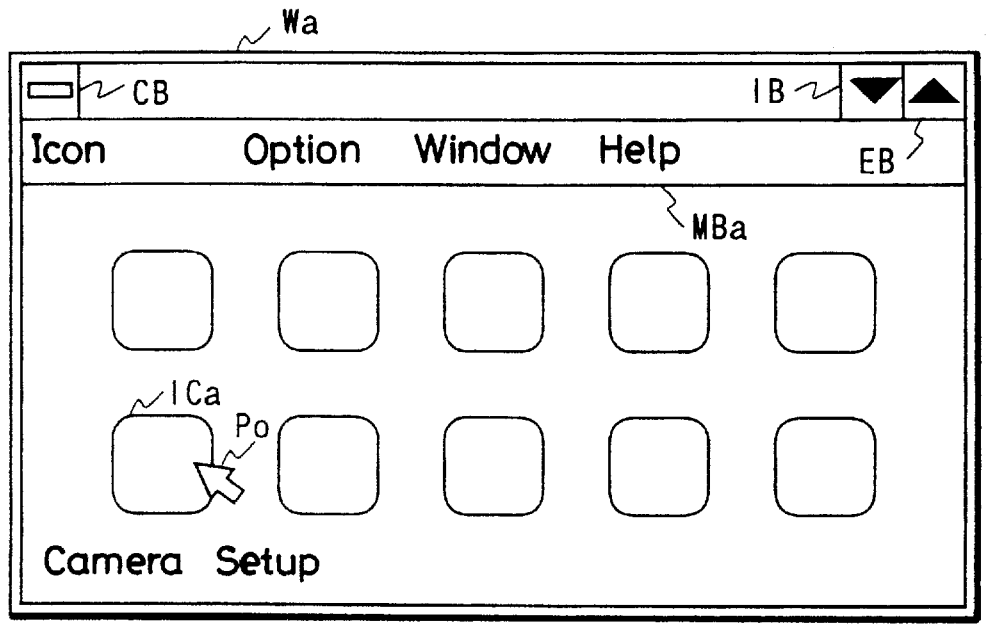
FIGS. 6A and 6B are views showing initial images produced by an operating system in the computer shown in FIG. 4.
Figure 6B:
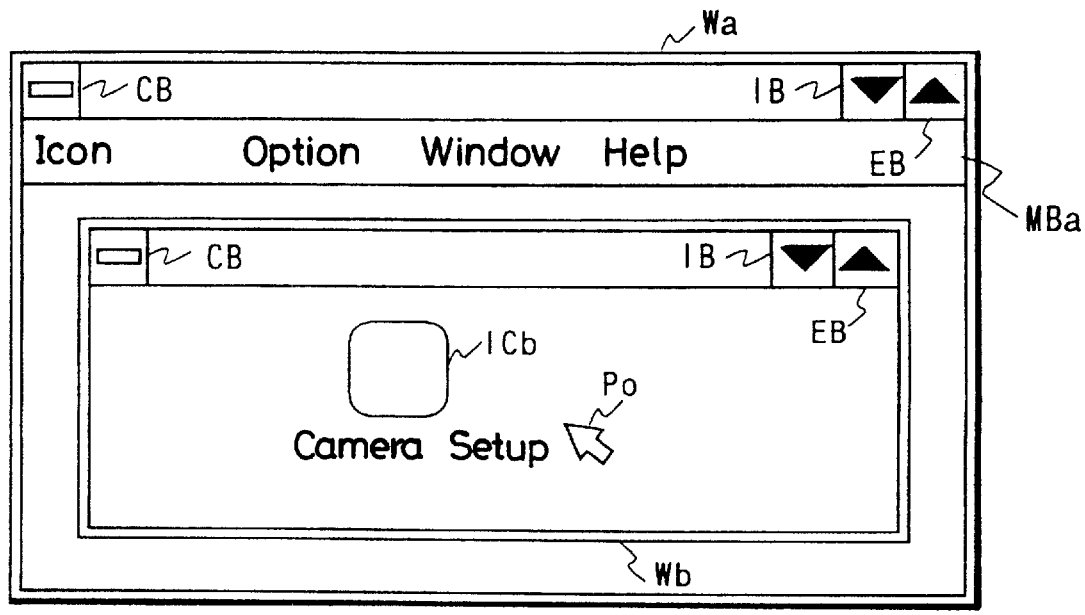

FIG. 6A shows a window image Wa in an uppermost layer produced by the operating system 129, and FIG. 6B shows the manner in which the camera setup system is started.

In FIG. 6A, the window image Wa is composed of a button image CB for displaying a pull-down menu of the system, a button image IB for iconizing the window image Wa, a button image EB for enlarging the window image Wa, a menu bar MBa for entering various instructions into the operating system 129, and various icon images including an icon ICa of the camera setup system.

The menu bar MBa has a plurality of menu images representing menus "ICON", "OPTION", "WINDOW", and "HELP". When one of the menu images is selected, it displays a pull-down menu comprising related commands. To Select one of the menu images, the operator may press a certain key on the keyboard 250 shown in FIG. 3, and then press a cursor key on the keyboard 250. Alternatively, the operator may move the pointing device 300 to bring a pointer Po to a desired one of the words, and then click the word. The operator then selects and clicks a desired one of the commands displayed on the pull-down menu which is displayed as a result of the selection of one of the menu images.

The alphabetic letters in lower case, which are contained in the window image Wa, indicate the levels of layers. The alphabetic letter "a" indicates the highest level of layer, and the alphabetic letters "b", "c", "d", . . . indicate the progressively lower levels of layers. The window image Wa contains the button images CB, IB, EB at all times.

In the window image Wa shown in FIG. 6A, the pointer Po is moved by the pointing device 300 to a position over the icon ICa marked with "CAMERA SETUP", and thereafter the button on the pointing device 300 is clicked once. Then, as shown in FIG. 6B, a window image Wb in a next lower layer is displayed on the display unit 50.

In the window usage Wb shown in FIG. 6B, the pointer Po is moved by the pointing device 300 to a position over an icon ICb marked with "CAMERA SETUP", and thereafter the button on the pointing device 300 is double-clicked, thereby executing the camera setup system.

G. Connection Configuration Window Which is Displayed at First When the Camera Setup System Shown in FIG. 3 Starts to Operate (see FIG. 7)

Figure 7:
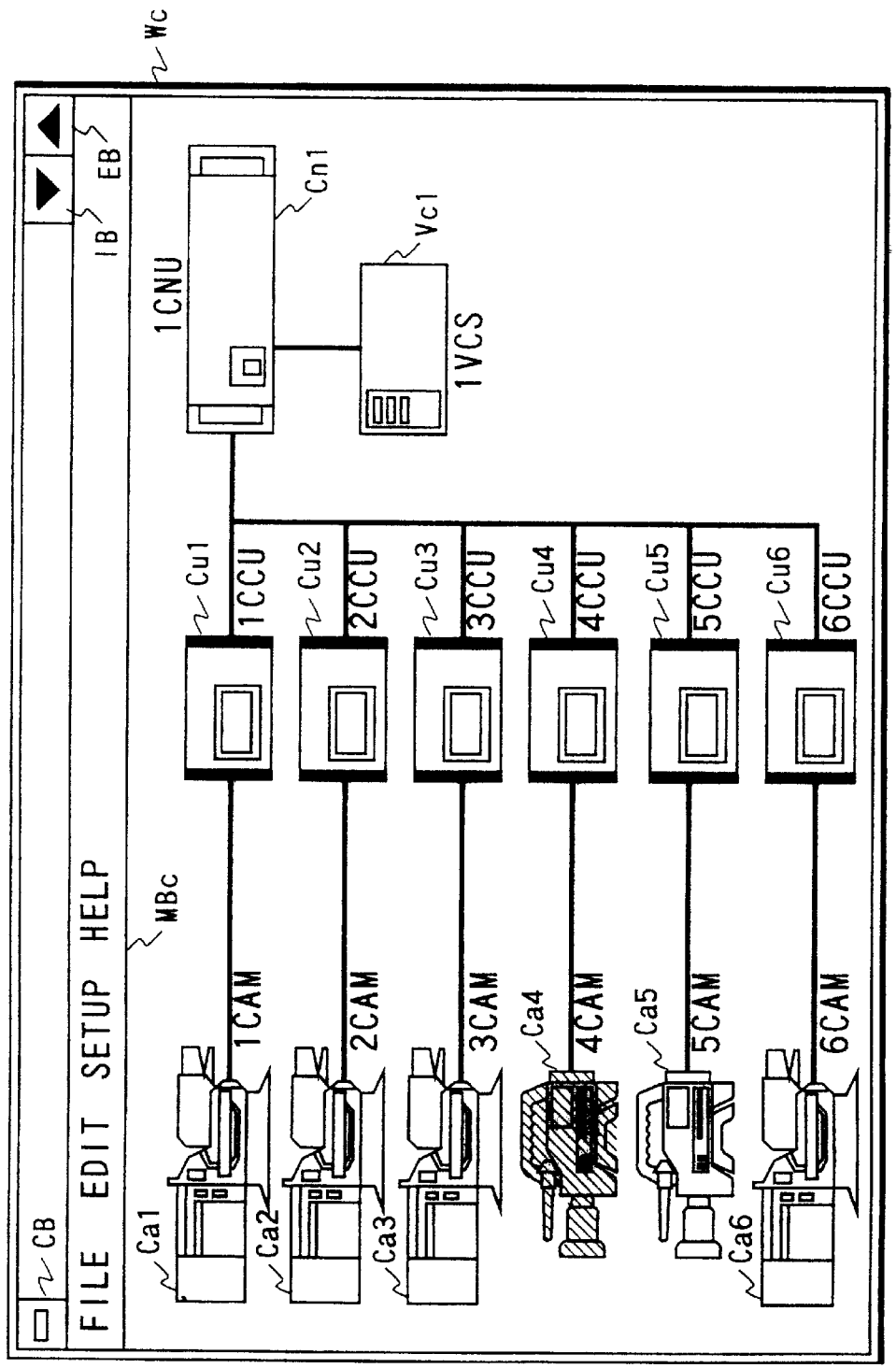
FIG. 7 is a view of a connection configuration window which is displayed at first when the camera setup system shown in FIG. 3 starts to operate.

FIG. 7 shows a connection configuration window which is displayed at first when the camera setup system shown in FIG. 3 starts to operate.

A window image Wc shown in FIG. 7 is displayed when a file of connection configuration information is read which was generated when the camera setup system started the last time. The window image Wc contains icon images Ca1~Ca6 of cameras, icon images Cu1~Cu6 of CCUs connected respectively to the icon images Ca1~Ca6, an icon image Cn1 of a CNU (Camera Network Unit) which is connected to the icon images Cu1~Cu6, an icon image Vc1 of a VCS (Video Camera Selector) connected to the icon image Cn1, and a menu bar MBc which contains menus "FILE", "EDIT", "SETUP", and "HELP".

The window image Wc indicates that a camera system composed of six cameras, six CCUs connected respectively to the six cameras, a CNU connected to the six CCUs, and a VCS connected to the CNU is to be set up. As described later on, the connected configuration has been confirmed by the camera setup system when the camera setup system has been started. An object with respect to which parameters are to be established is one of the icon images Ca1~Ca6 of cameras and the icon images Cu1~Cu6 of CCUs.

In order to establish parameters with respect to a desired camera or CCU, the pointer Po is controlled by the pointing device 300 to move to a position over one of the icon images Ca1~Ca6 of cameras and the icon images Cu1~Cu6 of CCUs, and thereafter the button of the pointing device 300 is clicked once. When the button of the pointing device 300 is clicked once, the selected one of the icon images Ca1~Ca6 of cameras and the icon images Cu1~Cu6 of CCUs is colored or displayed in a certain display state, indicating that it is selected. In FIG. 7, the icon image Ca4 of a camera is selected.

The CNU corresponds to the system controller 1100 shown in FIG. 3. The VCS serves to selectively output six video signals that are supplied through the CNU.

H. Parameter Icon Window of the Camera Setup System (see FIG. 8)

Figure 8:
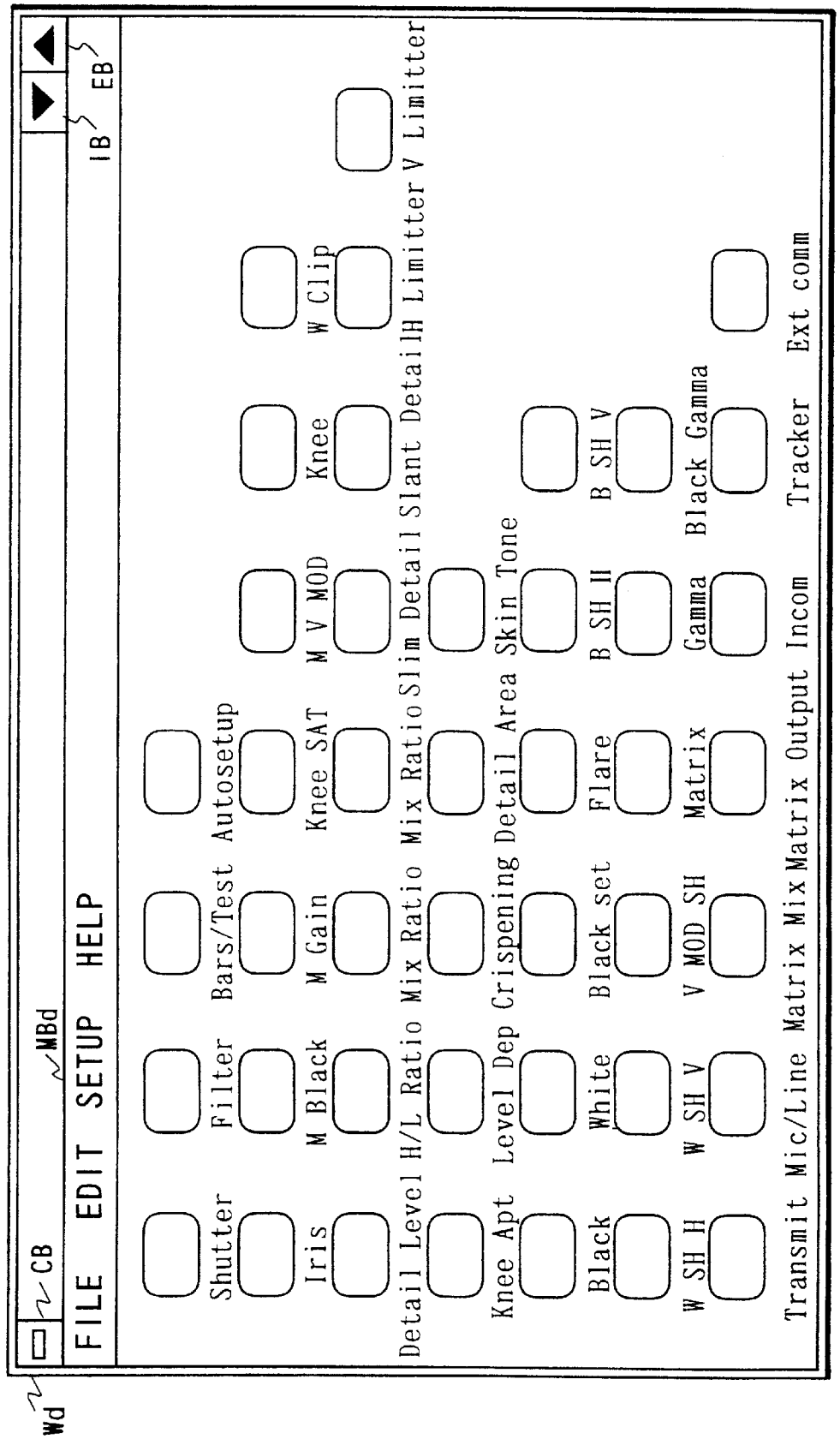
FIG. 8 is a view of a parameter icon window of the camera setup system.

FIG. 8 shows a window image Wd which is displayed when one of the icon images Ca1~Ca6 of cameras in the connection configuration window Wc shown in FIG. 7 is selected by clicking once the button of the pointing device 300 and thereafter the button of the pointing device 300 is clicked once, or when the button of the pointing device 300 is double-clicked while the pointer Po is placed over one of the icon images Ca1~Ca6 of cameras in the connection configuration window Wc.

The image window Wd contains camera parameters that can be set up as icon images. A process of setting up a desired one of the parameters can be started when the pointer Po is placed over the desired parameter by the pointing device 300 and thereafter the button of the pointing device 300 is double-clicked.

The parameters represented by the respective icon images will be described below.

Shutter

This is a parameter for adjusting the shutter speed of an electronic shutter. There are available two adjustment modes including a shutter mode of stepwise switching operation and an adjustment mode for adjusting a vertical resolution.

Filter

This is a parameter for adjusting an ND filter or a CC filter to a suitable filter in order to obtain a suitable depth of field through the color temperature or brightness of illumination.

Bars/Test

This is a parameter for establishing the output of a test signal or the output of color bars from the camera.

Automatic Setup

This is a parameter for controlling the automatic adjustment of white balance, black balance, white shading, black shading, master black level, gamma level, and knee level.

Iris

This is a parameter for adjusting the iris position (aperture) of the lens.

M Black (Master Black)

This is a parameter for adjusting the black level of a video output signal.

M Gain (Black Gain)

This is a parameter for adjusting the master gain of a video output signal depending on the illuminance of the subject to be imaged by the camera.

Knee SAT (Knee Saturation)

This is a parameter for controlling the compression of the level of only a luminance in a video signal.

M V MOD (Master V Modulation)

This is a parameter for adjusting the vertical modulating shading through simultaneous adjustment of primary color signals.

Knee

This is a parameter for controlling the compression of the level of a high-luminance portion of an input signal at the time the level of the input signal in the camera exceeds a certain value.

White Clip

This is a parameter for adjusting the limitation on the peak of a white level of the video signal.

Detail Level

This is a parameter for adjusting the corrective quantity for a corrective signal to emphasize the edge of the video signal.

H/V, H/L Ratios

These are parameters for adjusting the proportions of horizontal and vertical detail levels and adjusting the burst frequency of detail.

γ Mix Ratio

This is a parameter for adjusting the mixing ratio of corrective signals to emphasize the edge of the video signal before and after gamma correction.

R/G/B Mix Ratio

This is a parameter for adjusting the mixing ratio of signals from which to generate the corrective signal to emphasize the edge of the video signal.

Slim Detail

This is a parameter for adjusting the thickness of the edge with the corrective signal to emphasize the edge of the video signal.

Slant Detail

This is a parameter for adjusting the edge in an oblique direction with the corrective signal to emphasize the edge of the video signal.

H Limiter

This is a parameter for adjusting a level at which a limiter works for suppressing the white and black levels of the video signal, with respect to the corrective signal to emphasize the edge in a horizontal direction.

V Limiter

This is a parameter for adjusting a level at which a limiter works for suppressing the white and black levels of the video signal, with respect to the corrective signal to emphasize the edge in a vertical direction.

Knee Apt (Knee Aperture)

This is a parameter for adjusting the corrective quantity for the corrective signal to emphasize the edge of the video signal whose level is higher than a level for controlling the compression of the level of the high-luminance portion of the input signal at the time the level of the input signal exceeds a certain value.

Level Dep (Level Depend)

This is a parameter for adjusting the level of the corrective signal to emphasize the edge with respect to signals greater than a knee point.

Crispening

This is a parameter for adjusting the level of the corrective signal to emphasize the edge in order to remove the edge of a noise potion of the video signal.

Detail Area

This is a parameter for adjusting the area and its gain on the display screen which is corrected by the corrective signal to emphasize the edge.

Skin Tone

This is a parameter for adjusting the level of the corrective signal to emphasize the edge of the subject having a particular hue and saturation, of the video signal.

Black

This is a parameter for adjusting the black levels of the primary color signals in order to determine a black balance in each channel of the primary color signals.

White

This is a parameter for adjusting the white levels of the primary color signals in order to determine a white balance in each channel of the primary color signals.

Black Set

This is an adjusting parameter for making constant the black level which is a reference for each channel of the primary color signals.

Flare

This is a parameter for adjusting a flare balance of each channel of the primary color signals.

B SH H (Black Shading H)

This is a parameter for adjusting a horizontal black shading for each channel of the primary color signals.

B SH V (Black Shading V)

This is a parameter for adjusting a vertical black shading for each channel of the primary color signals.

W SH H (White Shading H)

This is a parameter for adjusting a horizontal white shading for each channel of the primary color signals.

W SH V (White Shading V)

This is a parameter for adjusting a vertical white shading for each channel of the primary color signals.

V MOD SH (V Modulation Shading)

This is a parameter for adjusting a vertical modulation shading for each channel of the primary color signals.

Matrix

This is an adjusting parameter for correcting fundamental colors of primary color signals to obtain an optimum color tone.

Gamma

This is a parameter for adjusting the gamma correction to correct nonlinear characteristics which is exhibited by a television cathode-ray tube when electric signals supplied thereto are converted into light.

Black Gamma

This is a parameter for adjusting the black gamma to improve gradation characteristics in the vicinity of the black level.

Transmit

This is a parameter for selecting a transmission method between the camera and the CCU.

Mic/Line

This is a parameter for selecting an input method for inputting an audio signal to the camera through a microphone or a line.

Matrix Mix

This is a parameter for establishing a mixing signal and a mixing ratio with respect to an external audio signal to be inputted to the camera.

Matrix Output

This is a parameter for selecting a program signal in the camera and adjusting the output level of the external audio signal.

Incom

This is a parameter for establishing an external audio signal to be inputted to the camera.

Tracker

This is a parameter for establishing an external audio signal to be inputted to the camera.

Ext Comm (External Command)

This is a parameter for establishing an ON or OFF response to an external command which is supplied to the camera.

I. Main Pull-Down Menus of the Camera Setup System (see FIGS. 9A through 9F)

FIGS. 9A through 9F show main pull-down menus which can be displayed when the pointer Po is placed over menus "FILE", "EDIT", "SETUP", "HELP" on the menu bars MBc, MBd in the window image Wc shown in FIG. 7 and the window image Wd shown in FIG. 8 and then the button of the pointing device 300 is clicked.

FIG. 9A shows a pull-down menu which is displayed when the menu "FILE" is selected. When the menu "FILE" is selected, commands that can be selected from the menu "FILE" are as follows:

Upload

This is a command for reading all parameter data from the camera or the CCU that is connected.

Download

This is a command for setting all parameter data in the camera or the CCU that is connected.

Load

This is a command for reading all parameter data stored as a file from a floppy disk in the floppy disk drive 107 shown in FIG. 4, the disk drive 350 shown in FIG. 3, or an IC card in the card slot 109 shown in FIG. 4.

Save

This is a command for saving parameter data as a file in a floppy disk in the floppy disk drive 107 shown in FIG. 4, the disk drive 350 shown in FIG. 3, or an IC card in the card slot 109 shown in FIG. 4.

Save As

This is a command for saving a file which has been read as a file under a different name.

Page Setup

This is a command for establishing various page information for files.

Print

This is a command for printing file data with a printer.

Exit

This is a command for leaving the selection node on this pull-down menu.

Each of the above commands on the pull-down menu shown in FIG. 9 can be selected by placing the pointer Po over the command while the button of the pointing device 300 is being pressed and thereafter releasing the button of the pointing device 300. This selecting method is used to select a command, an item, or a parameter on all the pull-down menus.

FIG. 9B shows a pull-down menu which is displayed when the menu "Edit" is selected. When the menu "Edit" is selected, commands that can be selected from the menu "Edit" are as follows:

Undo

This is a command for undoing a process which has been carried out by a command.

Cut

This is a command for deleting image data in a specified area.

Copy

This is a command for duplicating specified data or image data.

Paste

This is a command for inserting specified data or image data into a desired position.

FIG. 9C shows a pull-down menu which is displayed when the menu "SETUP" is selected. When the menu "SETUP" is selected, commands that can be selected from the menu "SETUP" are as follows:

User Defined 1~4

These are commands for calling control commands which the user has set for use in the window and carrying out processes according to the called control commands.

Operation Status:
Video Level:
Color:
Detail:
Audio:

The above five commands have pull-down menus in a lower layer.

Memory Access

This is a command for accessing a memory in the camera or the CCU.

File Edit

This is a command for editing file data of read parameter data.

FIG. 9D shows a pull-down menu which is displayed when the command "Memory Access" shown in FIG. 9C is selected. When the command "Memory Access" is selected, commands that can be selected are as follows:

CCU

This command has a pull-down menu shown in FIG. 9D.

FIG. 9E shows a pull-down menu which is displayed when the command "CHU" shown in FIG. 9D is selected.

FIG. 9F shows a pull-down menu which is displayed when the menu "HELP" shown in FIG. 8 is selected. The menu "HELP" serves to display various items of assistive information with respect to the camera setup system.

J. Pull-Down Menus for a CHU of the Camera Setup System (see FIGS. 10A through 10C and FIGS. 11A and 11B)

FIGS. 10A through 10C and FIGS. 11A and 11B show pull-down menus which are displayed when a camera is selected in the window image Wc shown in FIG. 7 and thereafter the respective commands "Operation Status", "Video Level", "Color", "Audio", and "Detail" are selected from the pull-down menu displayed at the time the menu "SETUP" shown in FIG. 9C is selected. When the parameters on these pull-down menus are selected, they initiate the same processes as when the icon images shown in FIG. 8 are selected. Therefore, the above description of the icon images shown in FIG. 8 should be referred to for details of the parameters on the pull-down menus shown in FIGS. 10A through 10C and FIGS. 11A and 11B.

K. Pull-Down Menus for a CCU of the Camera Setup System (see FIGS. 12A through 12D)

FIGS. 12A through 12D show pull-down menus which are displayed when a CCU is selected in the window image Wc shown in FIG. 7 and thereafter the respective commands "Operation Status", "Video Level", "Color", and "Audio" are selected from the pull-down menu displayed at the time the menu "SETUP" shown in FIG. 9C is selected. When some of the parameters on these pull-down menus are selected, they initiate the same processes as when some of the icon images shown in FIG. 8 are selected.

FIG. 12A shows a pull-down menu that is displayed when the command "Operation Status" is selected. Parameters that can be selected when the command "Operation Status" is selected are as follows:

Cam Power

This is a parameter for establishing ON and OFF settings for the power supply of the camera.

Bars

This is a parameter for setting the output of color bars from the CCU.

H/SC Phase

This is a parameter for adjusting the phase of a horizontal synchronizing signal and a subcarrier signal.

SeqV Reset (Sequential V Reset)

This is a parameter for adjusting the resetting timing in a sequential output mode for outputting signals to a waveform monitor and a picture monitor.

Skin Gate

This is a parameter for controlling the display of an effective area for skin details displayed on a video monitor.

Prompt

This is a parameter for setting prompts.

Return

This is a parameter for setting a return signal.

Pix Monitor

This is a parameter for setting an output signal to be supplied to a picture monitor.

WF Monitor (Waveform Monitor)

This is a parameter for setting an output signal to be supplied to a waveform monitor.

FIG. 12B shows a pull-down menu that is displayed when the command "Video Level" is selected. Parameters that can be selected when the command "Video Level" is selected are as follows:

ENC Out (Encoder Out)

This is a parameter for adjusting a composite signal outputted from the CCU.

Camera Out

This is a parameter for adjusting the level of an input signal from the camera.

Component Out

This is a parameter for adjusting a component signal outputted from the CCU.

VBS Level

This is a parameter for adjusting a VBS signal on an option board of a color corrector.

Y Comb

This is a parameter for adjusting a comb filter to reduce cross color of the VBS signal.

FIG. 12C shows a pull-down menu that is displayed when the command "Color" is selected. Parameters that can be selected when the command "Color" is selected are as follows:

Color Switch

This is a parameter for establishing ON and OFF settings of colors.

Contrast/Saturation

This is a parameter for adjusting the color level of a signal outputted from the CCU and the linearity of a luminance component thereof.

Notch

This is a parameter for establishing a process for removing a signal of a certain frequency from the video signal.

EDTV

This is a parameter for adjusting an item relative to EDTV.

Mono Color

This is a parameter for adjusting a hue with respect to the function of mono color for mixing a chroma signal of a single hue in a luminance signal outputted from the CCU.

Color Correct

This is a parameter for adjusting correcting conditions with respect to a color corrector capable of correcting a particular hue.

Auto Color Matching

FIG. 12D shows a pull-down menu that is displayed when the command "Audio Level" is selected. Parameters that can be selected when the command "Audio Level" is selected are as follows:

Transmit

This is a parameter for selecting a transmission method between the camera and the CCU.

Mic/Incom

This is a parameter for establishing settings with respect to a microphone and an external audio input signal.

Matrix Mix

This is a parameter for establishing a mixing signal and a mixing ratio with respect to an external audio signal to be inputted to the camera.

Ext Comm (External Command)

This is a parameter for establishing ON and OFF settings with respect to communication of commands with an external source.

L. Basics of a Parameter Setting Window of the Camera Setup System (see FIG. 13)

Figure 13:
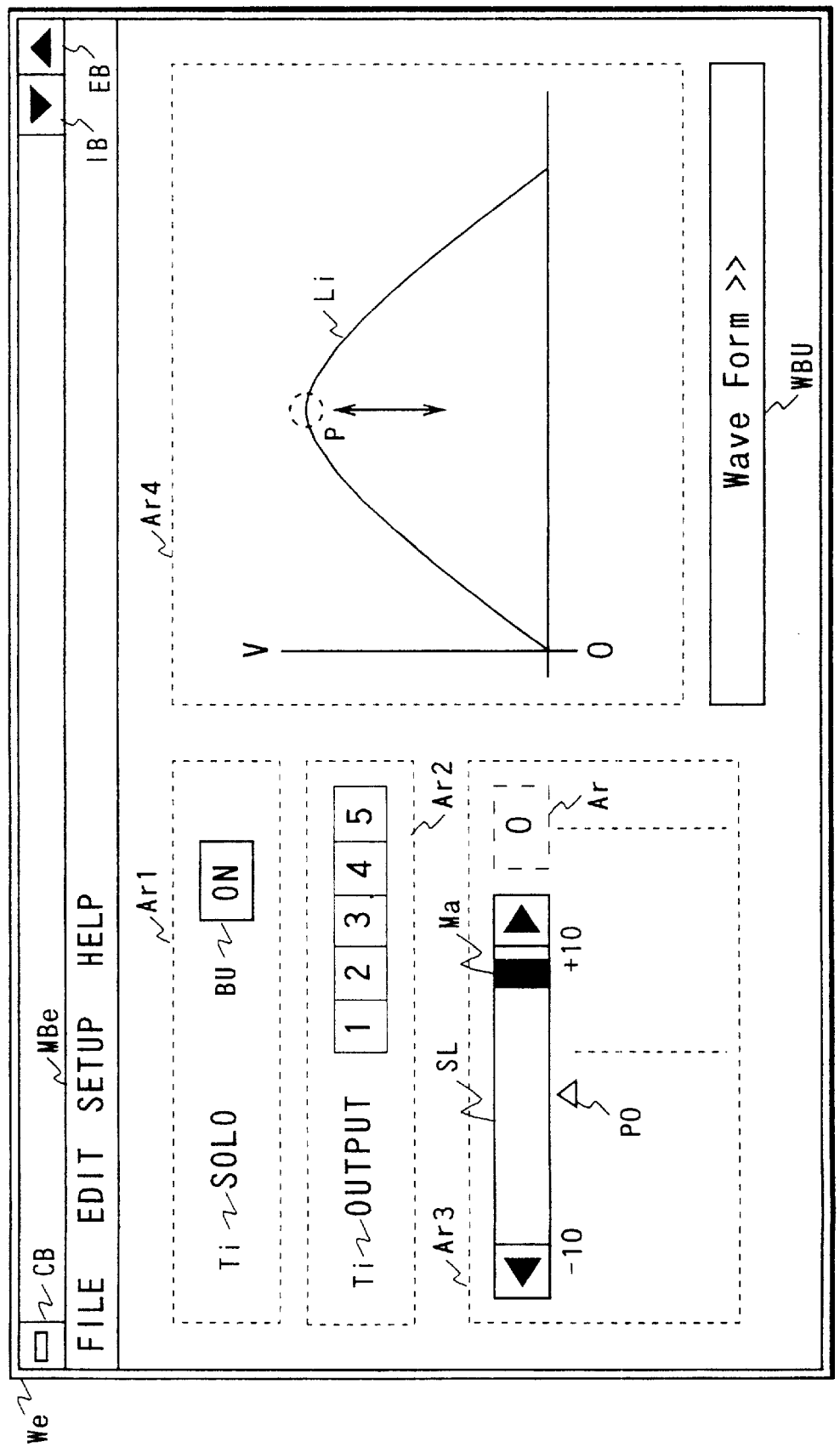
FIG. 13 is a view illustrative of basics of a parameter setting window which can be displayed from the parameter icon window shown in FIG. 8 or the pull-down menus shown in FIGS. 9A through 9F.

FIG. 13 illustrates basics of a parameter setting window We which is displayed as a parameter setting window for setting the parameters of a camera or a CCU which are described above.

The parameter setting window We shown in FIG. 13 is displayed by placing the pointer Po over one of the icon images shown in FIG. 8 and double-clicking the button of the pointing device 300 or placing the pointer Po over one of the commands on the pull-down menus shown in FIGS. 10A~10C through 12A~12D while the button of the pointing device 300 is being pressed and thereafter releasing the button of the pointing device 300. The monitor image 52 shown in FIG. 3 is omitted from illustration in FIG. 13.

For illustrative purpose, it is assumed that settings are to be established with respect to an audio signal in the parameter setting window We. The parameter setting window We has an area Ar1 containing a title image Ti and a button image BU. The title image Ti represents a title "SOLO", indicating that the selected audio signal is outputted singly.

The button BU switches between "ON" and "OFF" each time the button of the pointing device 300 is clicked after the pointer Po is placed on the button BU. That is, various data are established with respect to the button BU, and switched each time the button of the pointing device 300 is clicked. In the illustrated example, the button BU is set to "ON", and hence the title "SOLO" represented by the title image Ti is "ON", i.e., effective.

The parameter setting window we has an area Ar2 containing a title image Ti and switch images SW represented by numerical values "1"~"5". The title image Ti represents a title "OUTPUT", indicating an "output terminal". The numerical values "1"~"5" indicate the numbers of output terminals for an audio signal. One of the switch images SW is selected by placing the pointer Po over that switch image SW and thereafter clicking the button of the pointing device 300. At this time, one of the numerical values "1"~"5" which is indicated by the selected switch image SW, i.e., the corresponding number of the output terminal, is selected.

The parameter setting window We has an area Ar3 containing a slide lever image SL and a numeral image displayed in an area Ar indicated by the broken lines. The slide lever usage SL comprises a lever image Ma and a reference point image P0 which is displayed at a central position if a value to be set is an absolute value and displayed at a position before being changed if a value to be set is a relative value. The area Ar3 also displays a numeral image indicating a negative maximum value and a numeral image indicating a positive maximum value, respectively on the opposite ends of the slide lever image SL.

The lever image Ma is moved with the pointing device 300 when the pointing device 300 is moved while the pointer Po is being placed over the lover image Ma and the button of the pointing device 300 is being pressed. The area Ar displays a numerical value depending on the distance which the pointing device 300 is moved.

The parameter setting window we has an area Ar4 which displays therein a graph corresponding to a parameter being presently set as shown or a waveform image Li when the pointer Po is placed over a button image WBU below the area Ar4 and thereafter the button of the pointing device 300 is clicked. When the pointer Po is placed over the button image WBU and thereafter the button of the pointing device 300 is clicked again, the waveform image Li displayed in the area Ar4 disappears.

It should be noted that when the pointing device 300 is moved up and down while the button of the pointing device 300 is pressed with the pointer Po placed over a circular point P indicated by the broken line on the waveform image Li, the waveform image Li is also moved up and down as indicated by the solid-line arrow, and that when the waveform image Li is thus moved up and down, the value of the parameter data held in the computer varies, the lever Ma of the slide lever image SL moves, and the numeral image displayed in the area Ar varies. This process is controlled by the instruction analyzer 132, the display controller 134, and the parameter controller 138 shown in FIG. 4.

The operator can thus control the parameters of the cameras and the CCUs with tho camera setup system which has a graphical user interface as shown in FIG. 13.

Displayed examples of the parameter setting image We which correspond to the respective parameters will be described later on with reference to FIGS. 30 through 87. In those displayed examples of the parameter setting image We, only the parameters differ, but the basic method of using the button BU, the switch images SW, the numeral image in the area Ar, the slide lever image SL, the waveform image Li, and the button image WBU, and the basis processing carried out when these images are controlled by the pointing device 300 remain the same. Therefore, those basic method and processing which have been described above with respect to FIG. 13 will not be repeated in the description of displayed examples of the parameter setting image We shown in FIGS. 30 through 87.

M. A Main Processing Sequence of the Camera Setup System (see FIGS. 14 through 16)

Figure 14:
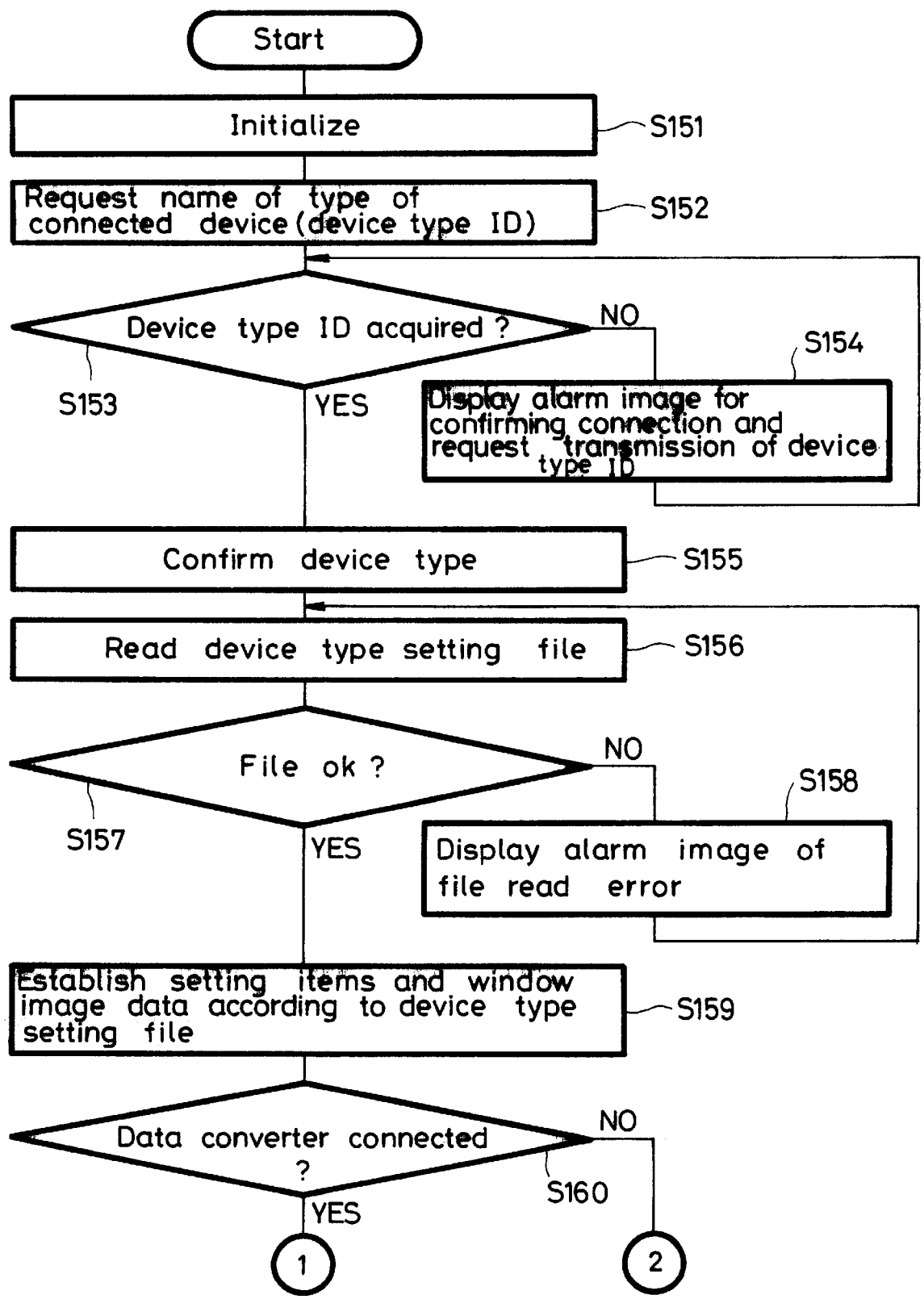
FIGS. 14 through 16 are flowcharts of a main processing sequence of the camera setup system, which is executed by the computer shown in FIG. 4.
Figure 15:
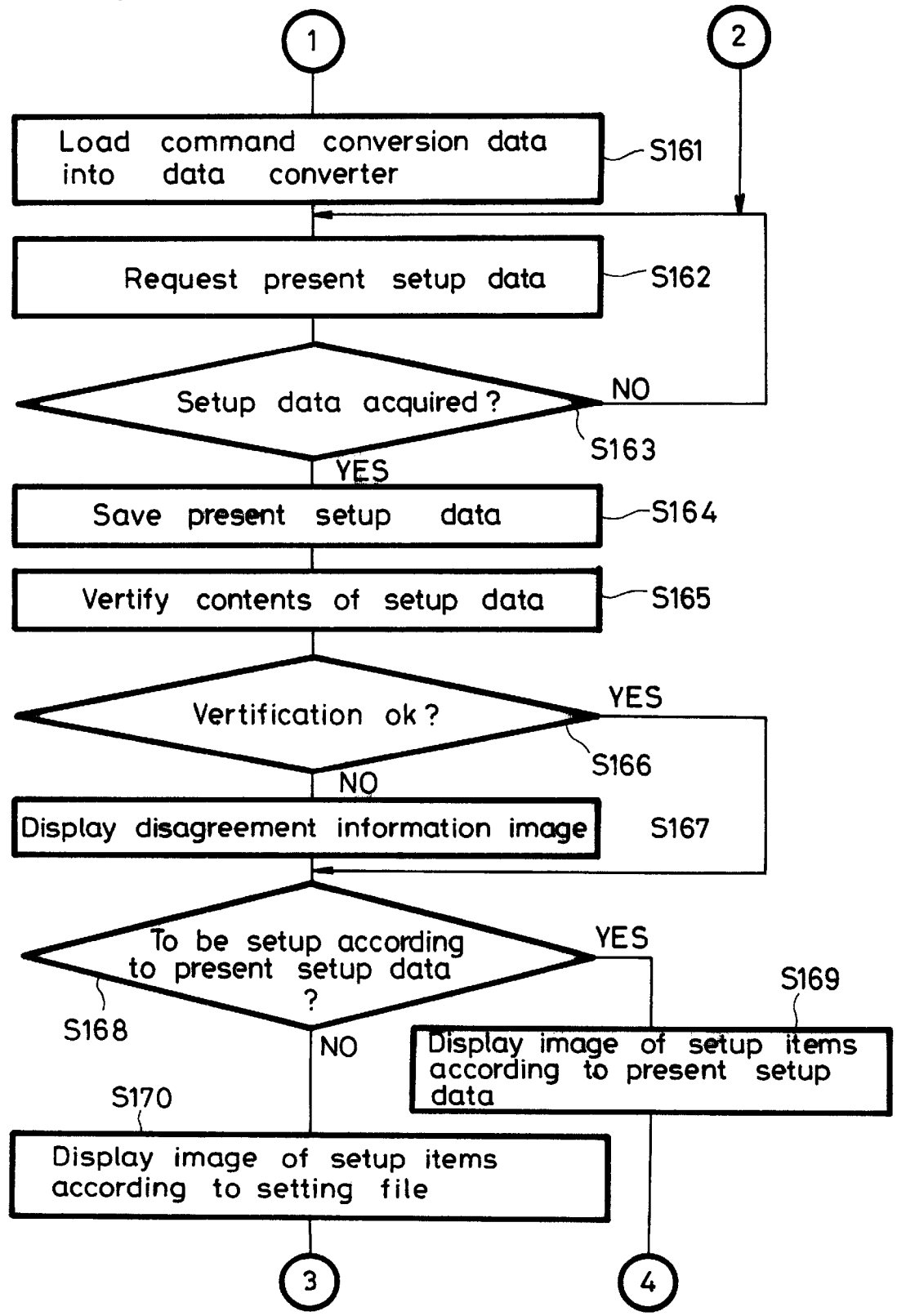
Figure 16:
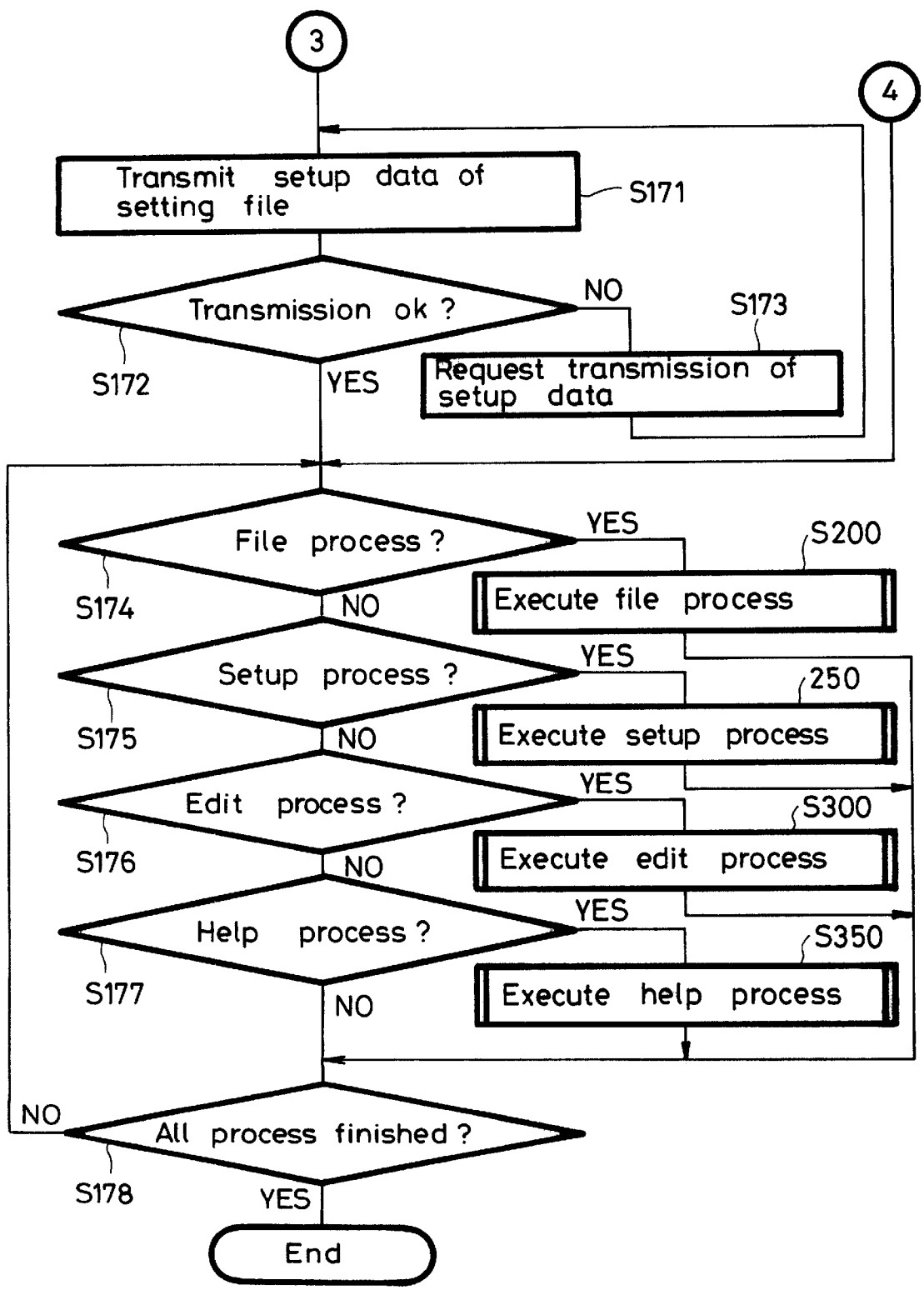

FIGS. 14 through 16 shows a main processing sequence of the camera setup system in the step S150 shown in FIG. 5.

In a step S151 shown in FIG. 14, the parameter controller 138 shown in FIG. 4 initializes the RAM 103, etc. Also in the step S151, the file manager 140 reads the image data of the connection configuration window shown in FIG. 7 from the disk drive 350 shown in FIG. 3. The display controller 134 writes the image data of the connection configuration window in the VRAM 105. The image data of the connection configuration window written in the VRAM 105 are supplied through the image display accelerator 115 and the output terminal 116 to the display unit 50, which displays the connection configuration window on its display panel. Then, control proceeds to a step S152.

In the step S152, when the operator selects one or the icon images Ca1~Ca6 of cameras or the icon images Cu1~Cu6 of CCUs in the displayed connection configuration window, the command generator 152 issues a command for requesting the transmission of device type ID data to one of the cameras 1000 or the controllers 1200-1, . . . , 1200-n shown in FIG. 4. Then, control proceeds to a step S153.

In the step S153, the command generator 152 decides whether it has acquired the device type ID data or not. If it has acquired the device type ID data (YES), then control proceeds to a step S155. If it has not acquired the device type ID data (NO), then control goes to a step S154.

In the step S154, the display controller 134 writes in the VRAM 105 alarm image data for prompting the operator to confirm whether one of the cameras 1000 or the controllers 1200-1, . . . , 1200-n, which the operator has selected, is connected or not. The alarm image data written in the VRAM 105 are displayed as an alarm image on the display unit 50. The command generator 139 transmits a command for requesting the transmission of device type ID data to the selected one of the cameras 1000 or the controllers 1200-1, . . . , 1200-n. Thereafter, control returns to the step S153.

In the step S155, the file manager 402 confirms the acquired device type ID data by specifying a device type setting file corresponding to the acquired device type ID data. Then, control proceeds to a step S156.

In the step S156, the file manager 402 reads the device type setting file corresponding to the acquired device type ID which is confirmed in the step S155 from the disk drive 350. Thereafter, control returns to the step S157.

In the step S157, the file manager 402 decides whether it has properly read file data from the device type setting file or not. If it has properly read the file data (YES), then control proceeds to a step S159. If it has not properly read the file data (NO), then control goes to a step S158.

In the step S158, the display controller 134 writes in the VRAM 105 alarm image data indicating that the file manager 402 has failed to read the file data. The alarm image data written in the VRAM 105 are displayed as an alarm image on the display unit 50. Then, control goes back to the step S156.

In the step S159, the parameter controller 138 establishes setting items based on the device type setting file data read by the file manager 140, and the display controller 134 writes window image data in the VRAM 105 based on the device type setting file data. The window image data written in the VRAM 105 are displayed as a window image on the display unit 50. Then, control proceeds to a step S160.

In the step S160, the command generator 139 issues a command for confirming a connection to the data converter 400. The command generator 139 decides whether the data converter 400 is connected or not based on whether it has received a response to the command or not. If the data converter 400 is connected (YES), then control proceeds to a step S161 shown in FIG. 15. If the data converter 400 is not connected (NO), then control jumps to a step S162 shown in FIG. 15.

In the step S161, the command generator 139 issues a command for requesting the transmission of setup data indicating a present setup status to the selected one of the cameras 1000 or the controllers 1200-1, . . . , 1200-n. Then, control goes to a step S163.

In the step S163, the command generator 139 decides whether it has acquired the setup data or not. If it has acquired the setup data (YES), then control proceeds to a step S164. If it has not acquired the setup data (NO), then control goes back to the step S162.

In the step S164, the file manager 140 stores the transmitted present setup data as a file in the RAM 103. Thereafter, control proceeds to a step S165.

In the step S165, the file manager 140 verifies the contents of the setup data stored in the RAM 103. Then, control proceeds to a step S166.

In the step S166, the file manager 140 decides, as a result of the verification process in the step S165, whether the contents of the transmitted setup data and the contents of the setup data stored in the RAM 103 agree with each other or not. If they agree with each other (YES), then control jumps to a step S174 shown in FIG. 16. If they do not agree with each other (NO), then control proceeds to a step S167.

In the step S167, the display controller 134 writes disagreement information image data indicative of the disagreed data contents in the VRAM 105. The disagreement information image data written in the VRAM 105 are displayed as an image on the display unit 50. Thereafter, control proceeds to a step S168.

In the step S168, the command analyzer 133 decides whether it has been instructed by the operator to set up the device according to the present setup data or not. If it has been instructed to set up the device (YES), then control goes to a step S169. If it has not been instructed to set up the device (NO), then control goes to a step S170.

In the step S169, the display controller 134 writes in the VRAM 105 image data indicative of the contents of setup items according to the present setup data. The image data written in the VRAM 105 are displayed as an image on the display unit 50. Thereafter, control goes to the step S174 shown in FIG. 16.

In tho step S170, the display controller 134 writes in the VRAM 105 image data indicative of the contents of setup items according to the contents of a setting file. The image data written in the VRAM 105 are displayed as an image on the display unit 50. Thereafter, control goes to a step S171 shown in FIG. 16. The setting file is a file stored in the disk drive 150.

In the step S171, the command generator 140 transmits the setup data of the setting file to the selected one of the cameras 1000 or the controllers 1200-1, . . . , 1200-n. When the setup data are transmitted to the selected one of the cameras 1000 or the controllers 1200-1, . . . , 1200-n, the selected one of the cameras 1000 or the controllers 1200-1, . . . , 1200-n establishes its own parameters to set up itself based on the transmitted setup data. Then, control proceeds to a step S172.

In the step S172, the command analyzer 133 analyzes a command from the selected one of the cameras 1000 or the controllers 1200-1, . . . , 1200-n to decide whether the transmission of the setup data has properly been finished or not. If the transmission of the setup data has properly been finished (YES), then control proceeds to the step S174. If the transmission of the setup data has not properly been finished (NO), then control goes to a step S173.

In the step S173, the command generator 173 retransmits the setup data to the selected one of the cameras 1000 or the controllers 1200-1, . . . , 1200-n. Thereafter, control goes back to the step S171.

In the step S174, the instruction analyzer 132 analyzes the position in the image where an instruction is entered through the pointing device 300 or the keyboard 250 by the operator. Based on the analyzed position, the command analyzer 133 analyzes a command entered by the operator, and decides whether the command indicates a file process or not. If the command indicates a file process (YES), then control goes to a step S200. If the command does not indicate a file process (NO), then control goes to a step S175.

The file process is executed in the step S200. Control then jumps from the step S200 to a step S178.

In the step S175, the instruction analyzer 132 analyzes the position in the image where an instruction is entered through the pointing device 300 or the keyboard 250 by the operator. Based on the analyzed position, the command analyzer 133 analyzes a command entered by the operator, and decides whether the command indicates a setup process or not. If the command indicates a setup process (YES), then control goes to a step S250. If the command does not indicate a setup process (NO), then control goes to a step S176.

The setup process is executed in the step S250. Control then jumps from the step S250 to the step S178.

In the step 5176, the instruction analyzer 132 analyzes the position in the image where an instruction is entered through the pointing device 300 or the keyboard 250 by the operator. Based on the analyzed position, the command analyzer 133 analyzes a command entered by the operator, and decides whether the command indicates an edit process or not. If the command indicates an edit process (YES), then control goes to a step S300. If the command does not indicate an edit process (NO), then control goes to a step S177.

The edit process is executed in the step S300. Control then jumps from the step S300 to the step S178.

In the step S177, the instruction analyzer 132 analyzes the position in the image where an instruction is entered through the pointing device 300 or the keyboard 250 by the operator. Based on the analyzed position, the command analyzer 133 analyzes a command entered by the operator, and decides whether the command indicates a help process or not. If the command indicates a help process (YES), then control goes to a step S350. If the command does not indicate a help process (NO), then control goes to the step S178.

The help process is executed in the step S350. Control then goes from the step S350 to the step S178.

In the step S178, the instruction analyzer 132 analyzes the position in the image where an instruction is entered through the pointing device 300 or the keyboard 250 by the operator. Based on the analyzed position, the command analyzer 133 analyzed a command entered by the operator, and decides whether the command indicates an end of the camera setup system or not. If the command indicates an end of the camera setup system (YES), then control comes to an end. If the command does not indicate an end of the camera setup system (NO), then control goes back to the step S174.

N. A Setup Process of the Camera Setup System (see FIGS. 17 and 18)

Figure 17:
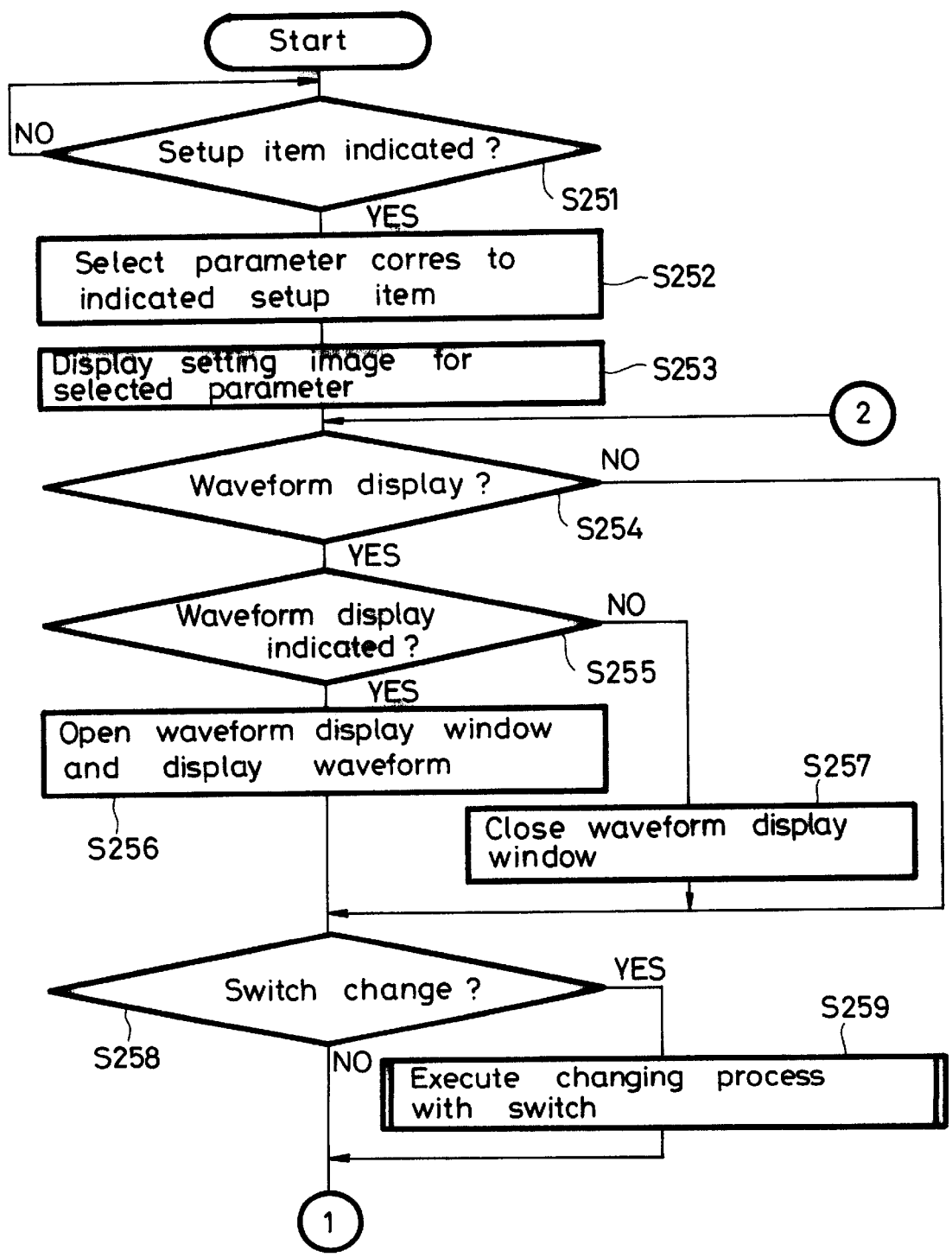
FIGS. 17 and 18 are flowcharts of a setup process in the main processing sequence shown in FIG. 16.
Figure 18:
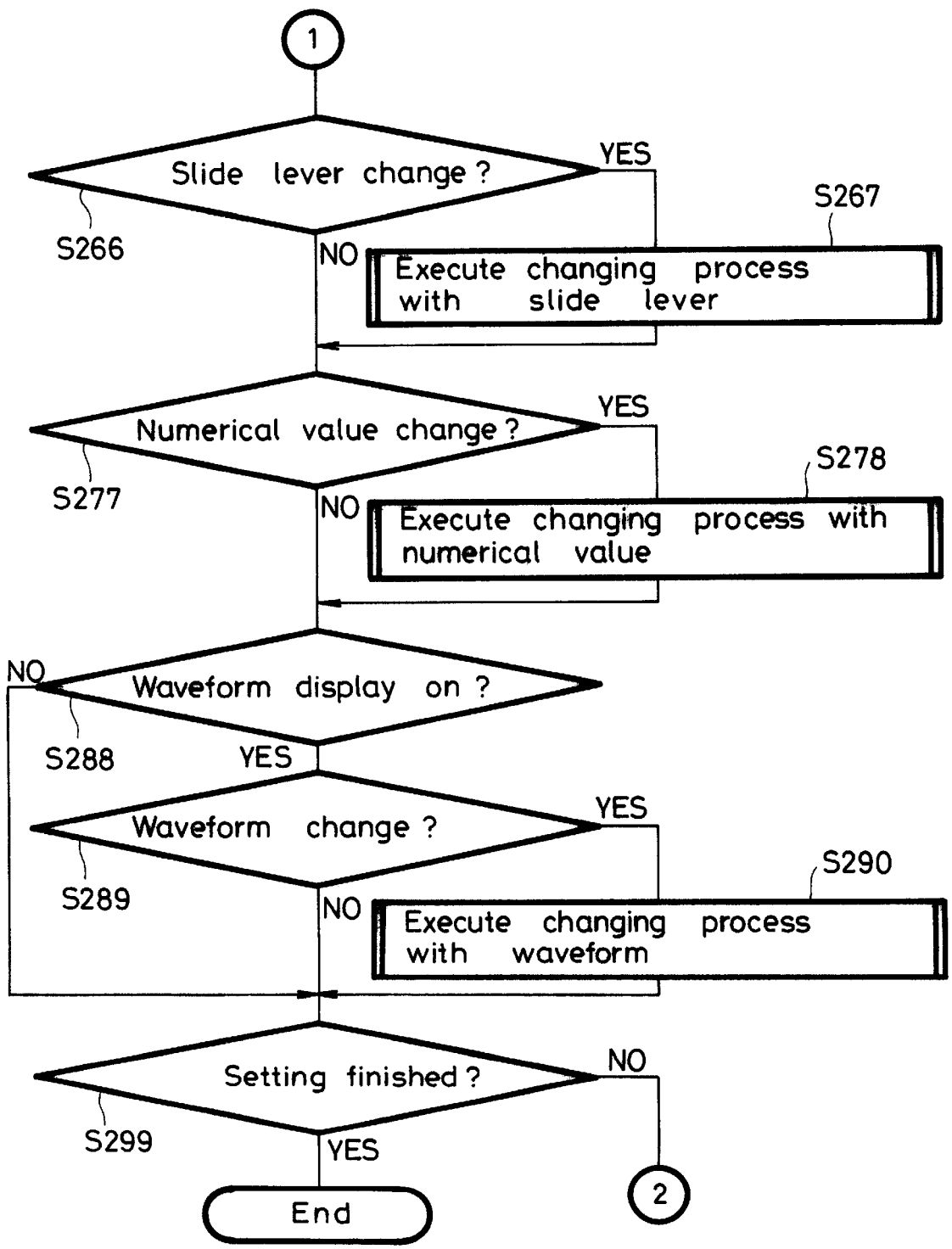

FIGS. 17 and 18 shows the setup process in the main processing sequence shown in FIG. 16.

In a step S251 shown in FIG. 17, the instruction analyzer 132 analyzes the position in the image where an instruction is entered through the pointing device 300 or the keyboard 250 by the operator. Based on the analyzed position, the command analyzer 133 analyzes a command entered by the operator, and decides whether the command indicates the designation of a setup item or not. If the command indicates the designation of a setup item (YES), then control proceeds to a step S252.

In the step S252, the parameter controller 138 selects a parameter corresponding to the setup item designated by the operator. Then, control proceeds to a step S253.

In the step S253, the file manager 140 reads image data of a parameter setting window corresponding to the parameter selected in the step S252, from the disk drive 350. The display controller 134 writes the read image data of the parameter setting window in the VRAM 105. The image data of the parameter setting window written in the VRAM 105 are displayed as an image on the display unit 50. Then, control proceeds to a step S254.

In the step S254, the command analyzer 133 decides whether there is a waveform display or not. If there is a waveform display (YES), then control proceeds to a step S255. If there is not a waveform display (NO), then control jumps to a step S258.

In the step S255, the instruction analyzer 132 analyzes the position in which the button of the pointing device 300 is pressed. Based on the analyzed positioned, the instruction analyzer 132 decides whether a waveform display is indicated or not. If a waveform display is indicated (YES), then control proceeds to a step S256. If a waveform display is not indicated (NO), then control goes to a step S257.

In the step S256, the display controller 134 writes the image data of a waveform display window in the VRAM 105. The image data of the waveform display window written in the VRAM 105 are displayed as an image on the display unit 50. Thereafter, control proceeds to a step S258.

In the step S257, the display controller 134 writes the image data of a parameter setting window in the VRAM 105. The image data of the parameter setting window written in the VRAM 105 are displayed as an image on the display unit 50. The displayed image data of the waveform display window are now deleted from the display unit 50. Then, control goes to the step S258.

In the step S258, the instruction analyzer 132 analyzes the position in the image in which the button of the pointing device 300 is clicked. Based on the analyzed positioned, the instruction analyzer 132 decides whether there is a change in the switch image or not. If there is a change in the switch image (YES), then control proceeds to a step S259. If there is not a change in the switch image (NO), then control goes to a step S266 shown in FIG. 18.

In the step S259, a change process with a switch is executed. Thereafter, control goes to the step S266 shown in FIG. 18.

In the step S266, the instruction analyzer 132 analyzes the position in the image in which the button of the pointing device 300 is pressed. Based on the analyzed positioned, the instruction analyzer 132 decides whether there is a change in the slide lever image or not. If there is a change in the slide lever image (YES), then control proceeds to a step S267. If there is not a change in the slide lever image (NO), then control goes to a step S277.

In the step S267, a change process with a slide lever is executed. Thereafter, control goes to the step S277.

In the step S277, the instruction analyzer 132 analyzes the position in the image in which the button of the pointing device 300 is clicked. Based on the analyzed positioned, the instruction analyzer 132 decides whether there is a change in the numerical value or not. If there is a change in the numerical value (YES), then control proceeds to a step S278. If there is not a change in the numerical value (NO), then control proceeds to a step S288.

In the step S278, a change process with a numerical value is executed. Thereafter, control goes to the step S288.

In the step S288, the instruction analyzer 132 analyzes the position in the image in which the button of the pointing device 300 is clicked. Based on the analyzed positioned, the instruction analyzer 132 decides whether the waveform display is ON or not. If the waveform display is ON (YES), then control proceeds to a step S289. If the waveform display is not ON (NO), then control proceeds to a step S290.

In the step S289, the instruction analyzer 132 analyzes the position in the image in which the button of the pointing device 300 is pressed. Based on the analyzed positioned, the instruction analyzer 132 decides whether there is a change in the waveform or not. If there is a change in the waveform (YES), then control proceeds to a step S290. If there is not a change in the waveform (NO), then control proceeds to a step S299.

In the step S290, a change process with a waveform is executed. Then, control goes to the step S299.

In the step S299, the instruction analyzer 132 analyzes the position in the image in which the button of the pointing device 300 is clicked. Based on the analyzed positioned, the command analyzer 133 decides whether the command entered by the operator indicates that the setup process is finished or not. It the command indicates that the setup process is finished (YES), then the setup process comes to an end. If the command does not indicate that the setup process is finished (NO), then control goes back to the step S254.

O. A Change Process With a Switch of the Camera Setup System (see FIG. 19)

Figure 19:
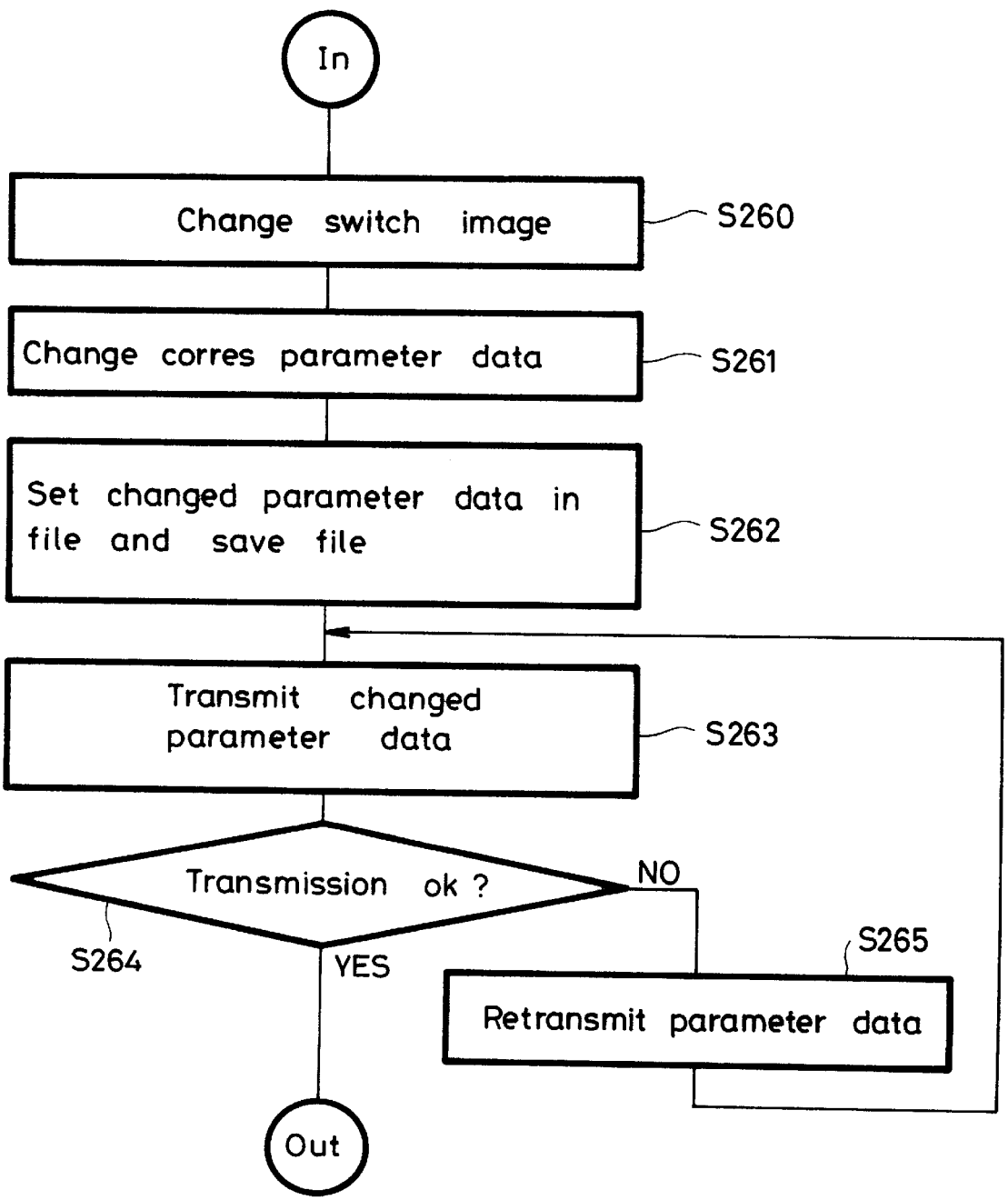
FIG. 19 is a flowchart of a change process with a switch in the setup process shown in FIG. 17.

FIG. 19 shows a change process with a switch in the step S259 of the setup process shown in FIG. 17.

In a step S260 shown in FIG. 19, the display controller 134 writes switch image data after they are changed in the VRAM 105. The switch image data written in the VRAM 105 are displayed as an image on the display unit 50. Then, control proceeds to a step S261.

In the step S261, the parameter controller 138 changes the value of the corresponding parameter data. Then, control proceeds to a step S262.

In the step S262, the file manager 140 sets the changed parameter data as film data in the file stored in the RAM 104, and saves the file data in the disk drive 350. Thereafter, control goes to a step S263.

In the step S263, the command generator 139 transmits the parameter data to the selected one of the cameras 1000 or the controllers 1200-1, . . . , 1200-n. Then, control proceeds to a step S264.

In the step S264, the command analyzer 133 analyzes a command from the selected one of the cameras 1000 or the controllers 1200-1, . . . , 1200-n, or a command from the data converter 400 to decide whether the transmission has properly been finished or not. If the transmission has properly been finished (YES), then control leaves the change process. Is the transmission has not properly been finished (NO), then control goes to a step S265.

In the step S265, the command generator 139 retransmits the parameter data to the selected one of the cameras 1000 or the controllers 1200-1, . . . , 1200-n. Then, control goes back to the step S263.

P. A Change Process With a Slide Lever of the Camera Setup System (see FIG. 20)

Figure 20:
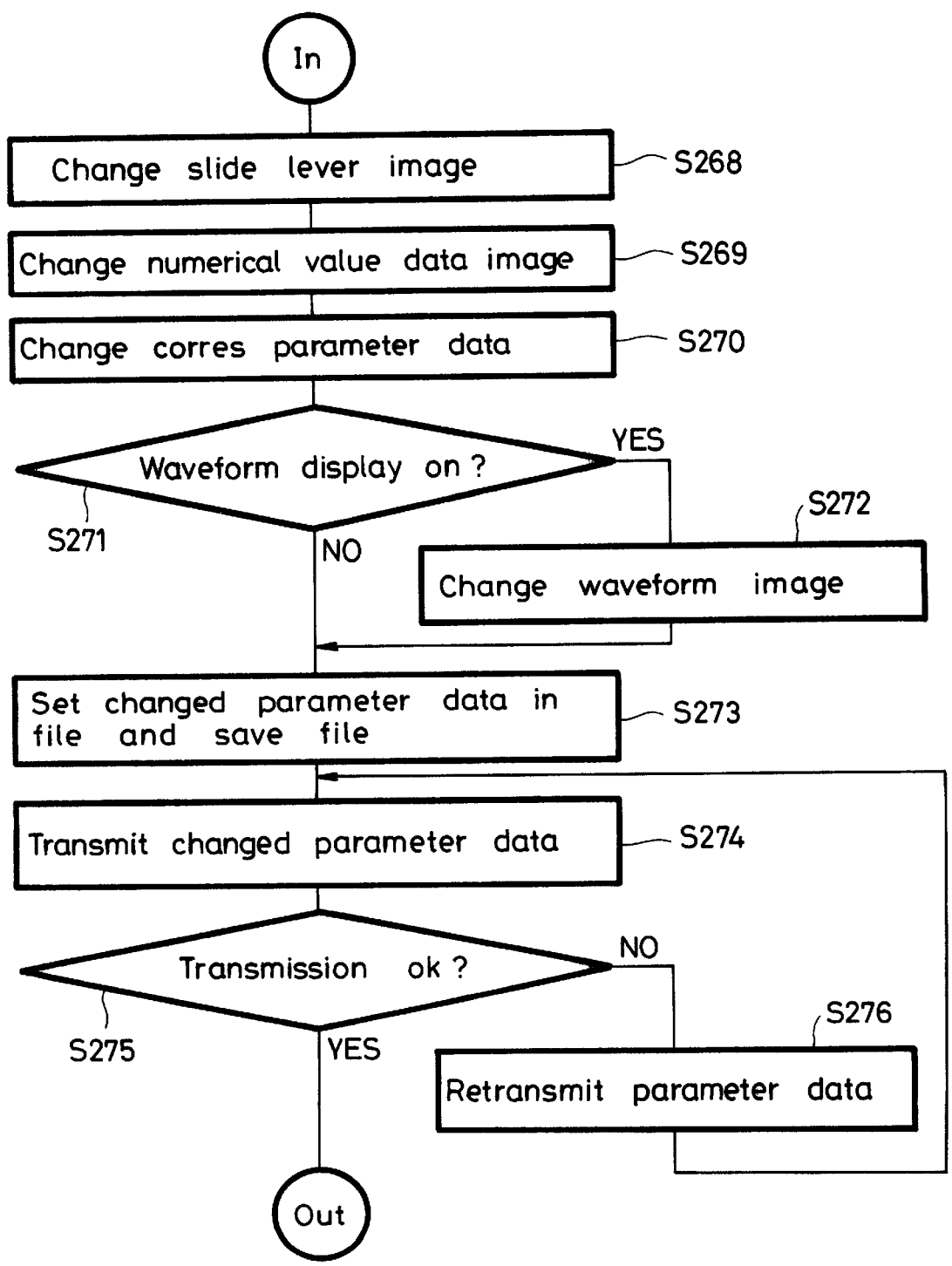
FIG. 20 is a flowchart of a change process with a slide lever in the setup process shown in FIG. 18.

FIG. 20 shows a change process with a slide lever in the step S267 of the setup process shown in FIG. 18.

In a step S268 shown in FIG. 20, the instruction analyzer 132 detects the distance that the pointing device 300 has moved after the button of the pointing device 300 has been pressed until the button of the pointing device 300 is released. Based on the detected distance, the display controller 134 changes the image data of a slide lever stored in the VRAM 105. Then, control proceeds to a step S269.

In the step S269, the display controller 134 changes the image data of a numerical value stored in the VRAM 105 based on the detected distance. Then, control proceeds to a step S270.

In the step S270, the parameter controller 138 changes parameter data based on the detected distance. Then, control proceeds to a step S271.

In the step S271, the display controller 134 decides whether the waveform display is ON or not. If the waveform display is ON (YES), then control proceeds to a step S272. If the waveform display is not ON (NO), then control proceeds to a step S273.

In the step S272, the display controller 134 changes a waveform image stored in the VRAM 105 based on the detected distance. Then, control goes to the step S273.

In the step S273, the file manager 140 sets the changed parameter data as file data in the file stored in the RAM 104, and saves the file data in the disk drive 350. Thereafter, control goes to a step S274.

In the step S274, the command generator 139 transmits the parameter data to the selected one of the cameras 1000 or the controllers 1200-1, . . . , 1200-n. Then, control proceeds to a step S275.

In the step S275, the command analyzer 133 analyzes a command from the selected one of the cameras 1000 or the controllers 1200-1, . . . , 1200-n, or a command from the data converter 400 to decide whether the transmission has properly been finished or not. If the transmission has properly been finished (YES), then control leaves the change process. If the transmission has not properly been finished (NO), then control goes to a step S276.

In the step S276, the command generator 139 retransmits the parameter data to the selected one of the cameras 1000 or the controllers 1200-1, . . . , 1200-n. Then, control goes back to the step S274.

Q. A Change Process With a Numerical Value of the Camera Setup System (see FIG. 21)

Figure 21:
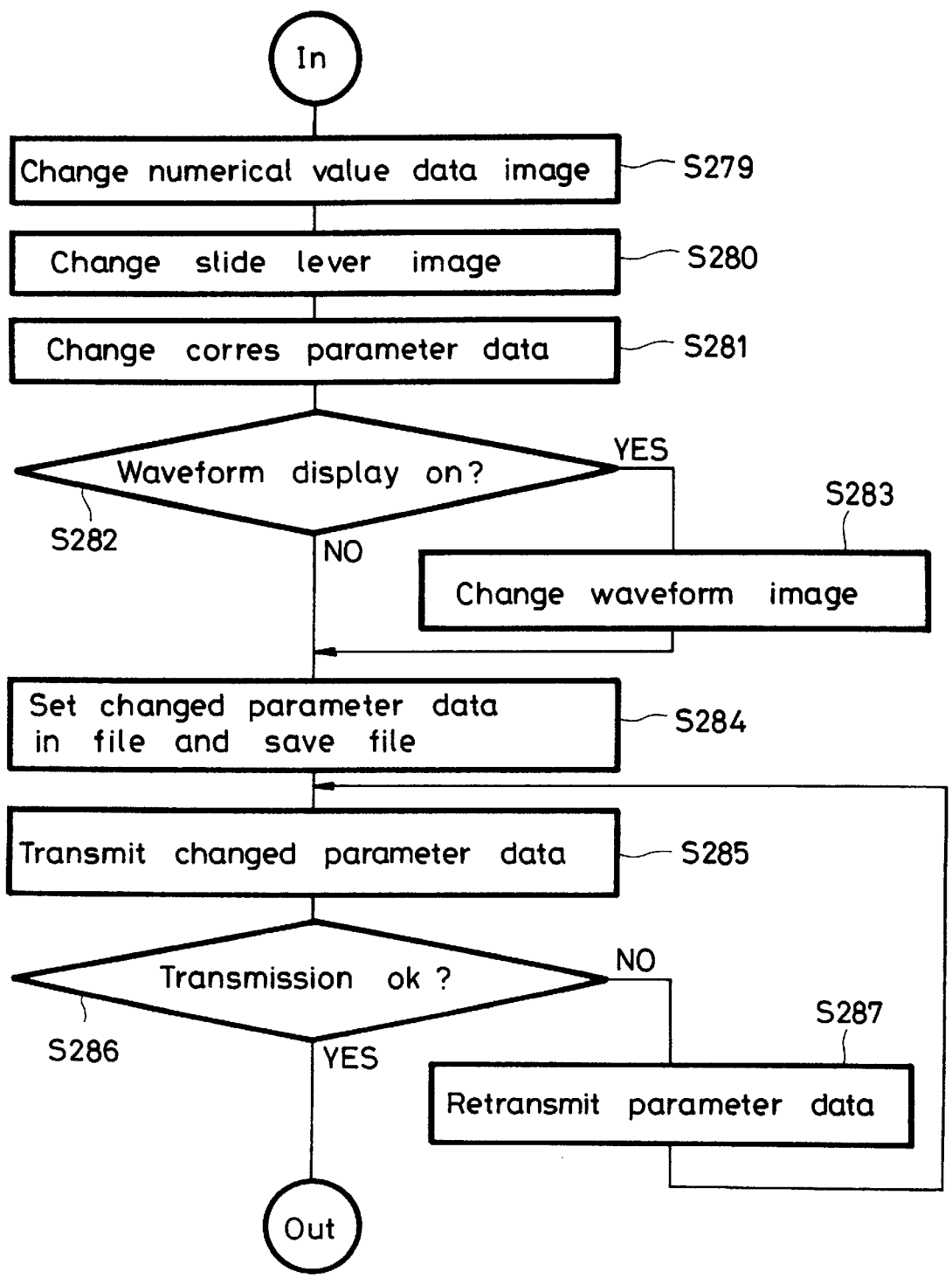
FIG. 21 is a flowchart of a change process with a numerical value in the setup process shown in FIG. 18.

FIG. 21 shows a change process with a numerical value in the step S278 of the setup process shown in FIG. 18.

In a step S279 shown in FIG. 21, the instruction analyzer 132 detects numerical data entered from the keyboard 250. Based on the detected numerical data, the display controller 134 changes numerical image data stored in the VRAM 105. Then, control proceeds to a step S280.

In the step S280, the display controller 134 changes the image data of a slide lever stored in the VRAM 105 based on the numerical data. Then, control proceeds to a step S281.

In the step S281, the parameter controller 138 changes parameter data based on the numerical data. Then, control proceeds to a step S282.

In the step S282, the display controller 134 decides whether the waveform display is ON or not. If the waveform display is ON (YES), then control proceeds to a step S283. If the waveform display is not ON (NO), then control proceeds to a step S284.

In the step S283, the display controller 134 changes a waveform image stored in the VRAM 105 based on the numerical data. Then, control goes to the step S284.

In the step S284, the file manager 140 sets the changed parameter data as file data in the file stored in the RAM 104, and saves the file data in the disk drive 350. Thereafter, control goes to a step S285.

In the step S285, the command generator 139 transmits the parameter data to the selected one of the cameras 1000 or the controllers 1200-1, . . . , 1200-n. Then, control proceeds to a step S286.

In the step S286, the command analyzer 133 analyzes a command from the selected one of the cameras 1000 or the controllers 1200-1, . . . , 1200-n, or a command from the data converter 400 to decide whether the transmission has properly been finished or not. If the transmission has properly been finished (YES), then control leaves the change process. If the transmission has not properly been finished (NO), then control goes to a step S287.

In the step S287, the command generator 139 retransmits the parameter data to the selected one of the cameras 1000 or the controllers 1200-1, . . . , 1200-n. Then, control goes back to the step S285.

R. A Change Process With a Waveform of the Camera Setup System (see FIG. 22)

Figure 22:
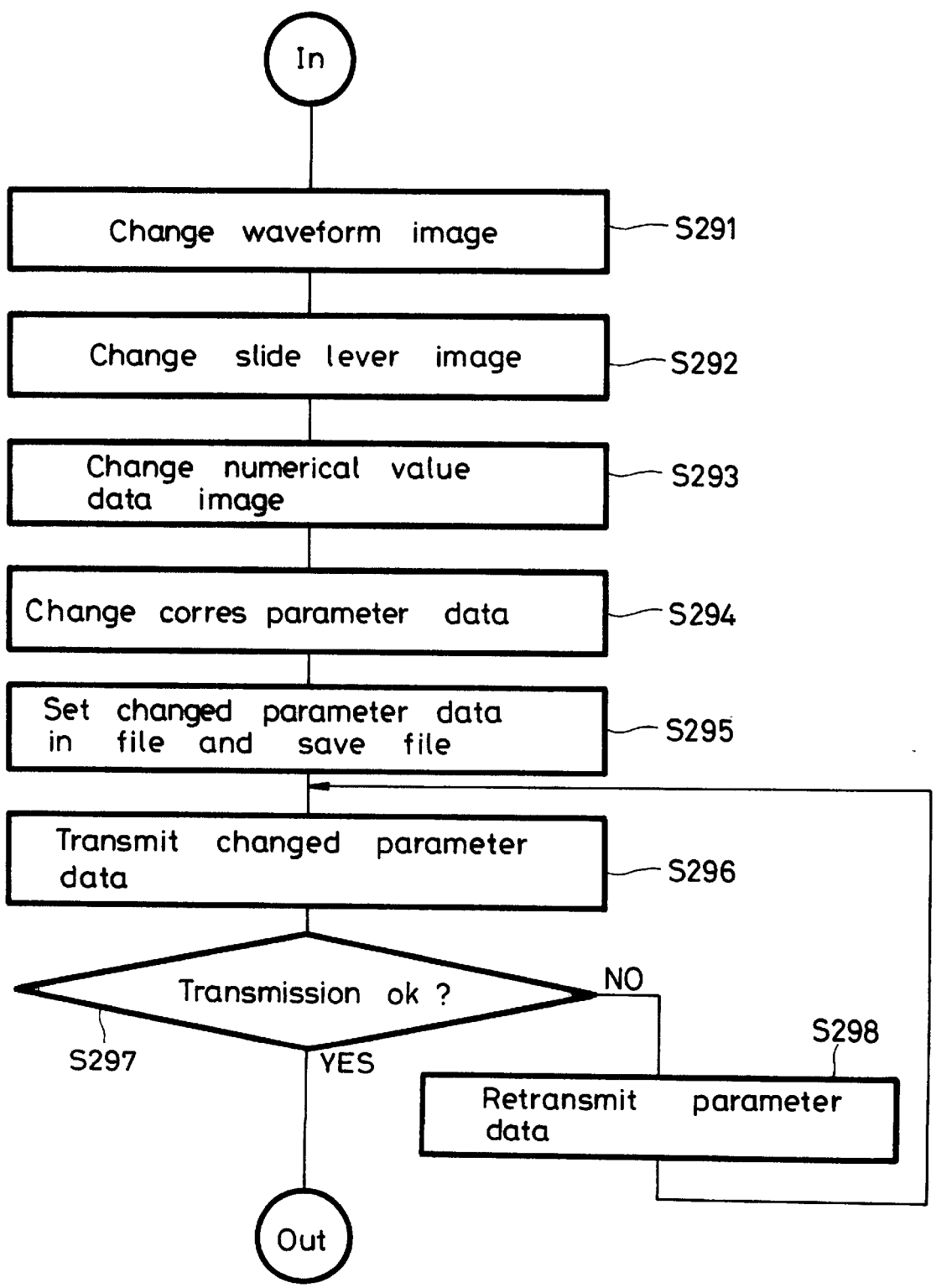
FIG. 22 is a flowchart of a change process with a waveform in the setup process shown in FIG. 18.

FIG. 22 shows a change process with a waveform in the step S290 of the setup process shown in FIG. 18.

In a step S291 shown in FIG. 22, the instruction analyzer 132 detects the distance that the pointing device 300 has moved after the button of the pointing device 300 has been pressed until the button of the pointing device 300 is released. Based on the detected distance, the display controller 134 changes the image data of a waveform stored in the VRAM 105. Then, control proceeds to a step S292.

In the step S292, the display controller 134 changes the image data of a slide lever stored in the VRAM 105 based on the detected distance. Then, control proceeds to a step S293.

In the step S293, the display controller 134 changes the image data of a numerical value stored in the VRAM 105 based on the detected distance. Then, control proceeds to a step S294.

In the step S294, the parameter controller 138 charges parameter data based on the detected distance. Then, control proceeds to a step S295.

In the step S295, the file manager 140 sets the changed parameter data as file data in the file stored in the RAM 104, and saves the file data in the disk drive 350. Thereafter, control goes to a step S296.

In the step S296, the command generator 139 transmits the parameter data to the selected one of the cameras 1000 or the controllers 1200-1, . . . , 1200-n. Then, control proceeds to a step S297.

In the step S297, the command analyzer 133 analyzes a command from the selected one of the cameras 1000 or the controllers 1200-1, . . . , 1200-n, or a command from the data converter 400 to decide whether the transmission has properly been finished or not. If the transmission has properly been finished (YES), then control leaves the change process. If the transmission has not properly been finished (NO), then control goes to a step S298.

In the step S298, the command generator 139 retransmits the parameter data to the selected one of the cameras 1000 or the controllers 1200-1, . . . , 1200-n. Then, control goes back to the step S296.

S. A Transmission Data Format and File Formats Used in the Camera Set Up System (see FIGS. 23A through 23E)

FIGS. 23A through 23E show a transmission data format and file formats used in the computer shown in FIG. 4.

FIG. 23A shows a transmission data format used at the time of setting parameters. As shown in FIG. 23A, data which are transmitted comprise device type ID data indicative of a destination, a command indicative of a parameter change, parameter ID data indicative of a parameter to be changed, and parameter data.

FIG. 23B shows a setup parameter file. As shown in FIG. 23B, a setup parameter file comprises device type ID data, parameter ID data, and parameter data. The setup parameter file comprises all parameter data established with respect to cameras and CCUs.

FIG. 23C shows an LSI port data file. As shown in FIG. 23C, an LSI port data file comprises device type ID data, LSI ID data, data of the number of used bytes, and setting data. The setting data comprise LSI port data and I/O port data required for cameras and CCUs.

FIG. 23D shows a screen display setting file. As shown in FIG. 23D, a screen display setting file comprises device type ID data, parameter ID data, and parameter display data. The parameter display data are data indicative of which switch has what value when a switch number is selected for a desired setting.

FIG. 23E shows an internal device data file. As shown in FIG. 23E, an internal device data file comprises device type ID data and internal device data. The internal device data include gamma curve data, a scene file, a master setup file, various log files, and service information. The internal device data file is a file for allowing the computer 100 to save and load internal device information other than data handled by a setup parameter file owned by cameras and CCUs.

Although not shown, a device setting file is also used in addition to the above files. There are as many device setting files as the number of device types. A device setting file corresponding to the connected device type is loaded from the disk drive 350 into the computer 100 to allow the computer 100 to effect processes that match the connected device type.

The above five files can be stored in an ASCII test format, for example, in the disk drive 350 shown in FIG. 3 or an IC card or the like inserted in the card slot 109 shown in FIG. 4. In addition, the contents of these files can be modified in a text format when the command "File Edit" is selected on the pull-down menu "SETUP" shown in FIG. 9C.

T. A Data Converter in the Camera Setup System Shown in FIG. 3 (see FIG. 24)

Figure 24:
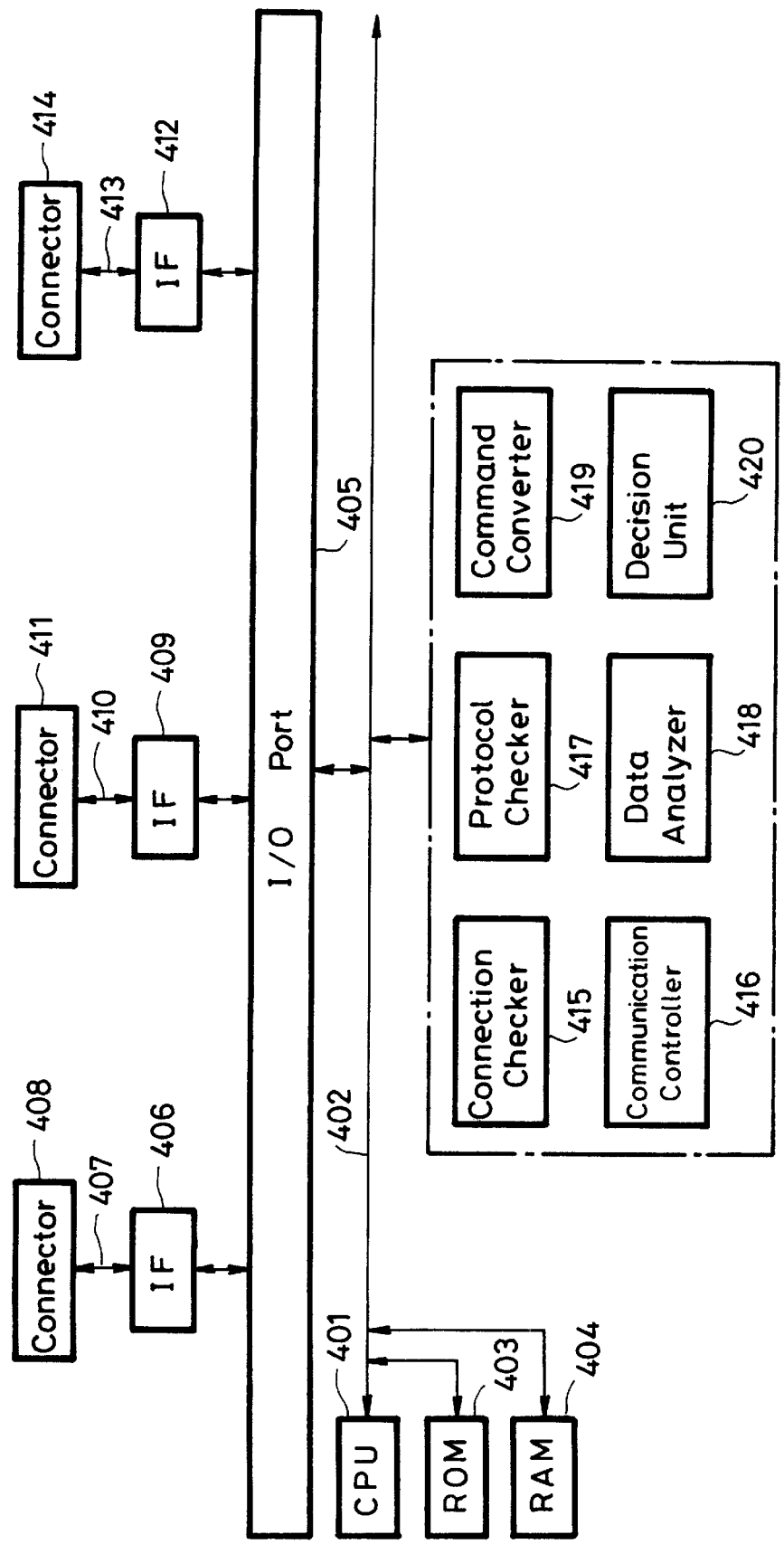
FIG. 24 is a block diagram of a data converter in the camera setup system shown in FIG. 3.

FIG. 24 shows the data converter 400 in the camera setup system shown in FIG. 3.

Connections and Structure

As shown in FIG. 24, the data converter 400 comprises a CPU 401, a bus assembly 402 connected to the CPU 401 and comprising address, data, and control buses, a ROM 403 connected to the bus assembly 402 for storing program data and a protocol converting table, etc., a working RAM 404 connected to the bus assembly 402 for storing data loaded from the computer 100, and interfaces 406, 409, 412 connected to the bus assembly 402. Connectors 408, 411, 414 are connected respectively to the interfaces 406, 409, 412 through respective lines 407, 410, 413.

The interface 406 may comprise an RS-232C interface or an RS-422 interface, for example. The interfaces 409, 412 are provided in two types corresponding to the types of the cameras 1000 and the types of the controllers 1200-1, . . . , 1200-n. Each of these interfaces 409, 412 may comprise an RS-232C interface or an RS-422 interface, for example.

When the data converter 400 is turned on and command conversion data are loaded from the computer 100 into the data converter 400, the CPU 401 performs various functions indicated as blocks in a frame surrounded by the dot-and-dash lines.

The functions performed by the CPU 401 will be described below.

A connection checker 415 serves to check connections between the data converter 400 and other devices. A communication controller 416 serves to control communications with other devices which are connected to the data converter 400. A protocol checker 417 serves to check the communication protocol of data which are transmitted from other devices which are connected to the data converter 400. A data analyzer 418 serves to decide whether data transmitted from the computer 100 are data for converting command data.

A command converter 419 serves to convert command data transmitted from the computer 100 into command data that can be recognized by the cameras 1000 or the controllers 1200-1, . . . , 1200-n, and also to convert command data supplied from the cameras 1000 or the controllers 1200-1, . . . , 1200-n into command data that can be recognized by the computer 100. A decision unit 420 serves to make various decisions.

Operation of the data converter 400 will be described below with reference to FIGS. 25 through 27.

U. A Control Sequence of the Data Converter 400 Shown in FIG. 24 (see FIGS. 25 through 27)

Figure 25:
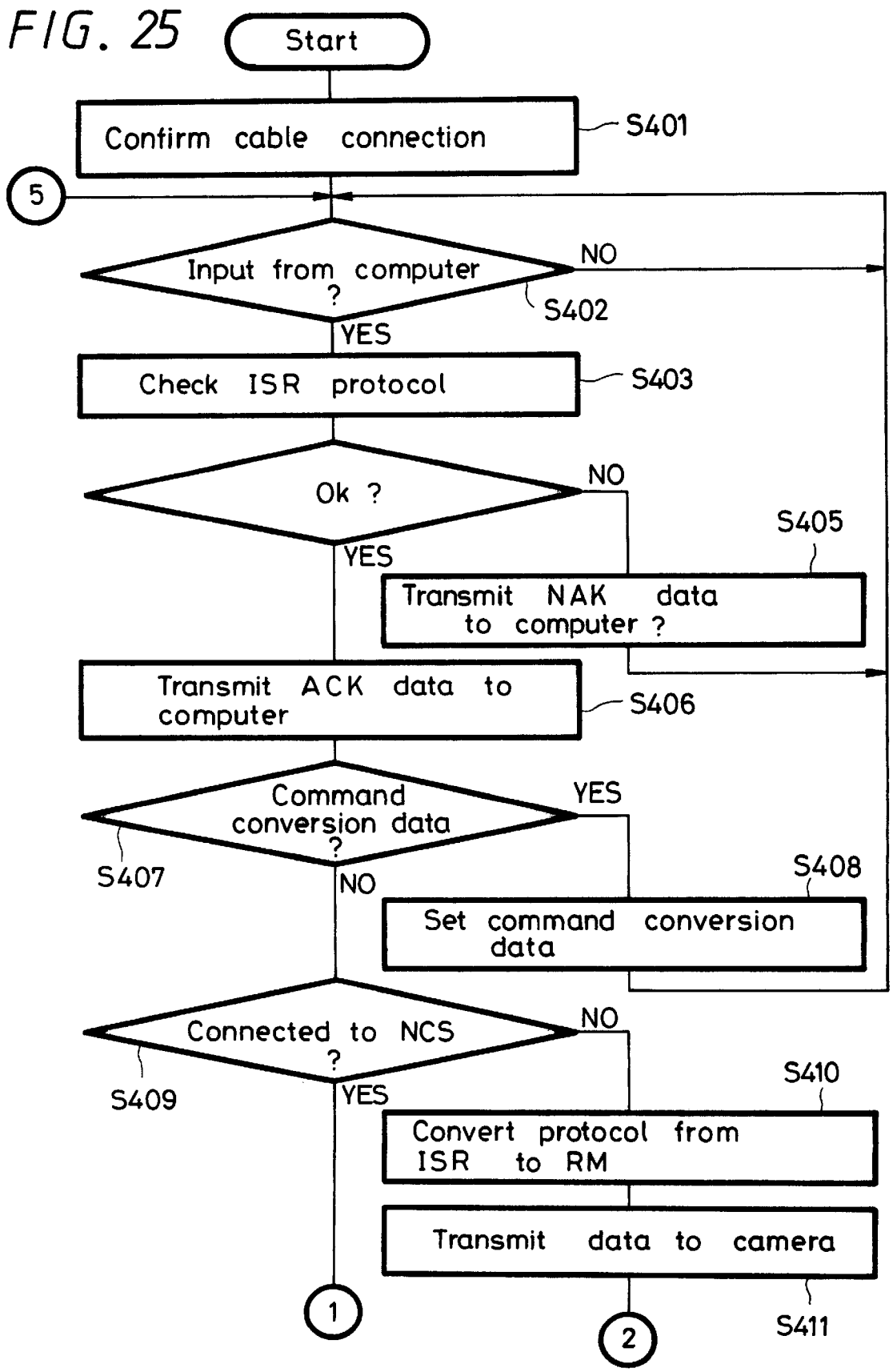
FIGS. 25 through 27 are flowcharts of a control sequence of the data converter shown in FIG. 24.
Figure 26:
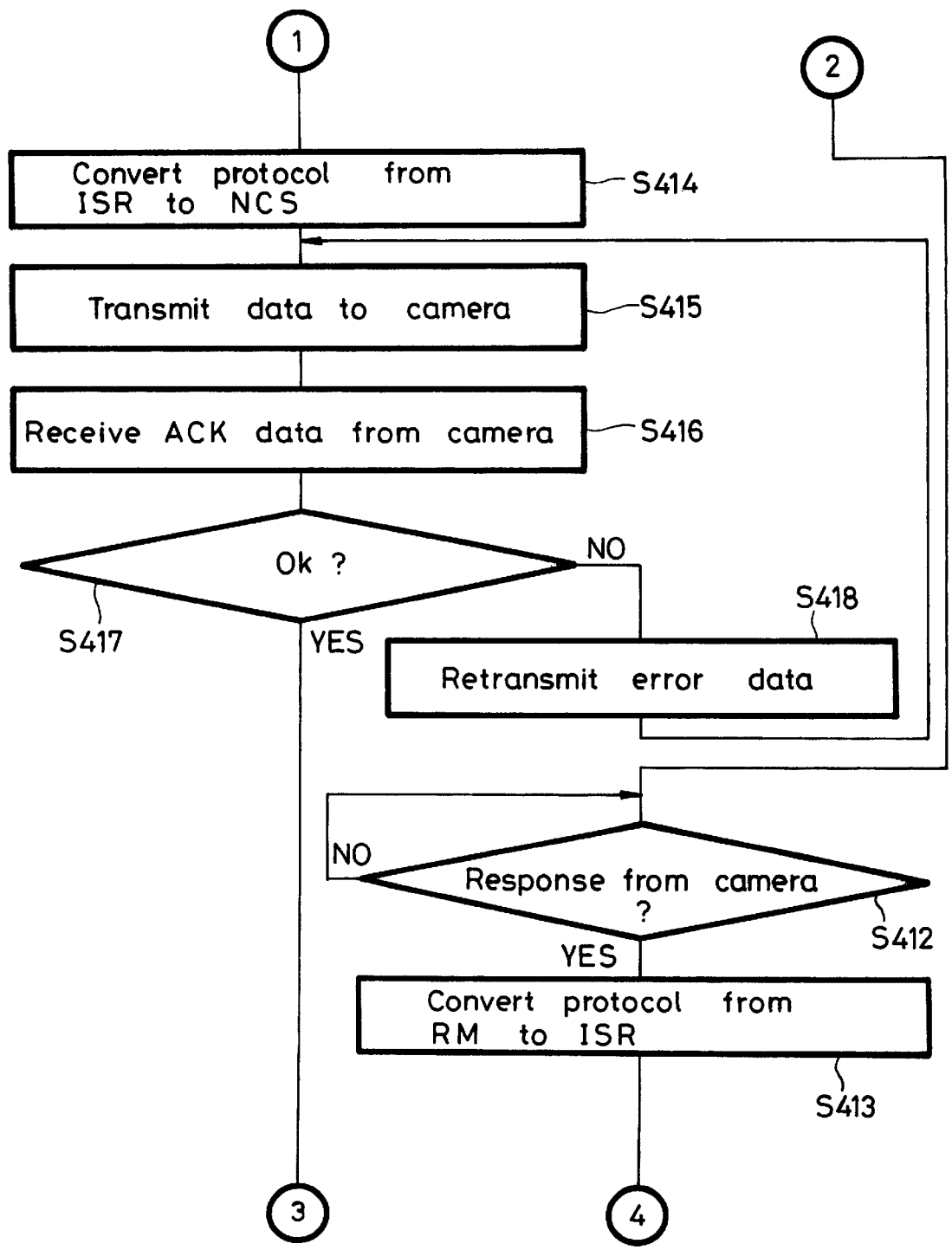
Figure 27:
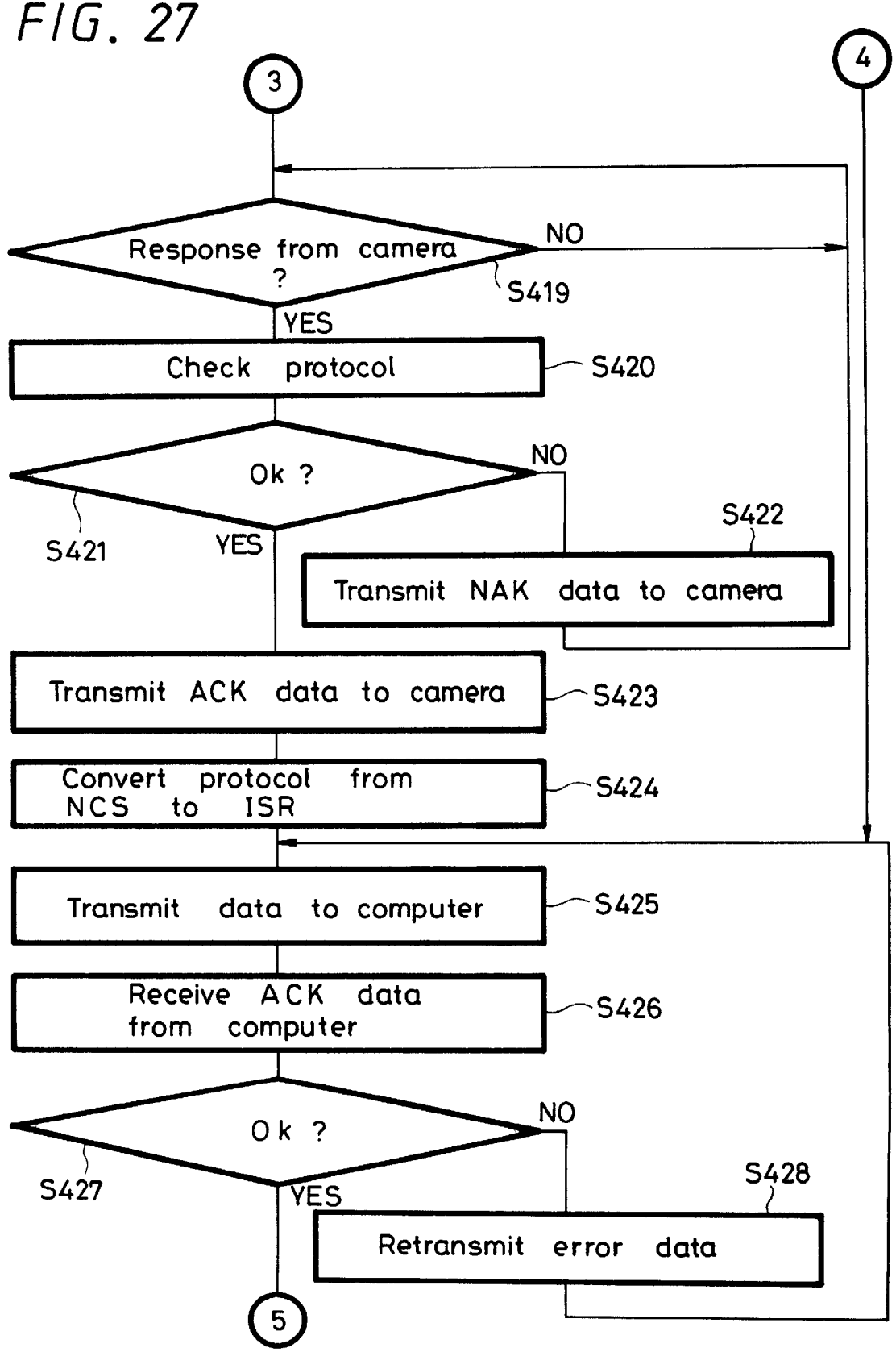

FIGS. 25 through 27 show a control sequence of the data converter 400 shown in FIG. 24.

It is assumed that a communication protocol used for communications between the computer 100 and the data converter 400 is an ISR protocol provided for by SMPTE RP-273M, a communication protocol used for communications between the data converter 400 and the cameras 1000 or the controllers 1200-1, . . . , 1200-n through the interface 409 is an RM protocol, and a communication protocol used for communications between the data converter 400 and the cameras 1000 or the controllers 1200-1, . . . , 1200-n through the interface 412 is an NCS (New Command System) protocol. The ISR protocol is used by an ISR (Interactive Status Reporting) system which is a centralized management system for broadcasting devices. It is also assumed that transmission of parameter data is carried out between the computer 100 and the data converter 400 and also between the data converter 400 and the cameras 1000.

The protocols used are specifically described only for illustrative purpose. It is not intended to limit the present invention to any particular protocols and interfaces.

In a step S401 shown in FIG. 25, the connection checker 415 confirms cables for their connections. Then, control proceeds to a step S402.

In the step S402, the decision unit 420 decides whether there are input data from the computer 100 or not. If there are input data from the computer 100 (YES), then control proceeds to a step S403.

In the step S403, the protocol checker 417 checks the ISR protocol. Thereafter, control proceeds to a step S404.

In the step S404, the decision unit 420 decides whether the ISR protocol has properly been recognized or not as a result of the checking process. If the ISR protocol has properly been recognized (YES), then control proceeds to a step S406. If the ISR protocol has not properly been recognized (NO), then control proceeds to a step S405.

In the step S405, the communication controller 416 transmits NAK data to the computer 100. Then, control goes back to the step S402.

In the step S406, the communication controller 416 transmits ACK data to the computer 100. Then, control goes to a step S407.

In the step S407, the decision unit 420 decides whether the data transmitted from the computer 100 are command conversion data or not. If the data transmitted from the computer 100 are command conversion data (YES), then control proceeds to a step S408. If the data transmitted from the computer 100 are not command conversion data (NO), then control goes to a step S409.

In the step S408, the command converter 419 sets command conversion data. Then, control goes back to the step S402.

In the step S409, the decision unit 420 decides whether a connected one of the cameras 1000 uses the NCR protocol or not. If the connected camera 1000 uses the NCR protocol (YES), then control goes to a step S414 shown in FIG. 26. If a connected camera 1000 does not use the NCR protocol (NO), then control goes to a step S410.

In the step S410, the command converter 419 converts the communication protocol from the ISR protocol into the RM protocol. Then, control proceeds to a step S411.

In the step S411, the communication controller 416 transmits data to the camera 1000. Then, control jumps to a step S412 shown in FIG. 26.

In the step S412, the decision unit 420 decides whether there is a response from the camera 1000 or not. If there is a response from the camera 1000 (YES), then control proceeds to a step S413.

In the step S413, the command converter 419 converts the communication protocol from the RM protocol into the ISR protocol. Then, control jumps to a step S425 shown in FIG. 27.

In the step S414, the command converter 419 converts the communication protocol from the ISR protocol into the NCS protocol. Then, control proceeds to a step S415.

In the step S415, the communication controller 416 transmits data to the camera 1000. Then, control proceeds to a step S416.

In the step S416, the communication controller 416 receives ACK data from the camera 1000. Then, control proceeds to a step S417.

In the step S417, the decision unit 420 decides whether the data have properly been transmitted or not. If the data have properly been transmitted (YES), then control proceeds to a step S419 shown in FIG. 27. If the data have not properly been transmitted (NO), then control proceeds to a step S418.

In the step S418, the communication controller 416 retransmits the error data. Then, control goes back to the step S415.

In the step S419, the decision unit 420 decides whether there is a response from the camera 1000 or not. If there is a response from the camera 1000 (YES), then control proceeds to a step S420.

In the step S420, the protocol checker 417 checks the protocol. Thereafter, control proceeds to a step S421.

In the step S421, the decision unit 420 decides whether the NCS protocol has properly been recognized or not as a result of the checking process. If the NCS protocol has properly been recognized (YES), then control proceeds to a step S423. If the NCS protocol has not properly been recognized (NO), then control proceeds to a step S422.

In the step S422, the communication controller 416 transmits NAK data to the camera 1000. Then, control goes back to the step S419.

In the step S423, the communication controller 416 transmits ACK data to the camera 1000. Then, control proceeds to a step S424.

In the step S424, the command converter 419 converts the communication protocol from the NCS protocol into the ISR protocol. Then, control proceeds to the step S425.

In the step S425, the communication controller 416 transmits data to the computer 100. Then, control proceeds to a step S426.

In the step S426, the communication controller 416 receives ACK data from the computer 100. Then, control proceeds to a step S427.

In the step S427, the decision unit 420 decides whether the data has properly been transmitted or not. If the data have properly been transmitted (YES), then control goes back to the step S402. If the data have not properly been transmitted (NO), then control goes to a step S428.

In the step S428, the communication controller 416 retransmits the error data. Thereafter, control goes back to the step S425.

V. A Video System of a Camera 1000 Shown in FIG. 3 (see FIG. 28)

Figure 28:
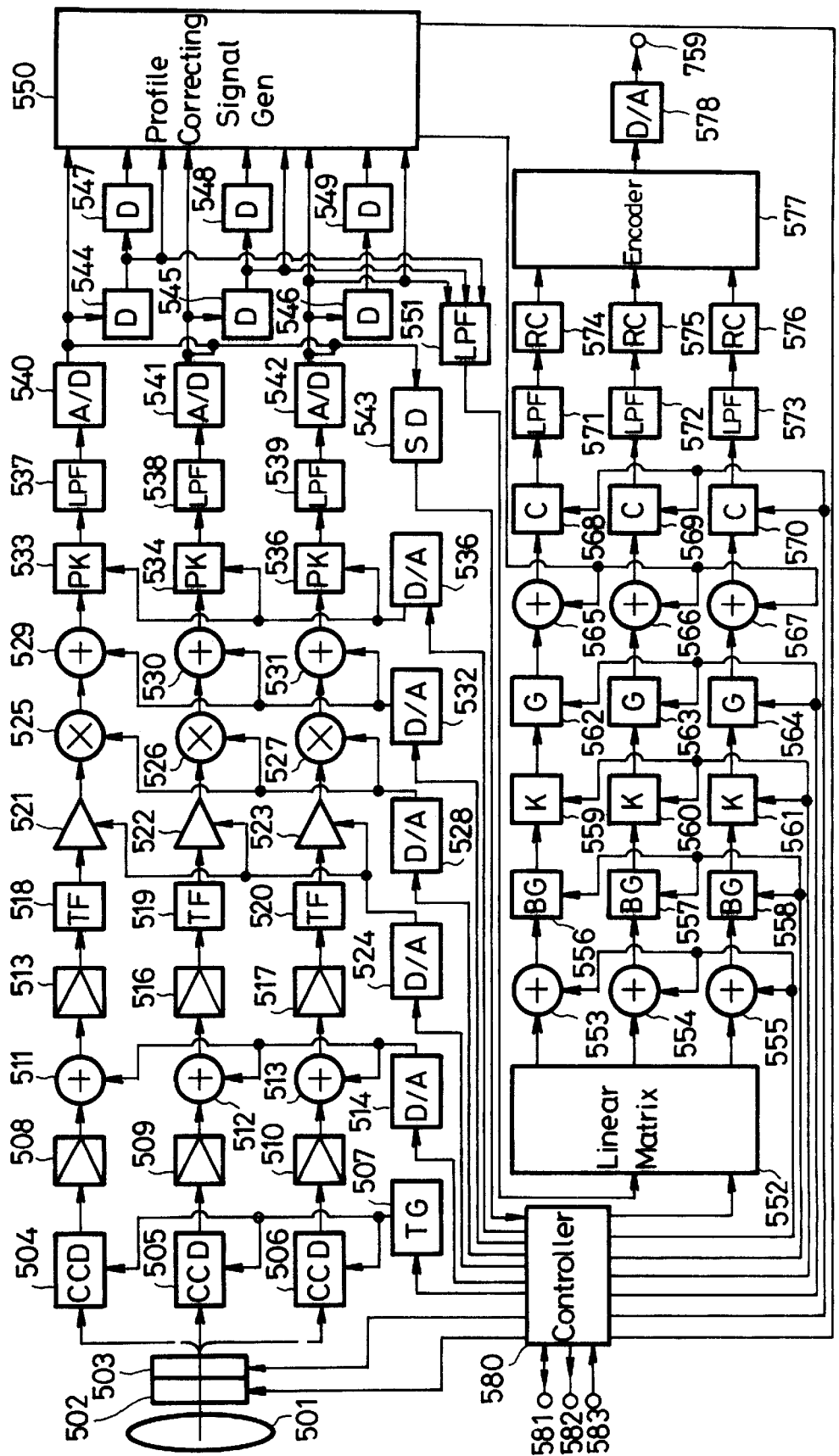
FIG. 28 is a block diagram of a video system of a camera shown in FIG. 3.

FIG. 28 shows a video system of each of the cameras 1000 shown in FIG. 3.

As shown in FIG. 28, the video system of the camera 1000 comprises an objective lens 501, a CC filter 502, an ND filter 503, CCDs 504, 505, 506 for detecting R, G, B signals, amplifiers 508, 509, 510, adders 511, 521, 513 for adjusting black set and black shading, amplifiers 515, 516, 517, trap filters 518, 519, 520, gain-control amplifiers 521, 522, 523, multipliers 525, 526, 527 for adjusting white shading, adders 529, 530, 531 for adjusting flare, pre-knee circuits 533, 534, 535 for controlling pre-knee, digital low-pass filters 537, 538, 539, A/D converters 540, 541, 542, 1H delay circuits 544, 545, 546, 547, 548, 549, a profile or edge correcting signal generator 550, a digital low-pass filter 551, a linear matrix circuit 552 for controlling a matrix, adders 553, 554, 555 for pedestal (black) control, black gamma correcting circuits 556, 557, 558 for black gamma control, knee correcting circuits 559, 560, 561 for knee control, gamma correcting circuits 562, 563, 564 for gamma control, adders 565, 566, 567 for edge correction, black/white clip circuits 568, 569, 570 for black/white clip control, digital low-pass filters 571, 572, 573, rate converters 574, 575, 576 for converting sampling rates, an encoder 577 for producing an NTSC or PAL composite video signal, a D/A converter 547, a controller 580, a timing generator 507, D/A converters 514, 524, 528, 532, 536, and a snaring detector 543.

An input/output terminal 581 is connected to the controllers 1200-1, . . . , 1200-n. An output terminal 582 is connected to a display signal input terminal of the LCD unit 700 shown in FIG. 3. An input terminal 583 is connected to a control data output terminal of the control key group 750.

Operation for Setting Parameters

The controller 580 receives device type ID data, command data, parameter ID data, and parameter data which are supplied from the computer 100 through the input/output terminal 581, the system controller 100, and the controller 1200-1. The controller 580 decides whether the transmitted data are destined for itself based on the device type ID data, recognizes what processing is to be made based on the contents of the command data, and effects a control process on a parameter indicated by the parameter ID data based on the parameter data.

The controller 580 supplies a CC filter control signal to the CC filter 502 to control the CC filter 502, supplies an ND filter control signal to the ND filter 503 to control the ND filter 503, and supplies a shutter control signal to the timing generator 507 to cause the timing generator 507 to supply CCD drive control signals to the CCDs 504, 505, 506 for shutter control.

The controller 580 also supplies a black set and black shading signal through the D/A converter 514 to adders 511, 512, 513, supplies a gain control signal through the D/A converter 524 to the gain-control amplifiers 521, 522, 523, supplies a white shading control signal through the D/A converter 528 to the multipliers 525, 526, 527, supplies a flare control signal through the D/A converter 532 to the adders 529, 530, 531, and supplies a pre-knee control signal through the D/A converted 536 to the pre-knee circuits 533, 534, 535.

The controller 580 receives shading data, as control data, which are produced when the shading detector 543 detects output data from the A/D converters 540, 541, 542.

The controller 580 supplies a detail control signal to the edge correcting signal generator 550. The edge correcting signal generator 550 then supplies detail data to the adders 565, 566, 567. The controller 580 supplies a matrix control signal to the linear matrix circuit 552, supplies a pedestal (black) control signal to the adders 553, 554, 555, supplies a black gamma control signal to the black gamma correcting circuits 556, 557, 558, supplies a knee control signal to the knee correcting circuits 559, 560, 561, supplies a gamma control signal to the gamma correcting circuits 562, 563, 564, supplies a black/white clip control signal to the black/white clip circuits 568, 569, 570.

W. An Audio System of a Camera 1000 Shown in FIG. 3 (see FIG. 29)

Figure 29:
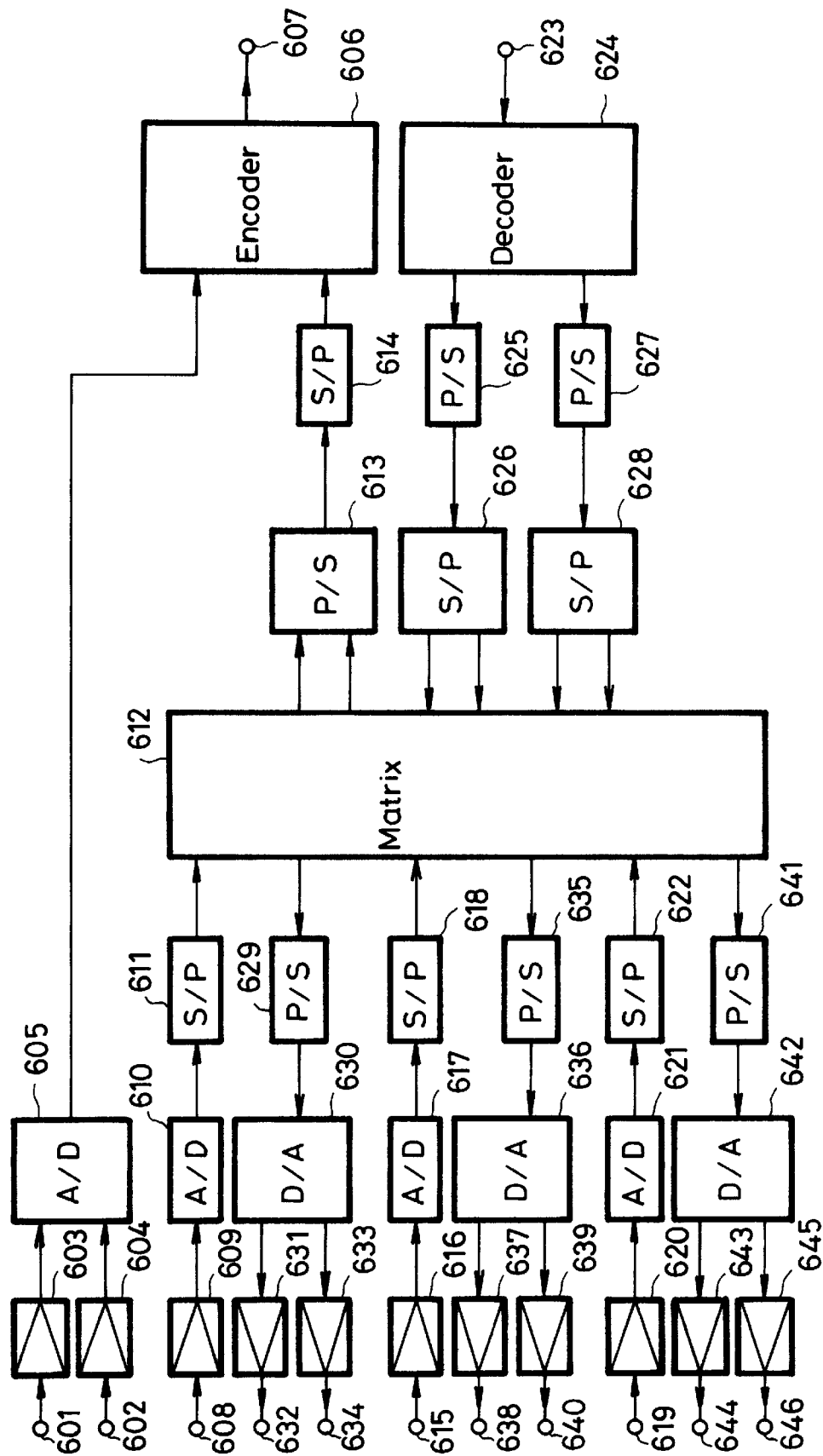
FIG. 29 is a block diagram of an audio system of a camera shown in FIG. 3.

FIG. 29 shows an audio system of each of the cameras 1000 shown in FIG. 3.

As shown in FIG. 29, the audio system has a processing system MIC/LINE for an audio signal inputted from the microphone 850 shown in FIG. 3 and a line, a first audio input signal processing system INCOM-1 for a first audio signal inputted from the intercom of the camera 1000, a second audio input signal processing system INCOM-2 for a second audio signal inputted from the intercom of the camera 1000, a third audio input signal processing system INCOM-3 for a third audio signal inputted from the intercom of the camera 1000, a first audio output signal processing system INCOM-1 for a first audio signal outputted to the intercom of the camera 1000, a second audio output signal processing system INCOM-2 for a second audio signal outputted to the intercom of the camera 1000, a third audio output signal processing system INCOM-3 (Tracker) for a third audio signal outputted to the intercom of the camera 1000, a first program audio output signal processing system PGM-1 for a first program audio signal outputted to the intercom of the camera 1000, a second program audio output signal processing system PGM-2 for a second program audio signal outputted to the intercom of the camera 1000, a third program audio output signal processing system PGM-3 for a third program audio signal outputted to the intercom of the camera 1000, a matrix circuit 612, parallel-to-serial converters 613, 625, 627, serial-to-parallel converters 626, 628, 614, an encoder 606, and a decoder 624.

The processing system MIC/LINE comprises an amplifier 603 for amplifying an audio signal inputted from the microphone 850 or the like through an input terminal 601, an amplifier 604 for amplifying an audio signal inputted from the microphone 850 or the like through an input terminal 602, and an A/D converter 605 for converting amplified audio signals into digital audio signals.

The first audio input signal processing system INCOM-1 comprises an amplifier 609 for amplifying a first audio signal supplied from the intercom of the camera 1000 through an input terminal 608, an A/D converter 610 for converting an amplified audio signal from the amplifier 609 into a digital audio signal, and a serial-to-parallel converter 611 for converting the digital audio signal outputted from the A/D converter 610 into a parallel digital audio signal.

The second audio input signal processing system INCOM-2 comprises an amplifier 616 for amplifying a second audio signal supplied from the intercom of the camera 1000 through an input terminal 615, an A/D converter 617 for converting an amplified audio signal from the amplifier 616 into a digital audio signal, and a serial-to-parallel converter 618 for converting the digital audio signal outputted from the A/D converter 617 into a parallel digital audio signal.

The third audio input signal processing system INCOM-3 comprises an amplifier 620 for amplifying a second audio signal supplied from the intercom of the camera 1000 through an input terminal 619, an A/D converter 621 for converting an amplified audio signal from the amplifier 620 into a digital audio signal, and a serial-to-parallel converter 622 for converting the digital audio signal outputted from the A/D converter 621 into a parallel digital audio signal.

The first audio output signal processing system INCOM-1 comprises a parallel-to-serial converter 629 for converting a parallel digital audio signal from the matrix circuit 612 into a serial digital audio signal, a D/A converter 630 for converting the digital audio signal outputted from the parallel-to-serial converter 629 into an analog audio signal, and an amplifier 631 for amplifying the analog audio signal outputted from the D/A converter 630 and outputting the amplified audio signal to the intercom of the camera 1000 through an output terminal 632.

The second audio output signal processing system INCOM-2 comprises a parallel-to-serial converter 635 for converting a parallel digital audio signal from the matrix circuit 612 into a serial digital audio signal, a D/A converter 636 for converting the digital audio signal outputted from the parallel-to-serial converter 635 into an analog audio signal, and an amplifier 637 for amplifying the analog audio signal outputted from the D/A converter 636 and outputting the amplified audio signal to the intercom of the camera 1000 through an output terminal 638.

The third audio output signal processing system INCOM-3 comprises a parallel-to-serial converter 641 for converting a parallel digital audio signal from the matrix circuit 612 into a serial digital audio signal, a D/A converter 642 for converting the digital audio signal outputted from the parallel-to-serial converter 641 into an analog audio signal, and an amplifier 643 for amplifying the analog audio signal outputted from the D/A converter 642 and outputting the amplified audio signal to the intercom of the camera 1000 through an output terminal 644.

The first program audio output signal processing system PGM-1 comprises the parallel-to-serial converter 629 for converting a parallel digital audio signal from the matrix circuit 612 into a serial digital audio signal, the D/A converter 630 for converting the digital audio signal outputted from the parallel-to-serial converter 629 into an analog audio signal, and an amplifier 633 for amplifying the analog audio signal outputted from the D/A converter 630 and outputting the amplified audio signal to the intercom of the camera 1000 through an output terminal 634.

The second program audio output signal processing system PGM-2 comprises the parallel-to-serial converter 635 for converting a parallel digital audio signal from the matrix circuit 612 into a serial digital audio signal, the D/A converter 636 for converting the digital audio signal outputted from the parallel-to-serial converter 635 into an analog audio signal, and an amplifier 639 for amplifying the analog audio signal outputted from the D/A converter 636 and outputting the amplified audio signal to the intercom of the camera 1000 through an output terminal 640.

The third program audio output signal processing system PGM-3 comprises the parallel-to-serial converter 641 for converting a parallel digital audio signal from the matrix circuit 612 into a serial digital audio signal, the D/A converter 642 for converting the digital audio signal outputted from the parallel-to-serial converter 641 into an analog audio signal, and an amplifier 645 for amplifying the analog audio signal outputted from the D/A converter 642 and outputting the amplified audio signal to the intercom of the camera 1000 through an output terminal 646.

Based on a control signal from the controller 580 shown in FIG. 28, the matrix circuit 612 mixes three audio signals inputted from the serial-to-parallel converters 611, 618, 622, and mixes audio signals inputted from an input terminal 623 as AUX IN, converted from a video signal rate into an audio signal rate by the decoder 624, and converted by the serial-to-parallel converters 626, 628 into audio signals for the processing systems INCOM-1, INCOM-2, and audio signals for the processing systems PGM-1, PGM-2. Based on a control signal from the controller 580 shown in FIG. 28, the encoder 606 converts an audio signal of the processing system MIC/LINE from the A/D converter 605, and an audio signal outputted from the matrix circuit 612, converted into a serial signal by the parallel-to-serial converter 613, and converted into a parallel signal by the serial-to-parallel converter 614, from an audio signal rate into a video signal rate, and outputs the signals from an output terminal 607 as AUX OUT.

The serial-to-parallel converters 611, 618, 622, 626, 628, the matrix circuit 612, and the parallel-to-serial converters 629, 635, 641, 613 are integrated into one LSI circuit. The serial-to-parallel converter 614, the parallel-to-serial converters 625, 627, the encoder 606, and the decoder 624 are integrated into one LSI circuit.

X. Displayed Images for Establishing Parameters in the Camera Setup System (see FIGS. 30A and 30B through 87)

Figure 30A:
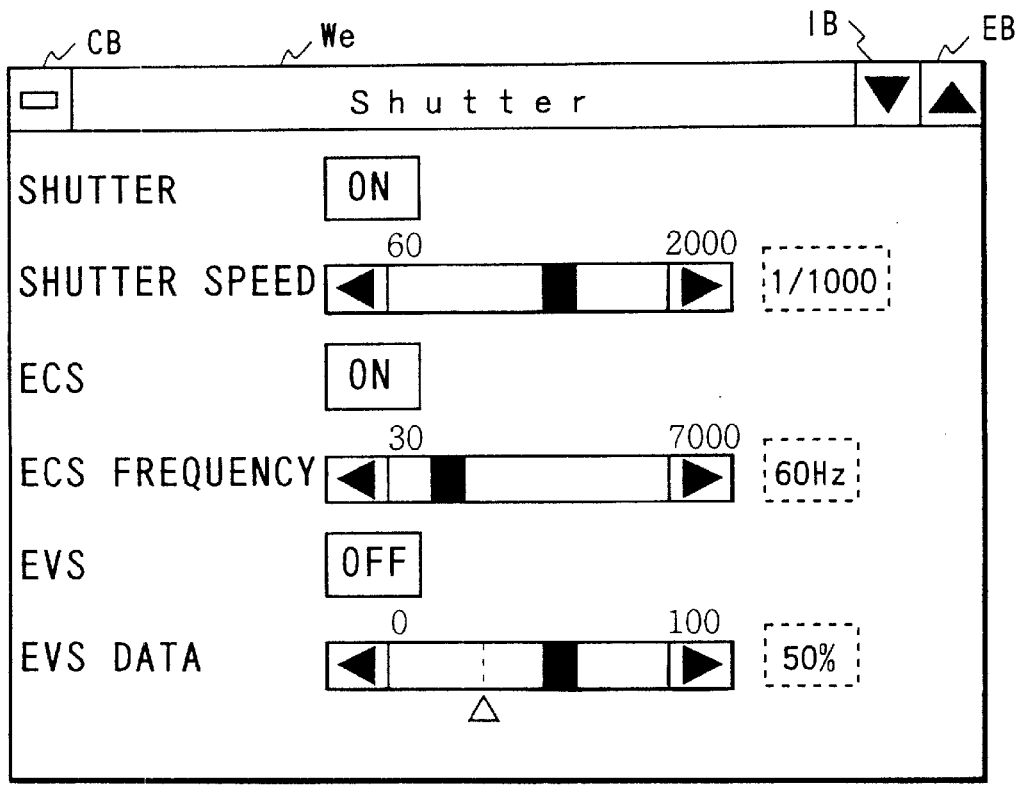
FIG. 30A is a view showing, by way of example, a displayed image for establishing shutter parameters.
Figure 30B:
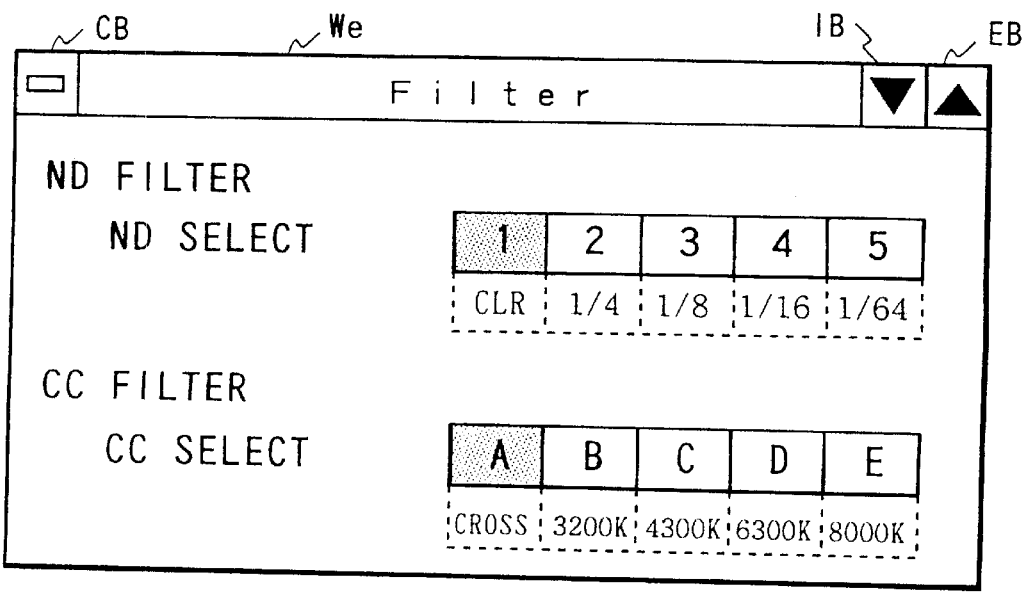
FIG. 30B is a view showing, by way of example, a displayed image for establishing filter parameters.
Figure 87:
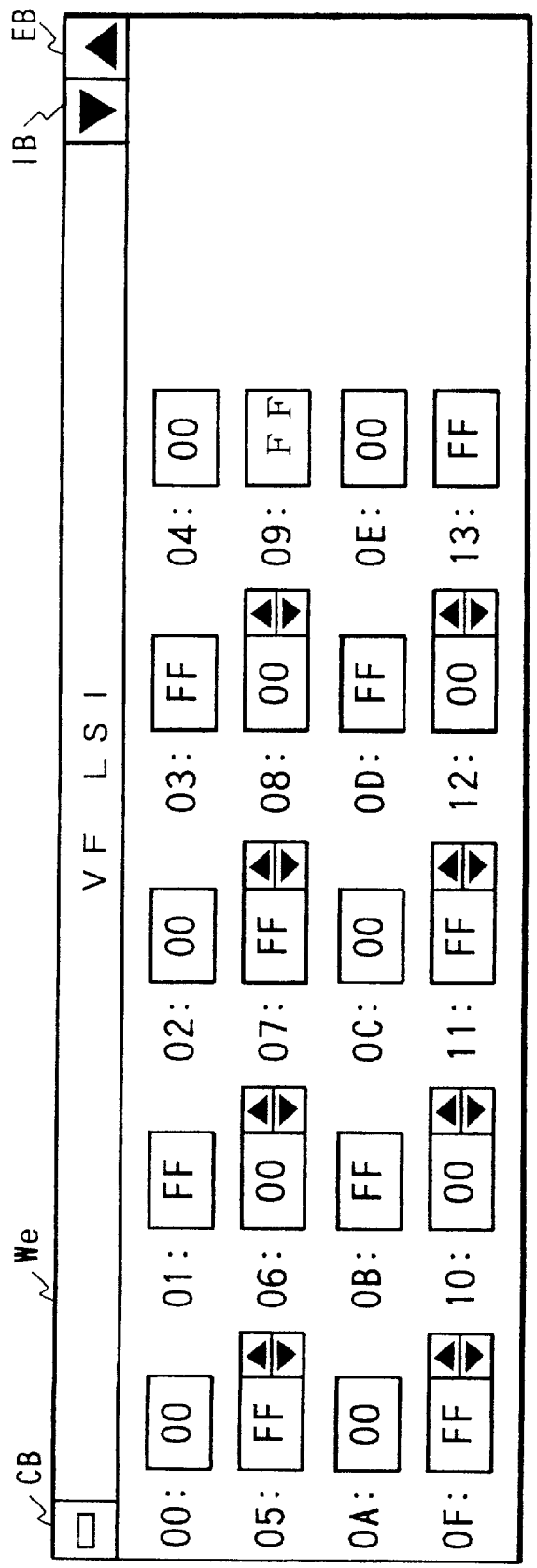
FIG. 87 is a view showing, by way of example, a displayed image for establishing LSI ports.

FIGS. 30A and 30B through 87 show, by way of example, displayed images for establishing parameters in the camera setup system. Only those portions of the displayed images which are necessary for the description of the present invention will be described below. The buttons, switches, slide levers, titles, and areas for displaying numerical values have already been described above with reference to FIG. 3, and major parameters have also been described above as to their meaning with reference to FIGS. 8 and 12A through 12D.

FIG. 30A shows, by way of example, a displayed image for establishing shutter parameters.

FIG. 30B shows, by way of example, a displayed image for establishing filter parameters.

In FIG. 30B, numerical values given in broken-line frames serves to display values applied when switch numbers are selected. In this example, a switch number "1" and a switch "A" are selected.

Figure 31A:
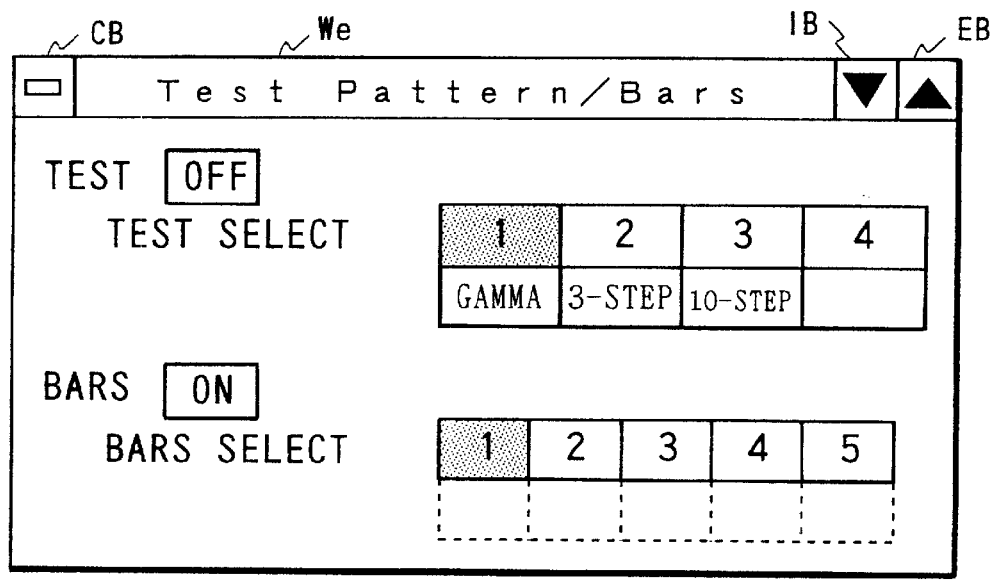
FIG. 31A is a view showing, by way of example, a displayed image for establishing a test pattern and bars.

FIG. 31A shows, by way of example, a displayed image for establishing a test pattern and bars.

Figure 31B:
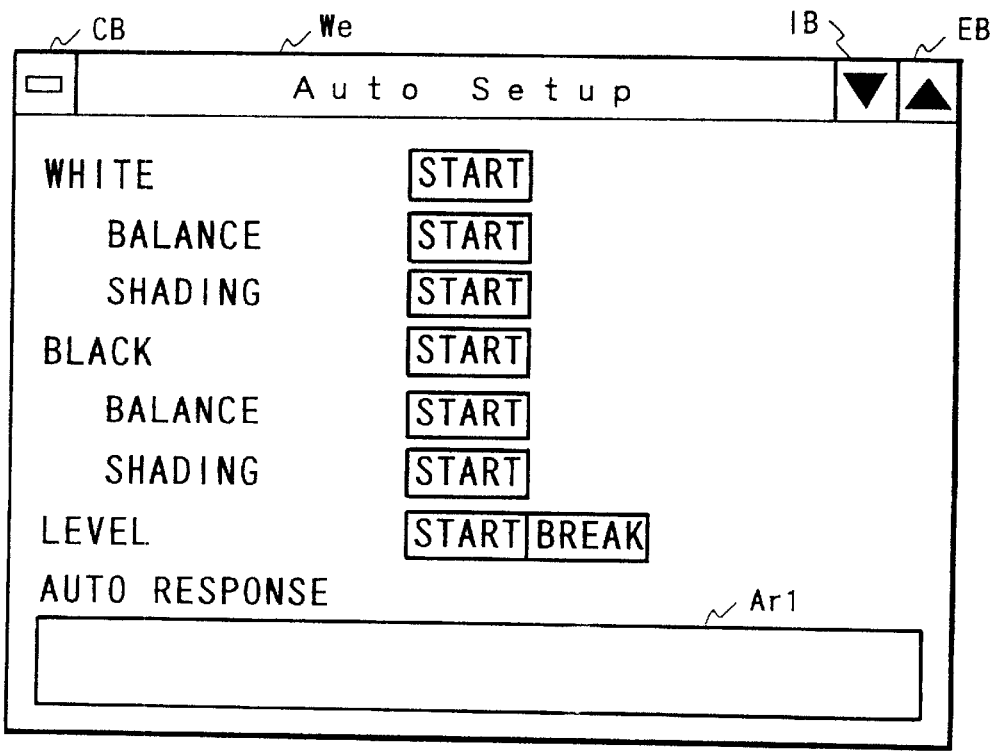
FIG. 31B is a view showing, by way of example, a displayed image for establishing an automatic setup process.

FIG. 31B shows, by way of example, a displayed image for establishing an automatic setup process.

As shown in FIG. 31B, in the automatic setup process, when a button indicates "START", a parameter indicated by its title is automatically set up. An area Ar1 displays data indicative of a response from the camera, e.g., an image of letters "COMPLETED" when a test is normally finished.

Figure 32A:
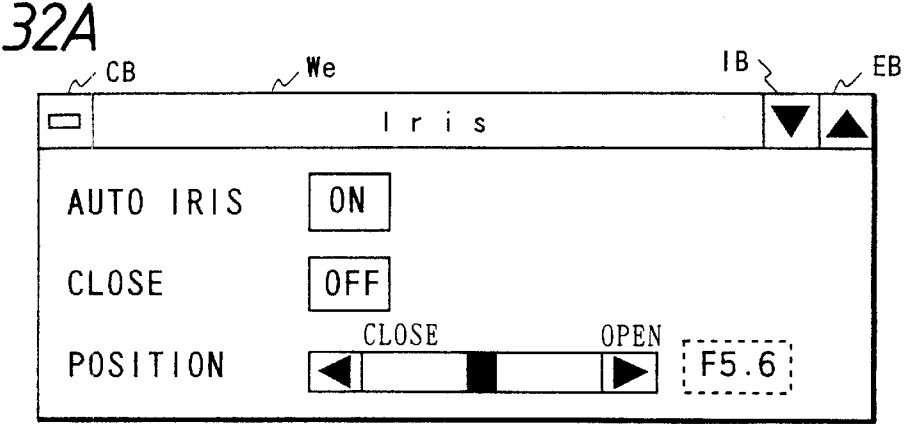
FIG. 32A is a view showing, by way of example, a displayed image for establishing iris parameters.

FIG. 32A shows, by way of example, a displayed image for establishing iris parameters.

Conversion equations for the F value of numerical data "F5.6" are as follows:

$$F = 132.8 \times (0.175^{\wedge}(i/(0.35 \times 2^{\wedge}n)))$$

i=16 bit data (open at 0000H and closed at FFFFH) where n is the bit accuracy (16 bits).

Figure 32B:
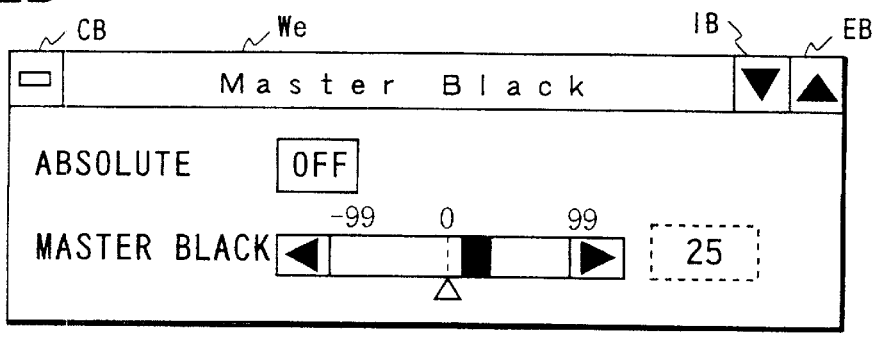
FIG. 32B is a view showing, by way of example, a displayed image for establishing master black parameters.

FIG. 32B shows, by way of example, a displayed image for establishing master black parameters.

When the parameter "ABSOLUTE" is "ON", absolute data are handled, and when the parameter "ABSOLUTE" is "OFF", relative data are handled. The meaning of the absolute and relative data has already been described above.

When the parameter "ABSOLUTE" is "ON", the displayed slide lever and numerical value are changed to an absolute representation ranging from 0 to 100%.

Figure 32C:
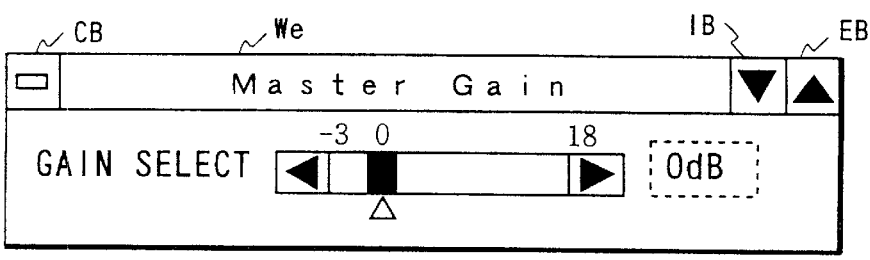
FIG. 32C is a view showing, by way of example, a displayed image for establishing a master gain parameter.

FIG. 32C shows, by way of example, a displayed image for establishing a master gain parameter.

In FIG. 32C, a support gain for each device type is established as SW data based on the device type setting file.

Figure 33:
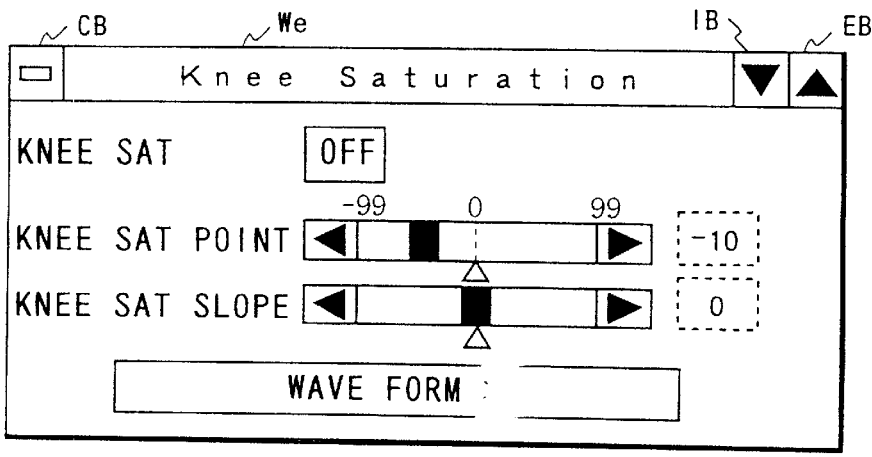
FIG. 33 is a view showing, by way of example, a displayed image for establishing knee saturation parameters.

FIG. 33 shows, by way of example, a displayed image for establishing knee saturation parameters.

Figure 34:
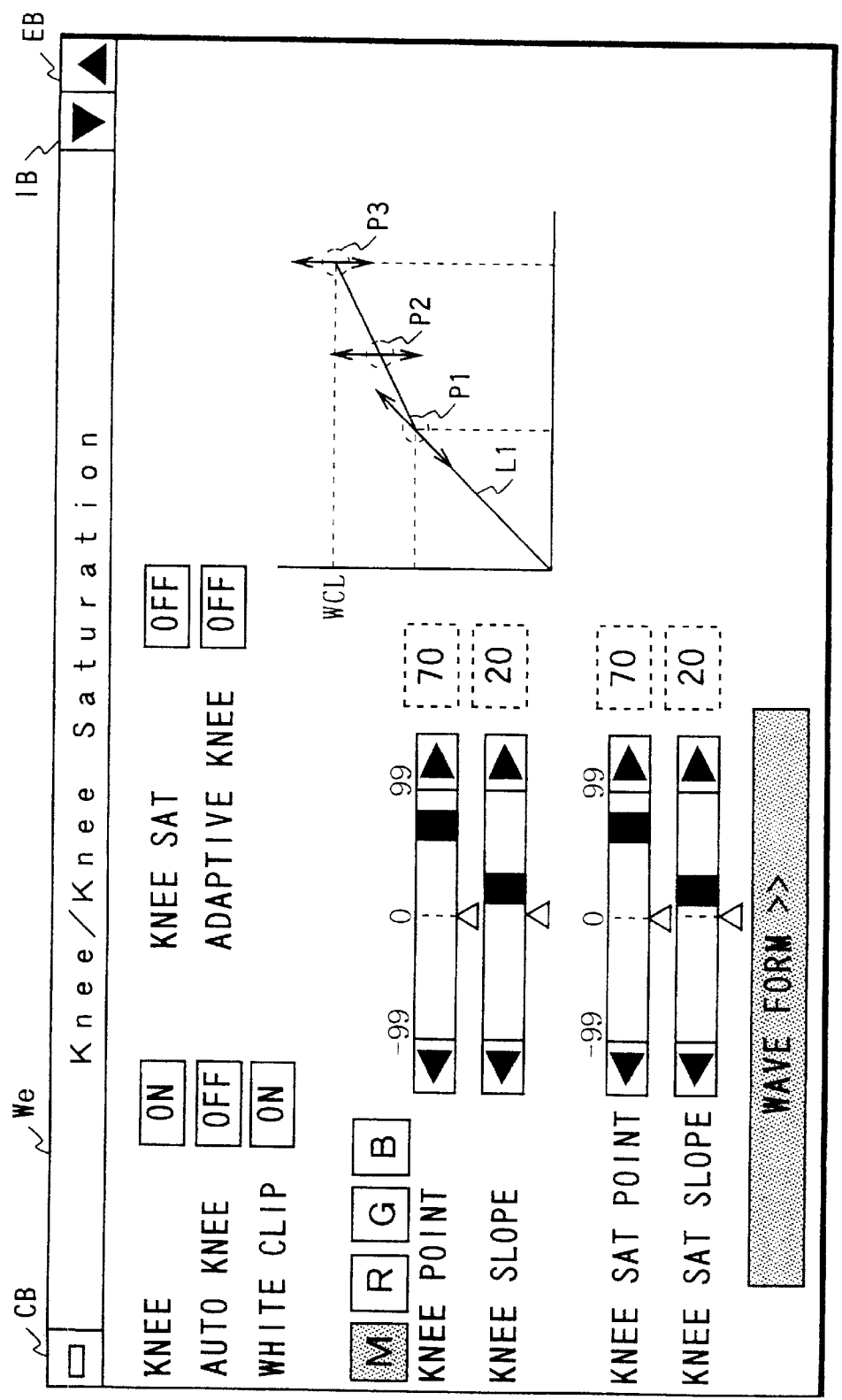
FIG. 34 is a view showing, by way of example, a displayed image for establishing knee and knee saturation parameters.

FIG. 34 shows, by way of example, a displayed image for establishing knee and knee saturation parameters.

In FIG. 34, when the parameter "WHITE CLIP" is "ON", a clip is applied, and when the parameter "WHITE CLIP" is "OFF", a clip is not applied.

Points P1, P2, P3 on a waveform image move in the directions indicated by the arrows.

As shown in FIG. 34, while the button of the pointing device 300 is being pressed, the pointer Po is superposed on the point P1, P2, or P3 which is indicated by a broken-line circle in the waveform image. Thereafter, the pointing device 300 is moved to change a waveform L1 as indicated by the solid-line arrows at the points P1, P2, P3. At the same time, the slide levers, etc. are also changed, and the numerical values in numerical value display areas on the right-hand side of the slide levers are also changed.

A white clip status with respect to a knee status, and a knee status with respect to a white clip status are reflected on the graphic representation.

Figure 35:
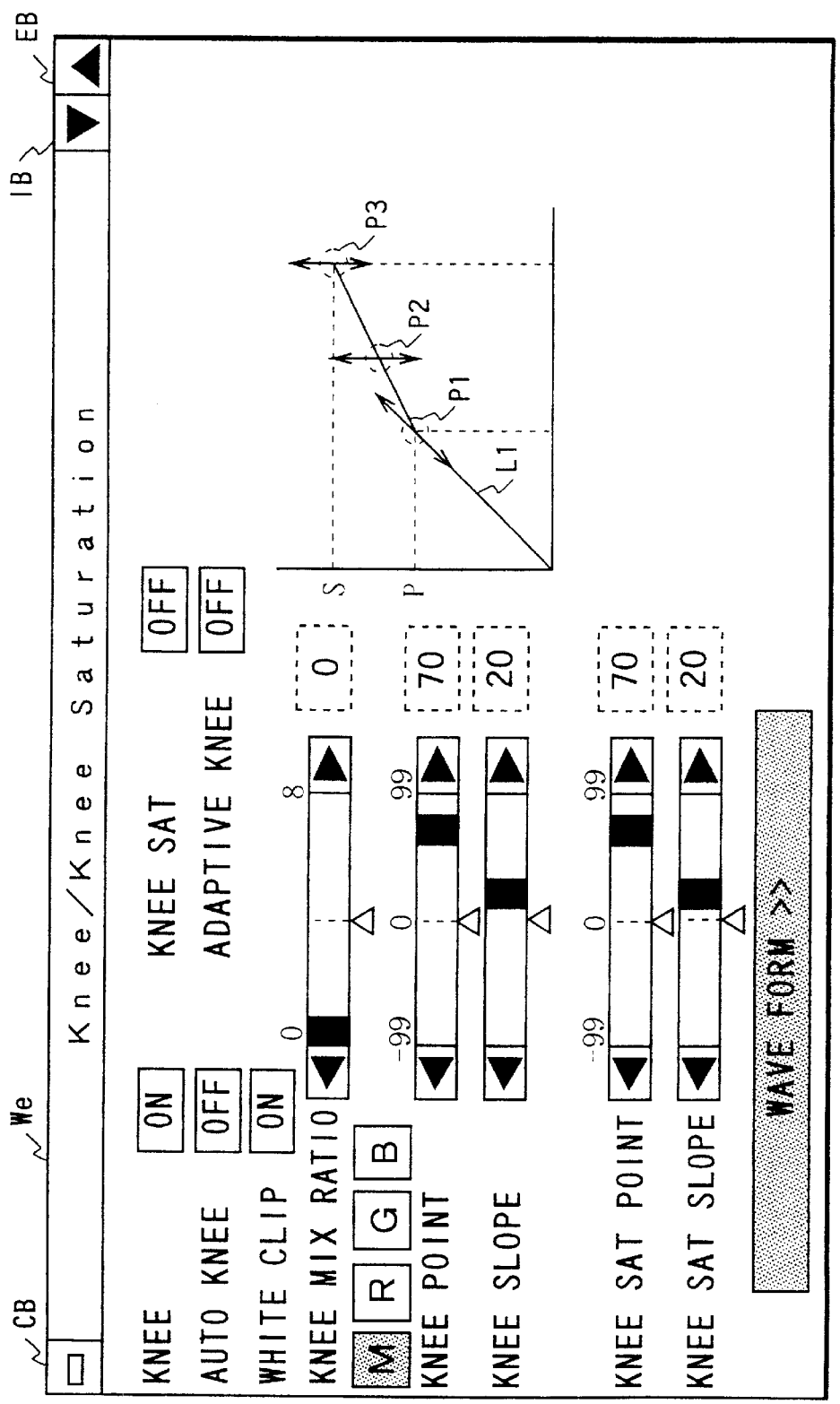
FIG. 35 is a view showing, by way of example, a displayed image for establishing knee and knee saturation parameters for servicing.

FIG. 35 shows, by way of example, a displayed image for establishing knee and knee saturation parameters for servicing.

Figure 36A:
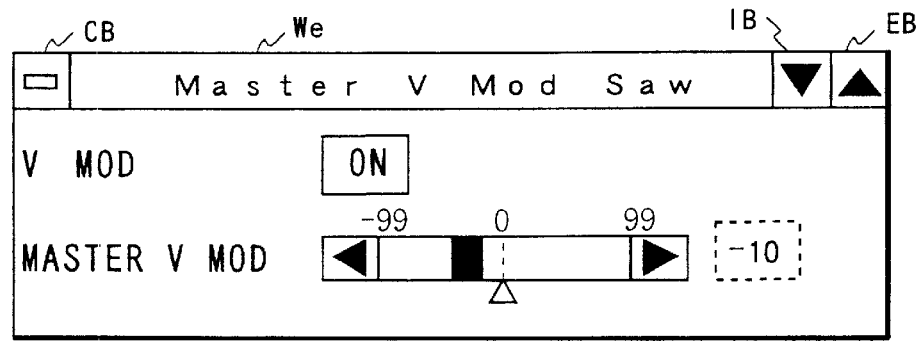
FIG. 36A is a view showing, by way of example, a displayed image for establishing master V modulation parameters.

FIG. 36A shows, by way of example, a displayed image for establishing master V modulation parameters.

Figure 36B:
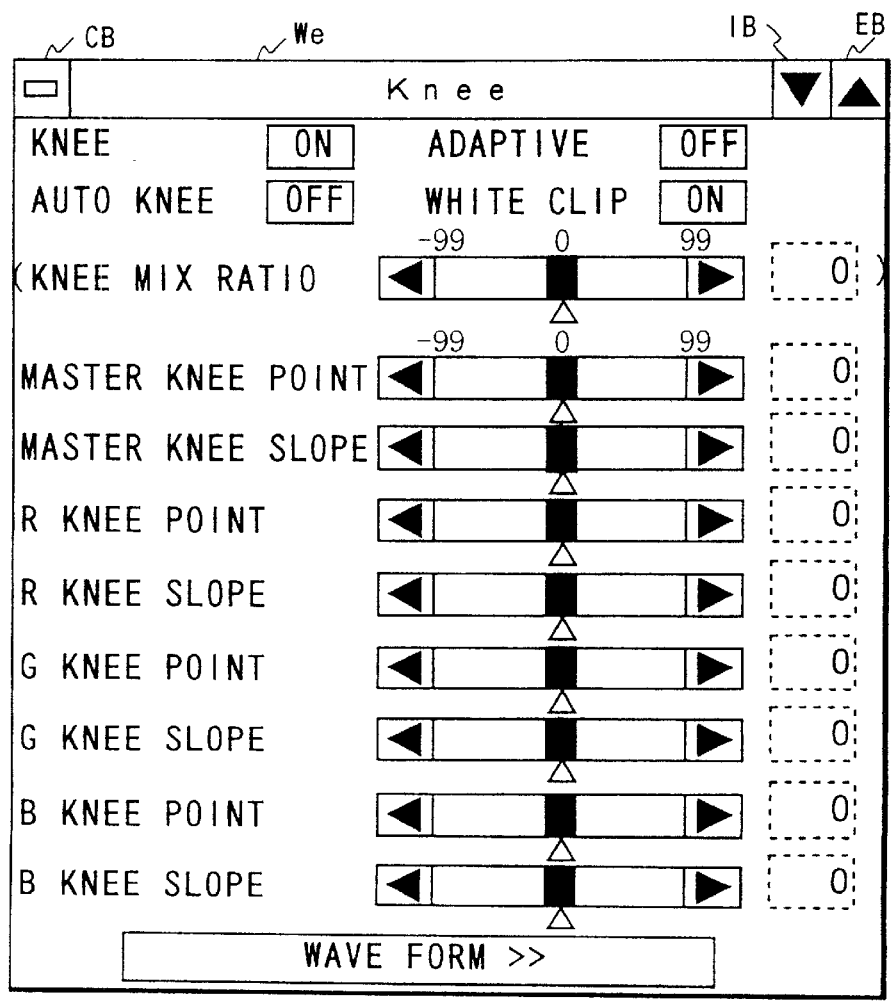
FIG. 36B is a view showing, by way of example, a displayed image for establishing knee parameters.

FIG. 36B shows, by way of example, a displayed image for establishing knee parameters.

In FIG. 36B, when a button on the right-hand side of the parameter "WHITE CLIP" is turned on or off, the white clip is turned on or off at the knee item.

Figure 37A:
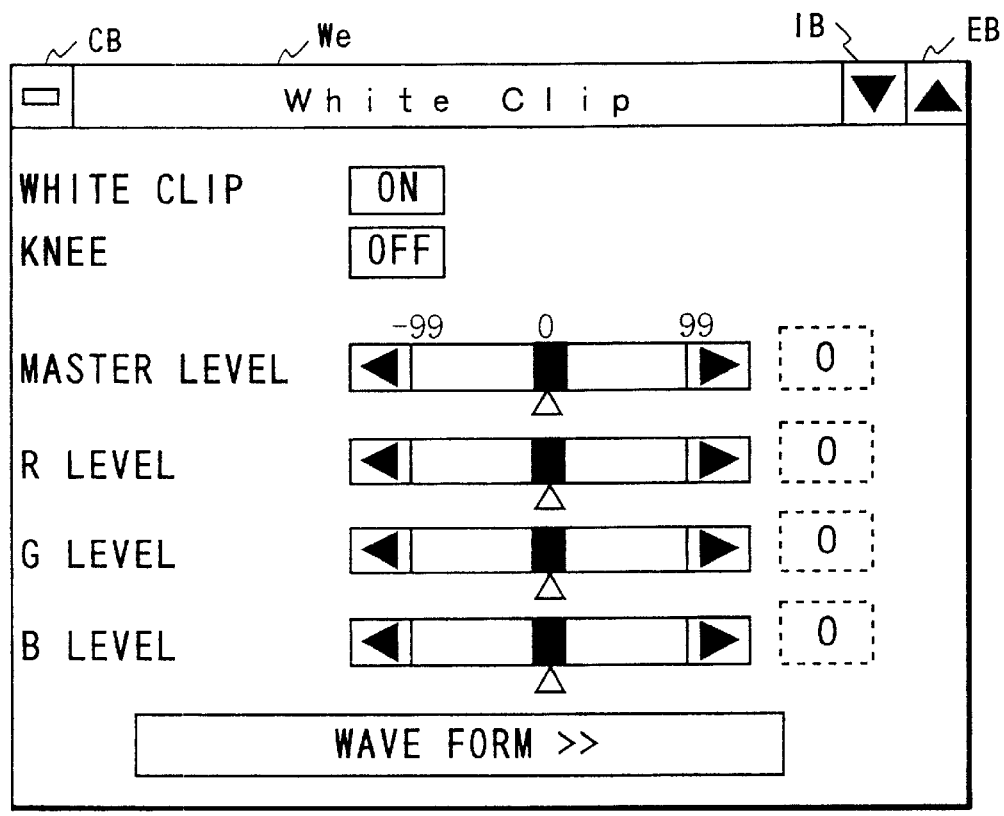
FIG. 37A is a view showing, by way of example, a displayed image for establishing white clip parameters.

FIG. 37A shows, by way of example, a displayed image for establishing white clip parameters.

In FIG. 37A, the button "WAVEFORM>>" for outputting a waveform is not turned on as the button of the pointing device 300 is not clicked.

Figure 37B:
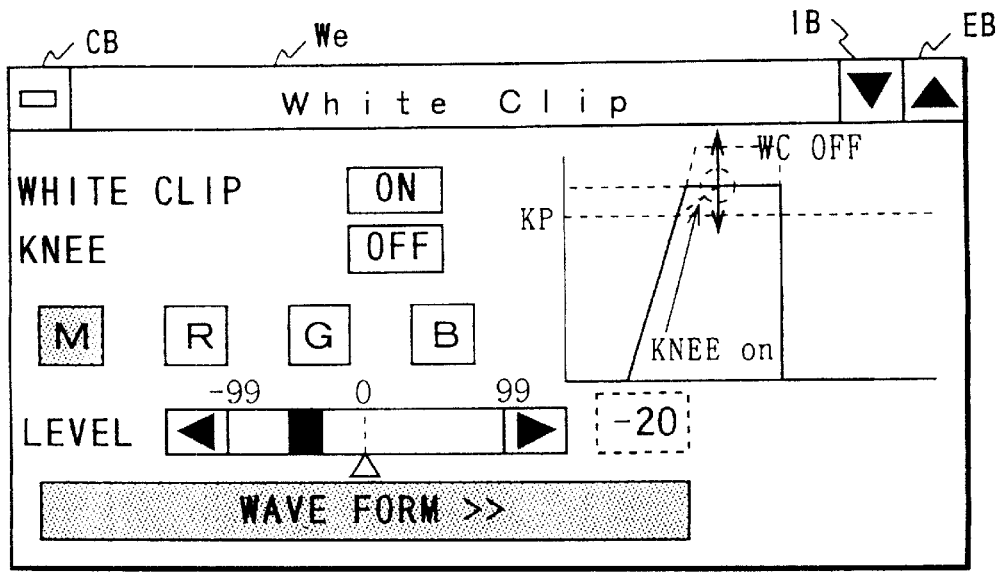
FIG. 37B is a view showing, by way of example, a displayed image for establishing white clip parameters, the displayed image including a displayed waveform.

When the button "KNEE" is turned on or off, the knee can be turned on or off at the white clip item FIG. 37B Shows, by way of example, a displayed image for establishing white clip parameters, the displayed image including a displayed waveform.

In FIG. 37B, the button "WAVEFORM >>" for outputting a waveform is turned on by clicking the button of the pointing device 300. Therefore, a waveform image is displayed. KP represents a knee point, and WC OFF represents a white clip off. As shown in FIG. 37B, the button "KNEE" is "OFF". When the button "KNEE" is "ON", a level in excess of the knee point is adjuster as shown by the broken lines in the waveform image as indicated by the arrow.

Figure 38A:
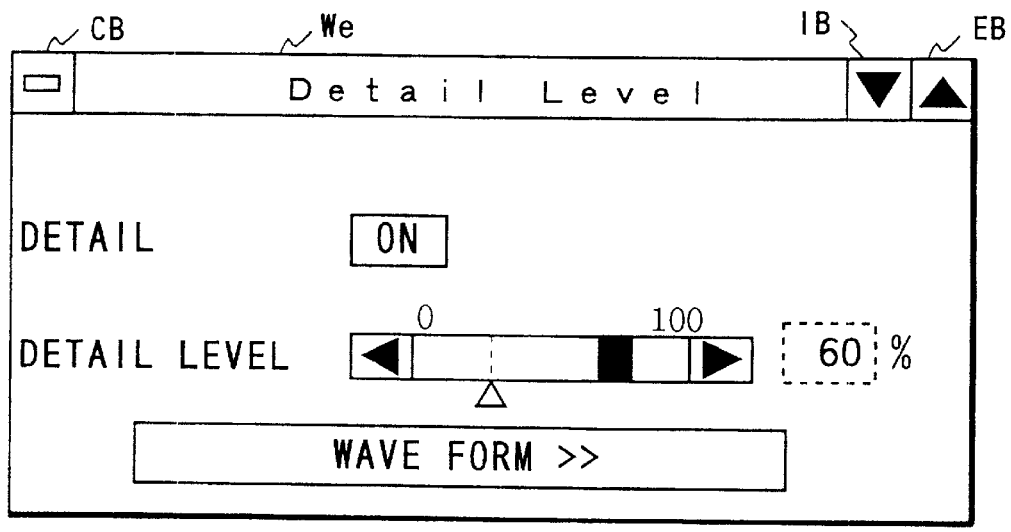
FIG. 38A is a view showing, by way of example, a displayed image for establishing detail level parameters.

FIG. 38A shows, by way of example, a displayed image for establishing detail level parameters.

Figure 38B:
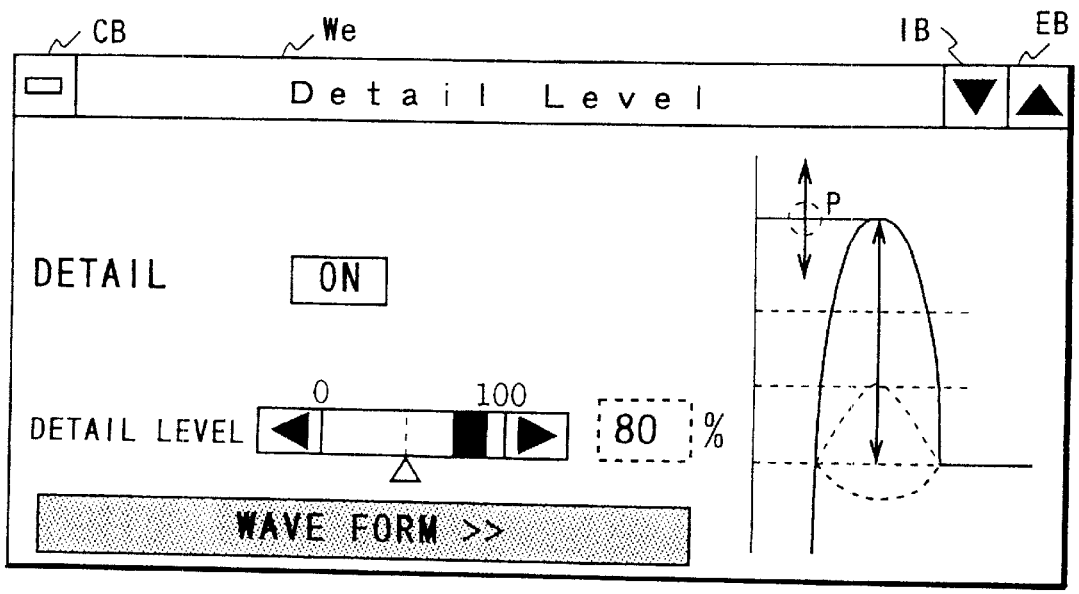
FIG. 38B is a view showing, by way of example, a displayed image for establishing detail level parameters, the displayed image including a displayed waveform.

FIG. 38B shows, by way of example, a displayed image for establishing detail level parameters, the displayed image including a displayed waveform.

As shown in FIG. 38B, the detail level can be adjusted by moving a point P with the pointing device 300 in the directions indicated by the solid-line arrow. However, the width of the waveform cannot be varied as indicated by the broken lines at the bottom of the waveform.

The distance between the two intermediate broken lines represents the detail level. When the numerical value is 0%, the detail level is 0%, and when the numerical value is 100%, the retail level is 100%.

Figure 39A:
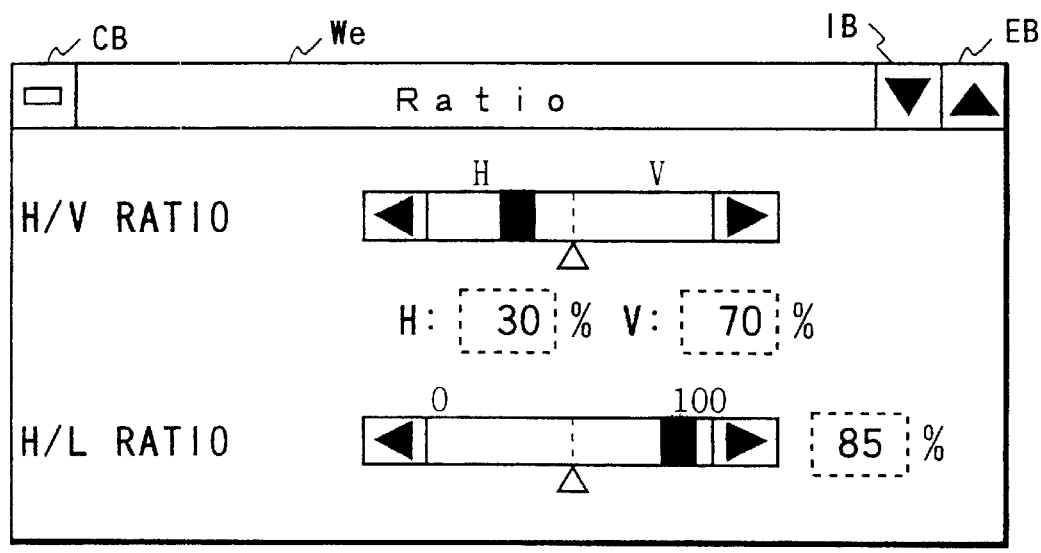
FIG. 39A is a view showing, by way of example, a displayed image for establishing ratio parameters.

FIG. 39A shows, by way of example, a displayed image for establishing ratio parameters.

In FIG. 39A, the parameter "H/V RATIO", which represents 100% as a whole, is divided into H and V areas by the slide lever, and each of the H and V areas indicates a percentage. For a relative representation of 99%, the entire parameter range extends from −99 to 0~99, with no H and V percentage representations, and the parameter is represented by a relative value as with other slide levers.

The parameter "H/L RATIO" may present a relative representation of ±99, and increases as it goes toward 100%.

Figure 39B:
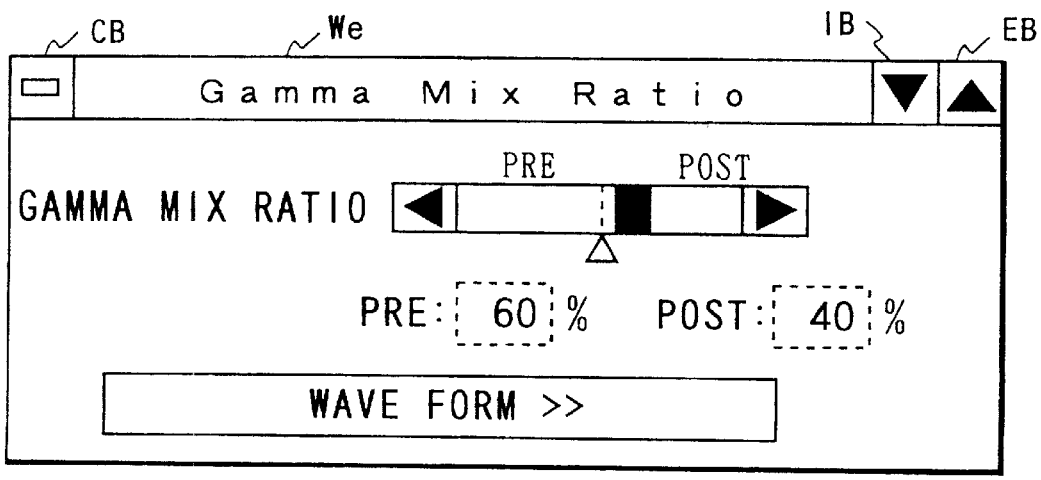
FIG. 39B is a view showing, by way of example, a displayed image for establishing a gamma mix ratio parameter.

FIG. 39B shows, by way of example, a displayed image for establishing a gamma mix ratio parameter.

Figure 40:
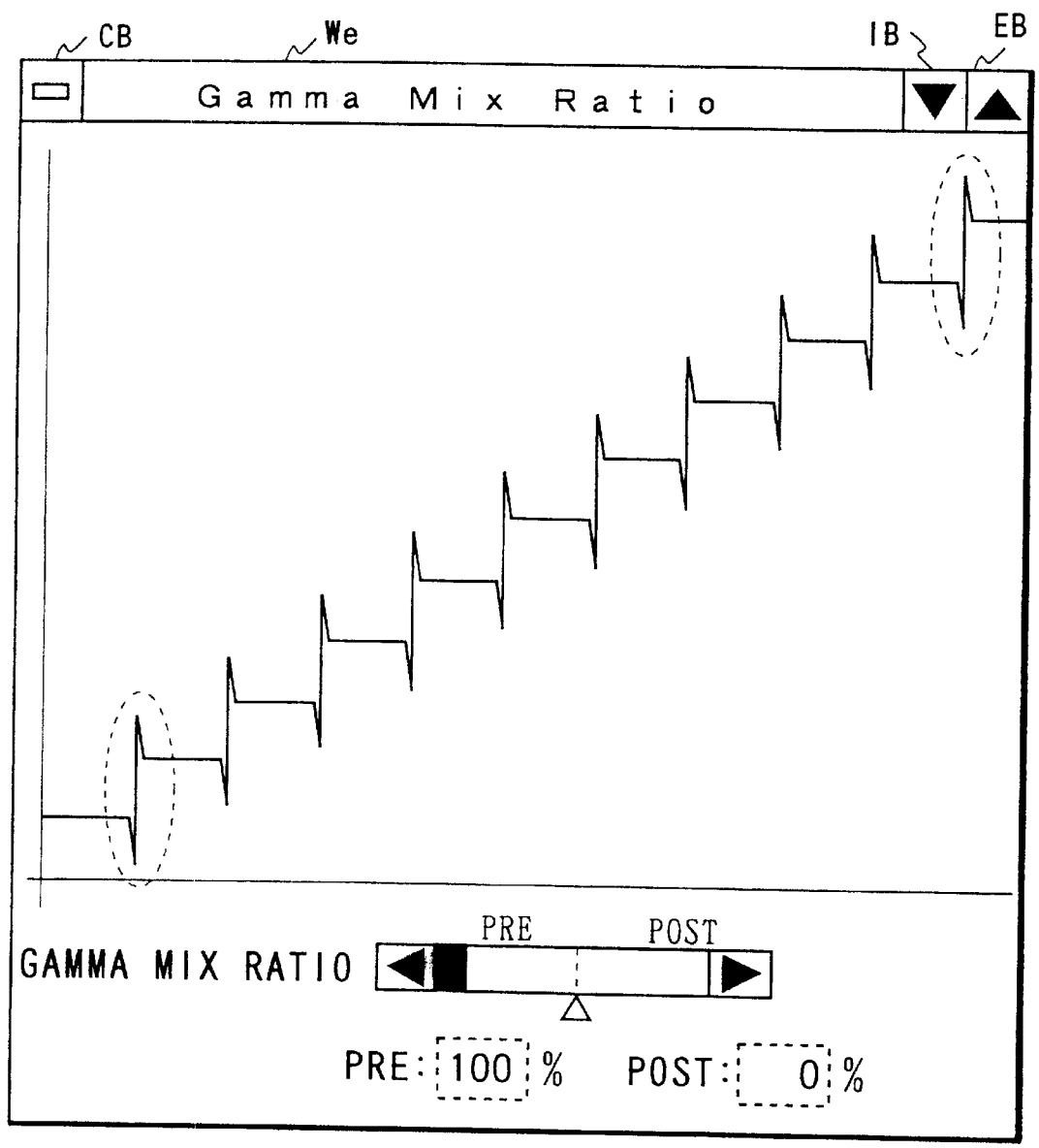
FIG. 40 is a view showing, by way of example, a displayed image for establishing a gamma mix ratio parameter, the displayed image including a displayed waveform.

FIG. 40 shows, by way of example, a displayed image for establishing a gamma mix ratio parameter, the displayed image including a displayed waveform.

As shown in FIG. 40, the letters "PRE", "POST" are displayed above the slide lever. The parameter "PRE" is "100%", i.e., the pre-to-post ratio of the gamma mix is 100% as a pre value. Therefore, the amount of detail remains the same when the video level is low or high as indicated by the elliptical broken lines.

The slide lever is displayed in a relative representation.

When the slide lever represents 0, the pre-to-post ratio of the gamma mix is 50%:50%.

When the slide lever represents −99, the pre-to-post ratio of the gamma mix is 100%:0%.

When the slide lever represents +99, the pre-to-post ratio of the gamma mix is 0%:100%.

Figure 41:
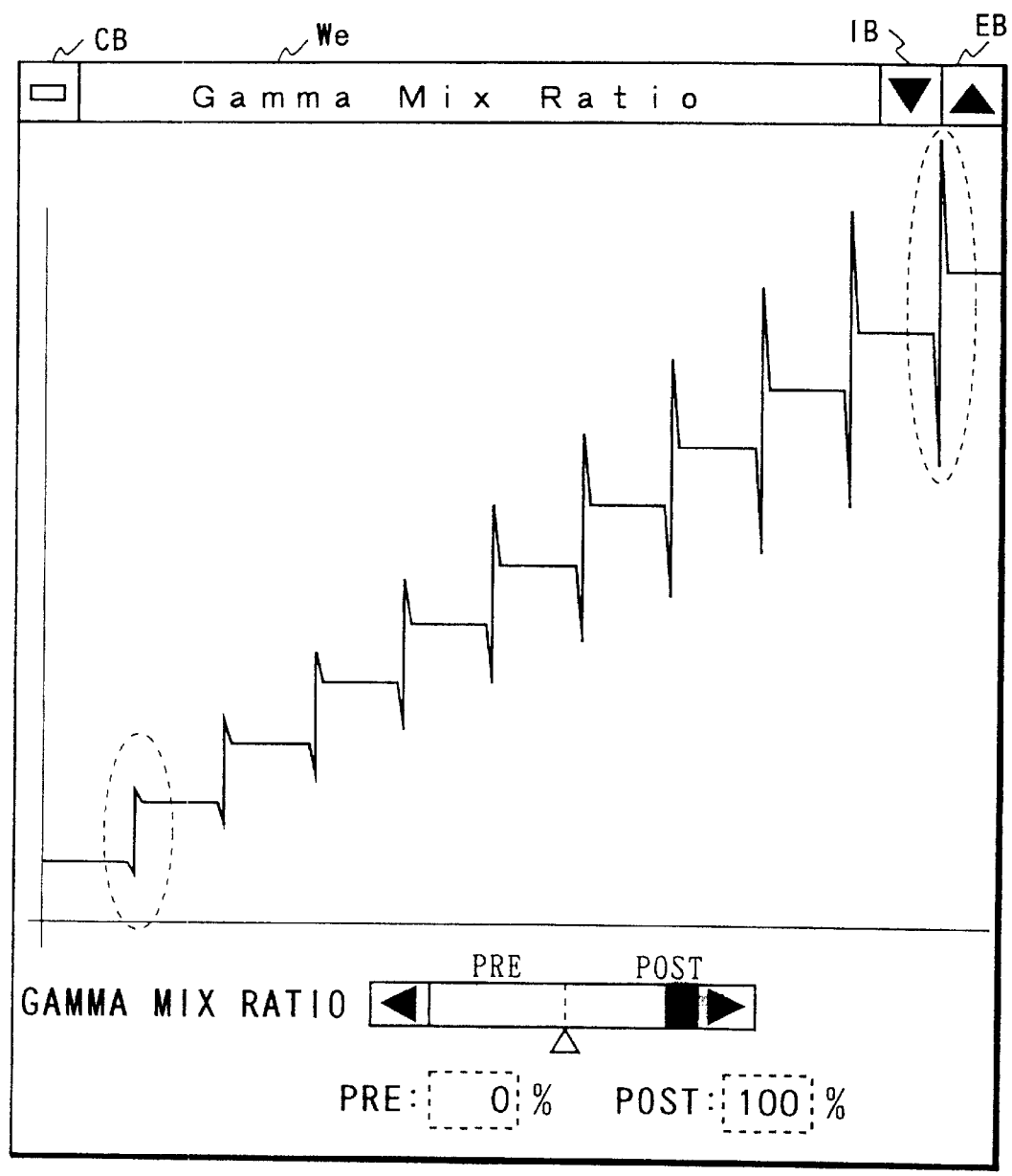
FIG. 41 is a view showing, by way of example, a displayed image for establishing a gamma mix ratio parameter, the displayed image including a displayed waveform.

FIG. 41 shows, by way of example, a displayed image for establishing a gamma mix ratio parameter, the displayed image including a displayed waveform.

Since the parameter "POST" is "100%", i.e., the pre-to-post ratio of the gamma mix is 100% as a post value. Therefore, the amount of detail is smaller when the video level is lower, and the amount of detail is greater when the video level is higher, as indicated by the elliptical broken lines.

Figure 42:
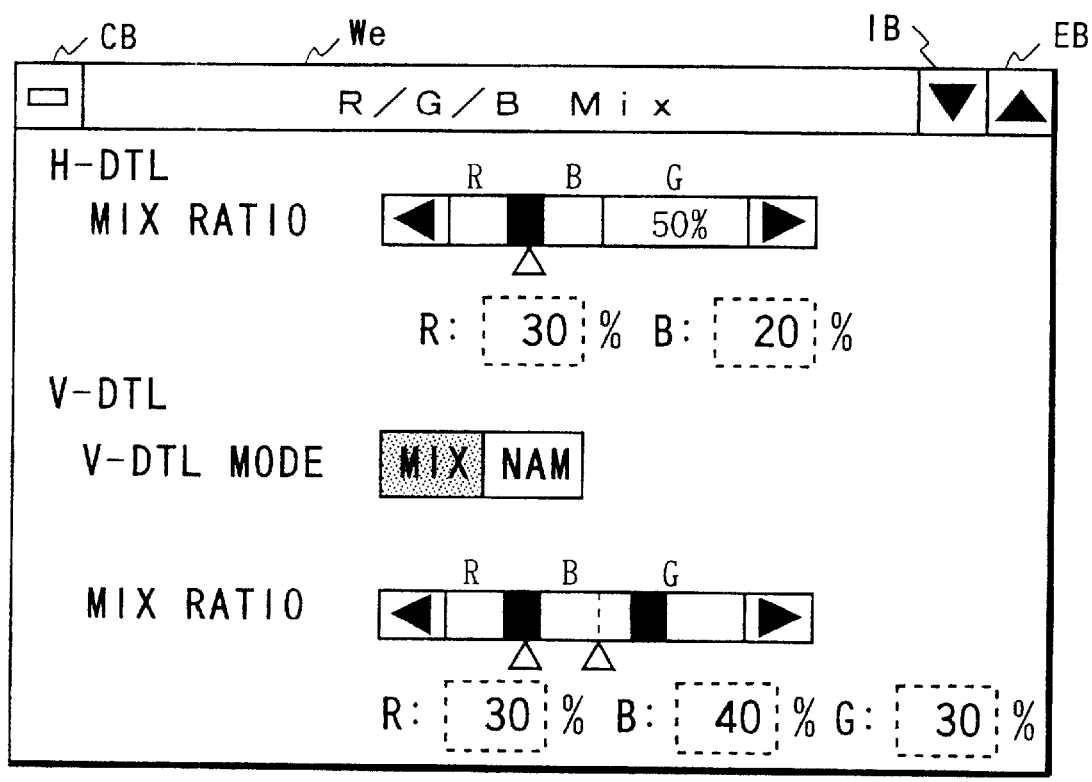
FIG. 42 is a view showing, by way of example, a displayed image for establishing R, G, B mix parameters.

FIG. 42 shows, by way of example, a displayed image for establishing R, G, B mix parameters.

As shown in FIG. 42, the parameter "MIX RAIO" for "H-DTL" includes an area having a fixed value of 50% for G (green), and a remaining area divided into variable % values for R (red) and B (blue) by the slide lever.

The parameter "V-DTL MODE" for "V-DTL" has two buttons "MIX", "NAM". When the button "NAM" is selected, contrary to the selection in the illustrated example, the mix ratio has no bearing on this parameter, and the data cannot be changed.

In the parameter "MIX RATIO", two slide levers are displayed, dividing the entire bar into variable % values for R, G, B. The slide levers represent ratios R:B and RB:G. When the ratio R:B is changed, the lever of the ratio RB:G is not moved. When the lever of the ratio RB:G is moved, the lever of the ratio R:B is also moved therewith because the ratio R:B varies at the same ratio.

Figure 43A:
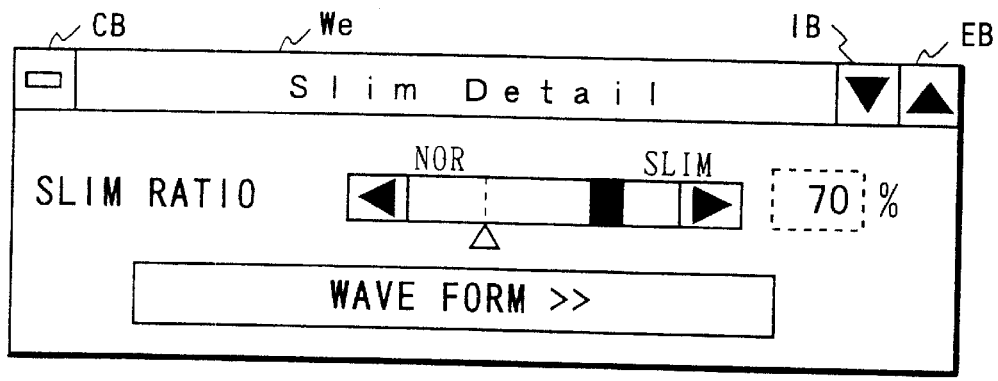
FIG. 43A is a view showing, by way of example, a displayed image for establishing a slim detail parameter.

FIG. 43A shows, by way of example, a displayed image for establishing a slim detail parameter.

Figure 43B:
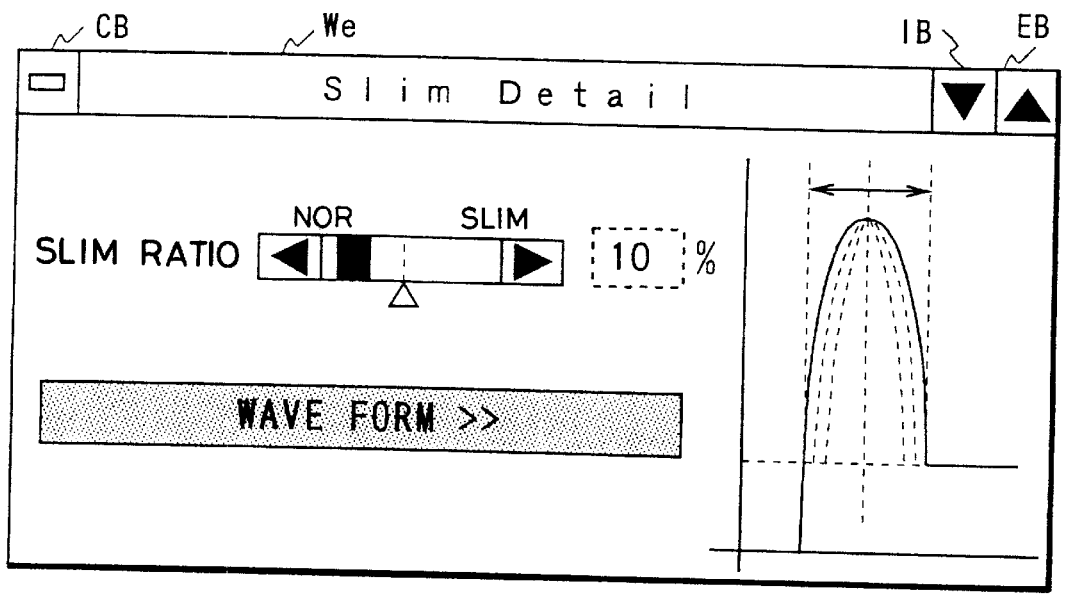
FIG. 43B is a view showing, by way of example, a displayed image for establishing a slim detail parameter, the displayed image including a displayed waveform.

FIG. 43B shows, by way or example, a displayed image for establishing a slim detail parameter, the displayed image including a displayed waveform.

The width indicated by the solid-line arrow on the displayed waveform image is representative of the parameter "SLID RAIO". The detail width can be narrowed about the center of the detail waveform.

Figure 43C:
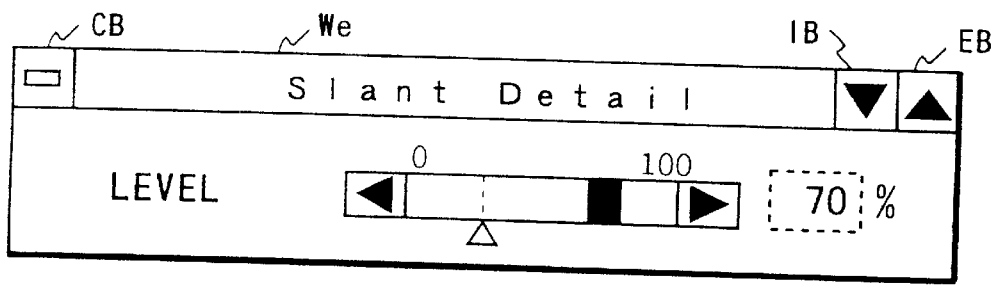
FIG. 43C is a view showing, by way of example, a displayed image for establishing a slant detail parameter.

FIG. 43C shows, by way of example, a displayed image for establishing a slant detail parameter.

In FIG. 43C, when the numerical data displayed in a broken-line frame are 0%, no detail in an oblique direction is applied. When the numerical data are 100%, a fully adjusted detail in an oblique direction is applied. The slant detail parameter may be displayed in a relative representation of ±99.

Figure 44A:
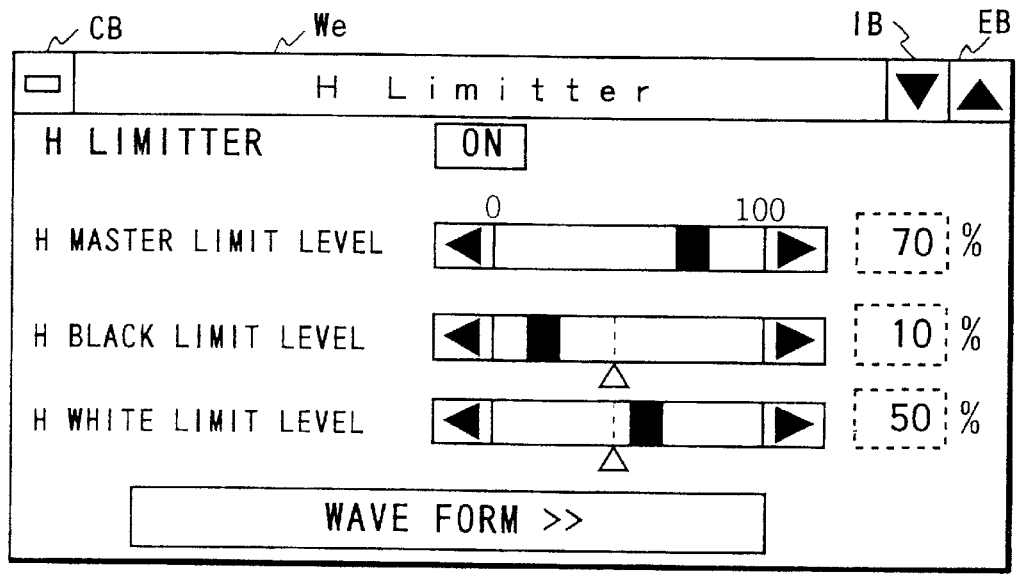
FIG. 44A is a view showing, by way of example, a displayed image for establishing H limiter parameters.

FIG. 44A shows, by way of example, a displayed image for establishing H limiter parameters.

Figure 44B:
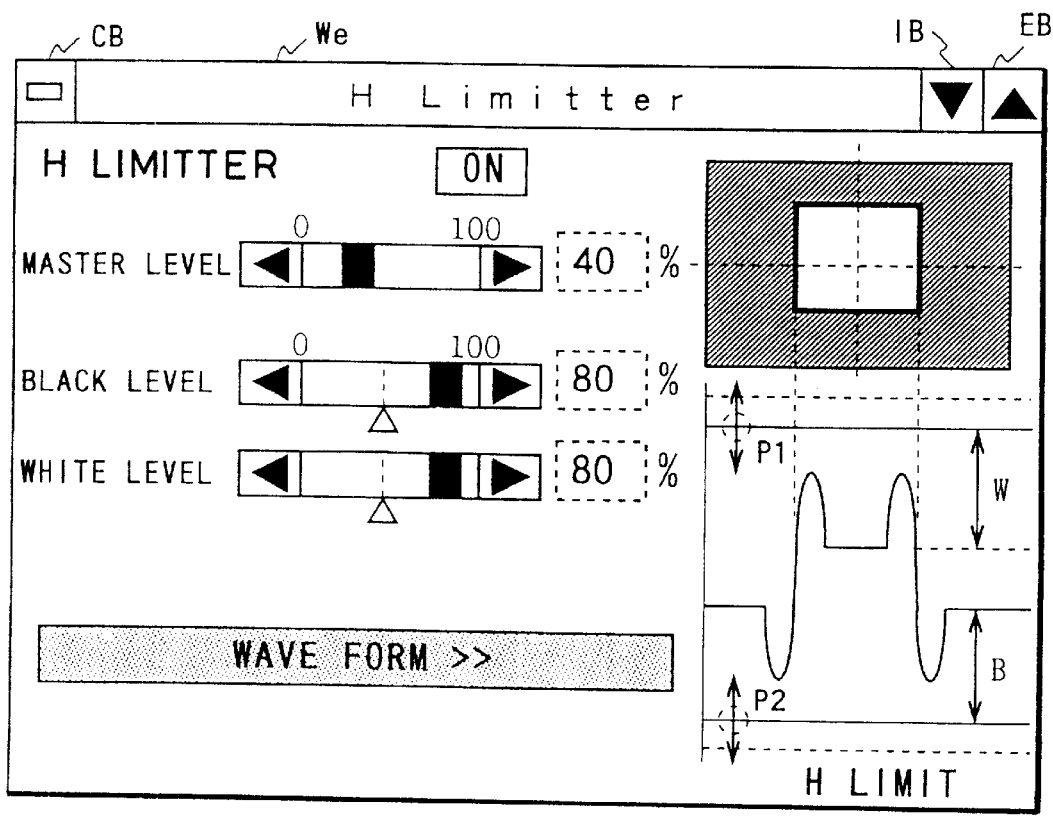
FIG. 44B is a view showing, by way of example, a displayed image for establishing H limiter parameters, the displayed image including a displayed waveform.

FIG. 44B shows, by way of example, a displayed image for establishing H limiter parameters, the displayed image including a displayed waveform.

In FIG. 44B, a parameter setting image is displayed when a waveform display button is turned on by the pointing device 300. As shown in FIG. 44B, when the button of the pointing device 300 is pressed at a pointer P1 or P2 and then moved in the directions indicated by the arrow, the width W of a white level or the width B of a black level in a horizontal direction can be changed. At the same time, the displayed slide levers and numerical values are also changed.

The parameter "MASTER LIMIT LEVEL" may not be used depending on the type of a camera connected. In such a case, this parameter is not displayed or masked in its display by shading or the like, so that it cannot be accessed.

The slide lever may be displayed in a relative representation of ±99. When the slide lever moves toward +, it moves in a limiting direction, and when the slide lever moves toward −, it moves in an unlimiting direction.

When the limit level is 0%, no limit is applied, and the detail may be applied up to a maximum detail level.

When the limit level is 100%, a maximum limit is applied, and hence no detail is applied.

Figure 45A:
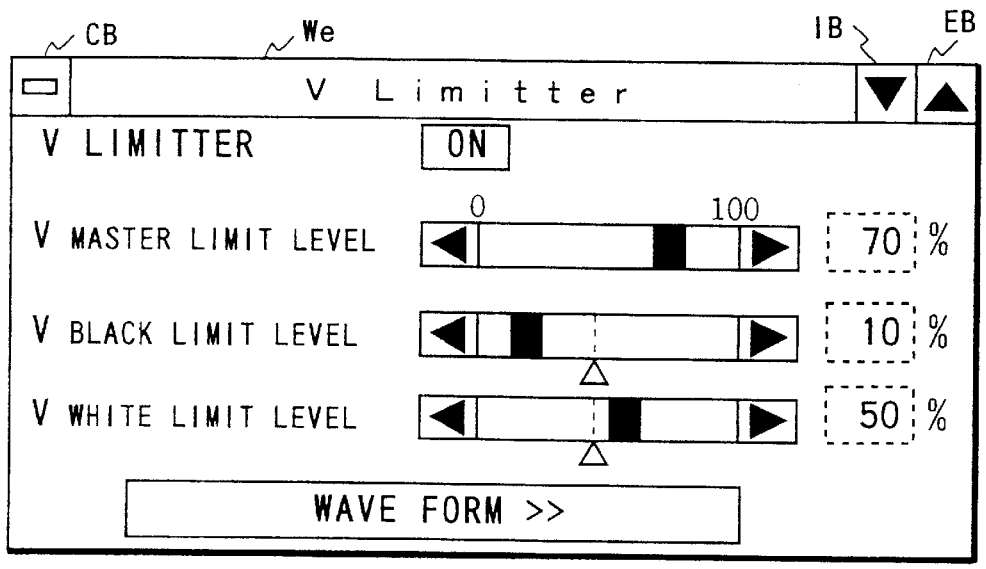
FIG. 45A is a view showing, by way of example, a displayed image for establishing V limiter parameters.

FIG. 45A shows, by way of example, a displayed image for establishing V limiter parameters.

Figure 45B:
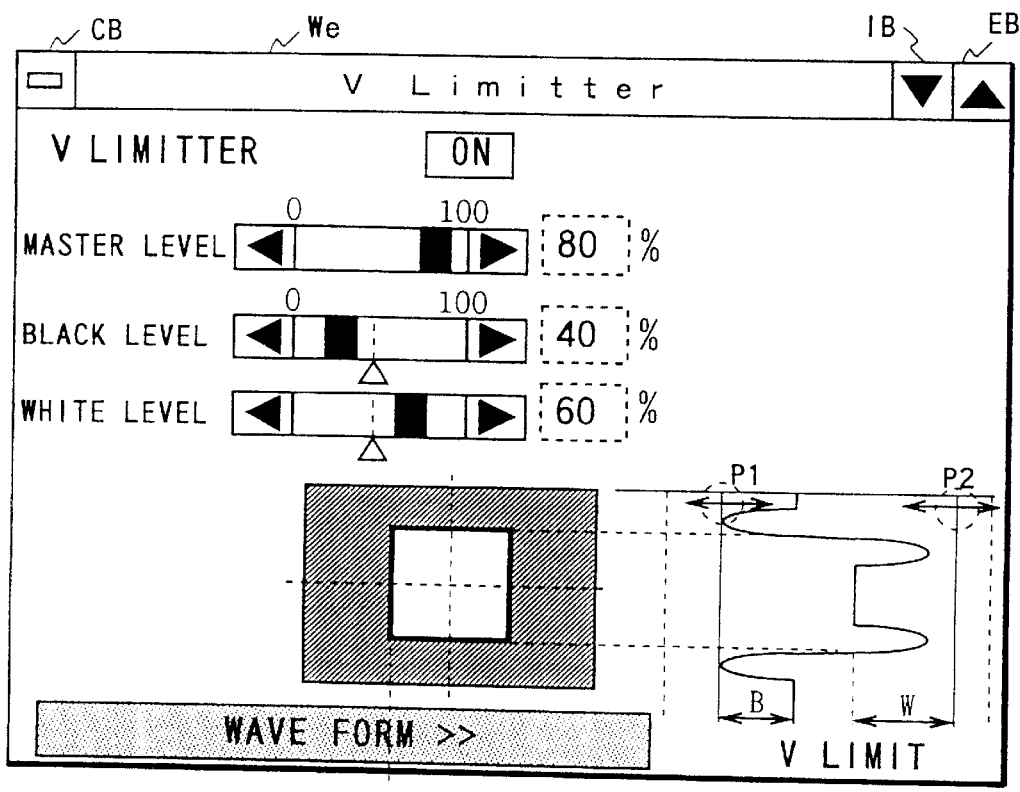
FIG. 45B is a view showing, by way of example, a displayed image for establishing V limiter parameters, the displayed image including a displayed waveform.

FIG. 45B shows, by way of example, a displayed image for establishing V limiter parameters, the displayed image including a displayed waveform.

In FIG. 45B, a parameter setting image is displayed when a waveform display button is turned on by the pointing device 300. As shown in FIG. 45B, when the button of the pointing device 300 is pressed at a pointer P1 or P2 and then moved in the directions indicated by the arrow, the width W of a white level or the width B of a black level in a vertical direction can be changed. At the same time, the displayed slide levers and numerical values are also changed.

Figure 46:
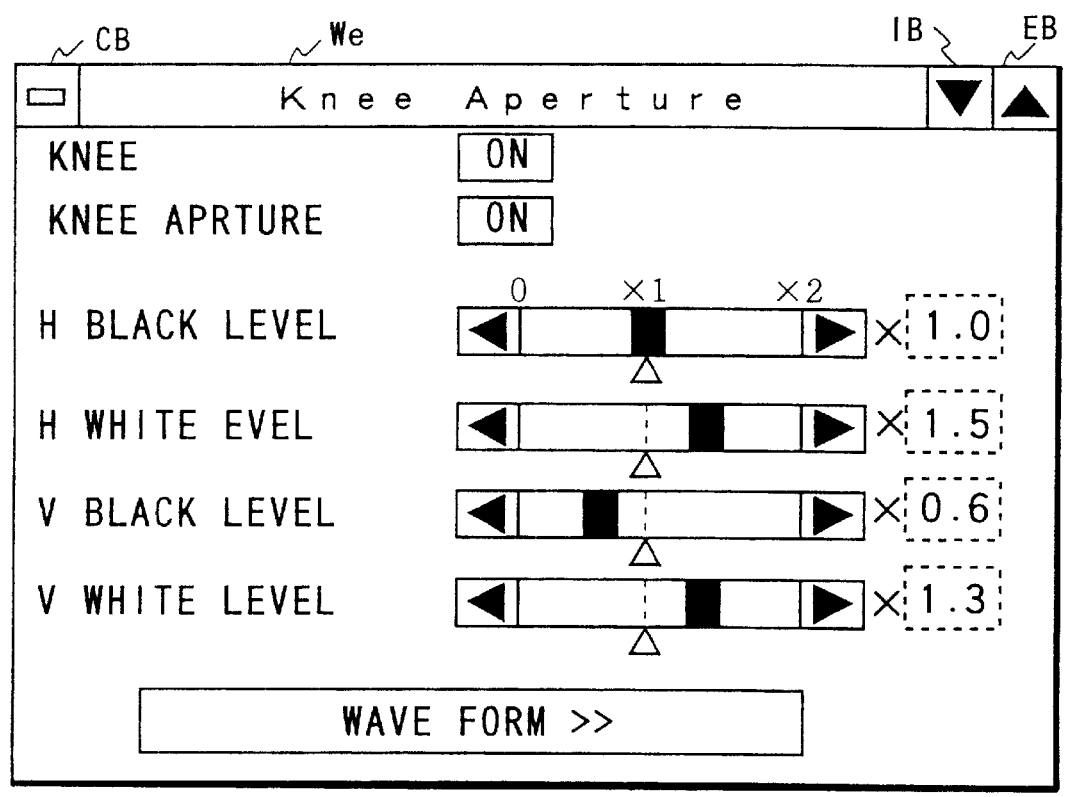
FIG. 46 is a view showing, by way of example, a displayed image for establishing knee aperture parameters.

FIG. 46 shows, by way of example, a displayed image for establishing knee aperture parameters.

Figure 47:
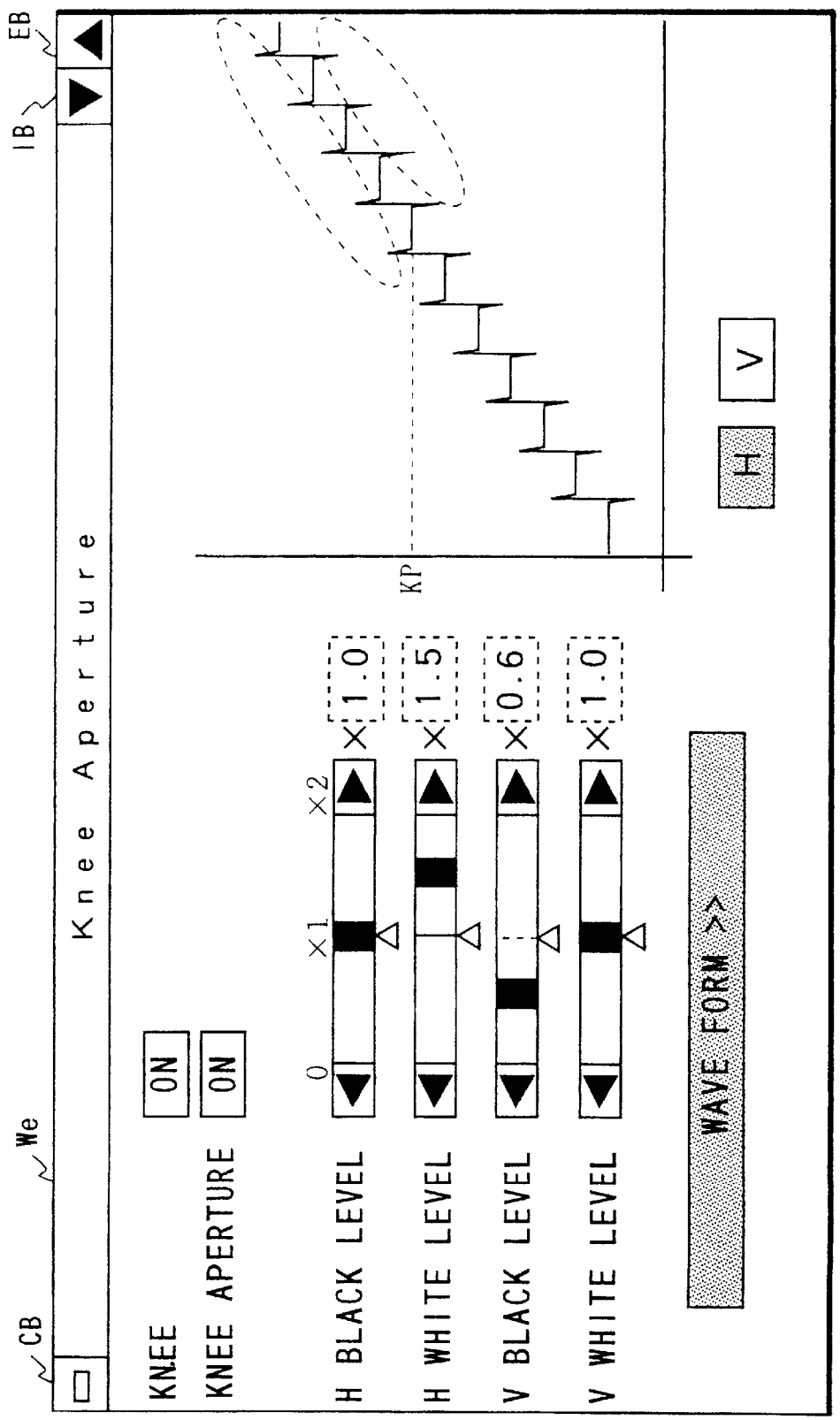
FIG. 47 is a view showing, by way of example, a displayed image for establishing knee aperture parameters, the displayed image including a displayed waveform.

FIG. 47 shows, by way of example, a displayed image for establishing knee aperture parameters, the displayed image including a displayed waveform.

As shown in FIG. 47, when the button "KNEE" is "OFF", the displayed KP (knee point) disappears, and the displayed waveform image becomes a linear step-like waveform image. Detail levels for H, V, black, and white are applied at ×1.0. When the button "KNEE" is "ON" and the button "KNEE APERTURE" is "OFF", the knee is applied at a step higher than the knee point, but the detail level remains fixed at ×1.0.

Data may be established by moving the slide levers or changing the displayed numerical values. While the waveform image varies in unison with the slide levers, the settings cannot not be varied by moving the waveform image in this parameter setting image.

The detail level of ×1.0 is the same as a detail level lower than the knee point. The detail level of ×2.0 is twice a detail level lower than the knee point. The detail level of ×0 eliminates details above the knee point.

In broken-line elliptical areas in the displayed waveform image, the detail levels of black and white are adjusted with respect to details above the knee point.

The buttons "H", "V" ("V" is shown as selected) displayed below the waveform image serve to switch between H and V displayed waveform images.

Figure 48:
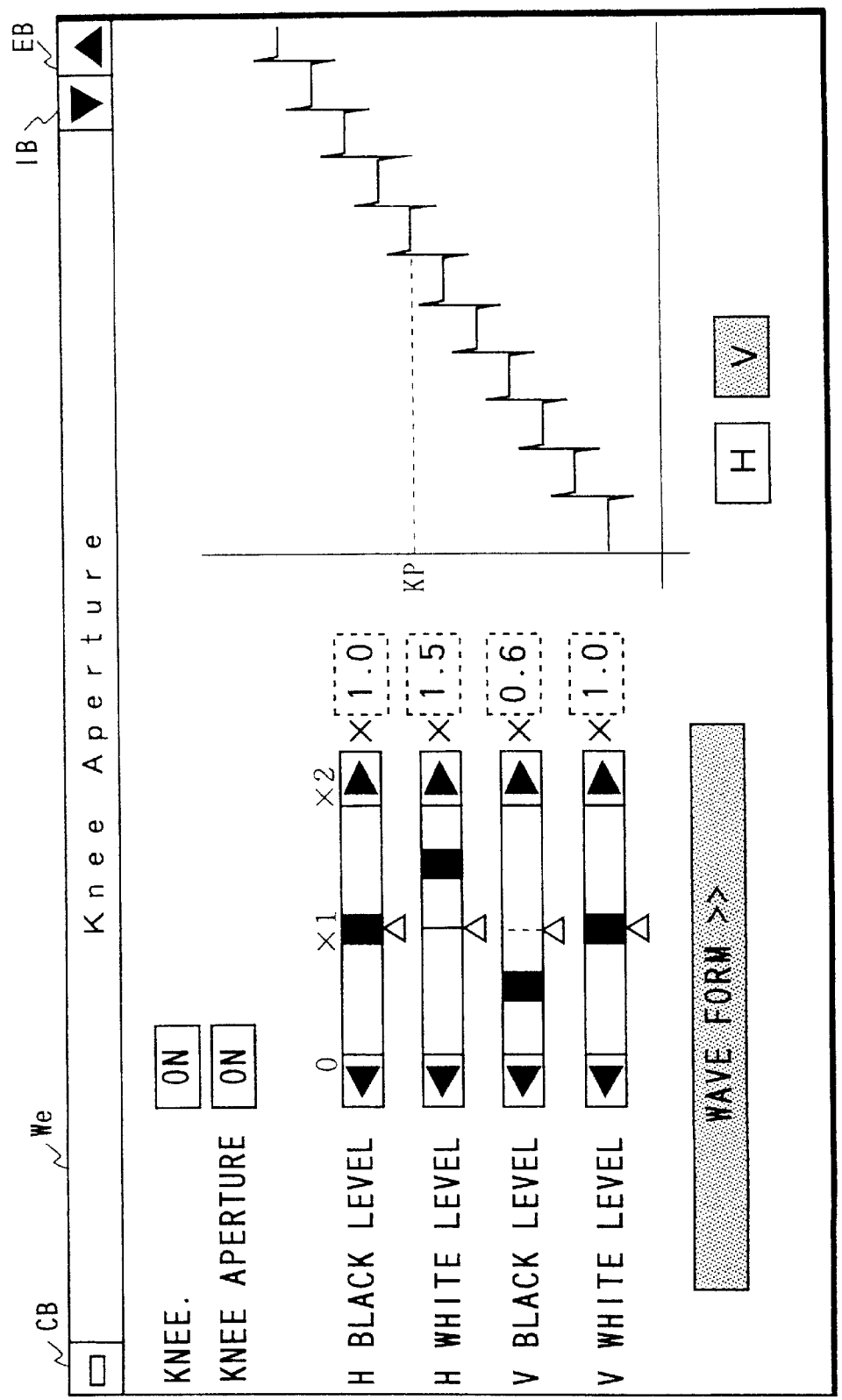
FIG. 48 is a view showing, by way of example, a displayed image for establishing knee aperture parameters, the displayed image including a displayed waveform.

FIG. 48 shows, by way of example, a displayed image for establishing knee aperture parameters, the displayed image including a displayed waveform.

Figure 49A:
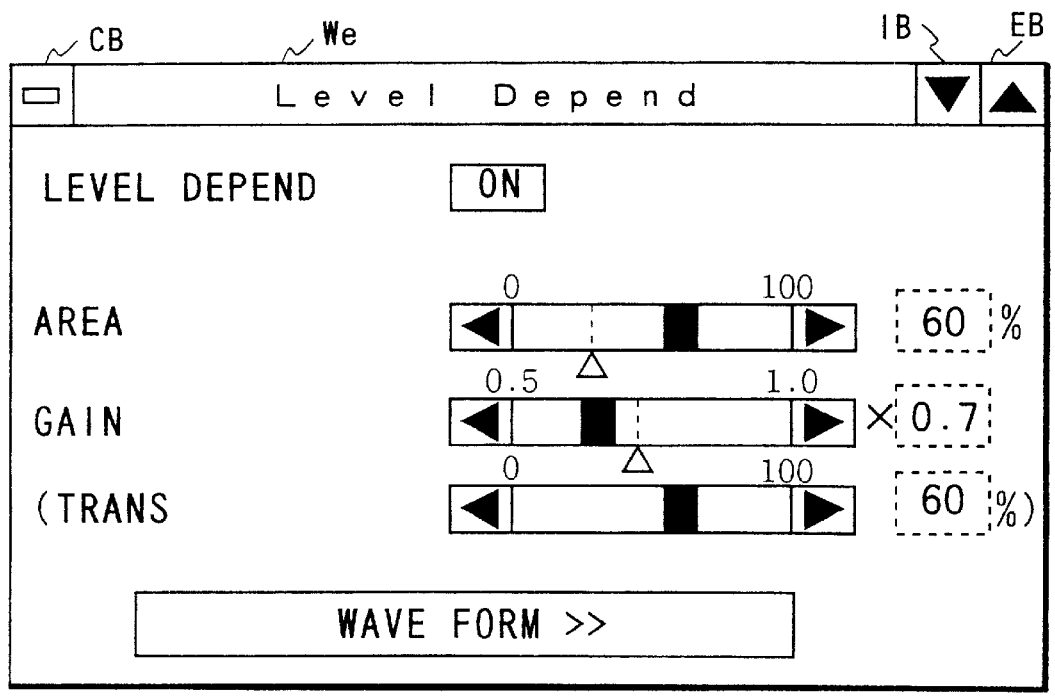
FIG. 49A is a view showing, by way of example, a displayed image for establishing level depend parameters.

FIG. 49A shows, by way of example, a displayed image for establishing level depend parameters.

Figure 49B:
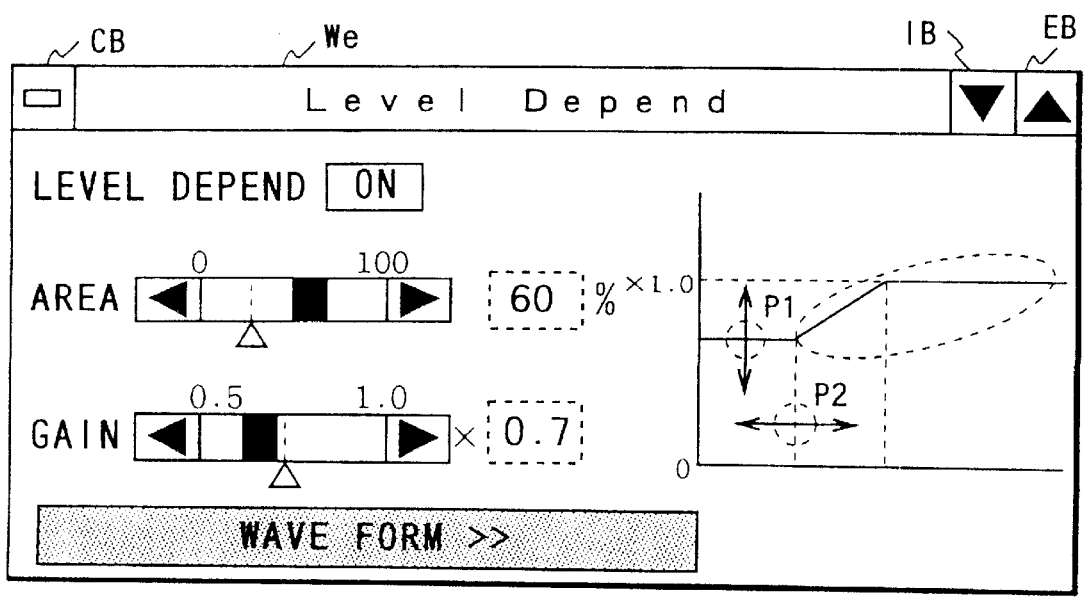
FIG. 49B is a view showing, by way of example, a displayed image for establishing level depend parameters, the displayed image including a displayed waveform.

FIG. 49B shows, by way of example, a displayed image for establishing level depend parameters, the displayed image including a displayed waveform.

In FIG. 49B, when a point P1 in the displayed waveform image is moved as indicated by the arrow, the gain is changed. When a point P2 in the displayed waveform image is moved as indicated by the arrow, the parameter "AREA" is changed. At this time, a broken-line elliptical area of the waveform image moves therewith.

Figure 50:
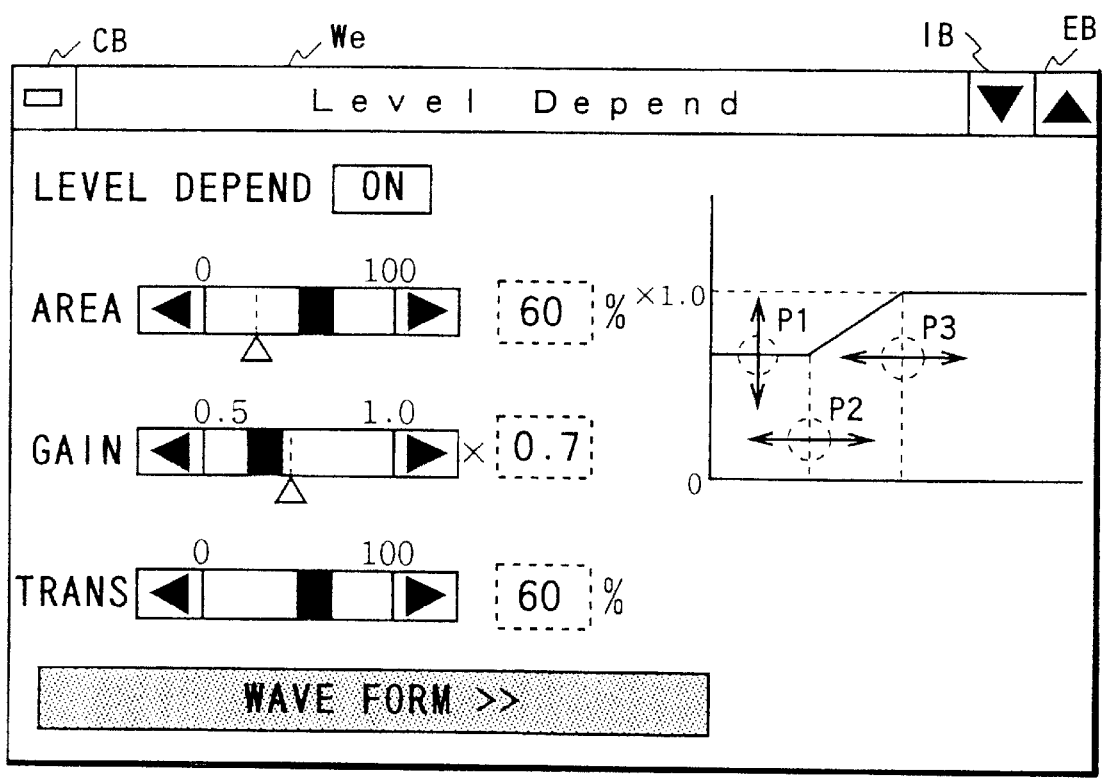
FIG. 50 is a view showing, by way of example, a displayed image for establishing level depend parameters for servicing, the displayed image including a displayed waveform.

FIG. 50 shows, by way of example, a displayed image for establishing level depend parameters for servicing, the displayed image including a displayed waveform. The details of this displayed image are the same as those of FIGS. 49A and 49B except the parameter "TRANS". The parameter "TRANS" serves to change the width between area and trans points.

Figure 51A:
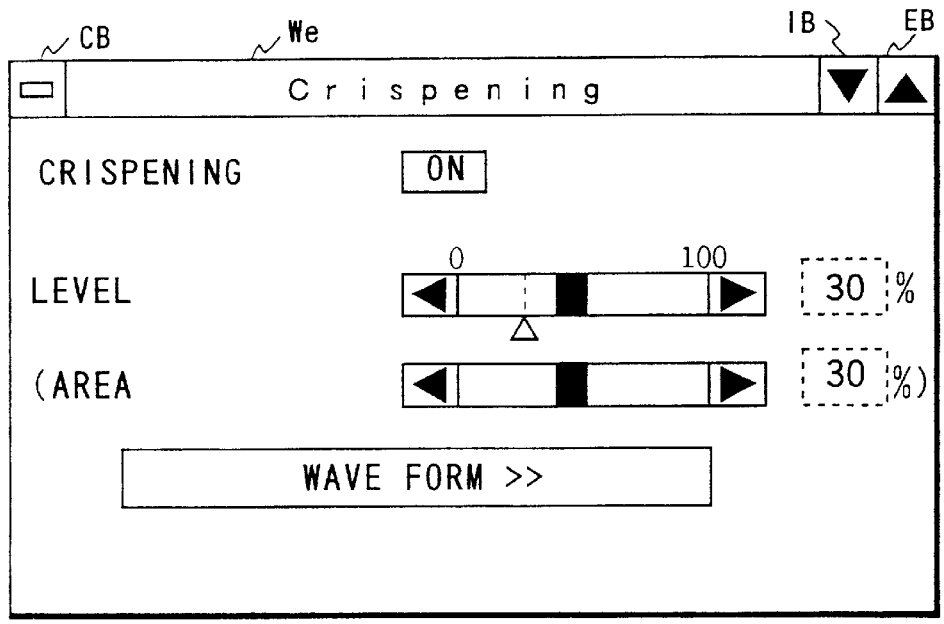
FIG. 51A is a view showing, by way of example, a displayed image for establishing crispening parameters.

FIG. 51A shows, by way of example, a displayed image for establishing crispening parameters.

Figure 51B:
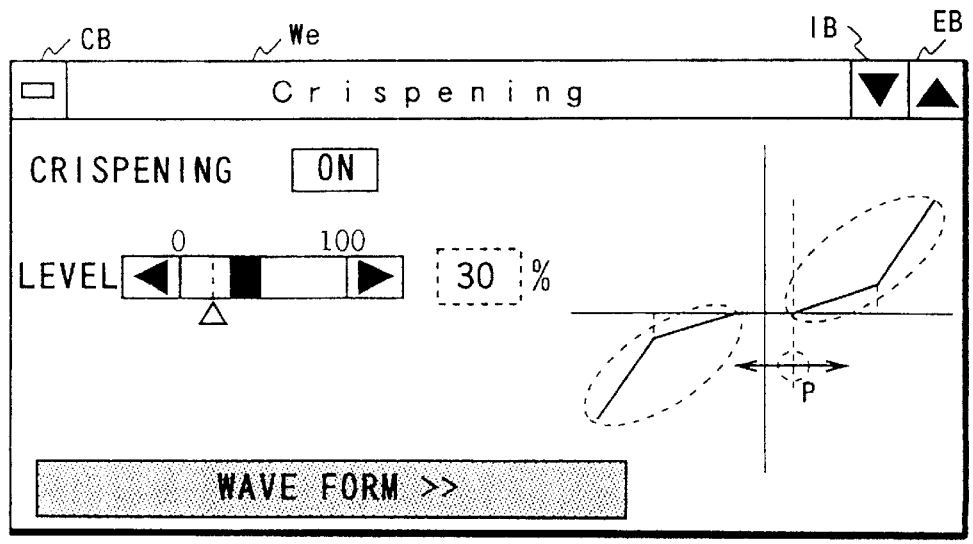
FIG. 51B is a view showing, by way of example, a displayed image for establishing crispening parameters, the displayed image including a displayed waveform.

FIG. 51B shows, by way of example, a displayed image for establishing crispening parameters, the displayed image including a displayed waveform.

Figure 52:
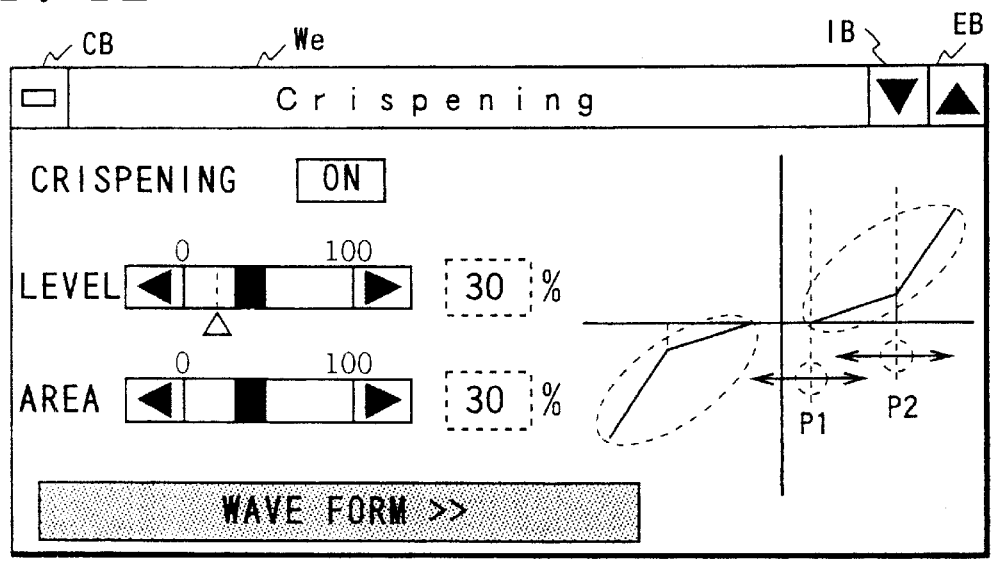
FIG. 52 is a view showing, by way of example, a displayed image for establishing crispening parameters for servicing, the displayed image including a displayed waveform.

FIG. 52 shows, by way of example, a displayed image for establishing crispening parameters for servicing, the displayed image including a displayed waveform.

In FIG. 52, the level is changed when a pointer P1 in the displayed waveform image is moved as indicated by the arrow.

Figure 53:
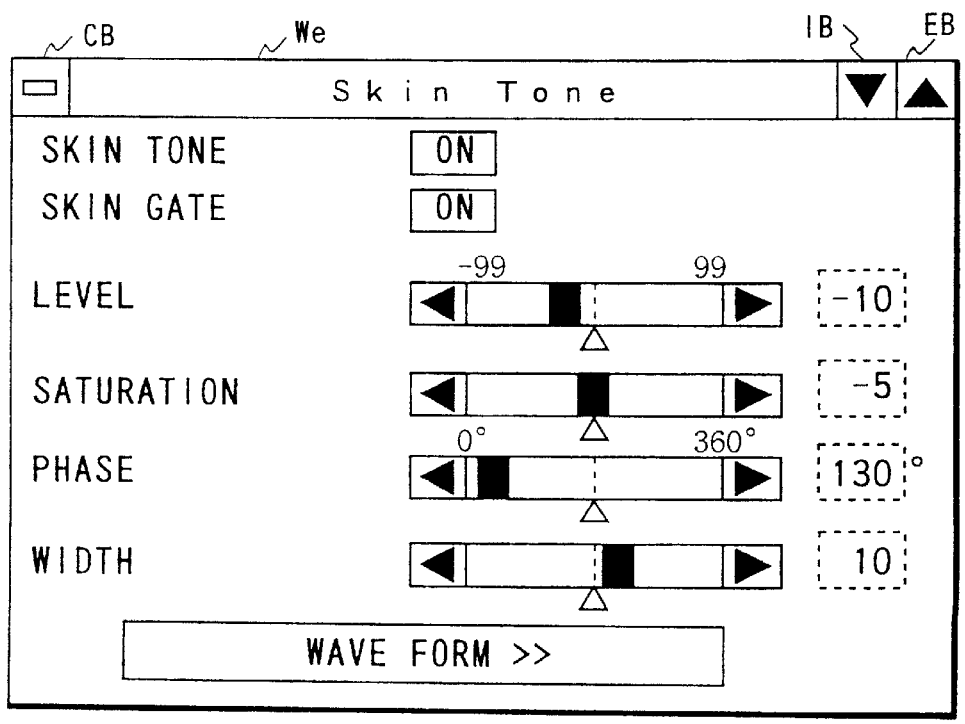
FIG. 53 is a view showing, by way of example, a displayed image for establishing skin tone parameters.

FIG. 53 shows, by way of example, a displayed image for establishing skin tone parameters.

The parameter "PHASE" can be changed in the range of 0 to 360 degrees.

Figure 54:
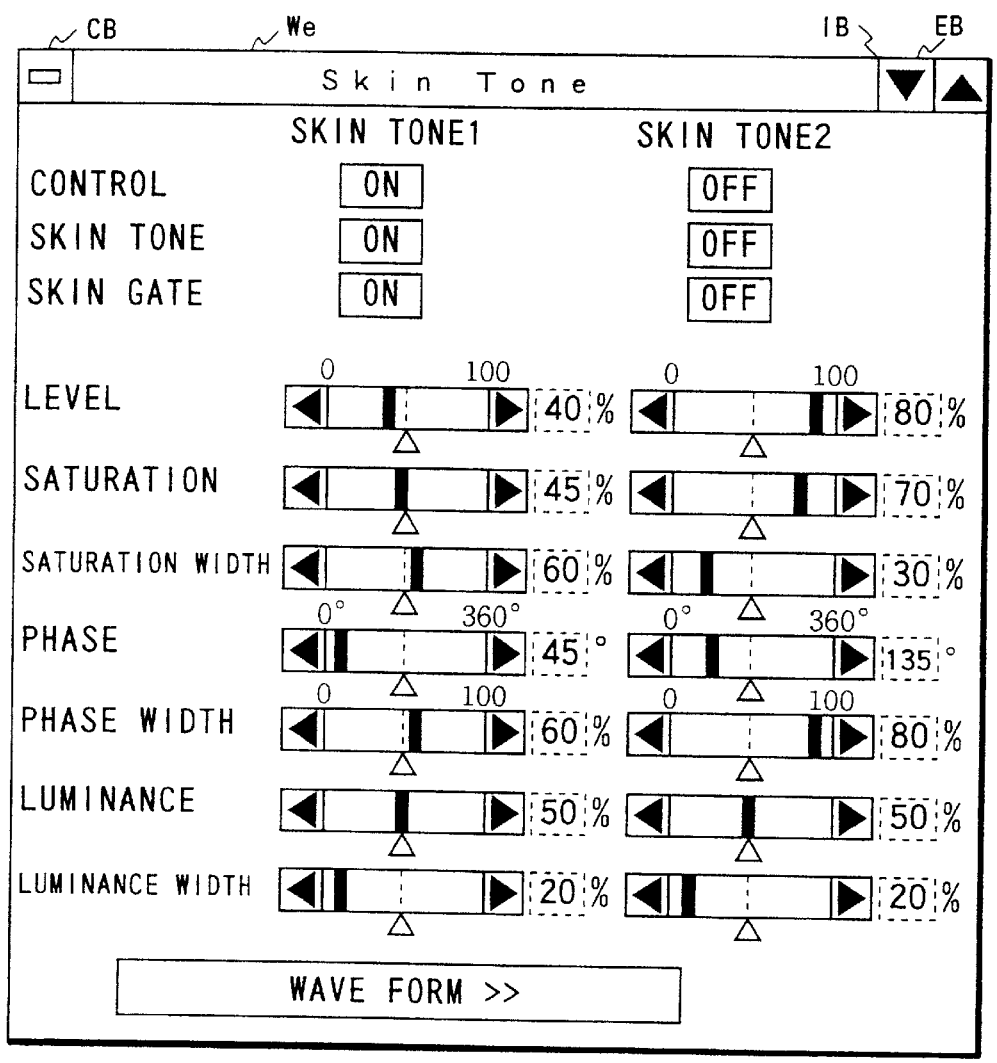
FIG. 54 is a view showing, by way of example, a displayed image for establishing skin tone parameters.

FIG. 54 shows, by way of example, a displayed image for establishing skin tone parameters.

Figure 55:
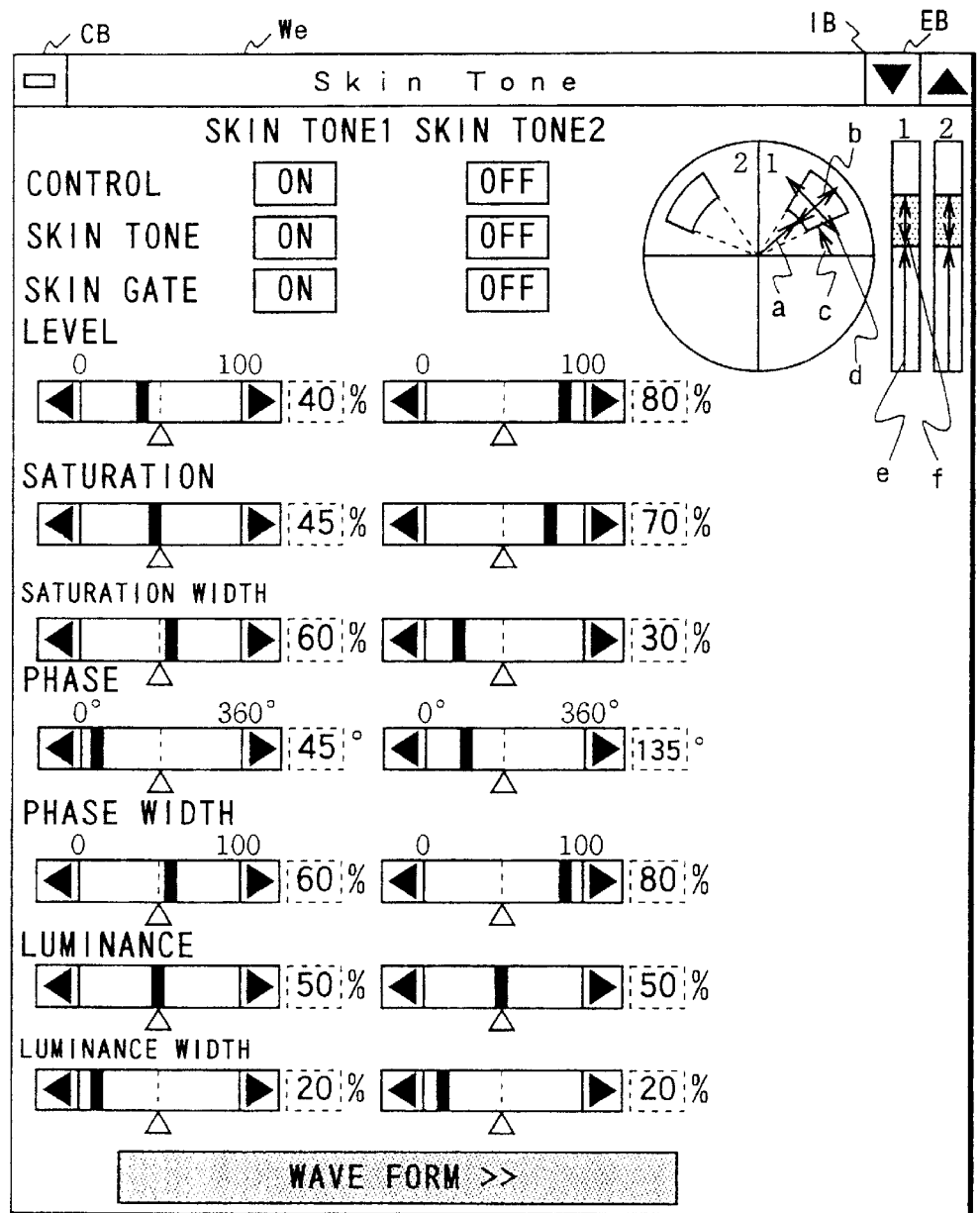
FIG. 55 is a view showing, by way of example, a displayed image for establishing skin tone parameters, the displayed image including a displayed waveform.

FIG. 55 shows, by way of example, a displayed image for establishing skin tone parameters, the displayed image including a displayed waveform.

Of the parameters "SKIN TONE 1", "SKIN TONE 2", those parameters for which the buttons are "ON" can be established.

Figure 56:
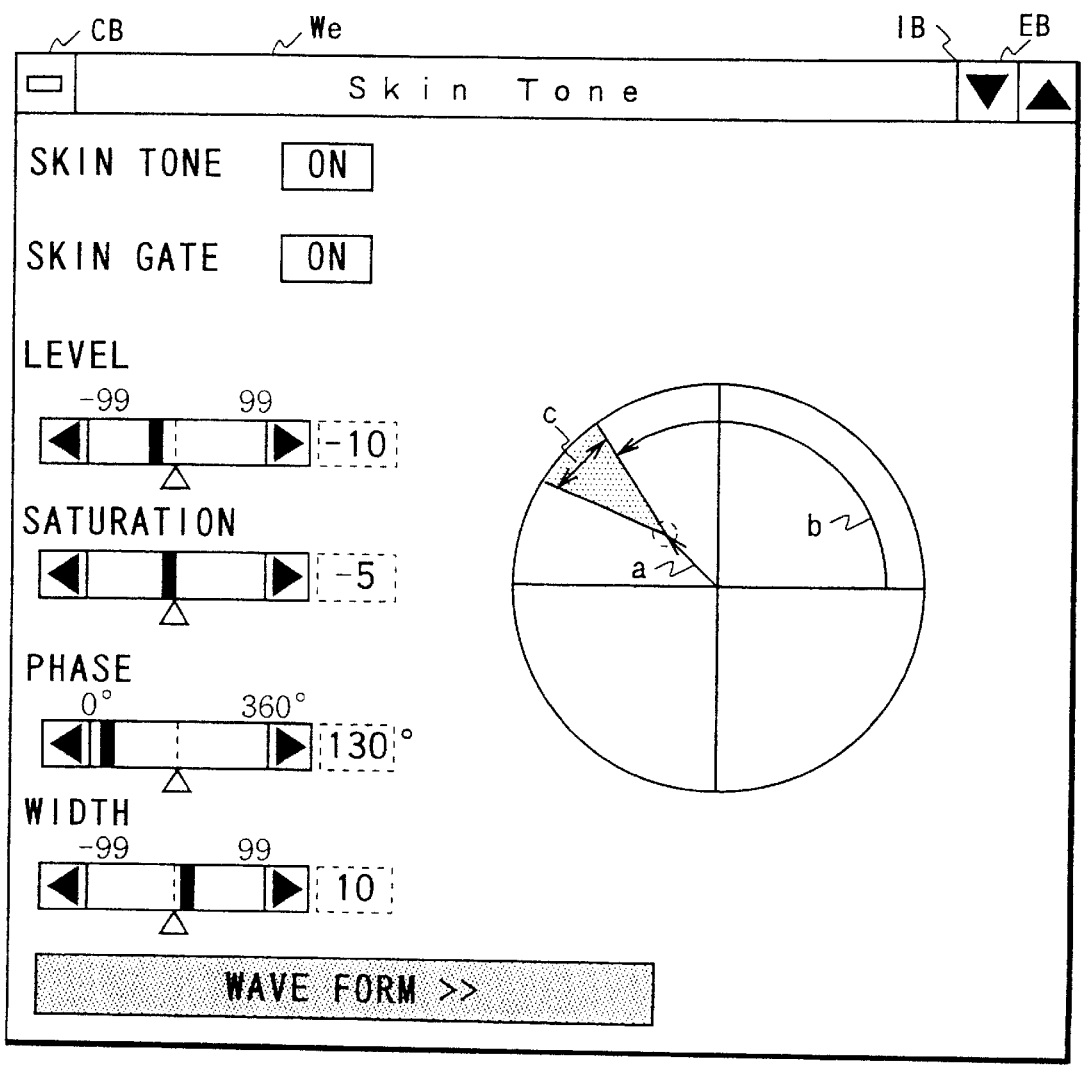
FIG. 56 is a view showing, by way of example, a displayed image for establishing skin tone parameters, the displayed image including a displayed waveform.

FIG. 56 shows, by way of example, a displayed image for establishing skin tone parameters, the displayed image including a displayed waveform.

The parameter "WIDTH" represents a phase width.

Figure 57A:
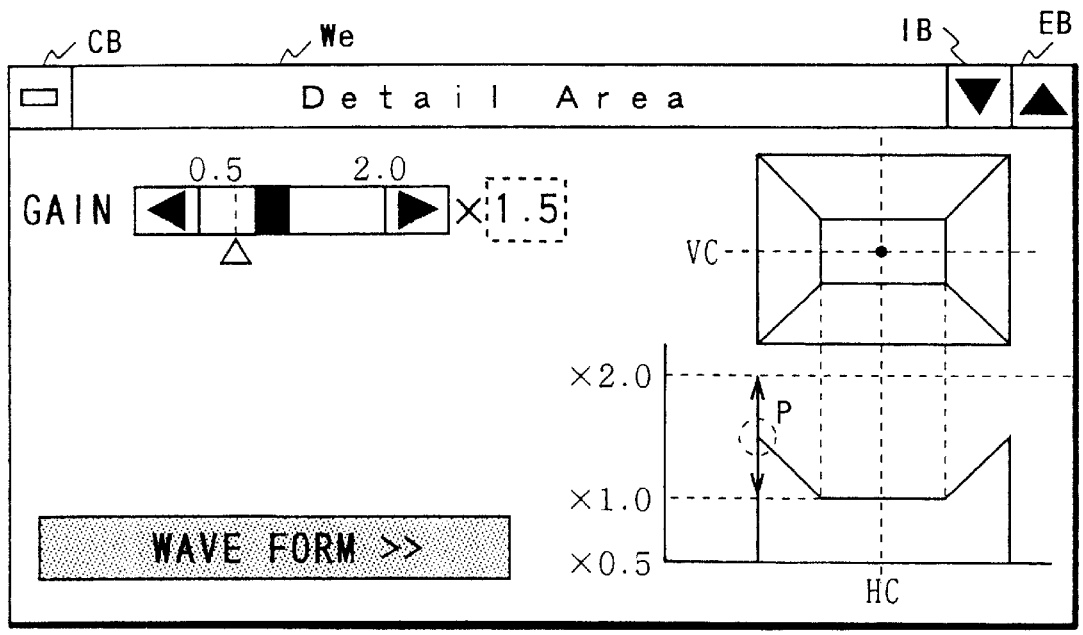
FIG. 57A is a view showing, by way of example, a displayed image for establishing a detail area parameter, the displayed image including a displayed waveform.

FIG. 57A shows, by way of example, a displayed image for establishing a detail area parameter, the displayed image including a displayed waveform.

Figure 57B:
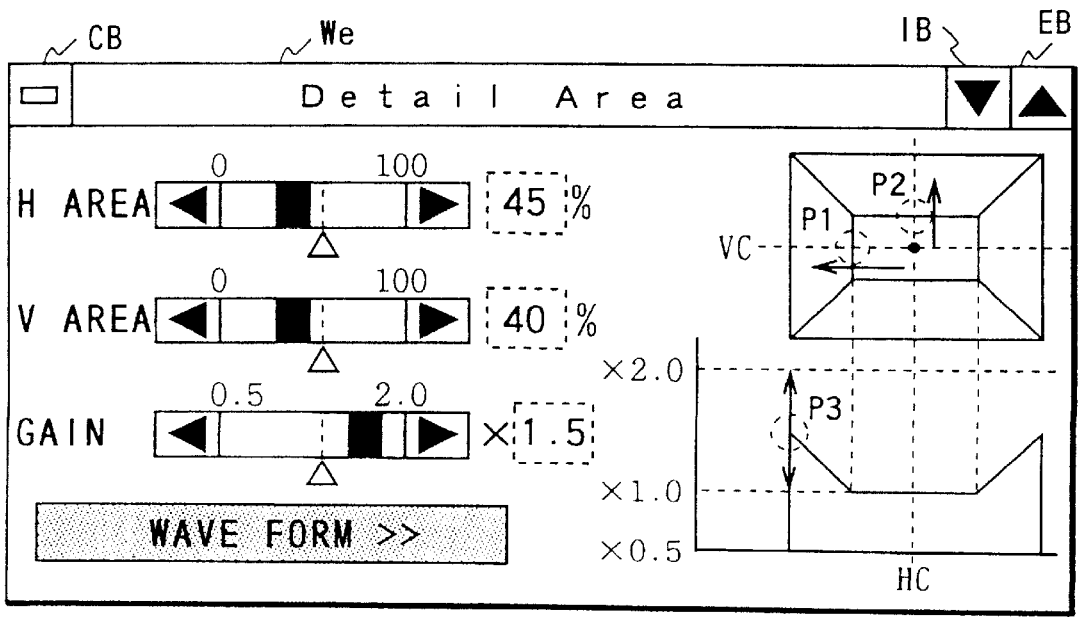
FIG. 57B is a view showing, by way of example, a displayed image for establishing a detail area parameter, the displayed image including a displayed waveform.

FIG. 57B shows, by way of example, a displayed image for establishing a detail area parameter, the displayed image including a displayed waveform.

Figure 58A:
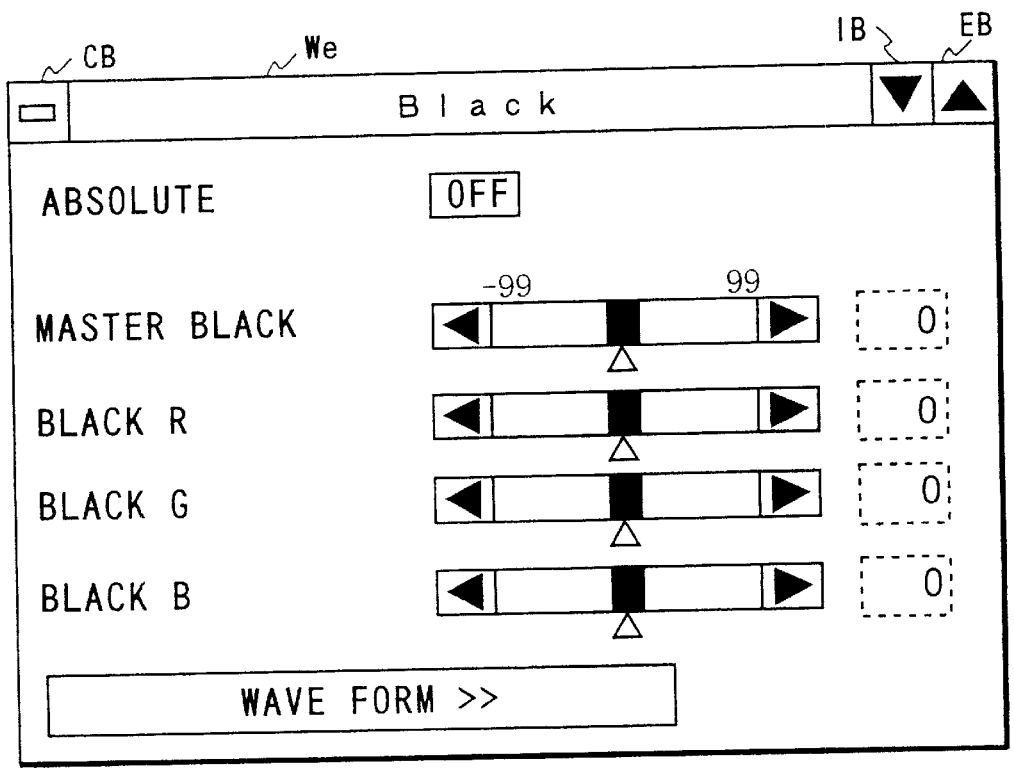
FIG. 58A is a view showing, by way of example, a displayed image for establishing black parameters.

FIG. 58A shows, by way of example, a displayed image for establishing black parameters.

Figure 58B:
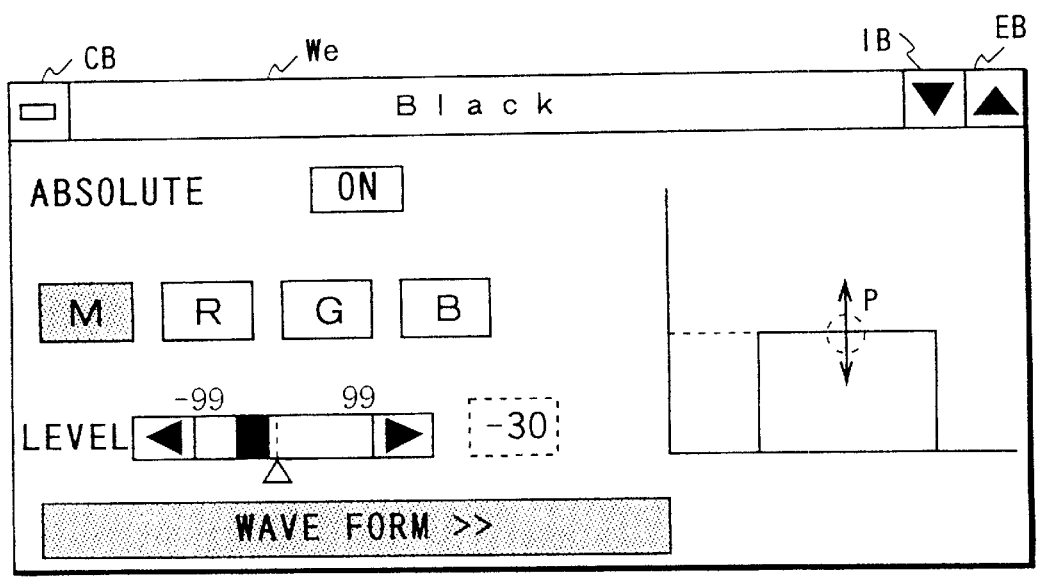
FIG. 58B is a view showing, by way of example, a displayed image for establishing black parameters, the displayed image including a displayed waveform.

FIG. 58B shows, by way of example, a displayed image for establishing black parameters, the displayed image including a displayed waveform.

Figure 59:
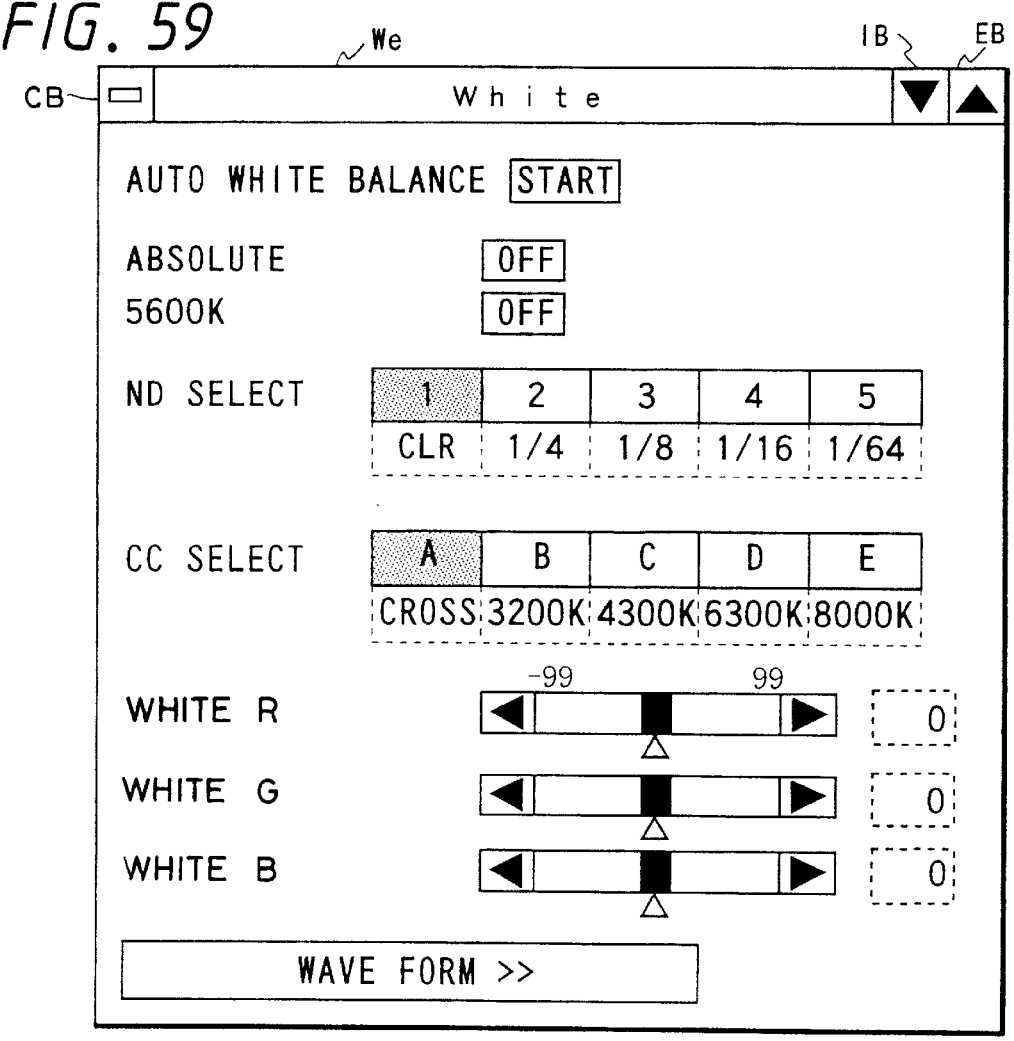
FIG. 59 is a view showing, by way of example, a displayed image for establishing white parameters.

FIG. 59 shows, by way of example, a displayed image for establishing white parameters.

Figure 60:
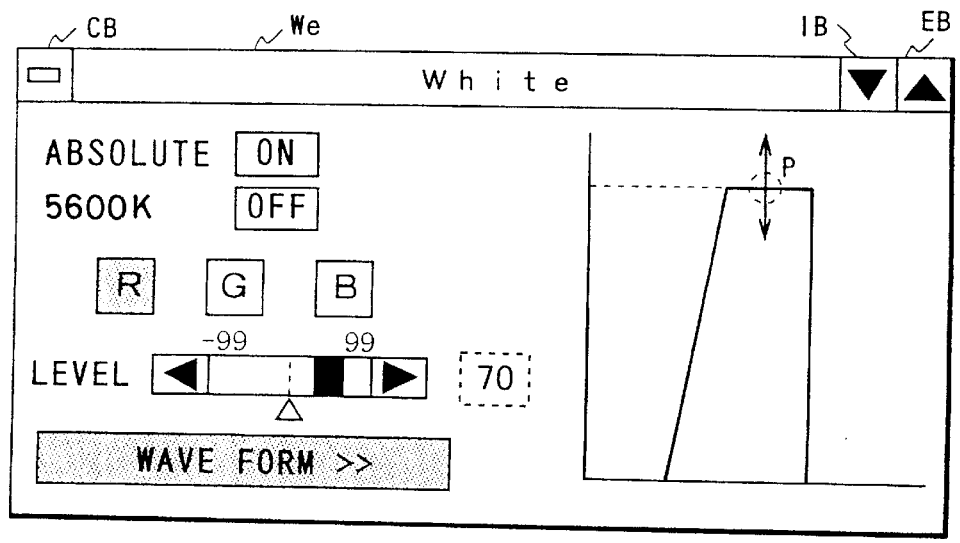
FIG. 60 is a view showing, by way of example, a displayed image for establishing white parameters, the displayed image including a displayed waveform.

FIG. 60 shows, by way of example, a displayed image for establishing white parameters, the displayed image including a displayed waveform.

In FIG. 60, when the button "ABSOLUTE" is "ON", absolute data are handled, and when button "ABSOLUTE" is "OFF", relative data are handled.

When the button "ABSOLUTE" is "ON", the slide lever presents a representation ranging from 0 to 100%.

Figure 61:
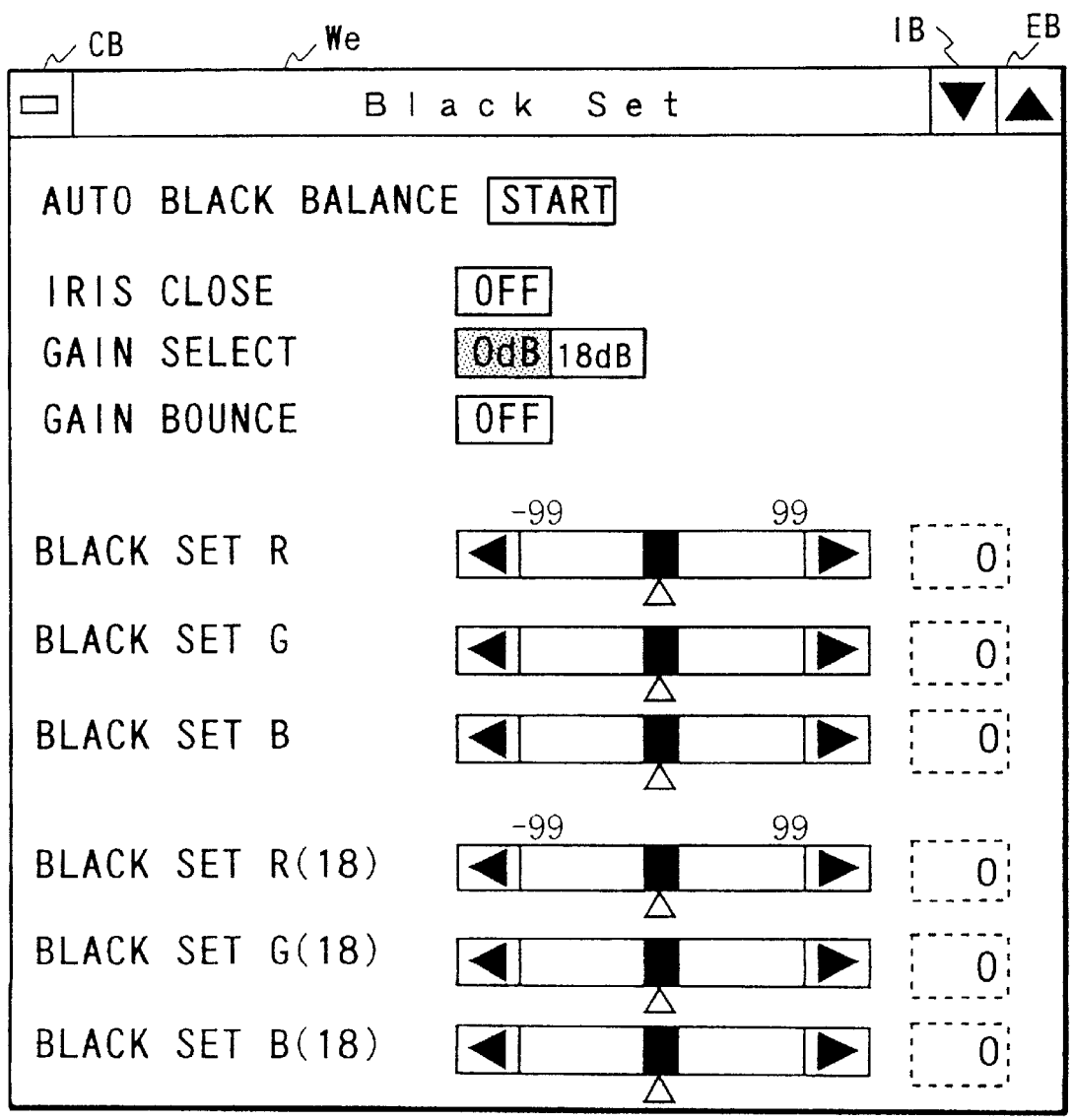
FIG. 61 is a view showing, by way of example, a displayed image for establishing black set parameters.

FIG. 61 shows, by way of example, a displayed image for establishing black set parameters.

Figure 62:
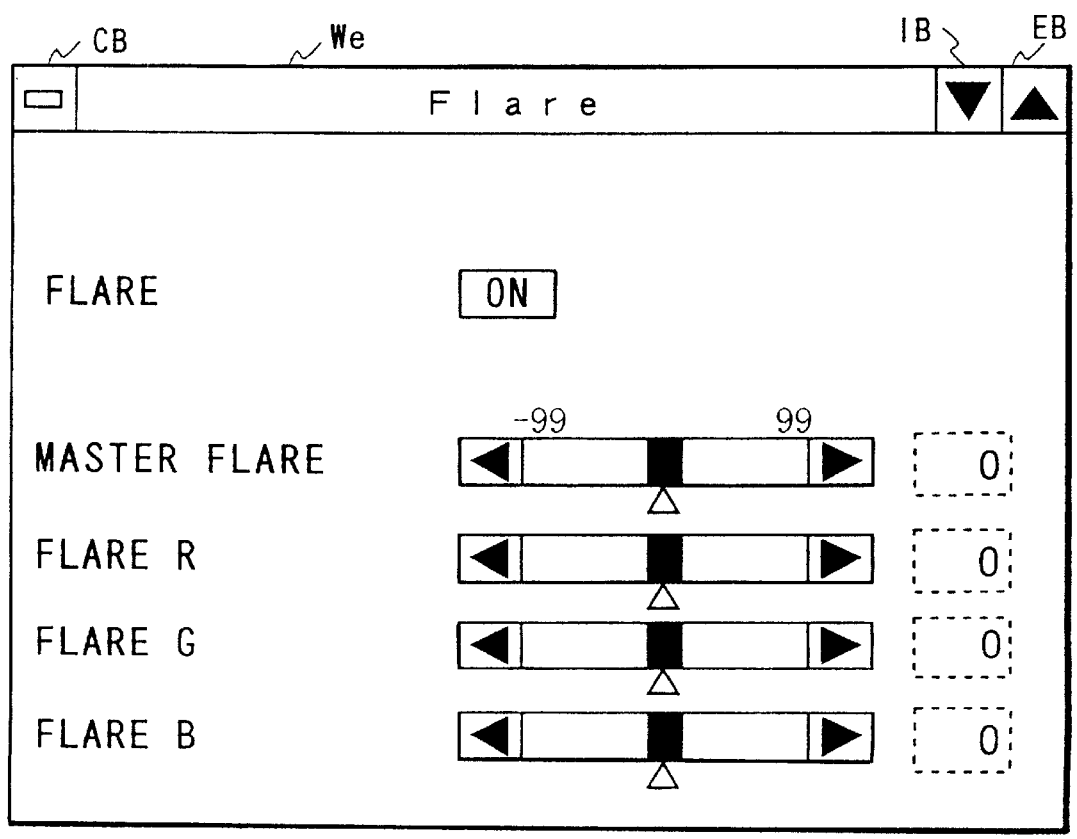
FIG. 62 is a view showing, by way of example, a displayed image for establishing flare parameters.

FIG. 62 shows, by way of example, a displayed image for establishing flare parameters.

Figure 63:
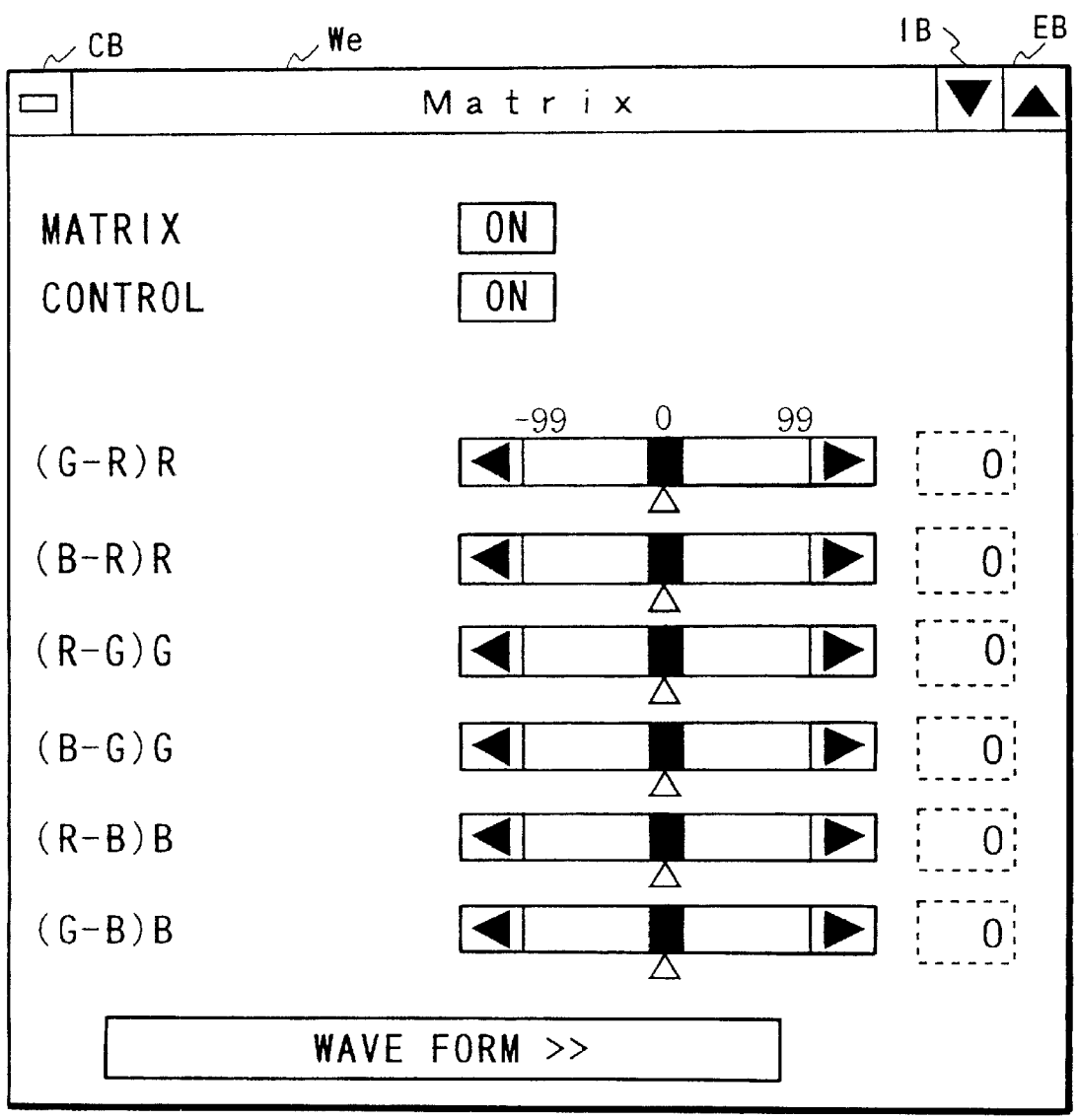
FIG. 63 is a view showing, by way of example, a displayed image for establishing matrix parameters.

FIG. 63 shows, by way of example, a displayed image for establishing matrix parameters.

Figure 64:
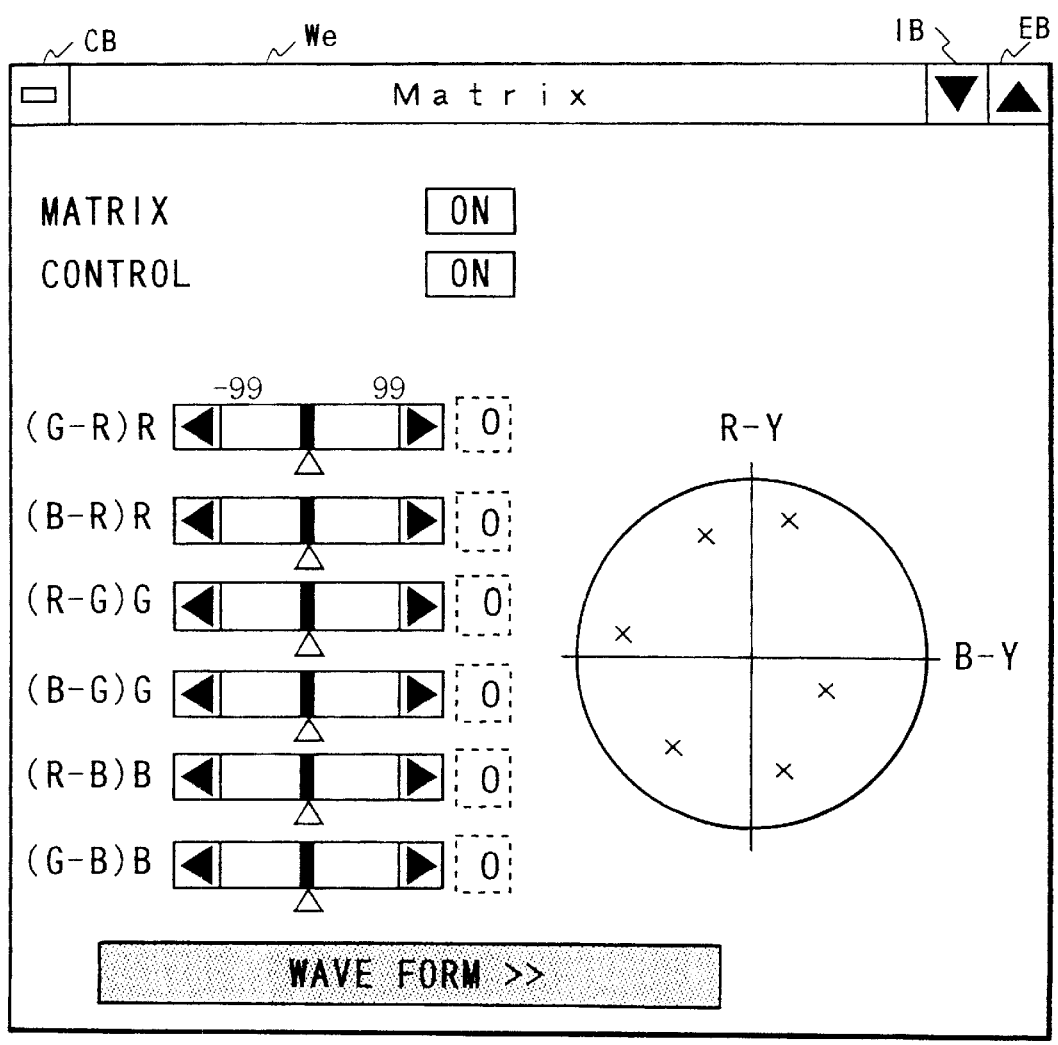
FIG. 64 is a view showing, by way of example, a displayed image for establishing matrix parameters, the displayed image including a displayed waveform.

FIG. 64 shows, by way of example, a displayed image for establishing matrix parameters, the displayed image including a displayed waveform.

Figures 65A, 65B:
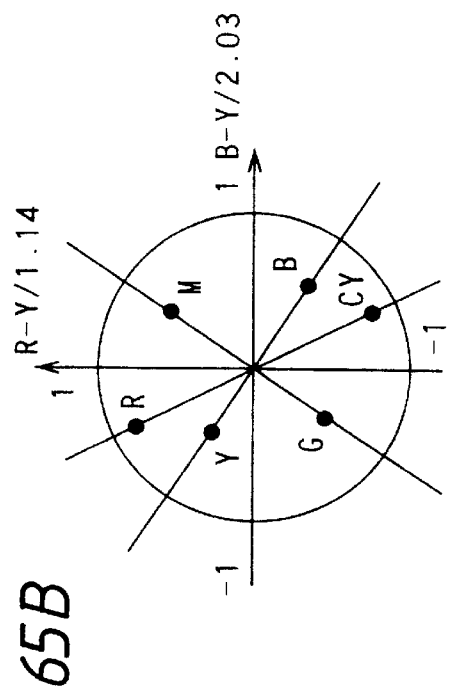
FIGS. 65A and 65B are diagrams illustrative of a matrix.

FIG. 65A is illustrative of a matrix.

When the title "MATRIX" is "OFF" and the title "CONTROL" is "OFF", a point ("x" in a waveform image) according to default settings (with no corrective coefficient) determined by equations of luminance Y, color differences R-Y, B-Y is displayed.

When the title "MATRIX" is "OFF" and the title "CONTROL" is "ON", a point determined by adding a value ranging from "a" to "f" to default settings, determining R', G', B', and substituting the determined R', G', B' in Y, R-Y B-Y is displayed.

When the title "MATRIX" is "ON" and the title "CONTROL" is "OFF", a point determined by determining R', G', B' with a coefficient given as a hardware default setting and substituting the determined R', G', B' in Y, R-Y, B-Y is displayed.

When the title "MATRIX" is "ON" and the title "CONTROL" is "ON", a point determined by adding a value ranging from "a" to "f" to a coefficient given as a hardware default setting and substituting the determined R', G', B' in Y, R-Y, B-Y is displayed.

Y=0.587G+0.299R+0.114B

R-Y=−0.587G+0.701R−0.114B

B-Y=−0.587G−0.299R+0.886B

R'=R+a(G−R)+b(B−R)

G'=G+c(R−G)+d(B−G)

B'=B+e(R−B)+f(G−B)

a=value of(G−R)R b=value of (B−R)R c=value of (R−G)G
d=value of (B−G)G
e=value of (R−B)B
f=value of (G−B)B A coefficient ranging from "a" to "f" is established, R', G', B, are determined, and the determined R', G', B' are substituted in Y, R-Y, B-Y, to thereby determine a point on vector.

Display points are displayed in six colors, given below, except gray and black, of the 8 colors of the color bar. R, G, B (R', G', B' if "a"~"f" are added) are substituted in the equations of Y, R-Y, B-Y to calculate values of R-Y, B-Y, and points are displayed on vector.

Yellow (Y), Cyan (CY), Green (G), Magenta (M), Red (R), and Blue (B).

For vector display, R-Y/1.14 and B-Y/2.03 are used as R-Y and B-Y, respectively.

FIG. 65B illustrates a matrix as it is turned off.

Figure 66A:
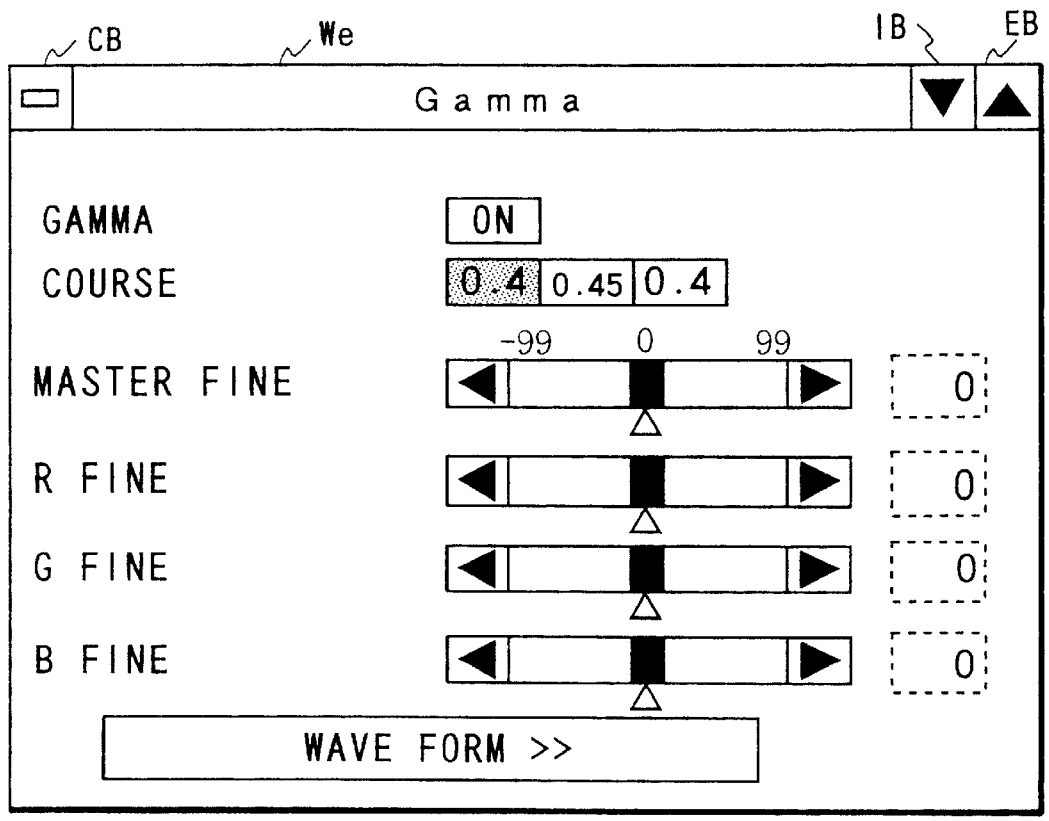
FIG. 66A is a view showing, by way of example, a displayed image for establishing gamma parameters.

FIG. 66A shows, by way of example, a displayed image for establishing gamma parameters.

In FIG. 66A, the switch "COURSE" is used to select a gamma curve. Adjustments made using the slide levers effect an addition to the selected gamma curve.

Figure 66B:
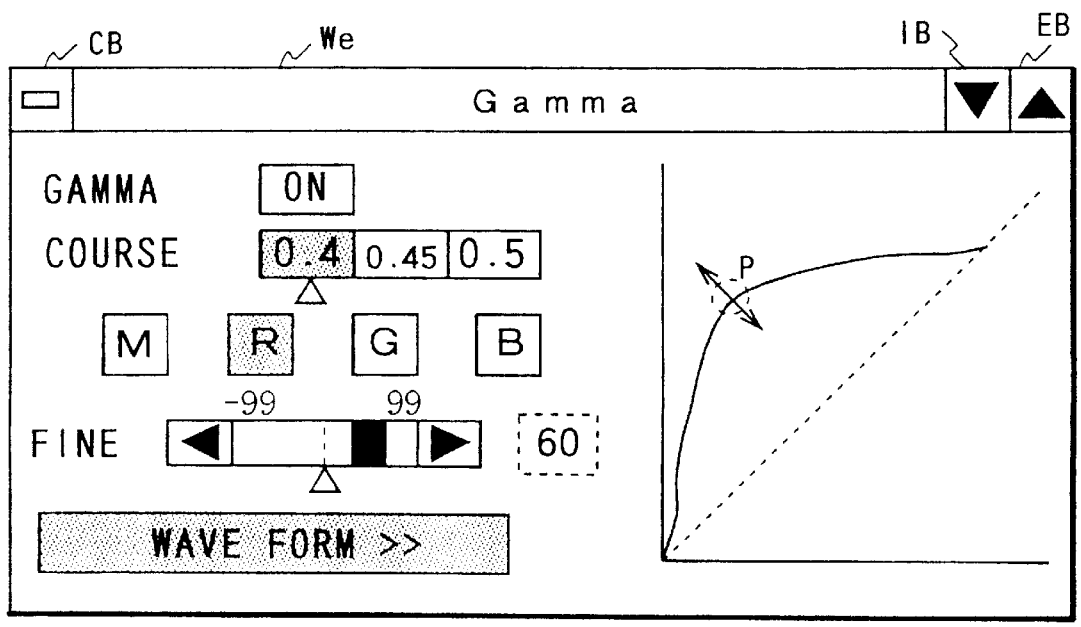
FIG. 66B is a view showing, by way of example, a displayed image for establishing gamma parameters, the displayed image including a displayed waveform.

FIG. 66B shows, by way of example, a displayed image for establishing gamma parameters, the displayed image including a displayed waveform.

In FIG. 66B, the switch "COURSE" is used to select a gamma curve. When the button "GAMMA" is "OFF", the waveform image is displayed as a linear line. The point P moves perpendicularly to the curve.

Figure 67A:
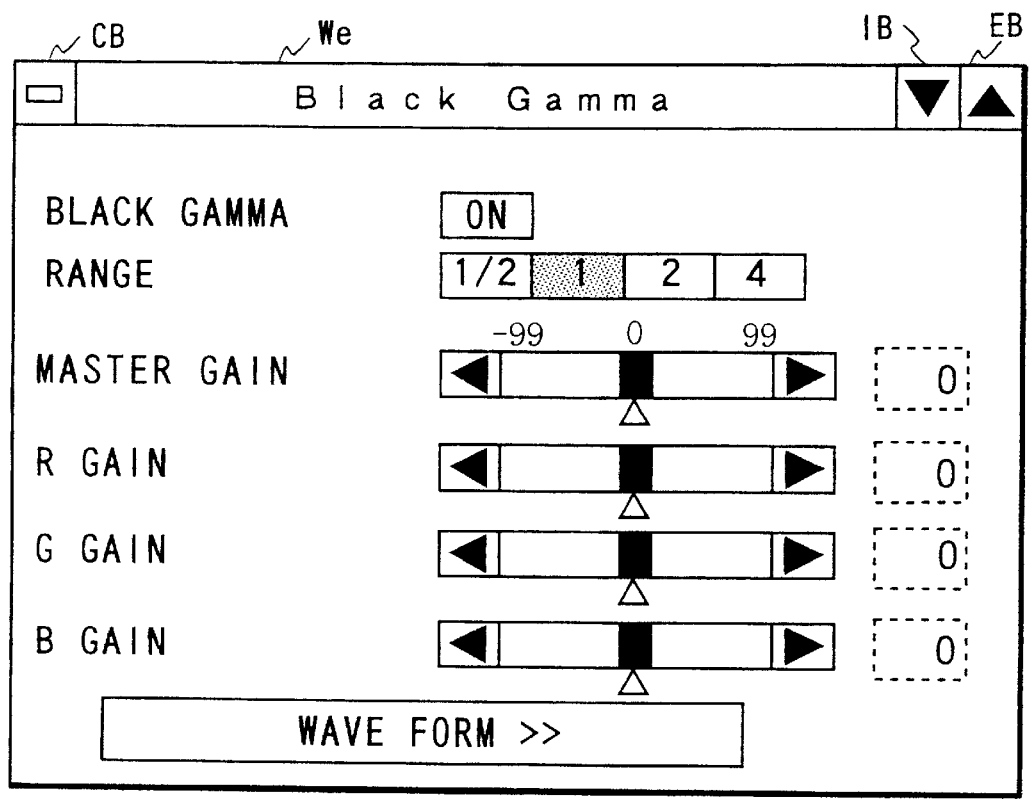
FIG. 67A is a view showing, by way of example, a displayed image for establishing black gamma parameters.

FIG. 67A shows, by way of example, a displayed image for establishing black gamma parameters.

Figure 67B:
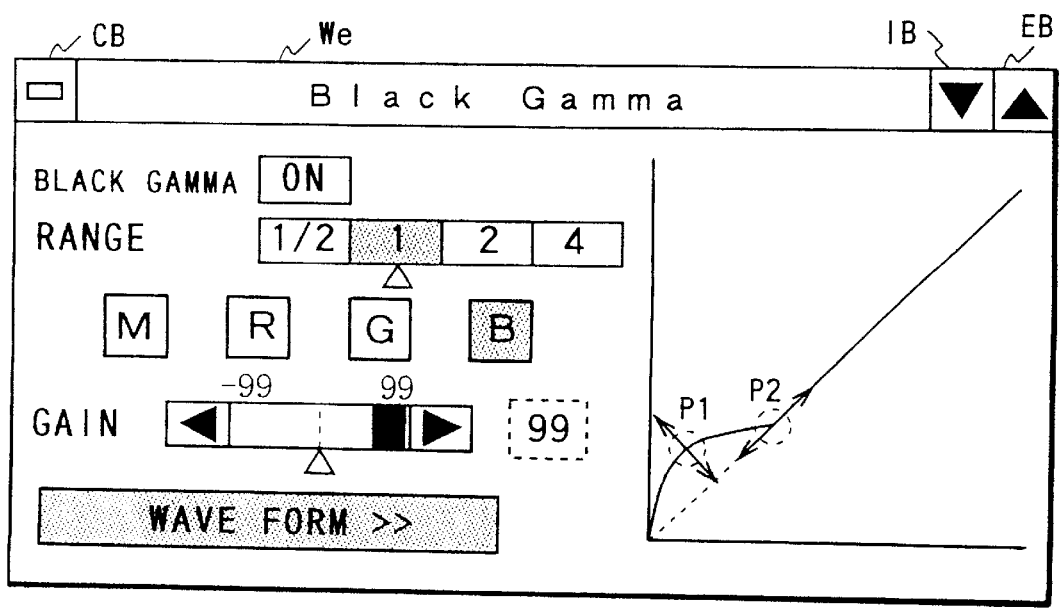
FIG. 67B is a view showing, by way of example, a displayed image for establishing black gamma parameters, the displayed image including a displayed waveform.

FIG. 67B shows, by way of example, a displayed image for establishing black gamma parameters, the displayed image including a displayed waveform.

Figure 68:
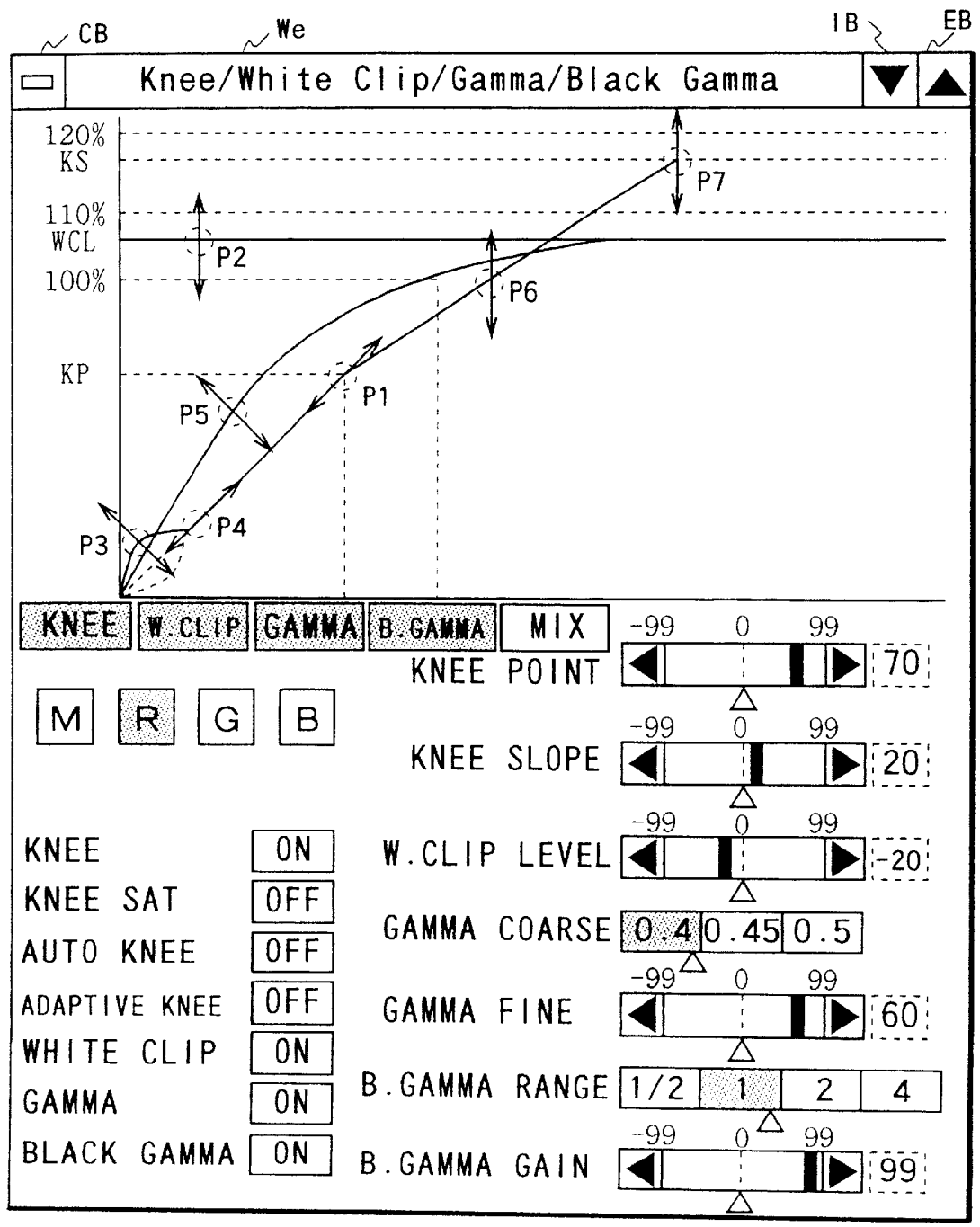
FIG. 68 is a view showing, by way of example, a displayed image for establishing knee, white clip, gamma, black gamma parameters, the displayed image including a displayed waveform.

FIG. 68 shows, by way of example, a displayed image for establishing knee, white clip, gamma, black gamma parameters, the displayed image including a displayed waveform.

The buttons M, R, G, B are used to select signals with respect to which settings are to be made.

When the parameter "MIX" is selected, the waveform image is displayed together with functions corresponding to titles displayed on the left-hand side.

Figure 69:
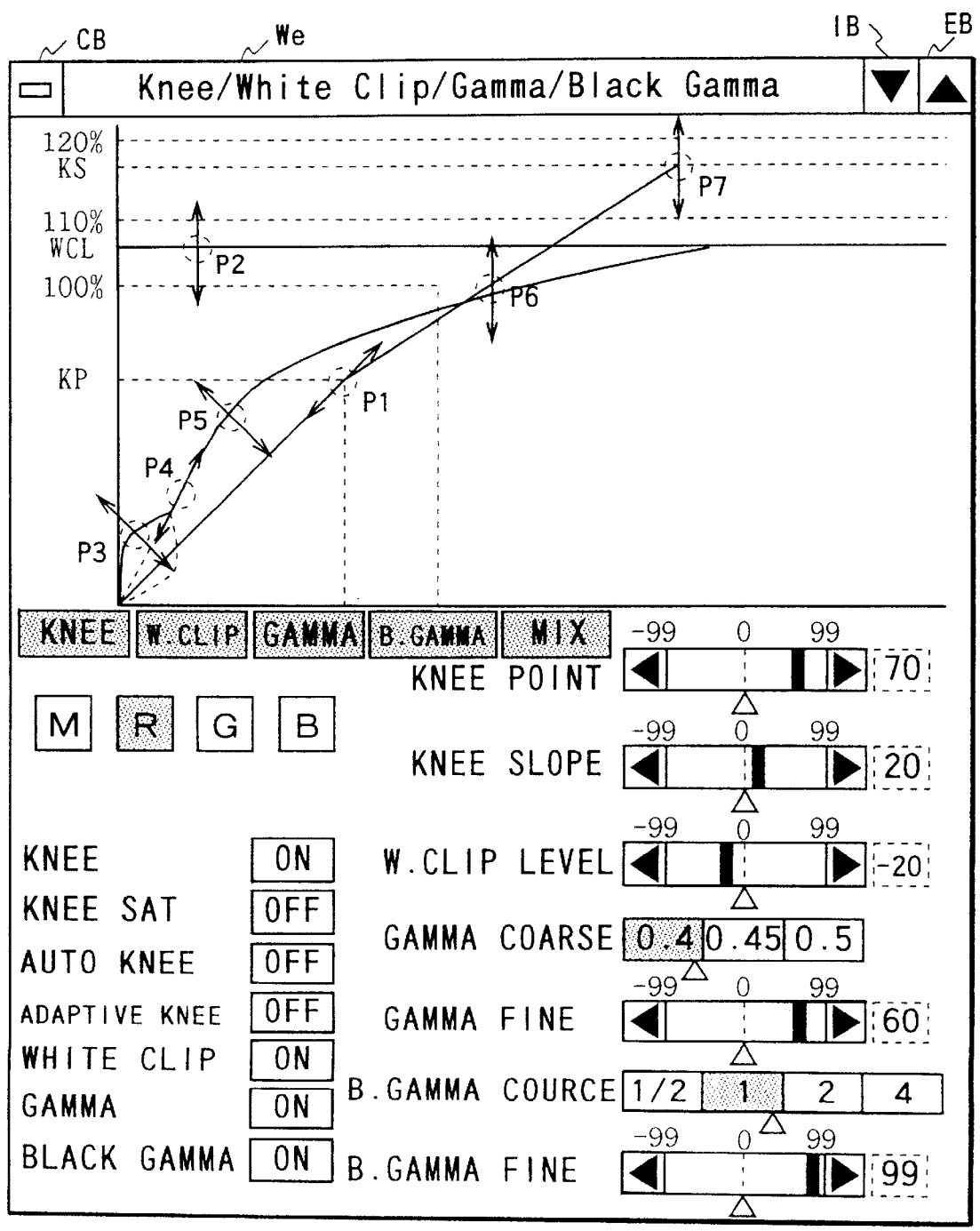
FIG. 69 is a view showing, by way of example, a displayed image for establishing knee, white clip, gamma, black gamma parameters, the displayed image including a displayed waveform.

FIG. 69 shows, by way of example, a displayed image for establishing knee, white clip, gamma, black gamma parameters, the displayed image including a displayed waveform. The displayed image shown in FIG. 69 is the same as the displayed image shown in FIG. 68.

Figure 70:
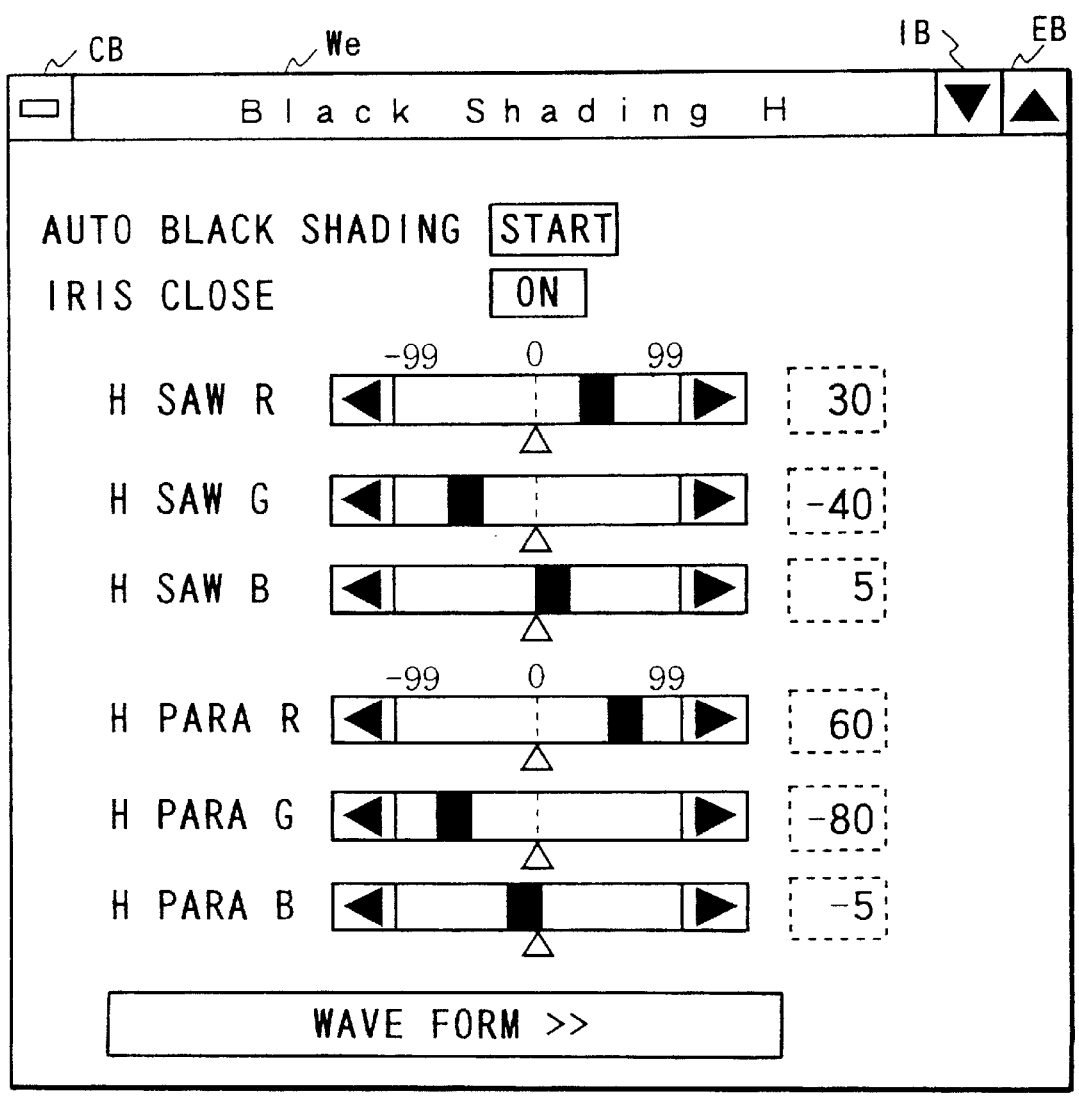
FIG. 70 is a view showing, by way of example, a displayed image for establishing black shading H parameters.

FIG. 70 shows, by way of example, a displayed image for establishing black shading H parameters.

The button "AUTO BLACK SHADING" is used in the same manner as with the automatic setup process.

Figure 71:
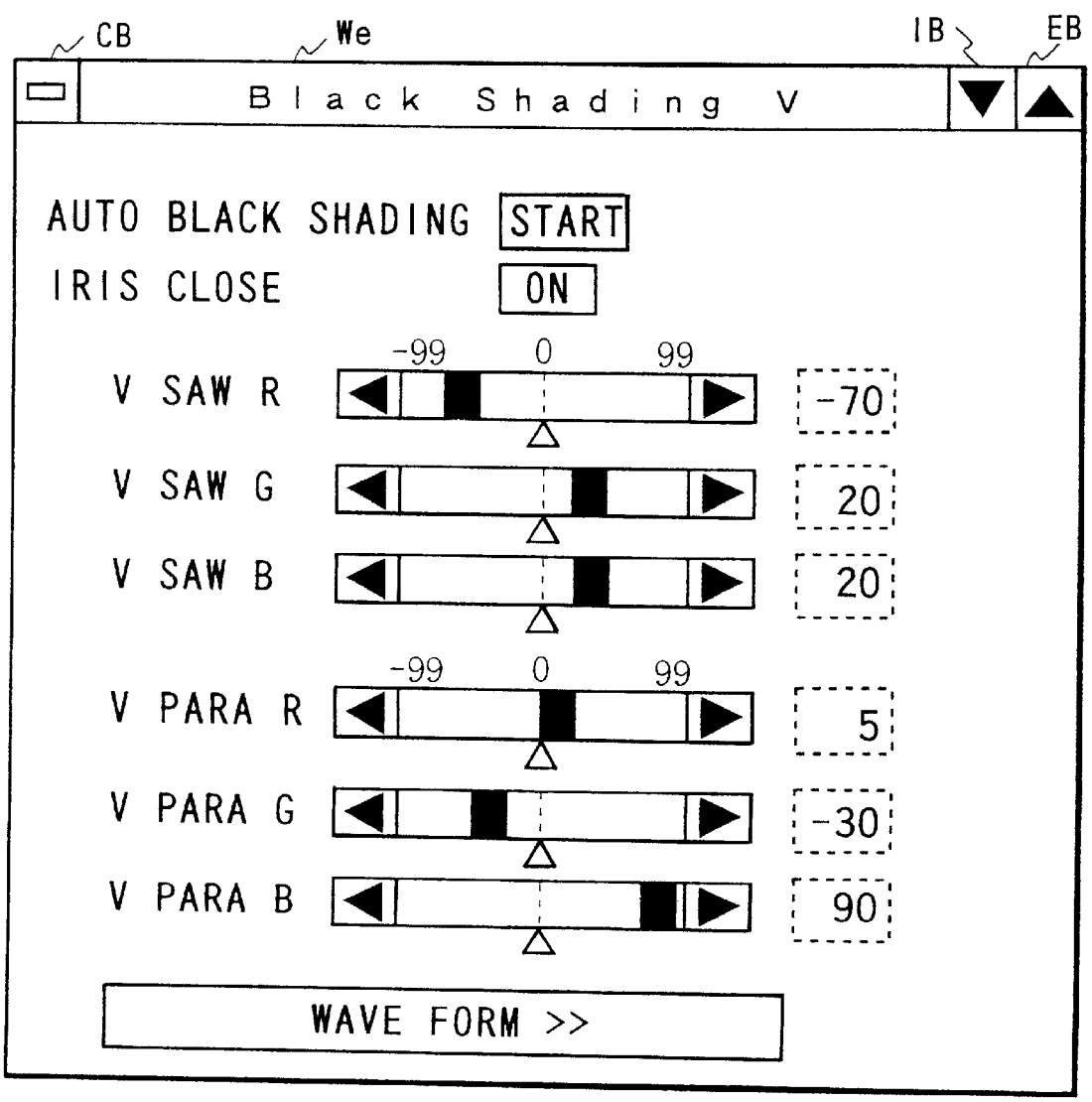
FIG. 71 is a view showing, by way of example, a displayed image for establishing black shading V parameters.

FIG. 71 shows, by way of example, a displayed image for establishing black shading V parameters.

Figure 72:
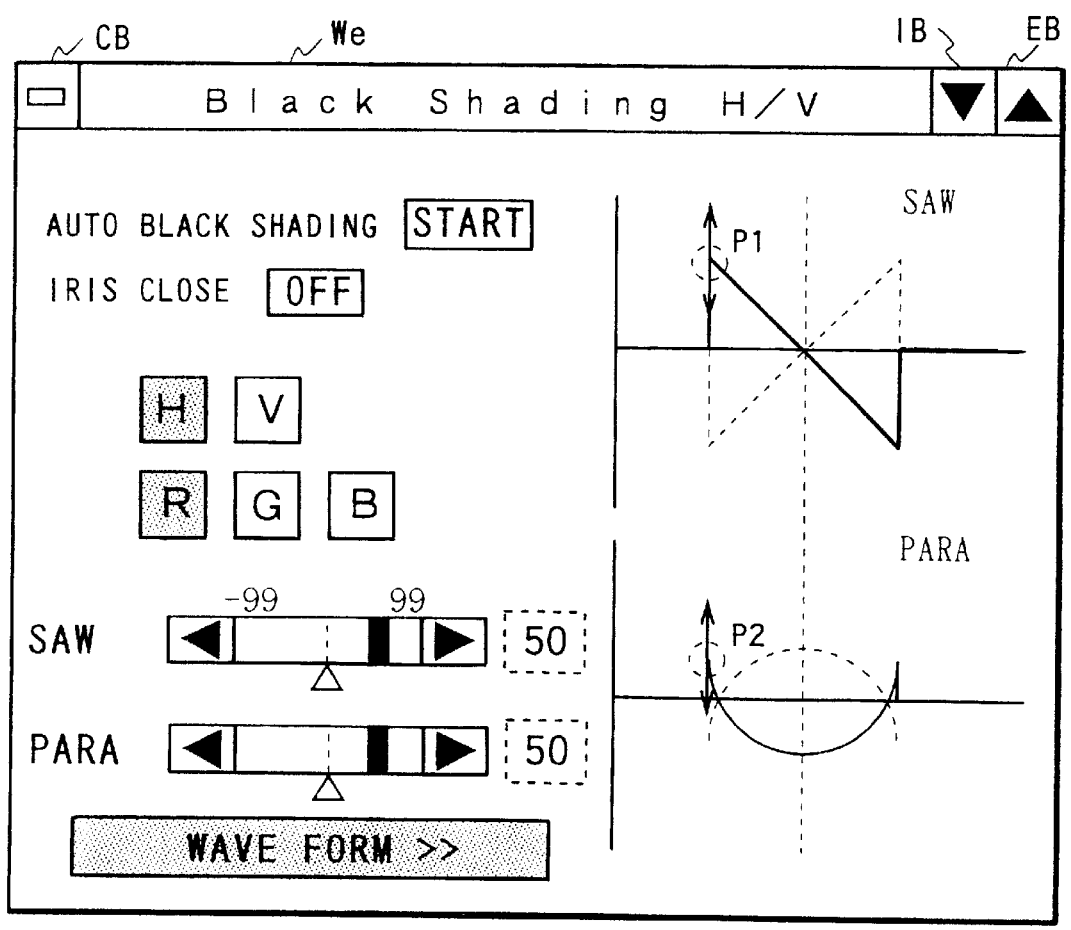
FIG. 72 is a view showing, by way of example, a displayed image for establishing black shading H/V parameters, the displayed image including displayed waveforms.

FIG. 72 shows, by way of example, a displayed image for establishing black shading H/V parameters, the displayed image including displayed waveforms.

The buttons "H", "V", "R", "G", "B" are used to select items with respect to which settings are to be made.

Figure 73:
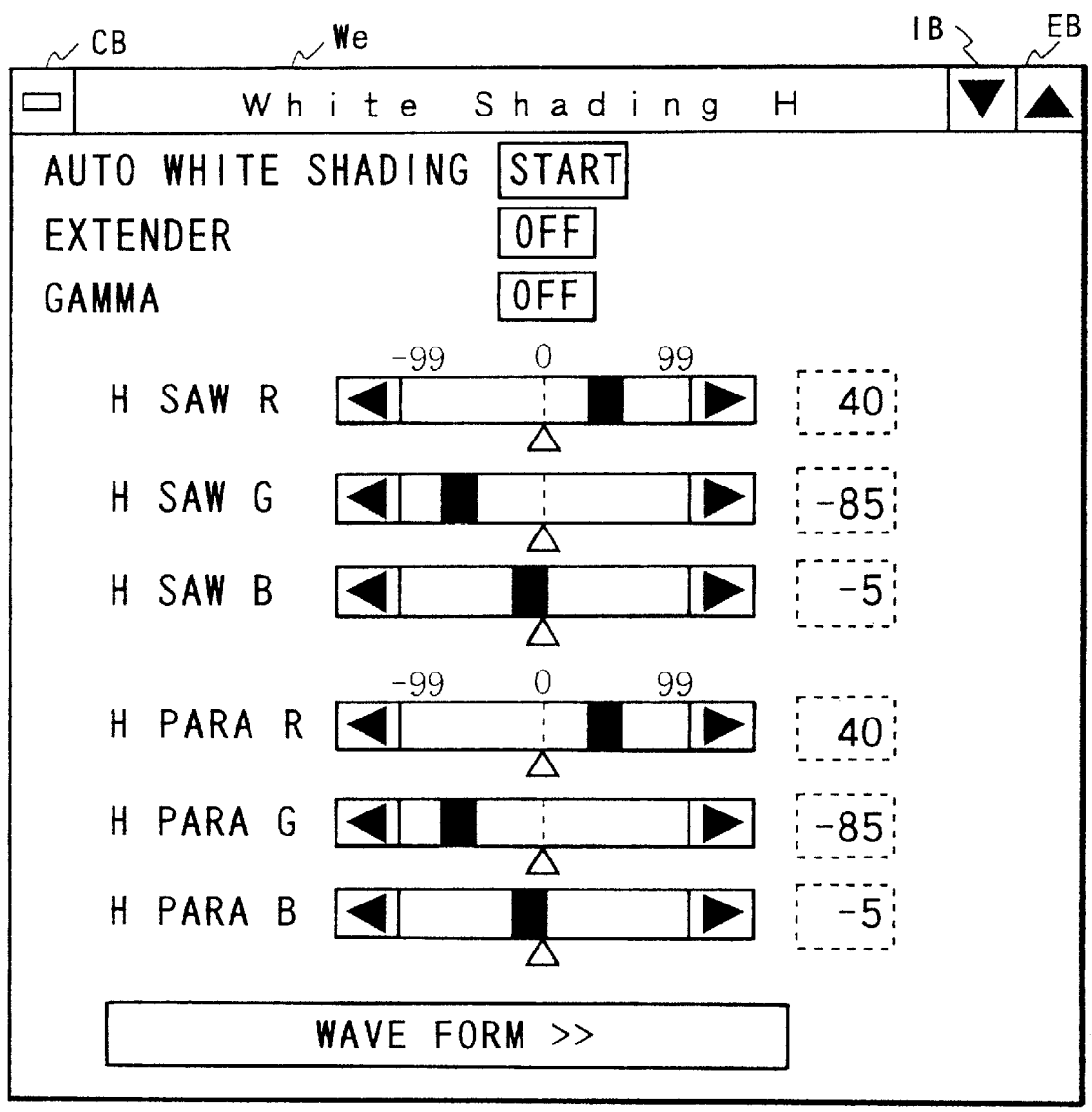
FIG. 73 is a view showing, by way of example, a displayed image for establishing white shading H parameters.

FIG. 73 shows, by way of example, a displayed image for establishing white shading H parameters.

The button "EXTENDER" is used to indicate whether information from the lens system is obtained or not, and not to establish settings.

Figure 74:
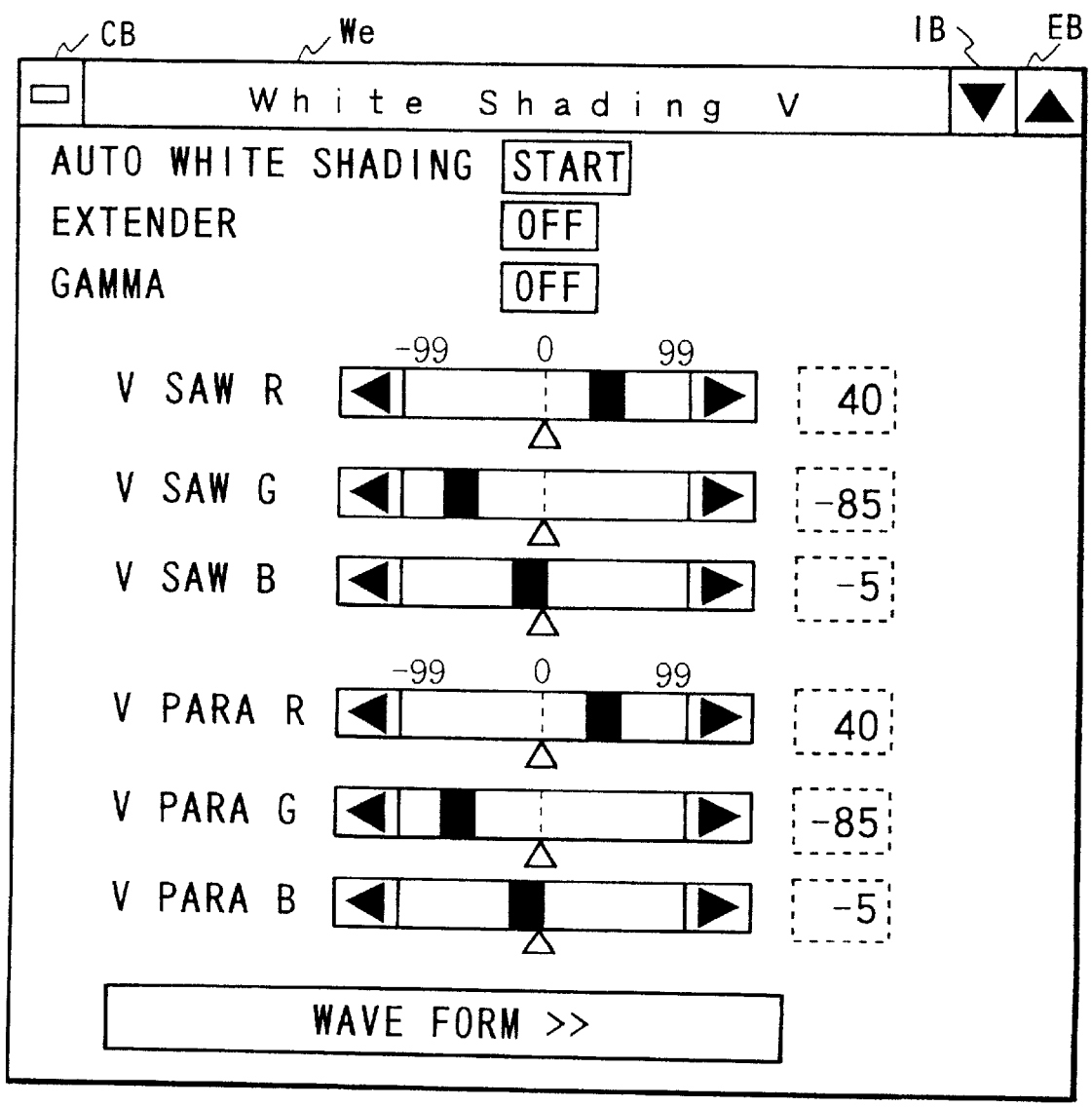
FIG. 74 is a view showing, by way of example, a displayed image for establishing white shading V parameters.

FIG. 74 shows, by way of example, a displayed image for establishing white shading V parameters.

Figure 75:
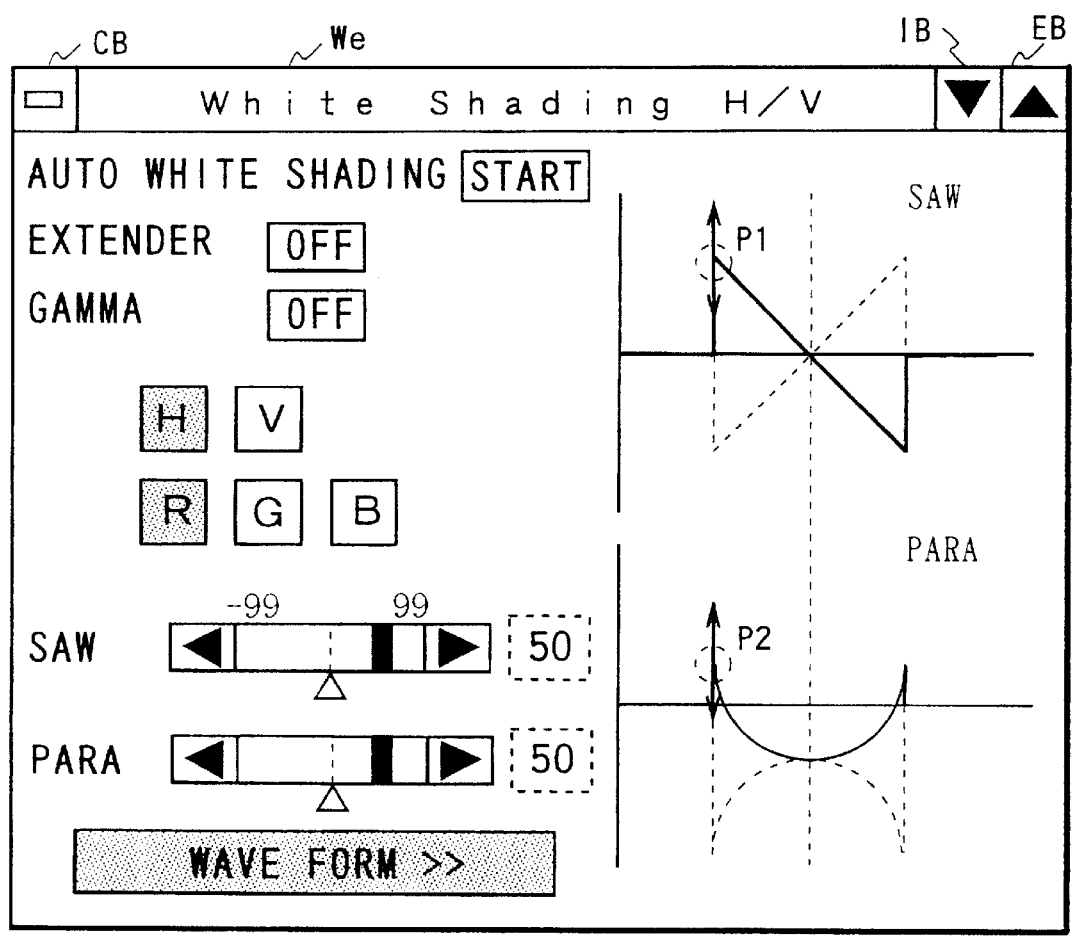
FIG. 75 is a view showing, by way of example, a displayed image for establishing white shading H/V parameters, the displayed image including displayed waveforms.

FIG. 75 shows, by way of example, a displayed image for establishing white shading H/V parameters, the displayed image including displayed waveforms.

The button "EXTENDER" is used to display a status only.

Figure 76A:
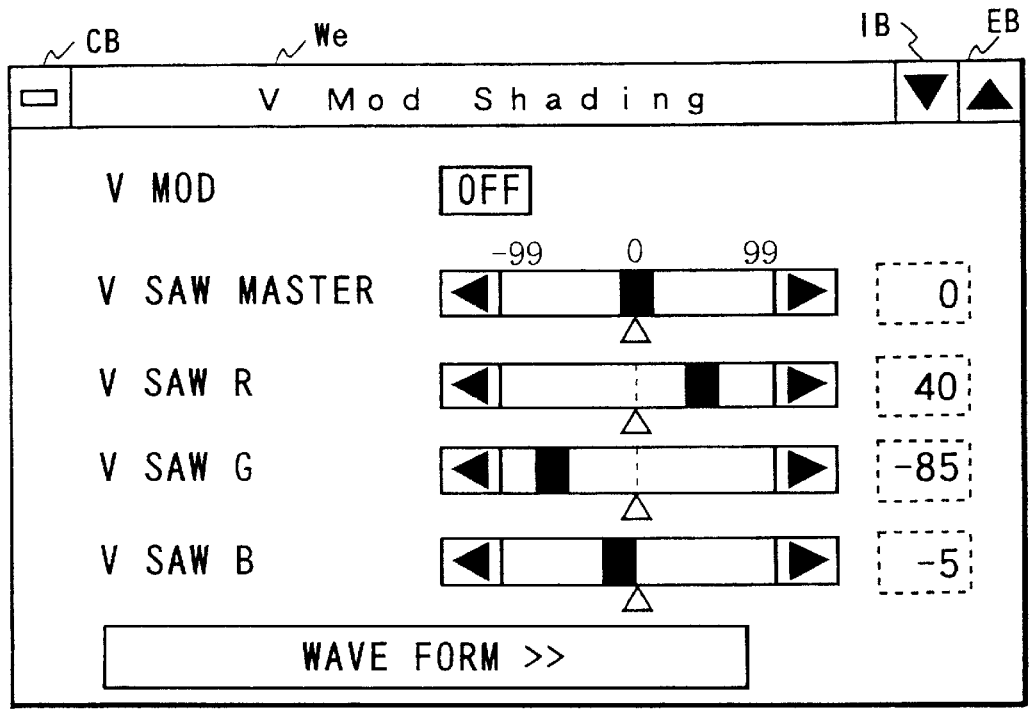
FIG. 76A is a view showing, by way of example, a displayed image for establishing V modulation shading parameters.

FIG. 76A shows, by way of example, a displayed image for establishing V modulation shading parameters.

Figure 76B:
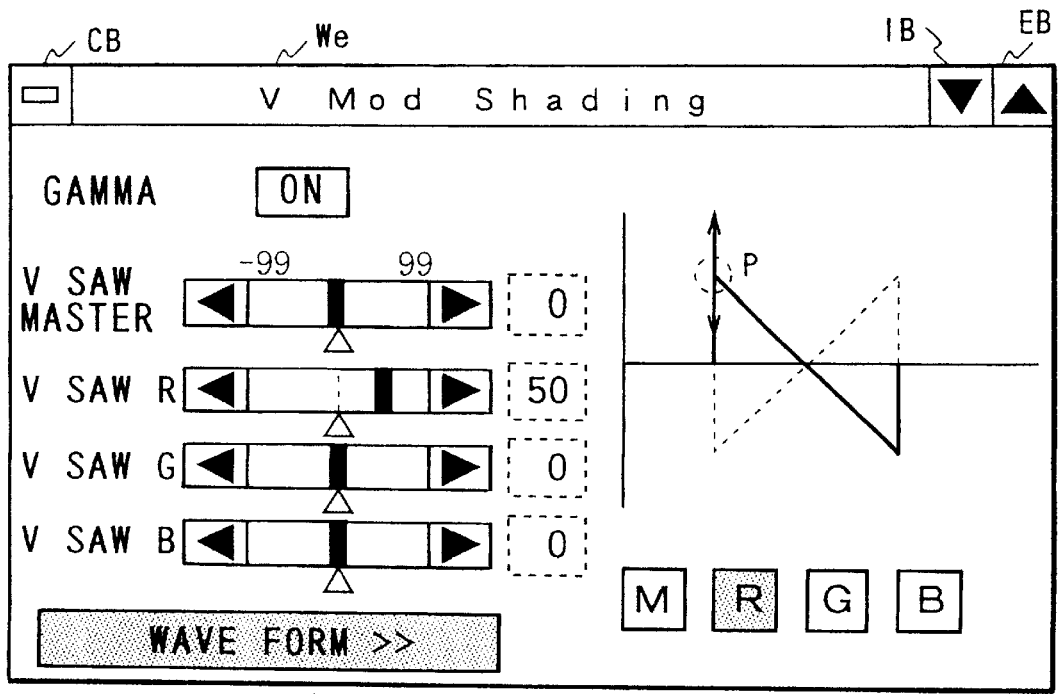
FIG. 76B is a view showing, by way of example, a displayed image for establishing V modulation shading parameters, the displayed image including displayed waveforms.

FIG. 76B shows, by way of example, a displayed image for establishing V modulation shading parameters, the displayed image including displayed waveforms.

The buttons "M", "R", "G", "B" are used to switch between displayed waveforms.

Figure 77A:
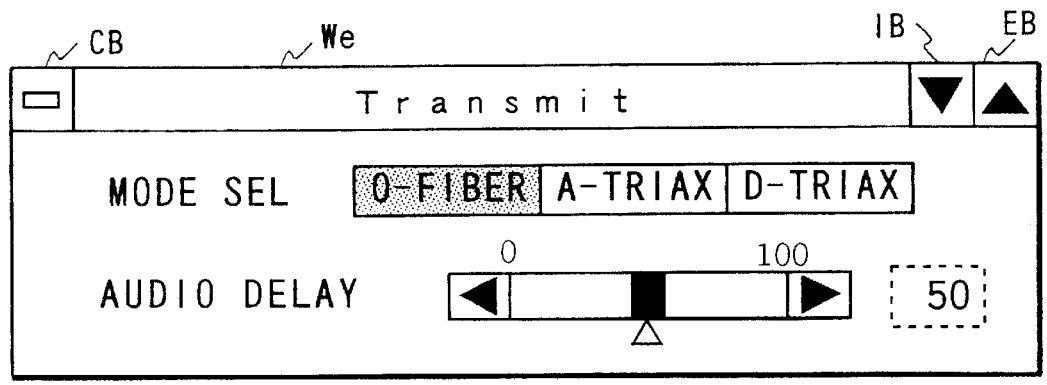
FIG. 77A is a view showing, by way of example, a displayed image for establishing transmit parameters.

FIG. 77A shows, by way of example, a displayed image for establishing transmit parameters.

Figure 77B:
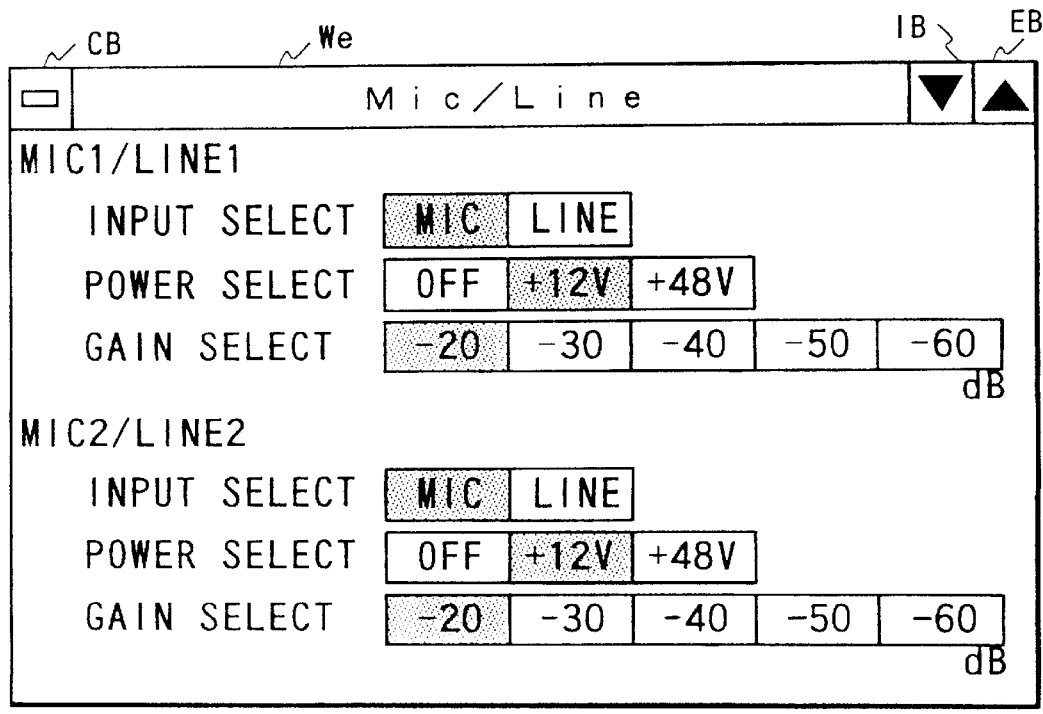
FIG. 77B is a view showing, by way of example, a displayed image for establishing mic/line parameters.

FIG. 77B shows, by way of example, a displayed image for establishing mic/line parameters.

Figure 78:
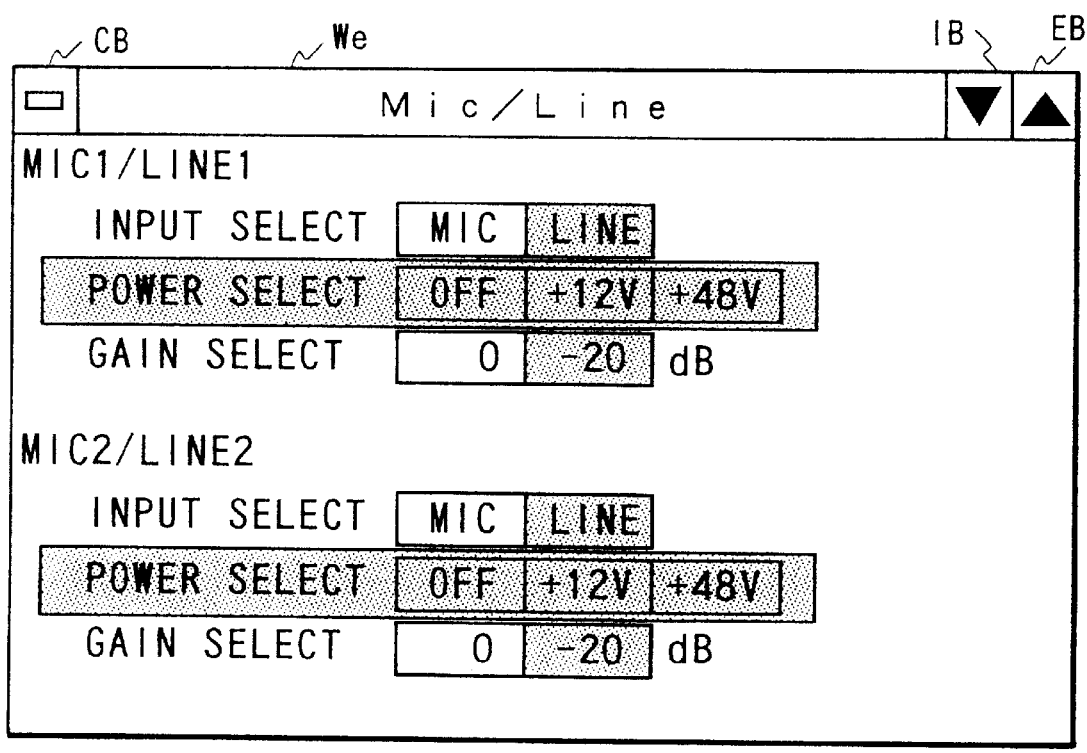
FIG. 78 is a view showing, by way of example, a displayed image for establishing mic/line parameters.

FIG. 78 shows, by way of example, a displayed image for establishing mic/line parameters.

When "LINE" is selected at the parameter "INPUT SELECT", the parameter "POWER SELECT" is masked as shown because is it not used.

Figure 79:
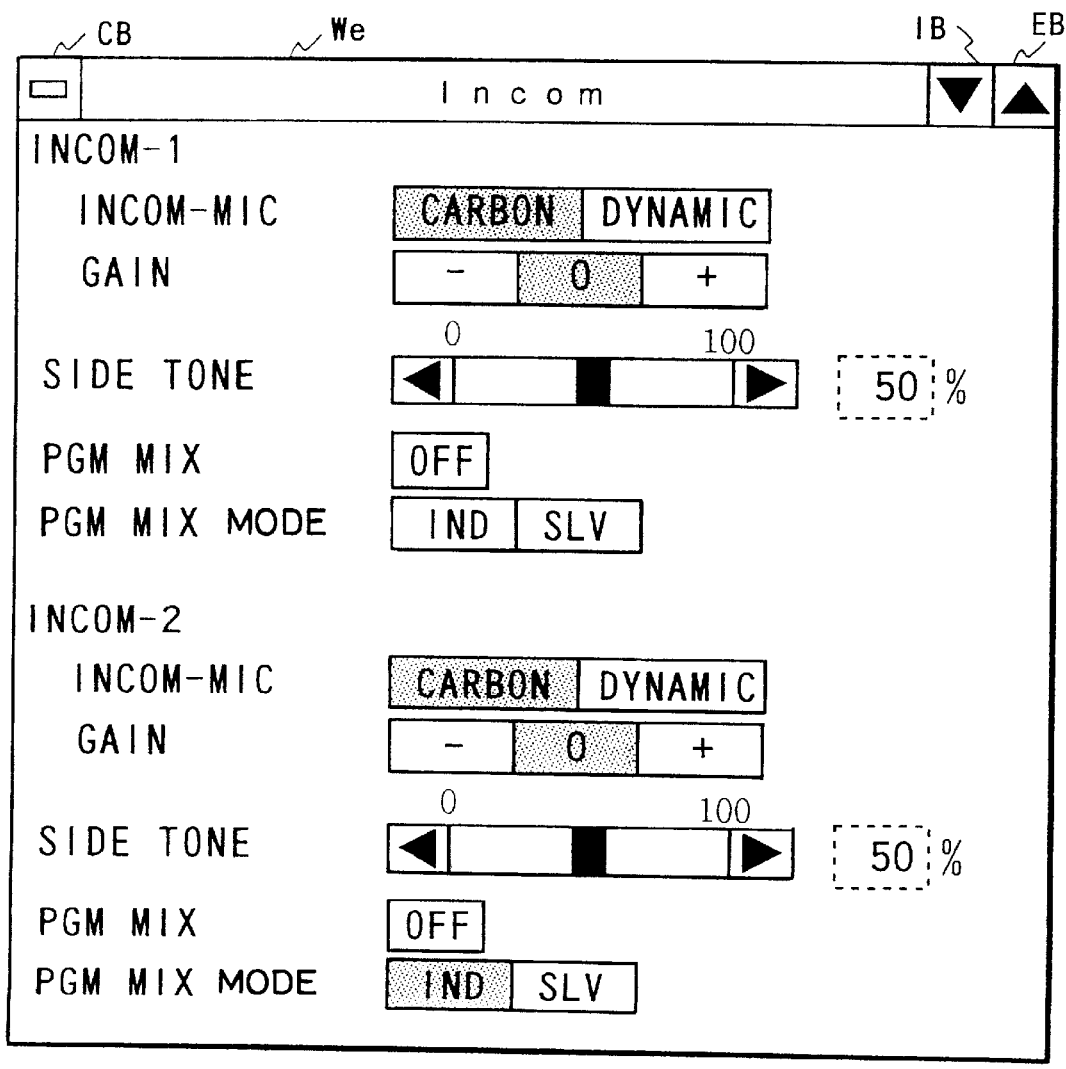
FIG. 79 is a view showing, by way of example, a displayed image for establishing incom parameters.

FIG. 79 shows, by way of example, a displayed image for establishing incom parameters.

Figure 80A:
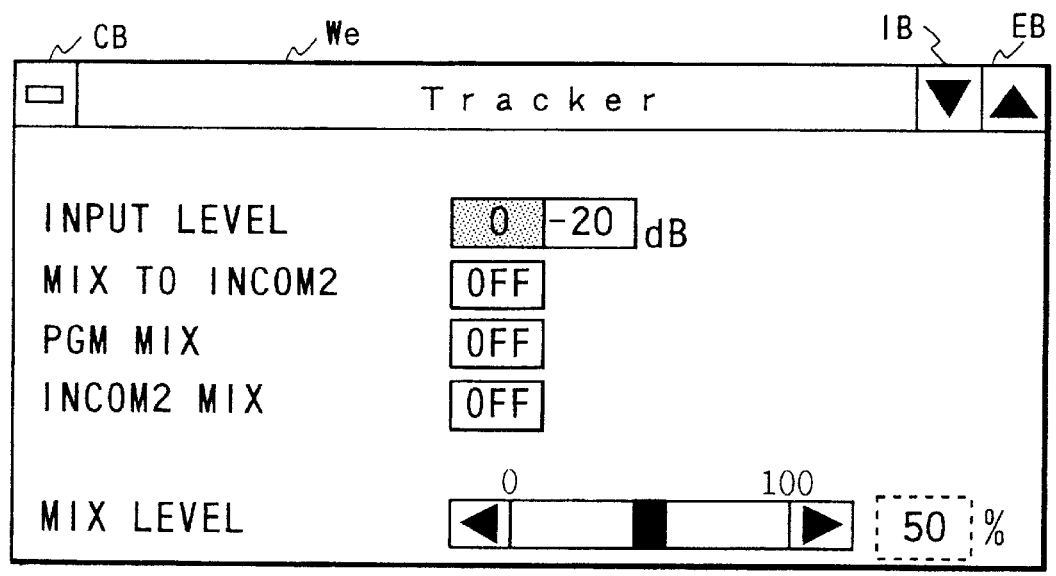
FIG. 80A is a view showing, by way of example, a displayed image for establishing tracker parameters.

FIG. 80A shows, by way of example, a displayed image for establishing tracker parameters.

Figure 80B:
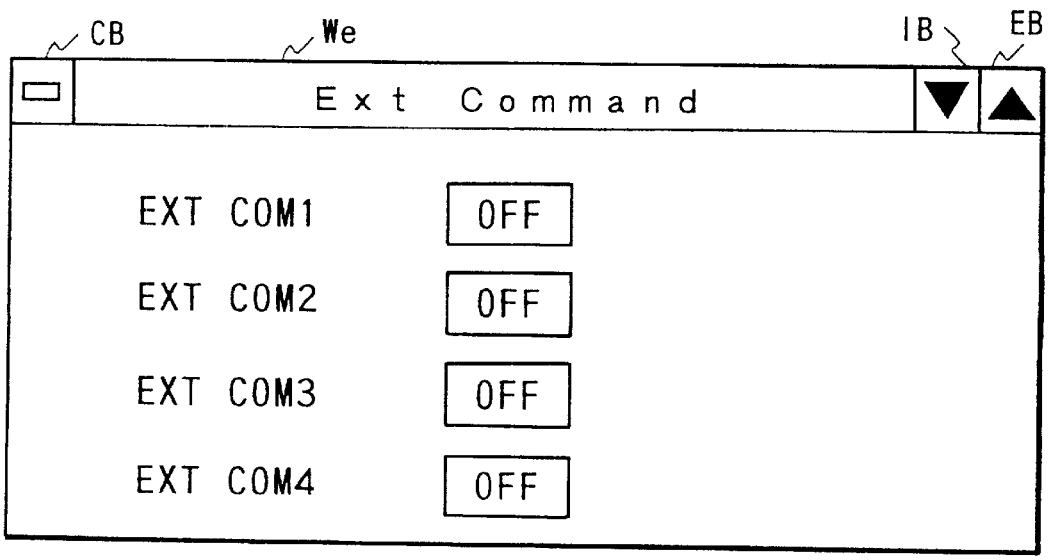
FIG. 80B is a view showing, by way of example, a displayed image for establishing external command parameters.

FIG. 80B shows, by way of example, a displayed image for establishing external command parameters.

Figure 81:
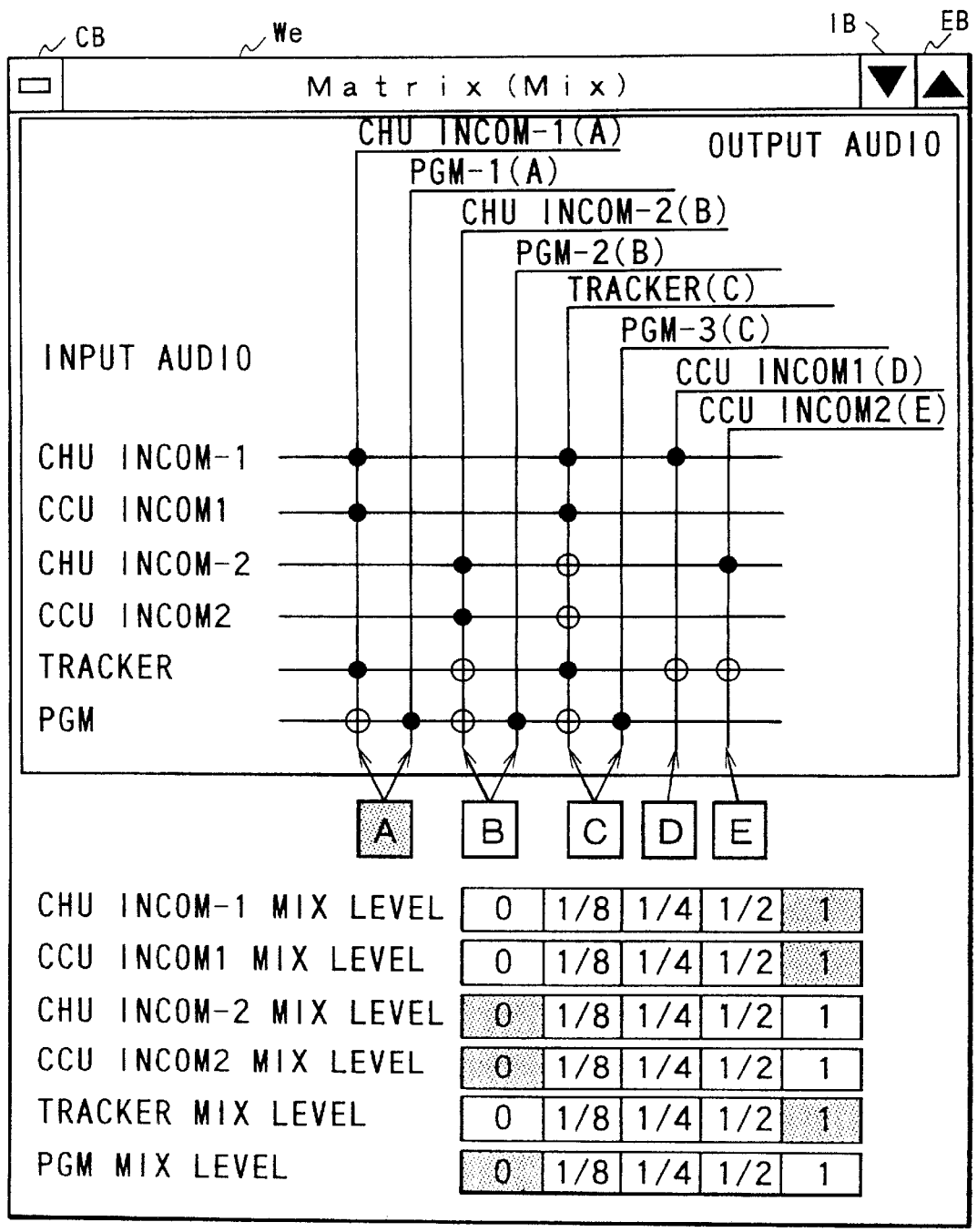
FIG. 81 is a view showing, by way of example, a displayed image for establishing NTSC matrix (mix) parameters, the displayed image including a displayed graph.

FIG. 81 shows, by way of example, a displayed image for establishing NTSC matrix (mix) parameters, the displayed image including a displayed graph.

In FIG. 81, the solid dots "●" represent mixed audio data and the blank dots "○" represent audio data that can be mixed but are not mixed at present. "INCOM-1", "INCOM-2", "INCOM1", "INCOM2", "TRACKER", "PGM" represent the same audio signals which are indicated by those reference characters used in the explanation of FIG. 29. The displayed menu "Matrix" indicates the same processing as that of the matrix circuit shown in FIG. 29. This matrix processing is controlled on the display screen of the computer 100 by the controller 580 shown in FIG. 28 based on the contents of settings made in parameter setting images shown in FIGS. 82 through 87.

The buttons "A"~"E" correspond to the alphabetic letters in parentheses at items displayed in the area "OUTPUT AUDIO", and are used to set mix levels. When an output system is selected, the buttons "A"~"E" select a mixing ratio with respect to the output system.

Switches "0" displayed in a lower area of the displayed image are selected for points where no audio signals are to be mixed. If the audio signal "PGM" is mixed with respect to the audio signals "PGM-1", "PGM-2", and "PGM-3", then the audio signal "PGM" is not mixed with respect to the audio signals "INCOM-1", "INCOM-2", and "TRACKER".

Figure 82:
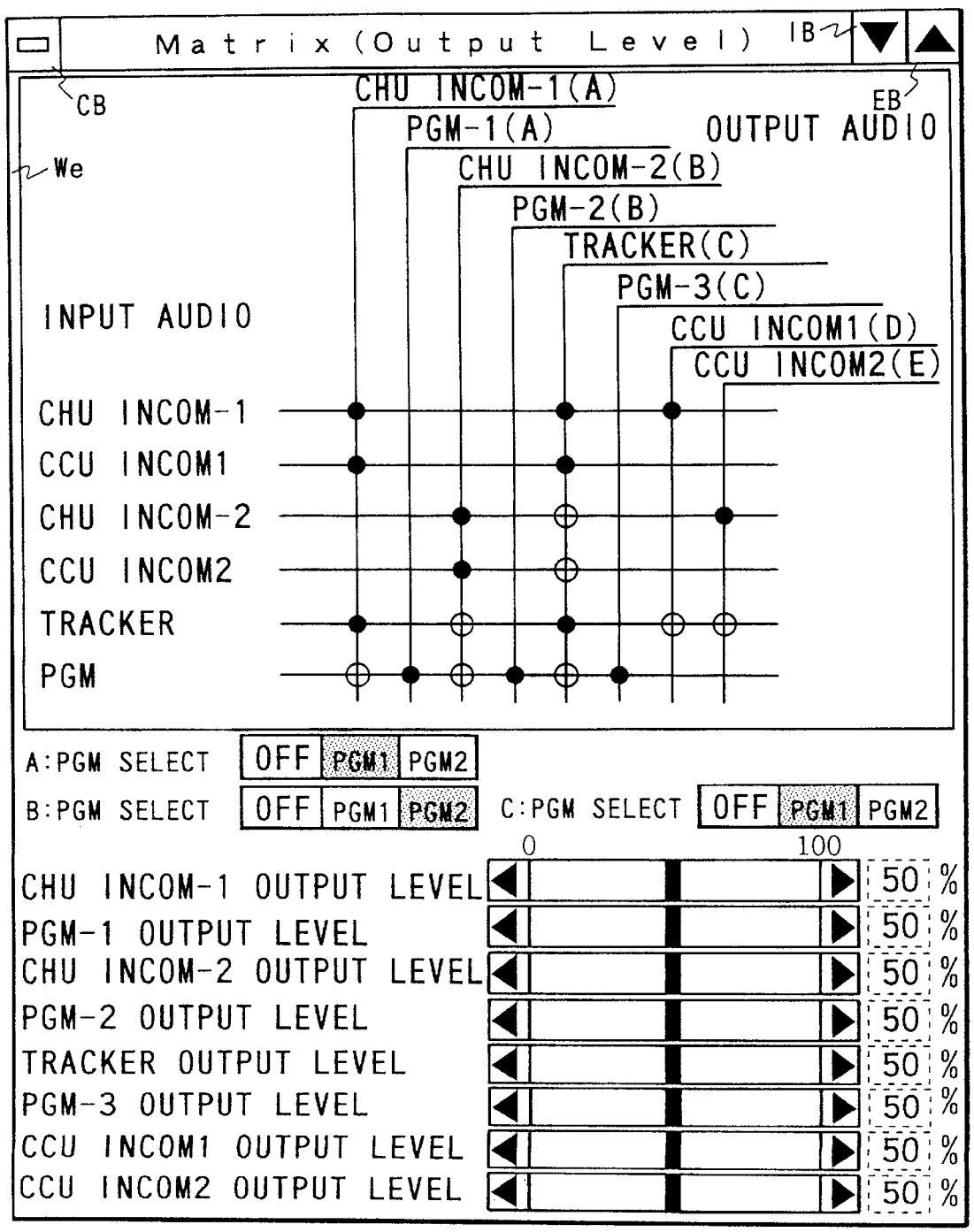
FIG. 82 is a view showing, by way of example, a displayed image for establishing NTSC matrix (mix) parameters, the displayed image including a displayed graph.

FIG. 82 shows, by way of example, a displayed image for establishing NTSC matrix (mix) parameters, the displayed image including a displayed graph.

In FIG. 82, if one of the audio signals PGM is mixed, then the other audio signal PGM is not mixed in the displayed waveform image.

The switches "A:PGM SELECT", "B:PGM SELECT", "C:PGM SELECT" are used to select the type of audio signals PGM to be mixed.

The slide levers displayed below the above switches are used to set respective output levels of the signals.

Figure 83:
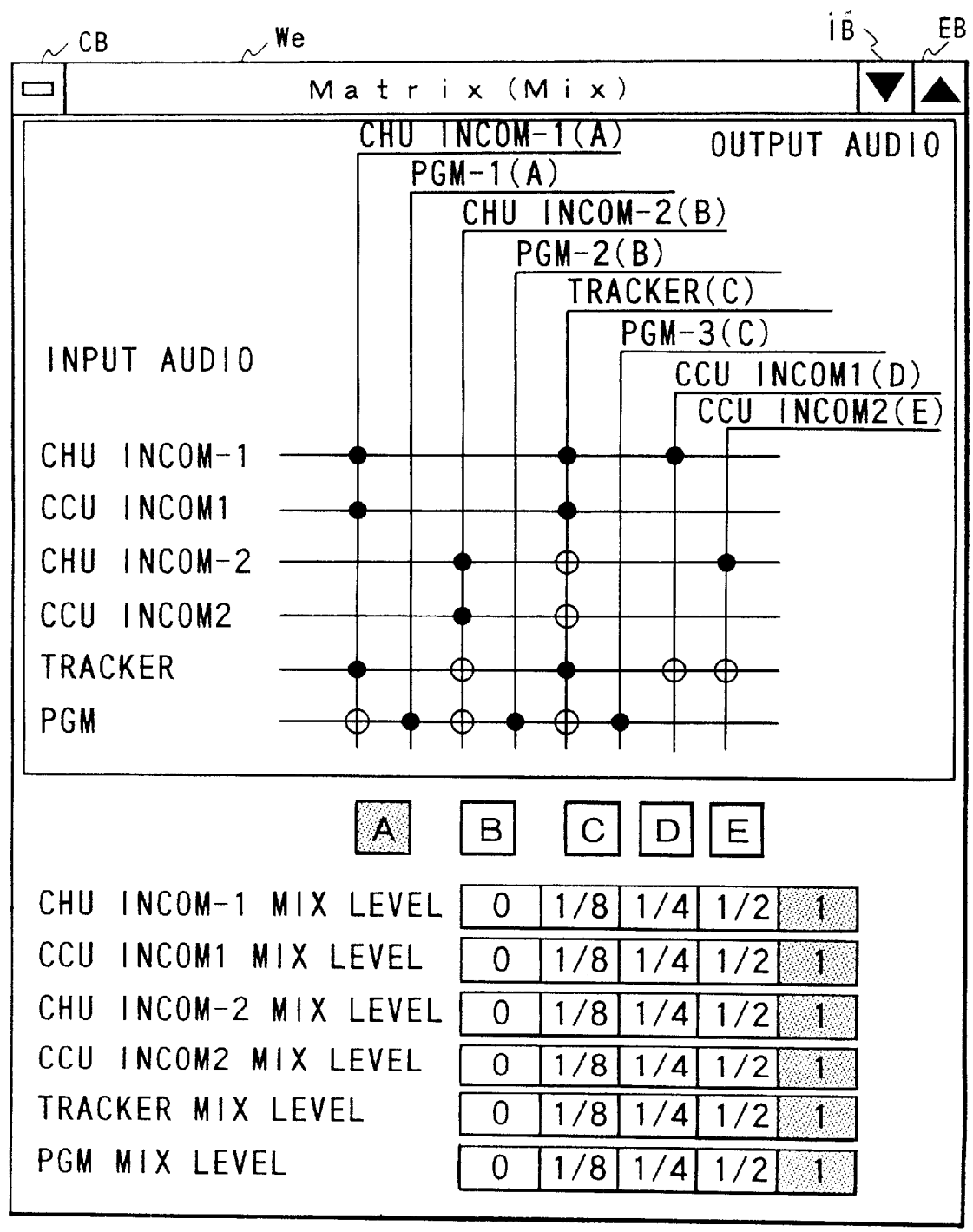
FIG. 83 is a view showing, by way of example, a displayed image for establishing PAL matrix (mix) parameters, the displayed image including a displayed graph.

FIG. 83 shows, by way of example, a displayed image for establishing PAL matrix (mix) parameters, the displayed image including a displayed graph.

Figure 84:
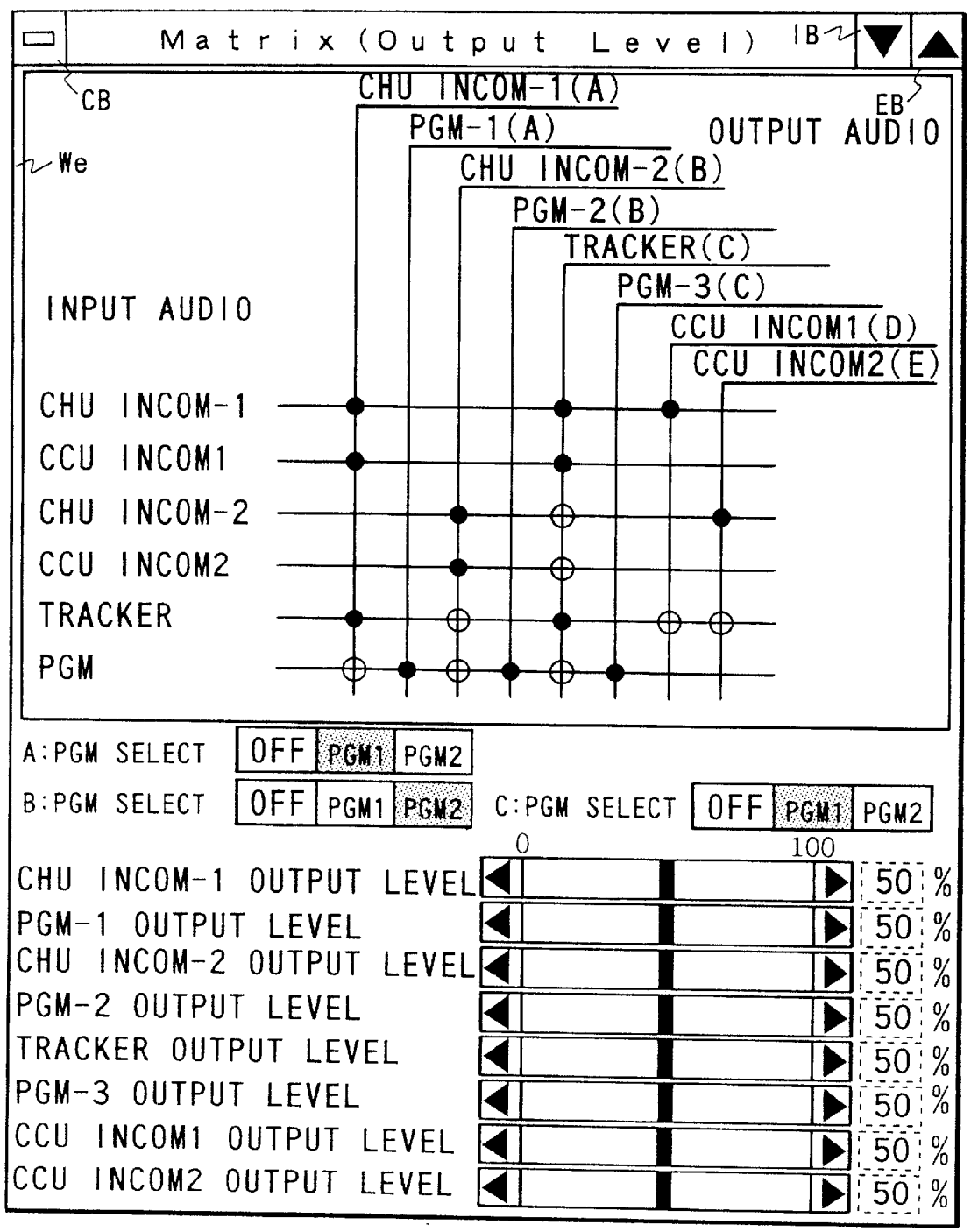
FIG. 84 is a view showing, by way of example, a displayed image for establishing PAL matrix (mix) parameters, the displayed image including a displayed graph.

FIG. 84 shows, by way of example, a displayed image for establishing PAL matrix (mix) parameters, the displayed image including a displayed graph.

Figure 85:
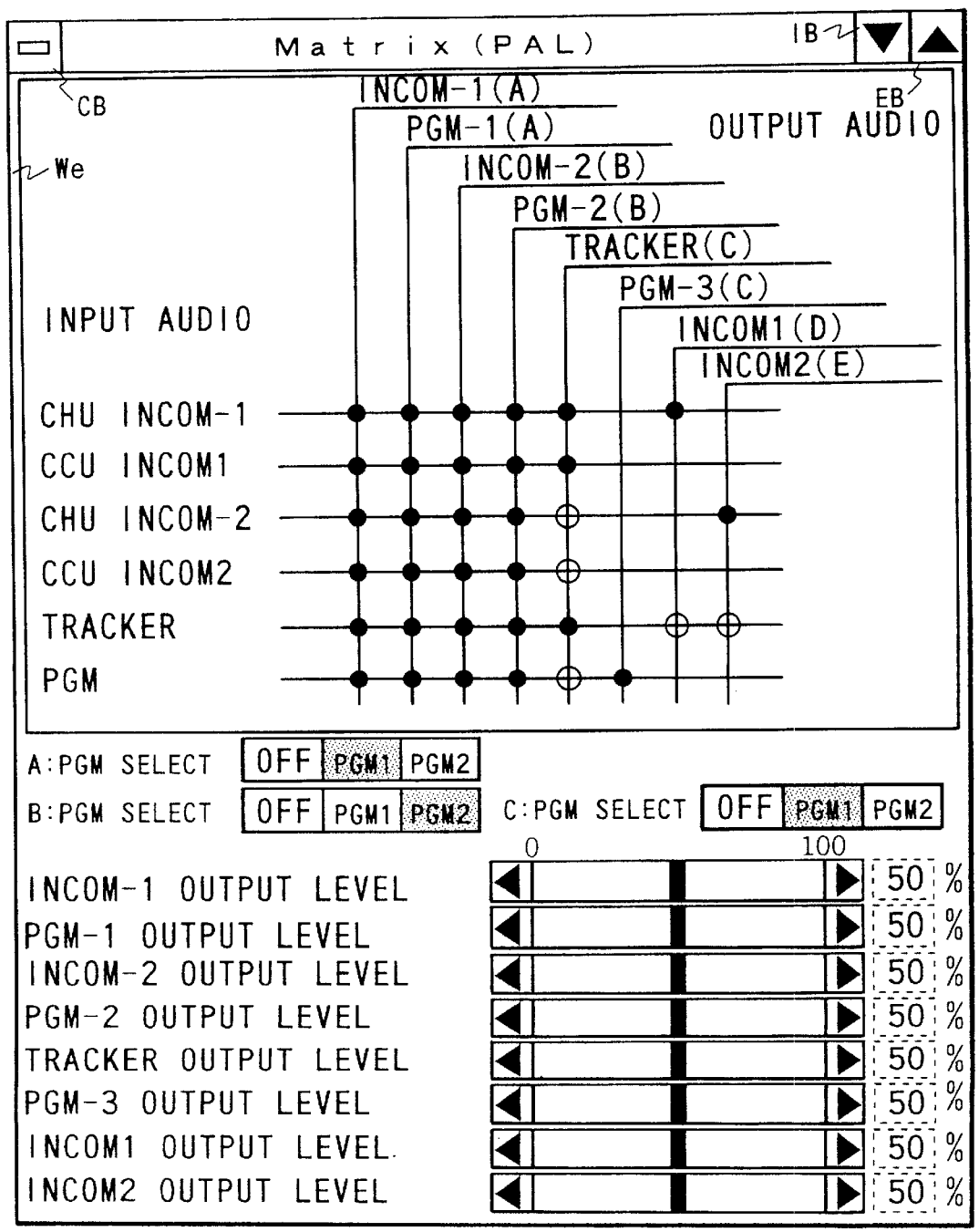
FIG. 85 is a view showing, by way of example, a displayed image for establishing PAL matrix (mix) parameters, the displayed image including a displayed graph.

FIG. 85 shows, by way of example, a displayed image for establishing PAL matrix (mix) parameters, the displayed image including a displayed graph.

FIGS. 86A through 86E show, by way of example, displayed images for processing memory accesses.

The displayed images represent items necessary to directly establish data with respect to LSI ports and memories of the cameras and CCUs, and extract data for checking. These items are present as an application separate from the application for setting parameters.

The data that can be established include data for LSI ports, data for I/O ports, data for servicing EEPROMs, data for gamma tables, and data for indicated memories.

FIG. 87 shows, by way of example, a displayed image for establishing LSI ports.

The established data are changed by rewriting addresses (numerical values on the left-hand side) directly with data. The data of those addresses which are associated with up/down buttons can continuously be varied between "00" and "FF" by the up/down buttons. The window image shown in FIG. 87 is present with respect to each of the LSI circuits.

According the present invention, as described above, since a camera or a CCU is set up using a graphical user interface, it can be set up efficiently, accurately, and reliably by the operator in an environment which enables the operator to control various setting operations easily.

In the above embodiment, the parameters are supplied from the computer 100 to the cameras and the CCUs. However, as can be seen from the displayed images shown in FIGS. 30A, 30B through 87 and the above embodiment, the parameter data may not be supplied directly to the cameras and the CCUs, but only parameter changes effected in parameter setting windows or the computer 100, i.e., only relative data, may be supplied to the cameras and the CCUs in view of responses of the cameras and the CCUs and changes in displayed images.

As described above, the display state of a parameter changing switch is changed depending on input information, the display state of a setting state display image is changed depending on input information, and a parameter is changed. The changed parameter or the parameter change is transmitted to the controlled device to set up the controlled device. Therefore, the controlled device can be set up highly efficiently, accurately, and reliably.

Furthermore, the display state of a parameter changing switch, the display state of a setting state display image, and the value of a parameter, which are displayed on the display unit, are changed depending on input information supplied from the input unit. The changed parameter or the parameter change is transmitted to the controlled device to set up the controlled device. Therefore, the controlled device can be set up highly efficiently, accurately, and reliably.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method of setting up an electronic device by transmitting parameters indicated by a controller to said electronic device positioned separate from said controller and not utilized to set said parameters to set up said electronic device, comprising the steps of:

(a) displaying on a display associated with said controller a parameter setting image depicting a plurality of parameters that can be established with respect to said electronic device;

(b) deciding whether input information has been entered into said controller while the parameter setting image is being displayed on said display associated with said controller;

(c) changing a portion of the parameter setting image displayed on said display associated with said controller which corresponds to input information if such input information is entered;

(d) establishing parameter data according to the input information; and (e) transmitting the established parameter data or a change in the parameter data to said electronic device positioned separate from said controller and not utilized to set said parameter data to change a parameter in said electronic device.

2. A method according to claim 1, wherein said parameter setting image includes a parameter changing switch image or a setting state display image which moves or changes in the parameter setting image depending on the input information, and wherein said step (c) comprises the step of changing the display state of said parameter changing switch image depending on the input information, and/or the step of changing the setting state display image depending on the input information.

3. A method according to claim 2, wherein said step (d) comprises the step of saving the established parameter data as a file, and said step (e) comprises the step of transmitting all the parameter data saved as the file to the controlled device to change the parameter in the controlled device.

4. A method according to claim 2, wherein said step (e) comprises the step of adding at least control device identification data indicative of the controlled device, control data indicative of a change in the parameter data, and parameter identification data indicative of the parameter, to the parameter data transmitted to the controlled device.

5. A method according to claim 4, further comprising the steps of:

receiving the data transmitted from said controller in the controlled device;

converting a communication protocol of the received data in the controlled device;

recognizing the parameter to be changed with the parameter identification data in the data whose communication protocol has been converted, in the controlled device; and changing the parameter in the controlled device based on the recognized parameter and the parameter data.

6. A method according to claim 2, wherein a data converter for converting a transmission format is disposed between the controller and the controlled device, further comprising the steps of:

receiving the data transmitted from the controller in the data converter;

converting a communication protocol of the received data in the data converter; and transmitting the data whose communication protocol has been converted, from the data converter to the controlled device.

7. A method according to claim 2, wherein the controlled device comprises a video camera having signal processing capabilities or a camera system comprising a camera device and a control unit.

8. A method of setting up an electronic device by transmitting parameters indicated by a controller to said electronic device positioned separate from said controller and not used to set parameters to set up said electronic device, comprising the steps of:

(a) displaying on a display associated with said controller a parameter setting image depicting a plurality of parameters that can be established with respect to said electronic device, said parameter setting image including a parameter changing switch image and/or a setting state display image whose display state changes depending on input information;

(b) deciding whether input information has been entered into said controller while the parameter setting image is being displayed on said display associated with said controller;

(c) changing the display state of said parameter changing switch image and/or said setting state display image displayed on said display associated with said controller which corresponds to input information if such input information is entered;

(d) establishing parameter data according to the input information;

(e) transmitting the established parameter data or a change in the parameter data from said controller to said electronic device positioned separate from said controller and not utilized to set said parameter data to change a parameter in said electronic device; and (f) changing the parameter in said electronic device positioned separate from said controller based on the parameter data or the change in the parameter data transmitted from said controller.

9. A method according to claim 8, wherein said step (d) comprises the step of saving the established parameter data as a file, and said step (e) comprises the step of transmitting all the parameter data saved as the file to the controlled device to change the parameter in the controlled device.

10. A method according to claim 8, wherein said step (e) comprises the step of adding at least control device identification data indicative of the controlled device, control data indicative of a change in the parameter data, and parameter identification data indicative of the parameter, to the parameter data transmitted to the controlled device.

11. A method according to claim 8, further comprising the steps of:

receiving the data transmitted from said controller in the controlled device;

converting a communication protocol of the received data in the controlled device;

recognizing the parameter to be changed with the parameter identification data in the data whose communication protocol has been converted, in the controlled device; and changing the parameter in the controlled device based on the recognized parameter and the parameter data.

12. A method according to claim 8, further comprising the step of:

(g) converting a transmission format between the controller and the controlled device;

and wherein said step (g) comprises the steps of:

receiving the data transmitted from the controller;

converting a communication protocol of the received data; and transmitting the data whose communication protocol has been converted, to the controlled device.

13. A method according to claim 8, wherein the controlled device comprises a video camera having signal processing capabilities or a camera system comprising a camera device and a control unit.

14. An apparatus for setting up an electronic device, comprising:

storage means for storing parameter setting image data for establishing one or more parameters with respect to said electronic device not utilized to establish said one or more parameters, said parameter setting image including parameter changing switch image data and setting state display image data;

display means for displaying a parameter setting image based on and depicting the parameter setting image data read from said storage means;

input means for entering input information indicating changes in display states of a parameter changing switch image data and a setting state display image which are displayed by said display means and a parameter to be established; and control means positioned separate from said electronic device for changing the display states of the parameter changing switch image data and the setting state display image which are displayed by said display means and the parameter to be established, based on the input information entered by said input means, and transmitting changed parameter data or a change in the parameter to said electronic device positioned separate from said control means and not utilized to establish said parameter data.

15. An apparatus according to claim 14, wherein said control means comprises:

position recognizing means for recognizing the position of a pointer in the parameter setting image displayed by said display means, based on the input information entered by said input means; and parameter generating means for generating parameter data based on the input information entered by said input means.

16. An apparatus according to claim 15, wherein said control means comprises:

means for saving the established parameter or parameters as a file, and transmitting all the parameter data saved as the file to the controlled device.

17. An apparatus according to claim 16, wherein said control means comprises:

means for adding at least control device identification data indicative of the controlled device, control data indicative of a change in the parameter data, and parameter identification data indicative of the parameter, to the parameter data transmitted to the controlled device.

18. An apparatus according to claim 17, wherein said controlled device comprises:

means for receiving the data transmitted from said control means, converting a communication protocol of the received data, recognizing the parameter to be changed with the parameter identification data in the data whose communication protocol has been converted, and changing the parameter based on the recognized parameter and the parameter data.

19. An apparatus according to claim 16, further comprising:

a data converter disposed between the controller and the controlled device, for converting a communication protocol of the parameter data transmitted from said control means, and transmitting the data whose communication protocol has been converted, to the controlled device.

20. An apparatus according to claim 14, wherein said controlled device comprises a video camera having signal processing capabilities or a camera system comprising a camera device and a control unit.

21. An apparatus according to claim 20, wherein said control means comprises display means for displaying a video signal supplied from said a video camera or said camera device or said control unit.

22. An apparatus for setting up an electronic device, comprising:

storage means for storing parameter setting image data for establishing one or more parameters with respect to a controlled device, said parameter setting image including parameter changing switch image data and setting state display image data;

display means for displaying a parameter setting image based on and depicting the parameter setting image data read from said storage means;

input means for entering input information indicating chances in display states of a parameter changing switch image data and a setting state display image which are displayed by said display means and a parameter to be established; and control means positioned separate from said controlled device for changing the display states of the parameter changing switch image data and the setting state display image which are displayed by said display means and the parameter to be established, based on the input information entered by said input means, and transmitting changed parameter data or a change in the parameter to the controlled device positioned separate from said control means;

said display means displaying a plurality of components, including at least a plurality of available input devices, or controlled devices, a plurality of associated camera control units, a camera network unit controller, a video camera selector, and interconnections therebetween; and said input means is also adapted for designating one of said displayed plurality of available input devices, or controlled devices, wherein designation of said one input device or controlled device electrically connects said designated input device or controlled device to said network in accordance with said interconnections, thereby allowing said changed parameter data to be transmitted to said designated input device or controlled device.

23. The apparatus of claim 22, wherein said interconnections indicate potential data transfer paths between various of the displayed components.

24. The apparatus of claim 22, wherein at least one of said plurality of input devices is a video recorder.

25. The apparatus of claim 22, wherein said designated input device is indicated on said display means.

26. The apparatus of claim 22, further comprising parameter setting means for setting various parameters in accordance with said designated input device.

27. The apparatus of claim 26, further comprising control means for transmitting said various parameter settings or changes to said various parameter settings to said designated device.

* * * * *

UNITED STATES PATENT AND TRADEMARK OFFICE
CERTIFICATE OF CORRECTION

| | |
|---|---|
| PATENT NO. | : 5,999,213 |
| APPLICATION NO. | : 08/659686 |
| DATED | : December 7, 1999 |
| INVENTOR(S) | : Tsushima et al. |

It is certified that error appears in the above-identified patent and that said Letters Patent is hereby corrected as shown below:

In the Claims:

In claim 3, column 46, at each of lines 24 and 25, replace "controlled" with --electronic--.

In claim 4, column 46, at each of lines 28 and 31, replace "controlled" with --electronic--.

In claim 5, column 46, at each of lines 36, 38, 41 and 43, replace "controlled" with --electronic--.

In claim 6, column 46, at each of lines 47 and 55-56, replace "controlled" with --electronic--.

In claim 7, column 46, at line 57, replace "controlled" with --electronic--.

In claim 9, column 47, at each of lines 29 and 30, replace "controlled" with --electronic--.

In claim 10, column 47, at each of lines 33 and 36, replace "controlled" with --electronic--.

In claim 11, column 47, at each of lines 40, 42, 45 and 47, replace "controlled" with --electronic--.

In claim 12, column 47, at each of lines 53 and 59, replace "controlled" with --electronic--.

In claim 13, column 47, at line 60, replace "controlled" with --electronic--.

In claim 16, column 48, at line 37, replace "controlled" with --electronic--.

In claim 17, column 48, at each of lines 41 and 44, replace "controlled" with --electronic--.

Signed and Sealed this
Seventh Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 5,999,213
APPLICATION NO. : 08/659686
DATED : December 7, 1999
INVENTOR(S) : Tsushima et al.

It is certified that error appears in the above-identified patent and that said Letters Patent is hereby corrected as shown below:

In the Claims:

In claim 3, column 46, at each of lines 24 and 25, replace "controlled" with --electronic--.

In claim 4, column 46, at each of lines 28 and 31, replace "controlled" with --electronic--.

In claim 5, column 46, at each of lines 36, 38, 41 and 43, replace "controlled" with --electronic--.

In claim 6, column 46, at each of lines 47 and 55-56, replace "controlled" with --electronic--.

In claim 7, column 46, at line 57, replace "controlled" with --electronic--.

In claim 9, column 47, at each of lines 29 and 30, replace "controlled" with --electronic--.

In claim 10, column 47, at each of lines 33 and 36, replace "controlled" with --electronic--.

In claim 11, column 47, at each of lines 40, 42, 45 and 47, replace "controlled" with --electronic--.

In claim 12, column 47, at each of lines 53 and 59, replace "controlled" with --electronic--.

In claim 13, column 47, at line 60, replace "controlled" with --electronic--.

In claim 16, column 48, at line 37, replace "controlled" with --electronic--.

In claim 17, column 48, at each of lines 41 and 44, replace "controlled" with --electronic--.

In claim 18, column 48, at line 46, replace "controlled" with --electronic--.

In claim 19, column 48, at each of lines 57 and 60-61, replace "controlled" with --electronic--.

In claim 20, column 48, at line 63, replace "controlled" with --electronic--.

This certificate supersedes the Certificate of Correction issued May 7, 2013.

Signed and Sealed this
Fourth Day of June, 2013

Teresa Stanek Rea
*Acting Director of the United States Patent and Trademark Office*